(12) United States Patent
Zhao et al.

(10) Patent No.: US 12,461,107 B2
(45) Date of Patent: Nov. 4, 2025

(54) COMPOSITIONS, METHODS AND SYSTEMS FOR PROTEIN CORONA ANALYSIS AND USES THEREOF

(71) Applicant: Seer, Inc., Redwood City, CA (US)

(72) Inventors: Xiaoyan Zhao, Foster City, CA (US); William Manning, Redwood City, CA (US); John Blume, Bellingham, WA (US); Lyndal Hesterberg, Loveland, CO (US); Gregory Troiano, Pembroke, MA (US); Michael Figa, San Mateo, CA (US); Hope Liou, Pleasanton, CA (US); Shadi Roshdiferdosi, Belmont, CA (US)

(73) Assignee: Seer, Inc., Redwood City, CA (US)

( * ) Notice: Subject to any disclaimer, the term of this patent is extended or adjusted under 35 U.S.C. 154(b) by 44 days.

(21) Appl. No.: 17/823,924

(22) Filed: Aug. 31, 2022

(65) Prior Publication Data

US 2023/0076807 A1    Mar. 9, 2023

Related U.S. Application Data

(63) Continuation of application No. 17/216,510, filed on Mar. 29, 2021, now abandoned, which is a continuation of application No. PCT/US2020/024426, filed on Mar. 24, 2020.

(60) Provisional application No. 62/824,284, filed on Mar. 26, 2019, provisional application No. 62/824,279, filed on Mar. 26, 2019.

(51) Int. Cl.
*G01N 33/68* (2006.01)
*G01N 33/543* (2006.01)

(52) U.S. Cl.
CPC ... *G01N 33/6848* (2013.01); *G01N 33/54346* (2013.01)

(58) Field of Classification Search
CPC .................. G01N 33/6848; G01N 33/54346
USPC ....................................................... 435/7.92
See application file for complete search history.

(56) References Cited

U.S. PATENT DOCUMENTS

| | | |
|---|---|---|
| 4,444,879 A | 4/1984 | Foster et al. |
| 4,863,873 A | 9/1989 | Matson |
| 5,366,140 A | 11/1994 | Koskenmaki et al. |
| 5,498,545 A | 3/1996 | Vestal |
| 5,900,481 A | 5/1999 | Lough et al. |
| 5,928,952 A | 7/1999 | Hutchins et al. |
| 5,952,653 A | 9/1999 | Covey et al. |
| 6,291,183 B1 | 9/2001 | Pirrung et al. |
| 6,327,410 B1 | 12/2001 | Walt et al. |
| 6,361,944 B1 | 3/2002 | Mirkin et al. |
| 6,413,780 B1 | 7/2002 | Bach et al. |
| 6,730,517 B1 | 5/2004 | Koster et al. |
| 6,759,010 B2 | 7/2004 | Lewis et al. |
| 6,942,968 B1 | 9/2005 | Dickinson et al. |
| 6,969,615 B2 | 11/2005 | Knezevic et al. |
| 7,375,234 B2 | 5/2008 | Sharpless et al. |
| 7,442,921 B2 | 10/2008 | Franzen |
| 7,749,299 B2 | 7/2010 | Vanheusden et al. |
| 8,021,891 B2 | 9/2011 | Rotello et al. |
| 8,304,187 B2 | 11/2012 | Fernando |
| 8,586,306 B2 | 11/2013 | Fernando |
| 8,795,960 B2 | 8/2014 | Seul et al. |
| 8,796,184 B2 | 8/2014 | Chilkoti et al. |
| 8,906,608 B2 | 12/2014 | Boschetti et al. |
| 8,920,851 B2 | 12/2014 | Hovens et al. |
| 9,005,994 B2 | 4/2015 | Huo |
| 9,234,895 B2 | 1/2016 | Hood et al. |
| 9,445,994 B2 | 9/2016 | Irvine et al. |
| 9,549,901 B2 | 1/2017 | Shi et al. |
| 9,657,227 B2 | 5/2017 | Fernando |
| 9,689,039 B2 | 6/2017 | Wong et al. |
| 9,758,811 B2 | 9/2017 | Brown et al. |
| 9,926,590 B2 | 3/2018 | Fernando |
| 9,945,994 B2 | 4/2018 | Hebrink et al. |
| 10,022,334 B2 | 7/2018 | Farokhzad et al. |
| 10,144,955 B2 | 12/2018 | Fernando |
| 10,294,513 B2 | 5/2019 | Fernando |
| 10,525,013 B2 | 1/2020 | Farokhzad et al. |
| 10,689,686 B2 | 6/2020 | Fernando |
| 10,866,242 B2 | 12/2020 | Farokhzad et al. |
| 11,408,898 B2 | 8/2022 | Farokhzad et al. |
| 11,428,688 B2 | 8/2022 | Xia et al. |

(Continued)

FOREIGN PATENT DOCUMENTS

| | | |
|---|---|---|
| CN | 101248189 A | 8/2008 |
| CN | 103703143 A | 4/2014 |

(Continued)

OTHER PUBLICATIONS

Kaufmann et al., Comparison of linear intrascan and interscan dynamic ranges of Orbitrap and ion-mobility time-of-flight mass spectrometers, (2017), Rapid Commun Mass Spectrom. 2017;31:1915-1926. (Year: 2017).*

Bertoli et al., Magnetic Nanoparticles to Recover Cellular Organelles and Study the Time Resolved Nanoparticle-Cell Interactome throughout Uptake, (2014), Small 2014, 10, No. 16, 3307-3315. (Year: 2014).*

Millioni et al. , High Abundance Proteins Depletion vs Low Abundance Proteins Enrichment: Comparison of Methods to Reduce the Plasma Proteome Complexity, (2011), PLoS One, May 4, 2011;6(5): e19603. (Year: 2011).*

(Continued)

*Primary Examiner* — Gregory S Emch
*Assistant Examiner* — Omar Ramadan
(74) *Attorney, Agent, or Firm* — WILSON SONSINI GOODRICH & ROSATI

(57) ABSTRACT

This disclosure provides methods and compositions for biomolecule corona analysis of biofluids. A biofluid may be contacted with a nanoparticle to form a biomolecule corona, and the composition of the resulting corona may be analyzed. Also provided are methods of preparing a biofluid for corona analysis by serial interrogation.

25 Claims, 45 Drawing Sheets

(56) References Cited

U.S. PATENT DOCUMENTS

| | | |
|---|---|---|
| 11,435,242 B2 | 9/2022 | Sheng et al. |
| 11,435,360 B2 | 9/2022 | Farokhzad et al. |
| 11,630,112 B2 | 4/2023 | Manning et al. |
| 11,850,309 B2 | 12/2023 | Farokhzad et al. |
| 11,906,526 B2 | 2/2024 | Manning et al. |
| 12,000,827 B2 | 6/2024 | Farokhzad et al. |
| 12,050,222 B2 | 7/2024 | Manning et al. |
| 12,055,541 B2 | 8/2024 | Farokhzad et al. |
| 2002/0009394 A1 | 1/2002 | Koster et al. |
| 2002/0094533 A1 | 7/2002 | Hess et al. |
| 2002/0102578 A1 | 8/2002 | Dickinson et al. |
| 2002/0127727 A1 | 9/2002 | Bach et al. |
| 2004/0106131 A1 | 6/2004 | Roy et al. |
| 2004/0132122 A1 | 7/2004 | Banerjee et al. |
| 2004/0147040 A1 | 7/2004 | Bluggel et al. |
| 2004/0153249 A1 | 8/2004 | Zhang et al. |
| 2004/0170822 A1 | 9/2004 | Rohrbaugh et al. |
| 2005/0130240 A1 | 6/2005 | Lin et al. |
| 2005/0272049 A1 | 12/2005 | Banerjee et al. |
| 2006/0081539 A1 | 4/2006 | Safar et al. |
| 2007/0072250 A1 | 3/2007 | Kim et al. |
| 2007/0178504 A1 | 8/2007 | Colpitts et al. |
| 2007/0184456 A1 | 8/2007 | Chee et al. |
| 2007/0224644 A1 | 9/2007 | Liotta et al. |
| 2008/0133141 A1 | 6/2008 | Frost |
| 2008/0160546 A1 | 7/2008 | Colpitts et al. |
| 2008/0277578 A1 | 11/2008 | Ferrari et al. |
| 2009/0004687 A1 | 1/2009 | Mansfield et al. |
| 2009/0054222 A1 | 2/2009 | Zhang et al. |
| 2009/0090855 A1 | 4/2009 | Kobold et al. |
| 2009/0182120 A1 | 7/2009 | Utermohlen et al. |
| 2009/0253181 A1 | 10/2009 | Vangbo et al. |
| 2009/0291454 A1 | 11/2009 | Sim et al. |
| 2009/0298710 A1 | 12/2009 | Farokhzad et al. |
| 2009/0305392 A1 | 12/2009 | Alfredsson et al. |
| 2010/0267108 A1 | 10/2010 | Jordaan et al. |
| 2011/0027894 A1 | 2/2011 | Farias-Eisner et al. |
| 2011/0052715 A1 | 3/2011 | Davis et al. |
| 2011/0076735 A1 | 3/2011 | Jovanovich et al. |
| 2011/0111443 A1 | 5/2011 | Nishimura et al. |
| 2011/0306514 A1 | 12/2011 | Hewitt et al. |
| 2012/0043208 A1 | 2/2012 | Jin et al. |
| 2012/0046184 A1 | 2/2012 | Dawson et al. |
| 2012/0088249 A1 | 4/2012 | Jovanovich et al. |
| 2012/0156135 A1 | 6/2012 | Farokhzad et al. |
| 2012/0171694 A1 | 7/2012 | Mansfield et al. |
| 2012/0328594 A1 | 12/2012 | McKenna et al. |
| 2013/0045873 A1 | 2/2013 | Hood et al. |
| 2013/0052661 A1 | 2/2013 | Huo |
| 2013/0058923 A1 | 3/2013 | Huo |
| 2013/0084561 A1 | 4/2013 | Coull et al. |
| 2014/0080119 A1 | 3/2014 | Stein et al. |
| 2014/0227687 A1 | 8/2014 | Horlitz et al. |
| 2014/0296096 A1 | 10/2014 | Llorente et al. |
| 2014/0323330 A1 | 10/2014 | Bergo |
| 2014/0374584 A1 | 12/2014 | Stults et al. |
| 2015/0168421 A1 | 6/2015 | Kearney et al. |
| 2015/0376678 A1 | 12/2015 | Krizman et al. |
| 2017/0074869 A1 | 3/2017 | Krijgsveld et al. |
| 2017/0131276 A1 | 5/2017 | Johnston |
| 2017/0216218 A1 | 8/2017 | Farokhzad et al. |
| 2018/0136231 A1 | 5/2018 | Borrebaeck et al. |
| 2018/0172694 A1* | 6/2018 | Farokhzad ......... G01N 33/6848 |
| 2018/0335376 A1* | 11/2018 | Ayliffe ............... G01N 15/1433 |
| 2018/0356414 A1 | 12/2018 | Strano et al. |
| 2018/0361000 A1 | 12/2018 | Weissleder et al. |
| 2019/0117799 A1 | 4/2019 | Xu et al. |
| 2019/0195903 A1 | 6/2019 | Leboudec |
| 2020/0085758 A1 | 3/2020 | Farokhzad et al. |
| 2020/0138728 A1 | 5/2020 | Farokhzad et al. |
| 2021/0072255 A1 | 3/2021 | Farokhzad et al. |
| 2021/0098083 A1 | 4/2021 | Ma et al. |
| 2021/0132071 A1 | 5/2021 | Kostarelos et al. |
| 2021/0215685 A1 | 7/2021 | Xia et al. |
| 2021/0215709 A1 | 7/2021 | Zhao et al. |
| 2021/0293801 A1 | 9/2021 | Farokhzad et al. |
| 2021/0299060 A1 | 9/2021 | Farokhzad et al. |
| 2021/0311064 A1 | 10/2021 | Farokhzad et al. |
| 2021/0318321 A1 | 10/2021 | Farokhzad et al. |
| 2022/0226510 A1 | 7/2022 | Xu et al. |
| 2022/0260559 A1 | 8/2022 | Blume et al. |
| 2022/0334123 A1 | 10/2022 | Farokhzad et al. |
| 2022/0365096 A1 | 11/2022 | Farokhzad et al. |
| 2023/0076840 A1 | 3/2023 | Farokhzad et al. |
| 2023/0160882 A1 | 5/2023 | Siddiqui et al. |
| 2023/0204596 A1 | 6/2023 | Manning et al. |
| 2023/0212647 A1 | 7/2023 | Farokhzad et al. |
| 2023/0213504 A1 | 7/2023 | Farokhzad et al. |
| 2023/0253113 A1 | 8/2023 | Guturu et al. |
| 2023/0324401 A1 | 10/2023 | Farokhzad et al. |
| 2023/0384317 A1 | 11/2023 | Manning et al. |
| 2023/0408503 A1 | 12/2023 | Hornburg et al. |
| 2023/0417744 A1 | 12/2023 | Xia et al. |
| 2024/0044884 A1 | 2/2024 | Farokhzad et al. |
| 2024/0044885 A1 | 2/2024 | Farokhzad et al. |
| 2024/0125795 A1 | 4/2024 | Hornburg et al. |
| 2024/0219398 A1 | 7/2024 | Manning et al. |
| 2024/0219400 A1 | 7/2024 | Siddiqui et al. |
| 2024/0264165 A1 | 8/2024 | Zhao et al. |
| 2024/0280558 A1 | 8/2024 | Platt et al. |
| 2024/0280566 A1 | 8/2024 | Farokhzad et al. |
| 2024/0288438 A1 | 8/2024 | Manning et al. |
| 2024/0353419 A1 | 10/2024 | Farokhzad et al. |
| 2024/0361307 A1 | 10/2024 | Farokhzad et al. |
| 2024/0385156 A1 | 11/2024 | Li et al. |

FOREIGN PATENT DOCUMENTS

| | | |
|---|---|---|
| CN | 103869080 A | 6/2014 |
| CN | 108309938 A | 7/2018 |
| CN | 109070040 A | 12/2018 |
| DE | 202017007363 U1 | 2/2021 |
| EP | 1308520 A2 | 5/2003 |
| EP | 2209893 A1 | 7/2010 |
| EP | 3510402 A1 | 7/2019 |
| EP | 3548652 A1 | 10/2019 |
| EP | 3554681 B1 | 2/2022 |
| EP | 4056263 A1 | 9/2022 |
| JP | 2003517998 A | 6/2003 |
| JP | 2009524828 A | 7/2009 |
| RU | 2200324 C2 | 3/2003 |
| WO | WO-9718474 A1 | 5/1997 |
| WO | WO-2007089731 A2 | 8/2007 |
| WO | WO-2009097526 A1 | 4/2009 |
| WO | WO-2010097785 A1 | 9/2010 |
| WO | WO-2010148365 A2 | 12/2010 |
| WO | WO-2010148365 A3 | 5/2011 |
| WO | WO-2011088128 A2 | 7/2011 |
| WO | WO-2012006385 A2 | 1/2012 |
| WO | WO-2012068226 A3 | 8/2012 |
| WO | WO-2012106385 A2 | 8/2012 |
| WO | WO-2012170711 A1 | 12/2012 |
| WO | WO-2013022995 A2 | 2/2013 |
| WO | WO-2015118152 A1 | 8/2015 |
| WO | WO-2018046542 A1 | 3/2018 |
| WO | WO-2018112460 A1 | 6/2018 |
| WO | WO-2019083856 A1 | 5/2019 |
| WO | WO-2019133892 A1 | 7/2019 |
| WO | WO-2020096631 A2 | 5/2020 |
| WO | WO-2020198209 A1 | 10/2020 |

OTHER PUBLICATIONS

Villanueva et al., Automated serum peptide profiling, (2006), Nat. Protoc, 2006;1(2): 880-91. (Year: 2006).*

A. Liaw, M. Wiener, Classification and regression by randomForest. R news 2, 18-22 (2002).

Agasti et al. (Adv. Drug Deliv Rev. Mar. 8, 2010; 62(3):316-328) (Year: 2010).

Aggarwal, P., Hall, J.B., Mcleland, C.B., Dobrovolskaia, M.A. & McNeil, S.E. Nanoparticle interaction with plasma proteins as it relates to particle biodistribution, biocompatibility and therapeutic efficacy. Advanced drug delivery reviews 61, 428-437 (2009).

(56) References Cited

OTHER PUBLICATIONS

Ahn, J.-M. & Cho, J.-Y. Current serum lung cancer biomarkers. Journal of Molecular Biomarkers & Diagnosis 2013 (2013).
Alavi et al.: Applying Automated Machine Learning to Accelerate Large-Scale Proteomics Data Analysis. Seer, Inc., Redwood City, CA; and Massachusetts General Hospital, Boston, MA. poster 1 page (2023).
Alavi et al.: Challenges in Large Scale Proteomics Data Analysis: A Survey of Characterization and Correction Solutions for Batch Effects. Seer, Inc., Redwood City, CA, online video available at https://seer.bio/resources/video-gallery/?tx_category=publications&wchannelid=dfl89n6go7&wmediaid=d4eyac11ff (2022).
Alavi et al.: Challenges in Large Scale Proteomics Data Analysis: A Survey of Characterization and Correction Solutions for Batch Effects. Seer, Inc., Redwood City, CA, poster 1 page (2022).
Alexopoulos, C., Blatsios, B. & Avgerinos, A. Serum lipids and lipoprotein disorders in cancer patients. Cancer 60, 3065-3070 (1987).
Alexopoulos, C., Pournaras, S., Vaslamatzis, M., Avgerinos, A. & Raptis, S. Changes in serum lipids and lipoproteins in cancer patients during chemotherapy. Cancer chemotherapy and pharmacology 30, 412-416 (1992).
Ali, et al. "Erlotinib-Conjugated Iron Oxide Nanoparticles as a Smart Cancer-Targeted Theranostic Probe for MRI." Scientific reports vol. 6 36650. Nov. 11, 2016, doi:10.1038/srep36650.
Amici, A. et al. In vivo protein corona patterns of lipid nanoparticles. RSC Advances 7, 1137-1145 (2017).
Andersen, J.D. et al. Identification of candidate biomarkers in ovarian cancer serum by depletion of highly abundant proteins and differential in-gel electrophoresis. Electrophoresis 31, 599-610(2010).
Anderson, L. Candidate-Based Proteomics in the Search for Biomarkers of Cardiovascular Disease. The Journal of physiology 2005, 563, 23-60.
Andriole et al.: Mortality results from a randomized prostate-cancer screening trial. N Engl J Med. 360(13):1310-1319 doi:10.1056/NEJMoa0810696 (2009).
Angel, T.E. et al. Mass spectrometry-based proteomics: existing capabilities and future directions. Chemical Society Reviews 41, 3912-3928 (2012).
Arvizo et al.: Identifying new therapeutic targets via modulation of protein corona formation by engineered nanoparticles. PLoS One 7(3):e33650, pp. 1-8 doi:10.1371/journal.pone.0033650 (2012).
Ashby et al., Size and surface functionalization of iron oxide nanoparticles influence the composition and dynamic nature of their protein corona. ACS Appl. Mater. Interfaces 2014, 6, p. 15412-15419.
Askim, J. R., Mahmoudi, M. & Suslick, K. S. Optical sensor arrays for chemical sensing: the optoelectronic nose. Chemical Society Reviews 42, 8649-8682 (2013).
Auluck et al.: A Cloud-Scalable Software Suite for Large-Scale Proteogenomics Data Analysis and Visualization. Seer, Inc., Redwood City, CA, poster 1 page (2022).
Bagalkot, V. et al. Quantum dot-aptamer conjugates for synchronous cancer imaging, therapy, and sensing of drug delivery based on bi-fluorescence resonance energy transfer. Nano letters 7, 3065-3070 (2007).
Bakhtiary, Z. et al. Targeted superparamagnetic iron oxide nanoparticles for early detection of cancer: Possibilities and challenges. Nanomedicine: Nanotechnology, Biology and Medicine 12, 287-307 (2016).
Bally, M., et al. "Liposome and lipid bilayer arrays towards biosensing applications." Small 6.22 (2010): 2481-2497.
Barkman et al.: Fabricated micro-nano devices for in vivo and in vitro biomedical applications. Wiley Interdiscip Rev Nanomed Nanobiotechnol 5(6):544-568 doi: 10.1002/wnan.1236 (2013).
Barran-Berdon, et al., Time Evolution of Nanoparticle-Protein corona in Human Plasma: Relevance for targeted drug delivery. Langmuir, 2013, 29, 6485-6494.
Baumann et al.: Standardized approach to proteome profiling of human serum based on magnetic bead separation and matrix-assisted laser desorption/ionization time-of-flight mass spectrometry. Clin Chem. 51(6):973-980 doi:10.1373/clinchem.2004.047308 (2005).
Beck, H.C., Overgaard, M. & Rasmussen, L.M. Plasma proteomics to identify biomarkers-application to cardiovascular diseases. Translational Proteomics 7, 40-48 (2015).
Benjamin, E. J., Blaha, M. J., Chiuve, S. E., et al. Heart Disease and Stroke Statistics-2017 Update: A Report from the American Heart Association. Circulation 2017, 135, e146-e603.
Benz et al.: Deep Plasma Proteomics at Scale with Proteograph™ Product Suite: A Performance Evaluation with Label-free and TMT Multiplexing Methods. Seer, Inc., Redwood City, CA; Sanford Burnham Prebys Medical Discovery Institute, La Jolla, CA 92037, USA, poster 1 page (2022).
Beri, J., Rosenblatt, M.M., Strauss, E., Urh, M. & Bereman, M.S. Reagent for Evaluating Liquid Chromatography-Tandem Mass Spectrometry (LC-MS/MS) Performance in Bottom-Up Proteomic Experiments. Analytical chemistry 87, 11635-11640 (2015).
Bertrand, N., et al. Mechanistic understanding of in vivo protein corona formation on polymeric nanoparticles and impact on pharmacokinetics. Nat Commun 8, 777 (2017).
Bigbee et al.: Tumor Markers and Immunodiagnosis. Holland-Frei Cancer Medicine, 6th edition Hamilton (ON):BC Decker; Chapter 13, pp. 209-220 (2003).
Bigdeli et al. "Exploring cellular interactions in liposomes using protein corona fingerprints and physicochemical properties", ACS Nano, 10(3): 3723-3737 (2016).
Bio-Rad, ProteoMiner™ Protein Enrichment Technology [Online] Available at: http://wolfson.huji.ac.il/purification/PDF/AlbuminRemoval/BIORAD_ProteoMiner.pdf. [Accessed Sep. 17, 2020].
Bisker, et al. Protein-targeted corona phase molecular recognition. Nat Commun 7, 10241 (2016). https://doi. org/10.1038/ncomms10241.
Bloom, D., Cafiero, E., Jane-Llopis, E., et al. The Global Economic Burden of Noncommunicable Diseases. Program on the Global Demography of Aging;2012.
Bloomston, M. et al. Fibrinogen y overexpression in pancreatic cancer identified by large-scale proteomic analysis of serum samples. Cancer research 66, 2592-2599 (2006).
Blume, et al., Rapid, deep and precise profiling of the plasma proteome with multi-nanoparticle protein corona. Nat Commun 11, 3662; 1-14 (2020). https://doi.org/10.1038/s41467-020-17033-7.
Bodansky, O. & Mcinnes, G. F. Thermal coagulation of serum proteins in cancer, in the postoperative phase of surgery, and in the administration of adrenocorticotropic hormone. Cancer 3, 1-14 (1950).
Brede et al., Applications of Nanoparticles in the Detection and Treatment of Kidney Diseases, Advances in Chronic kidney disease, vol. 20, Issue 6, Nov. 2013, pp. 454-465.
Breiman, L., "Random Forests," Machine Learning, 2001, vol. 45, pp. 5-32.
Brenner, et al., Gene Expression analysis by massively parallel signature sequencing (MPSS) on microbead arrays. Nature Biotechnology 18.6 (Jun. 2000): 630-634, doi:10.1038/76469.
Buys et al.: Effect of screening on ovarian cancer mortality: the Prostate, Lung, Colorectal and Ovarian (PLCO) Cancer Screening Randomized Controlled Trial. JAMA 305(22):2295-2303 doi:10.1001/jama.2011.766 (2011).
Byrne, J.C et al. 2D-DIGE as a strategy to identify serum markers for the progression of prostate cancer. Journal of proteome research 8, 942-957 (2008).
Calvo et al.: Clinical proteomics: from biomarker discovery and cell signaling profiles to individualized personal therapy. Biosci Rep. 25(1-2):107-125 doi:10.1007/s10540-005-2851-3 (2005).
Canini, S et al., Association between birth weight and first-trimester free beta-human chorionic gonadotropin and pregnancy-associated plasma protein A. Fertility and Sterility. Jan. 2008, vol. 89 No. 1. pp. 174-178.
Canovi et al.: Applications of surface plasmon resonance (SPR) for the characterization of nanoparticles developed for biomedical purposes. Sensors (Basel). 12(12):16420-16432 doi:10.3390/s121216420 (2012).

(56) References Cited

OTHER PUBLICATIONS

Cao, Z., Tang, H.-Y., Wang, H., Liu, Q. & Speicher, D.W. Systematic comparison of fractionation methods for in-depth analysis of plasma proteomes. J Proteome Res 11, 3090-3100 (2012).
Capriotti, A.L. et al. Label-free quantitative analysis for studying the interactions between nanoparticles and plasma proteins. Analytical and bioanalytical chemistry 405, 635-645 (2013).
Capriotti et al.: Analytical methods for characterizing the nanoparticle-protein corona. Chromatographia 77(11-12):755-769 DOI:10.1007/s10337-014-2677-x (2014).
Capriotti et al., Shotgun proteomic analytical approach for studying proteins adsorbed onto liposome surface, Anal Bioanal Chem, 2011, 401, 1195-1202.
Caputo, et al. A protein corona-enabled blood test for early cancer detection. Nanoscale 9.1 (Jan. 7, 2017): 349-354.
Caracciolo, et al., Evolution of the protein corona of lipid gene vectors as a function of plasma concentration. Langmuir, 2011, 27, 15048-15053.
Caracciolo, G., Caputo, D., Pozzi, D., Colapicchioni, V. & Coppola, R. Size and charge of nanoparticles following incubation with human plasma of healthy and pancreatic cancer patients. Colloids and Surfaces B: Biointerfaces 123, 673-678 (2014).
Caracciolo, G., et al. "Disease-specific protein corona sensor arrays may have disease detection capacity." Nanoscale Horizons 4.5 (2019): 1063-1076.
Caracciolo, G., et al. Lipid composition: a "key factor" for the rational manipulation of the liposome-protein corona by liposome design. RSC Adv 5, 5967-5975 (2015).
Caracciolo, G., Farokhzad, O.C. & Mahmoudi, M. Biological Identity of Nanoparticles In Vivo: Clinical Implications of the Protein Corona. Trends in Biotechnology 35, 257-264 (2017).
Carey, J. R. et al. Rapid identification of bacteria with a disposable colorimetric sensing array. Journal of the American Chemical Society 133, 7571-7576 (2011).
Carter, A. M. Complement Activation: An Emerging Player in the Pathogenesis of Cardiovascular Disease. Scientifica 2012, 2012.
Carter, H. B et al. Early detection of prostate cancer: AUA Guideline. The Journal of urology 190, 419-426 (2013).
Cedervall, T., et al. Understanding the nanoparticle-protein corona using methods to quantify exchange rates and affinities of proteins for nanoparticles. Proc Natl Acad Sci U S A 104, 2050-2055 (2007).
Cerasoli, E. et al. MiS-MALDI: microgel-selected detection of protein biomarkers by MALDI-ToF mass spectrometry. Molecular Biosystems 6, 2214-2217 (2010).
Chen et al.: Balancing deep proteome coverage with limited sample amounts using Seer's ProteographTM Product Suite. Application Note, Seer, Inc., Redwood City, CA, pp. 1-6 (2023).
Chen et al.: Balancing deep proteome coverage with limited sample amounts using Seer's ProteographTM Product Suite. Seer, Inc., Redwood City, CA, poster 1 page (2023).
Chintamaneni et al.: Biomarkers in Alzheimer's disease: a review. ISRN Pharmacol. 2012:984786:1-6 doi:10.5402/2012/984786 (2012).
Choi, Y.-E., Kwak, J.-W. & Park, J. W. Nanotechnology for early cancer detection. Sensors 10, 428-455 (2010).
Chung et al.: Novel serum protein biomarker panel revealed by mass spectrometry and its prognostic value in breast cancer. Breast Cancer Res. 16(3):R63:1-12 doi: 10.1186/bcr3676 (2014).
Clarke et al.: Characterization of renal allograft rejection by urinary proteomic analysis. Ann Surg. 237(5):660-664; discussion 664-665. doi:10.1097/01.SLA.0000064293.57770.42 (2003).
Clemments, A. M. et al., Protein Adsorption From Biofluids on Silica Nanoparticles: Corona Analysis as a Function of Particle Diameter and Porosity, ACS Applied Materials & Interfaces 2015, 7, 21682-21689, with 5 pages of supporting information.
Colapicchioni, V. et al. Personalized liposome-protein corona in the blood of breast, gastric and pancreatic cancer patients. International Journal of Biochemistry and Cell Biology, 2015,75(11): 180-187.
Consortium, E.P. Europe PMC: a full-text literature database for the life sciences and platform for innovation. Nucleic acids research, gku1061 (2014).

Corbo, C. et al., Biomarker discovery by proteomics-based approaches for early detection and personalized medicine in colorectal cancer, Proteomics—Clinical Applications, 2017, 11, 5-6, paper 1600072, 19 pages.
Corbo, C. et al. Unveiling the in Vivo Protein Corona of Circulating Leukocyte-like Carriers. ACS Nano (2017).
Corbo, C., Molinaro, R., Parodi, A., Furman, N. E. T., Salvatore, F., Tasciotti, E. The Impact of Nanoparticle Protein Corona on Cytotoxicity, Immunotoxicity and Target Drug Delivery. Nanomedicine 2016, 11, 81-100.
Corbo, C., Molinaro, R., Tabatabaei, M., Farokhzad, O.C. & Mahmoudi, M. Personalized protein corona on nanoparticles and its clinical implications. Biomater Sci 5, 378-387 (2017).
Corbo, et al. Effects of the protein corona on liposome-liposome and liposome-cell interactions. Int J Nanomedicine. 2016; 11: 3049-3063. Published online Jul. 4, 2016. doi: 10.2147/IJN.S109059.
Cramer et al.: Ovarian cancer biomarker performance in prostate, lung, colorectal, and ovarian cancer screening trial specimens. Cancer Prev Res (Phila) 4(3):365-374 doi:10.1158/1940-6207.CAPR-10-0195 (2011).
Croft, D. et al. The Reactome pathway knowledgebase. Nucleic acids research 42, D472-D477 (2013).
Cruz, J.A. & Wishart, D.S. Applications of machine learning in cancer prediction and prognosis. Cancer informatics 2, 59 (2006).
Cuenca, A.G. et al. Emerging implications of nanotechnology on cancer diagnostics and therapeutics. Cancer 107, 459-466 (2006).
Cuzick, J. et al. Prevention and early detection of prostate cancer. The Lancet Oncology 15, e484-e492, doi: 10.1016/ S1470-2045(14)70211-6.
Dai et al.: Combining proteograph technology with zeno swath dia acquisition enables the potential for deep, unbiased discovery of biomarkers in blood. PrognomiQ Inc., 1900 Alameda de las Pulgas, Suite 100, San Mateo, California, USA, poster 1 page (2022).
De Lathauwer, L., B. De Moor, J. Vandewalle, A multilinear singular value decomposition. SIAM journal on Matrix Analysis and Applications 21, 1253-1278 (2000).
Del Pino, et al. Protein corona formation around nanoparticles—from the past to the future. Maler Horiz, 2014, 1, 301.
Deng, Z.J., Liang, M., Monteiro, M., Toth, I. & Minchin, R.F. Nanoparticle-induced unfolding of fibrinogen promotes Mac-1 receptor activation and inflammation. Nature nanotechnology 6, 39-44 (2011).
Deng, Z.J., Liang, M., Toth, I., Monteiro, M.J. & Minchin, R.F. Molecular interaction of poly (acrylic acid) gold nanoparticles with human fibrinogen. ACS nano 6, 8962-8969 (2012).
Di Domenico, M. et al., Nanoparticle-biomolecular corona: A new approach for the early detection of non-small-cell lung cancer, Journal of Cellular Physiology 2019, 234, 9378-9386.
Di Silvio, D. et al., Technical tip: high-resolution isolation of nanoparticle-protein corona complexes from physiological fluids, Nanoscale, 2015, 7, 11980-11990, with 7 pages of supplementary information.
Dicker, L., Lin, X. & Ivanov, A.R. Increased power for the analysis of label-free LC-MS/MS proteomics data by combining spectral counts and peptide peak attributes. Molecular & Cellular Proteomics 9, 2704-2718 (2010).
Dobrovolskaia et al., Protein corona composition does not accurately predict hematocompatibility of colloidal gold nanoparticles, Nanomedicine: Nanotechnology, Biology, and Medicine, 2014, 10:1453-1463.
Docter, D., et al. Quantitative profiling of the protein coronas that form around nanoparticles. Nat Protoc 9, 2030-2044 (2014).
Docter, et al. The nanoparticle biomolecule corona: lessons learned-challenge accepted?. Chemical Society Reviews 44.17 (2015): 6094-6121.
Donovan et al.: Proteoform inference using a proteogenomic approach in non-small cell lung cancer and healthy control plasma proteomes reveals disease-associated protein isoforms. Seer Inc., Redwood City, CA USA, poster 1 page (2022).
Dyna beads Products & Technology. ThennoFisher Scientific, Website accessed Dec. 15, 2021 at https://www.thermofisher.com/us/en/home/brands/product-brand/dynal/dynabeads-technology.html.

(56) References Cited

OTHER PUBLICATIONS

Einav, S. et al. Early postoperative serum S10013 levels predict ongoing brain damage after meningioma surgery: a prospective observational study. Critical Care 10, 1 (2006).
Elechalawar, C. K. et al., Analysing the nanoparticle-protein corona for potential molecular target identification. Journal of Controlled Release 322:122-136 doi:10.1016/j.jconrel.2020.03.008 (2020).
Ellenberger et al.: Robust, high throughput and deep plasma proteomics workflow with engineered nanoparticle panels. Seer, Inc., Redwood City, CA, poster 1 page (2022).
Ellenberger et al.: Robust in-depth label-free plasma proteomics with engineered nanoparticle panels: An evaluation of micro-pillar array columns and FAIMS peptide separation. Seer, Inc., Redwood City, CA, poster 1 page (2022).
Enroth, S., Hallmans, G., Grankvist, K. & Gyllensten, U. Effects of long-term storage time and original sampling month on biobank plasma protein concentrations. EBioMedicine 12, 309-314 (2016).
Enten, A. et al., A Liquid-Handling Robot for Automated Attachment of Biomolecules to Microbeads, Journal of Laboratory Automation 2016, 21, 526-532.
Espina et al.: Use of proteomic analysis to monitor responses to biological therapies. Expert Opin Biol Ther. 4(1):83-93 doi:10.1517/14712598.4.1.83 (2004).
Etzioni, R. et al. The case for early detection. Nature Reviews Cancer 3, 243-252 (2003).
Everley, et al., Proteograph: Efficient and automated multi-nanoparticle platform for Deep, Unbiased Plasma protein profiling and protein-protein interaction biological insight. Seer, Inc. Mar. 2020.
Faca, V. M. et al. A mouse to human search for plasma proteome changes associated with pancreatic tumor development. PLoS Med 5, e123 (2008).
Farias, V., A. Li, Optimal Recovery of Tensor Slices. Artificial Intelligence and Statistics, 1394-1402 (2017).
Farokhzad, 0. C et al. Targeted nanoparticle-aptamer bioconjugates for cancer chemotherapy in vivo. Proceedings of the National Academy of Sciences 103, 6315-6320 (2006).
Farrah et al.: State of the Human Proteome in 2013 as Viewed through PeptideAtlas: Comparing the Kidney, Urine, and Plasma Proteomes for the Biology- and Disease-Driven Human Proteome Project. J Proteome Res. 13(1):60-75.
Farrah, T., et al. A high-confidence human plasma proteome reference set with estimated concentrations in PeptideAtlas. Mol Cell Proteomics 10, M110 006353 (2011).
Faunce et al.: Integrated research into the nanoparticle-protein corona: a new focus for safe, sustainable and equitable development of nanomedicines. Nanomedicine (Lond). 3(6):859-866 doi:10.2217/17435889.3.6.859 (2008).
Feldman, E. B. & Carter, A. C. Circulating lipids and lipoproteins in women with metastatic breast carcinoma. The Journal of Clinical Endocrinology & Metabolism 33, 8-13 (1971 ).
Fengming et al.: Biomarkers of inflammatory bowel disease. Dis Markers 2014:710915:1-11 doi:10.1155/2014/710915 (2014).
Ferdosi et al.: Engineered nanoparticles enable deep proteomics studies at scale by leveraging tunable nano-bio interactions. PNAS USA 119(11):e2106053119, pp. 1-11 doi:10.1073/pnas.2106053119 (2022).
Ferdosi et al.: Enhanced Competition at the Nano-Bio Interface Enables Comprehensive Characterization of Protein Corona Dynamics and Deep Coverage of Proteomes. Adv Mater. e2206008, pp. 1-11 doi:10.1002/adma.202206008 (2022).
Ferdosi et al.: Multi-nanoparticle Workflow Enables Deep Plasma Proteomics at Scale, with Enhanced Precision, and Depths of Coverage. Seer, Inc. (Mar. 2022).
Ferdosi et al.: The Nanoparticle-Based Plasma Proteomics Workflow enables the Investigation of Glycoproteome. Seer, Inc., Redwood City, CA, poster 1 page (2022).
Ferguson, M. K. et al. Sex-associated differences in survival of patients undergoing resection for lung cancer. The Annals of thoracic surgery 69, 245-249 (2000).
Ferrari, M. Cancer nanotechnology: opportunities and challenges. Nature Reviews Cancer 5, 161-171 (2005).
Findeisen et al.: Preanalytical impact of sample handling on proteome profiling experiments with matrix-assisted laser desorption/ionization time-of-flight mass spectrometry. Clin Chem. 51(12):2409-2411 doi:10.1373/clinchem.2005.054585 (2005).
Flory et al.: A Highly Scaled Proteomic Discovery Study for Prostate Cancer Diagnostic Signatures Using ProteographTM Workflow with Trapped Ion Mobility Mass Spectrometry. Oregon Health and Science University, Knight Cancer Institute, Cancer Early Detection Advanced Research Center; University of Texas Health Science Center at San Antonio Health; Fred Hutchinson Cancer Research Center; Bruker Daltonics, Billerica; Seer Inc., poster 1 page (2022).
Fodor, S.P. et al., Light-directed, spatially addressable parallel chemical synthesis. Science, 251 (4995), 767-773 (1991).
Fontana, R. S. et al. Early Lung Cancer Detection: Results of the Initial (Prevalence) Radiologic and Cytologic Screening in the Mayo Clinic Study 1, 2. American Review of Respiratory Disease 130, 561-565 (1984).
Forbes, et al. Cosmic: exploring the world's knowledge of somatic mutations in human cancer. Nucleic Acids Res. Jan. 2015;43 (Database issue):D805-D811. Epub Oct. 29, 2014.
Foroozandeh et al.: Merging worlds of nanomaterials and biological environment: factors governing protein corona formation on nanoparticles and its biological consequences. Nanoscale Res Lett. 10(221):1-12 doi:10.1186/s11671-015-0922-3 (2015).
Fortunato, J. E., Bassiouny, H. S., Song, R.H., et al. Apolipoprotein (a) Fragments in Relation to Human Carotid Plaque Instability. Journal of vascular surgery 2000, 32, 555-563.
Gabizon, A. et al. Cancer nanomedicines: closing the translational gap. The Lancet 384, 2175-2176 (2014).
Gajadhar et al.: An integrated data processing and visualization suite leveraging cloud scalable architecture for large-cohort proteogenomics data analysis and interpretation. Seer, Inc., Redwood City, CA, poster 1 page (Jun. 2022).
Gajadhar et al.: Unbiased human biofluids analysis using a scalable, deep, automated, multi-nanoparticle-based proteomics workflow. Seer, Inc., Redwood City, CA, poster 1 page (2023).
Gan, C.S., Chong, P.K., Pham, T.K. & Wright, P.C. Technical, experimental, and biological variations in isobaric tags for relative and absolute quantitation (iTRAQ). Journal of proteome research 6, 821-827 (2007).
Gao, W.-M. et al. Distinctive serum protein profiles involving abundant proteins in lung cancer patients based upon antibody microarray analysis. BMC cancer 5, 1 (2005).
Gautam, P. et al. Proteins with altered levels in plasma from glioblastoma patients as revealed by iTRAQ-based quantitative proteomic analysis. PloS one 7, e46153 (2012).
Geyer, P.E., et al., Plasma proteome profiling to assess human health and disease. Cell systems, 2016;2: 185-195.
Ghasemi, F., Hormozi-Nezhad, M. R. & Mahmoudi, M. Identification of catecholamine neurotransmitters using fluorescence sensor array. Analytica Chimica Acta 917, 85-92 (2016).
Ghavami, M. et al. Plasma concentration gradient influences the protein corona decoration on nanoparticles. Rsc Advances 3, 1119-1126 (2013).
Gopal, K., Grossi, E., Paoletti, P. & Usardi, M. Lipid composition of human intracranial tumors: A biochemical study. Acta neurochirurgica 11, 333-34 7 (1963).
Gossmann, R. et al., Comparative examination of adsorption of serum proteins on HSA- and PLGA-based nanoparticles using SDS-PAGE and LC-MS, European Journal of Pharmaceutics and Biopharmaceutics 2015, 93, 80-87.
Guerrier et al.: A simplified monobuffer multidimensional chromatography for high-throughput proteome fractionation. J Chromatogr A. 1073(1-2):25-33 doi:10.1016/j.chroma.2004.10.002 (2005).
Guo, D. et al. An LXR agonist promotes glioblastoma cell death through inhibition of an EGFR/AKT/SREBP-1/LDLR-dependent pathway. Cancer discovery (2011 ).
Guo, D. et al. EGFR signaling through an Akt-SREBP-1-dependent, rapamycin-resistant pathway sensitizes glioblastomas to antilipogenic therapy. Science signaling 2, ra82 (2009).

(56) References Cited

OTHER PUBLICATIONS

Guo, D. et al. The AMPK agonist AICAR inhibits the growth of EGFRvlll-expressing glioblastomas by inhibiting lipogenesis. Proceedings of the National Academy of Sciences 106, 12932-12937 (2009).

Guo, Q. et al. Elevated levels of plasma fibrinogen in patients with pancreatic cancer: possible role of a distant metastasis predictor. Pancreas 38, e75-e79 (2009).

Gupta, A. et al. Synergistic antimicrobial therapy using nanoparticles and antibiotics for the treatment of multidrug-resistant bacterial infection. Nano Futures 1, 015004 (2017).

Guturu et al.: Systematic analysis of DIA LC-MS protein rollup strategies and their impact on phenotype association and proteogenomic applications. Seer, Inc., Redwood City, CA; and Massachusetts General Hospital, Boston, MA. poster 1 page (2023).

Hadjidemetriou, et al., A novel scavenging tool for cancer biomarker discovery based on the blood-circulating nanoparticle protein corona. Biomaterials. Jan. 2019; vol. 188: pp. 118-129.

Hadjidemetriou, et al., In Vivo Biomolecule Corona around Blood-Circulating, Clinically Used and Antibody-Targeted Lipid Bilayer Nanoscale Vesicles. ACS Nano, 2015; 9(8): pp. 8142-8156.

Hadjidemetriou, et al., The Human In Vivo Biomolecule Corona onto PEGylated Liposomes: A Proof-of-Concept Clinical Study. Advanced Materials. Nov. 28, 2018:e1803335. doi: 10.1002/adma. 201803335. [Epub ahead of print].

Hadjidemetriou, M., Al-Ahmady, Z. & Kostarelos, K. Time-evolution of in vivo protein corona onto blood-circulating PEGylated liposomal doxorubicin (DOXIL) nanoparticles. Nanoscale 8, 6948-6957 (2016).

Hajipour et al., Personalized disease-specific protein corona influences the therapeutic impact of graphene oxide, Nanoscale. 7(19):8978-8994 (2015) (pre-print).

Hajipour, et al., Personalized protein coronas: a "key" factor at the nanobiointerface. Biomate Sci. 2014; 2: 1210-1221.

Hajipour, M. J. et al. Personalized disease-specific protein corona influences the therapeutic impact of graphene oxide. Nanoscale, 2015, 7(19): 8978-8994.

Hajipour, M. J. et al., Sensing of Alzheimer's Disease and Multiple Sclerosis Using Nano-Bio Interfaces, Journal of Alzheimer's Disease 2017, 59, 1187-1202.

Hakimi et al.: Robust and Deep Plasma Proteomics using a Multi Nanoparticle-based Workflow coupled with an Orbitrap Exploris 480 Mass Spectrometry and FAIMS Pro Interface. ThermoFisher Scientific, San Jose, CA; and Seer, Inc., Redwood City, CA, poster 1 page (2023).

Hanash, S. M., Pitteri, S. J. & Faca, V. M. Mining the plasma proteome for cancer biomarkers. Nature 452, 571-579 (2008).

Hansson, G. K., Hermansson, A. The Immune System in Atherosclerosis. Nature immunology 2011, 12, 204-212.

Hasija, K. & Bagga, H. K. Alterations of serum cholesterol and serum lipoprotein in breast cancer of women. Indian Journal of Clinical Biochemistry 20, 61-66 (2005).

Hassanein, M. et al. The state of molecular biomarkers for the early detection of lung cancer. Cancer prevention research 5, 992-1006 (2012).

Havugimana et al., A census of human soluble protein complexes, Cell, 150(5): 1068-1081, 2012.

Heath, J. R. & Davis, M. E. Nanotechnology and cancer. Annual review of medicine 59, 251 (2008).

Henschke, C. I. et al. Early Lung Cancer Action Project: overall design and findings from baseline screening. The Lancet 354, 99-105 (1999).

Hirsch, F. R., Franklin, W. A., Gazdar, A. F. & Bunn, P. A. Early detection of lung cancer: clinical perspectives of recent advances in biology and radiology. Clinical Cancer Research 7, 5-22 (2001).

Honda, K. et al. Plasma biomarker for detection of early stage pancreatic cancer and risk factors for pancreatic malignancy using antibodies for apolipoprotein-AI I isoforms. Scientific reports 5 (2015).

Hong et al.: Discrimination Analysis of Mass Spectrometry Proteomics for Lung Adenocarcinoma Detection. Laboratory Medicine 42(6):6, pp. 344-349. doi:10.1309/LMXWEJV3FFDRODHH (2011).

Hornburg et al.: Enhanced Competition at the Nano-Bio Interface Enables Comprehensive Characterization of Protein Corona Dynamics and Deep Coverage of Proteomes. Seer Inc., Redwood City, CA USA, poster 1 page (2022).

Houerbi et al.: Deep Profiling of the Spaceflight Plasma Proteome reveals Changes in Reactive Oxygen Species, Extracellular Matrix and Lipid Metabolism. Weill Cornell Medicine, New York, NY; Seer, Inc., Redwood City, CA; Colorado State University, Fort Collins, CO; and SpaceX, Hawthorne, CA, poster 1 page (2022).

Howlader N et al. SEER Cancer Statistics Review, 1975-2014, National Cancer Institute. Bethesda, MD, https://seer. cancer.gov/csr/1975_2014/, based on Nov. 2016 SEER data submission, posted to the SEER web site, Apr. 2017. (2017).

Huang et al.: Deep, Rapid and Unbiased Plasma Proteomics with Differential Analysis of Proteoforms Enabling Proteogenomic Studies in a NSCLC Lung Cancer Study. Seer, Inc. (Mar. 2022).

Huang et al.: Deep, Rapid and Unbiased Plasma Proteomics with Peptide Correlation Analysis Enabling Proteoform Inference and Differential analysis in a NSCLC Lung Cancer Study. Seer, Inc., Redwood City, CA, poster 1 page (2022).

Huang et al.: Deep, Unbiased and Quantitative mass spectrometry-based plasma proteome analyses of adaptive response to COVID-19 vaccine. Seer, Inc., Redwood City, CA, poster 1 page (2023).

Huang, et al. "Superparamagnetic iron oxide nanoparticles conjugated with folic acid for dual target-specific drug delivery and MRI in cancer theranostics" Mater Sci Eng C Mater Biol Appl. Jan. 1, 2017 ;70(Pt1) 763-771. doi: 10.1016/j.msec.2016.09.052.

Huggins, C., Miller, G. M. & Jensen, E. V. Thermal Coagulation of Serum Proteins II. Deficient Coagulation in Cancer and the Iodoacetate Index. Cancer Research 9, 177-182 (1949).

Huo et al.: Developing a nanoparticle test for prostate cancer scoring. J Transl Med. 10(44):1-8 doi:10.1186/1479-5876-10-44 (2012).

Huo, Q. et al., A facile nanoparticle immunoassay for cancer biomarker discovery. Journal of Nanobiotechnology 2011, 9, paper 20, 12 pages.

Hwang, T. L., Liang, Y., Chien, K. Y. & Yu, J. S. Overexpression and elevated serum levels of phosphoglycerate kinase 1 in pancreatic ductal adenocarcinoma. Proteomics 6, 2259-2272 (2006).

Jaffe, A. S., Babuin, L., Apple, F. S. Biomarkers in Acute Cardiac Disease. Journal of the American College of Cardiology 2006, 48, 1-11.

Jager et al., Investigation of Arsenic-Stressed Yeast (*Saccharomyces cerevisiae*) as a Bioassay in Homeopathic Basic Research, Scientific World Journal; 2011; vol. 11, pp. 568-583, Published online Mar. 7, 2011.

Jankovska, et al. Affinity depletion versus relative protein enrichment: a side-by-side comparison of two major strategies for increasing human cerebrospinal fluid proteome coverage. Clin Proteom, 2019; 16(9):1-10. https://doi.org/10.1186/s12014-019-9229-1.

Jayaram, S., Gupta, M. K., Polisetty, R. V., Cho, W. C. & Sirdeshmukh, R. Towards developing biomarkers for glioblastoma multiforme: a proteomics view. Expert review of proteomics 11, 621-639 (2014).

Jemal, A., Siegel, R., Xu, J. & Ward, E. Cancer statistics, 2010. CA: a cancer journal for clinicians 60, 277-300 (2010).

Jerant, A. F., Johnson, J. T., Sheridan, C. & Caffrey, T. J. Early detection and treatment of skin cancer. American family physician 62, 357-386 (2000).

Jung, et al., Specific colorimetric detection of proteins using bidentate aptamer-conjugated polydiacetylene (PDA) liposomes, Adv Funct. Mater, 2010, vol. 20, No. 8 pp. 3092-3097.

Just et al.: Matrix-Matched Calibration Curves Provide Verification of Quantitative Data-Independent Acquisition Techniques for Deep Plasma Proteomics. Seer, Inc., Redwood City, CA, poster 1 page (2022).

Karna, E. et al. Serum and tissue level of insulin-like growth factor-I (IGF-1) and IGF-1 binding proteins as an index of pancreatitis and pancreatic cancer. International journal of experimental pathology 83, 239-246 (2002).

(56) References Cited

OTHER PUBLICATIONS

Kawasaki, E. S. & Player, A. Nanotechnology, nanomedicine, and the development of new, effective therapies for cancer. Nanomedicine: Nanotechnology, Biology and Medicine 1, 101-109 (2005).

Keshishian et al.: Multiplexed, Quantitative Workflow for Sensitive Biomarker Discovery in Plasma Yields Novel Candidates for Early Myocardial Injury. Mol Cell Proteomics. 14(9):2375-2393 doi:10.1074/mcp.M114.046813 (2015).

Keshishian, et al., Quantitative, multiplexed workflow for deep analysis of human blood plasma and biomarker discovery by mass spectrometry, Nat Protoc, 2017 12, 8, 1683-1701.

Keshishian, H., Addona, T., Burgess, M., Kuhn, E. & Carr, S.A. Quantitative, multiplexed assays for low abundance proteins in plasma by targeted mass spectrometry and stable isotope dilution. Molecular & Cellular Proteomics 6, 2212-2229 (2007).

Keshishian, H. et al. Quantification of cardiovascular biomarkers in patient plasma by targeted mass spectrometry and stable isotope dilution. Molecular & cellular proteomics 8, 2339-2349 (2009).

Khadka et al.: An unbiased multi-omics approach for the detection of pancreatic cancer biomarkers utilizing ion-mobility mass spectrometry and nanoparticle-based proteograph technology. PrognomiQ Inc., 1900 Alameda de las Pulgas, Suite 100, San Mateo, CA, USA, poster 1 page (2022).

Kharya, S., Dubey, D. & Soni, S. Predictive Machine Learning Techniques for Breast Cancer Detection. (IJCSIT) International Journal of Computer Science and Information Technologies 4, 1023-1028 (2013).

Kiehntopf et al.: Use of SELDI-TOF mass spectrometry for identification of new biomarkers: potential and limitations. Clin Chem Lab Med. 45(11):1435-1449 doi: 10.1515/CCLM.2007.351 (2007).

Kluger et al.: Ultra-high coverage of the serum proteome using a multi-nanoparticle based workflow. Seer Evotec poster, 1 page (2022).

Koene et al.: Serum protein profiles as potential biomarkers for infectious disease status in pigs. BMC Vet Res. 8(32):1-14 doi:10.1186/1746-6148-8-32 (2012).

Kojima et al.: Detection of elevated proteins in peritoneal dissemination of gastric cancer by analyzing mass spectra data of serum proteins. J Surg Res. 155(1):13-17 doi:10.1016/j.jss.2008.07.024 (2009).

Kolda, T., and Bader, B., Tensor decompositions and applications. SIAM review 51, 455-500 (2009).

Konduru et al., Protein Corona: Implications for Nanoparticle Interactions with Pulmonary Cells, Particle and Fibre Toxicology, 2017, 14:42, pp. 1-12.

Koo et al.: Liquid flow in microchannels: experimental observations and computational analyses of microfluidics effects. Journal of Micromechanics and Microengineering 13(5):568-579 (2003).

Korbelik, M. & Cooper, P. Potentiation of photodynamic therapy of cancer by complement: the effect of y-inulin. British journal of cancer 96, 67-72 (2007).

Koscielny, G. et al. Open Targets: a platform for therapeutic target identification and validation. Nucleic acids research 45, D985-D994 (2016).

Kourou, K., Exarchos, T.P., Exarchos, K.P., Karamouzis, M.V. & Fotiadis, D.I. Machine learning applications in cancer prognosis and prediction. Computational and structural biotechnology journal 13, 8-17 (2015).

Kozak et al.: Identification of biomarkers for ovarian cancer using strong anion-exchange ProteinChips: potential use in diagnosis and prognosis. Proc Natl Acad Sci USA 100(21):12343-12348 doi:10.1073/pnas.2033602100 (2003).

Kugler, K.G. et al. The impact of sample storage time on estimates of association in biomarker discovery studies. Journal of clinical bioinformatics 1, 1 (2011).

Lacerda, S.H.D.P., et al. Interaction of gold nanoparticles with common human blood proteins. ACS Nano 4, 365-379 (2009).

Laurent, S. et al. Corona protein composition and cytotoxicity evaluation of ultra-small zeolites synthesized from template free precursor suspensions. Toxicology Research 2, 270-279 (2013).

Laurent, S. et al., Superparamagnetic iron oxide nanoparticles: promises for diagnosis and treatment of cancer. Int J Mol Epidemiol Genet. 2011; 2(4): 367-390. Published online Nov. 25, 2011.

Le, N. D., Yazdani, M., Rotello, V. M. Array-Based Sensing Using Nanoparticles: An Alternative Approach for Cancer Diagnostics. Nanomedicine 2014, 9, 1487-1498.

Lebrecht et al.: Surface-enhanced Laser Desorption/Ionisation Time-of-flight Mass Spectrometry to Detect Breast Cancer Markers in Tears and Serum. Cancer Genomics Proteomics. 6(2):75-83 (2009).

Lee et al., Recognition of Volatile Organic Compounds Using SnO2 Sensor Array and Pattern Recognition Analysis. Sensors and Actuators B: Chemical, Jun. 2001, 77, 228-236.

Lee et al.: Revealing urologic diseases by proteomic techniques. J Chromatogr B Analyt Technol Biomed Life Sci. 815(1-2):203-213 doi:10.1016/j.jchromb.2004.11.008 (2005).

Lee, G. Cancerous immunoglobulins in cancer immunology. Journal of Clinical & Cellular Immunology 2014.

Leong et al.: Profiling of apoptotic changes in human breast cancer cells using SELDI-TOF mass spectrometry. Cell Physiol Biochem. 20(5):579-590 doi:10.1159/000107541 (2007).

Levin, B. et al. Screening and surveillance for the early detection of colorectal cancer and adenomatous polyps, 2008: a joint guideline from the American Cancer Society, the US Multi-Society Task Force on Colorectal Cancer, and the American College of Radiology*t. CA: a cancer journal for clinicians 58, 130-160 (2008).

Levitan et al.: Evaluation of engineered multi-nanoparticle-based proteomics analysis for unbiased, deep, and rapid analysis of fetal bovine serum derived cell culture media. Seer, Inc., Redwood City, CA, poster 1 page (2022).

Li et al.: A high-throughput and robust multi nanoparticle-based label-free mass spectrometry workflow for deep plasma proteomics at scale. Seer, Inc., Redwood City, CA, poster 1 page (2023).

Li et al. A review on phospholipids and their main applications in drug delivery systems. Asian Journal of Pharmaceutical Sciences 10:81-98 (2015).

Li, J. et al. Block copolymer conjugated Au-coated Fe3O4 nanoparticles as vectors for enhancing colloidal stability and cellularuptake, Journal of Nanobiotechnology, 15(56) 1-11 (Year: 2017).

Lilien et al.: Probabilistic disease classification of expression-dependent proteomic data from mass spectrometry of human serum. J Comput Biol. 10(6):925-946 doi:10.1089/106652703322756159 (2003).

Lim, S. H., Feng, L., Kemling, J. W., Musto, C. J. & Suslick, K. S. An optoelectronic nose for the detection of toxic gases. Nature chemistry 1, 562-567 (2009).

Lin, et al. A chemically functionalized magnetic nanoplatform for rapid and specific biomolecular recognition and separation Biomacromolecules 2013, 14, 1, 160-168.

Lin et al.: Plasma proteomic pattern as biomarkers for ovarian cancer. Int J Gynecol Cancer 16 Suppl 1:139-146 doi:10.1111/j.1525-1438.2006.00475.x (2006).

Lin Jiang et al: "Patterning of Plasmonic Nanoparticles into Multiplexed One-Dimensional Arrays Based on Spatially Modulated Electrostatic Potential", ACS Nano, vol. 5, No. 10, Oct. 25, 2011 (Oct. 25, 2011), pp. 8288-8294.

Little, D.P. et al., MALDI on a Chip: Analysis of Arrays of Low-Femtomole to Subfemtomole Quantities of Synthetic Oligonucleotides and DNA Diagnostic Products Dispensed by a Piezoelectric Pipet. Analytical Chemistry, 69 (22), 4540-4546 (1997).

Liu et al.: MALDI-TOF MS combined with magnetic beads for detecting serum protein biomarkers and establishment of boosting decision tree model for diagnosis of hepatocellular carcinoma. Am J Clin Pathol. 134(2):235-241 doi:10.1309/AJCPA6C6NOGFLYIR (2010).

Liu et al.: Proteomic profiling of hepatitis B virus-related hepatocellular carcinoma with magnetic bead-based matrix-assisted laser desorption/ionization time-of-flight mass spectrometry. Acta Biochim Biophys Sin (Shanghai) 43(7):542-550 doi:10.1093/abbs/gmr044 (2011).

Liu, J.Z. et al. Association analyses identify 38 susceptibility loci for inflammatory bowel disease and highlight shared genetic risk across populations. Nature genetics 47, 979-986 (2015).

(56) References Cited

OTHER PUBLICATIONS

Liu, Y. et al., Theranostic near-infrared fluorescent nanoplatform for imaging and systemic siRNA delivery to metastatic anaplastic thyroid cancer, Proceedings of the National Academy of Sciences of the United States of America Jul. 12, 2016, 113, 7750-7755.

Longo, C. et al. Core-shell hydrogel particles harvest, concentrate and preserve labile low abundance biomarkers. PLoS one 4, e4763 (2009).

Luchini, A. et al. Smart hydrogel particles: biomarker harvesting: one-step affinity purification, size exclusion, and protection against degradation. Nano letters 8, 350-361 (2008).

Ludwig, J. A. & Weinstein, J. N. Biomarkers in cancer staging, prognosis and treatment selection. Nature Reviews Cancer 5, 845-856 (2005).

Lundqvist, et al. The nanoparticle protein corona formed in human blood or human blood fractions. PloS one 12.4 (Apr. 17, 2017): e0175871. 15 Pages.

Lundqvist, M., et al. Nanoparticle size and surface properties determine the protein corona with possible implications for biological impacts. Proc Natl Acad Sci U S A 105, 14265-14270 (2008).

Machado, R. F., Laskowski, D., Deffenderfer, 0., et al. Detection of Lung Cancer by Sensor Array Analyses of Exhaled Breath. American journal of respiratory and critical care medicine 2005, 171, 1286-1291.

Maciel, C. M. et al. Differential proteomic serum pattern of low molecular weight proteins expressed by adenocarcinoma lung cancer patients. Journal of experimental therapeutics & oncology 5 (2005).

Magni et al.: Biomarkers discovery by peptide and protein profiling in biological fluids based on functionalized magnetic beads purification and mass spectrometry. Blood Transfus. 8 Suppl 3(Suppl 3):s92-s97 doi:10.2450/2010.015S (2010).

Mahmoudi, M., Bertrand, N., Zope, H. & Farokhzad, O.C. Emerging understanding of the protein corona at the nano-bio interfaces. Nano Today 11, 817-832 (2016).

Mahmoudi, M. et al. Protein-nanoparticle interactions: opportunities and challenges. Chemical reviews 111, 5610-5637 (2011).

Mahmoudi, M. et al. Variation of protein corona composition of gold nanoparticles following plasmonic heating. Nano letters 14, 6-12 (2013).

Mahmoudi, M., Lohse, S., Murphy, C. J. & Suslick, K. S. Identification of Nanoparticles with a Colorimetric Sensor Array. ACS Sensors 1, 17-21 (2016).

Mahmoudi, M., Saeedi-Eslami, S. N., Shokrgozar, M.A., et al. Cell "Vision": Complementary Factor of Protein Corona in Nanotoxicology. Nanoscale 2012, 4, 5461-5468.

Majek, P., Reicheltova, Z., Suttnar, J., et al. Plasma Proteome Changes in Cardiovascular Disease Patients: Novel Isoforms of Apolipoprotein A 1. Journal of translational medicine 2011, 9, 84.

Malik, G. et al. Serum levels of an isoform of apolipoprotein A-II as a potential marker for prostate cancer. Clinical Cancer Research 11, 1073-1085 (2005).

Mani et al.: Data mining strategies to improve multiplex microbead immunoassay tolerance in a mouse model of infectious diseases. PLoS One 10(1):e0116262:1-19. doi:10.1371/journal.pone. 0116262 (2015).

Mani, et al., Magnetic particles in ultrasensitive biomarker protein measurements for cancer detection and monitoring. Expert Opin Med Diagn. Sep. 1, 2011; 5(5): 381-391.

Matuszak, et al. "Drug delivery to atherosclerotic plaques using superparamagnetic iron oxide nanoparticles." International journal of nanomedicine vol. 13 8443-8460. Dec. 11, 2018, doi:10.214 7/IJN.S179273.

May: Digging Deep to Release the Power of the Proteome. Inside Precision Medicine, pp. 1-11 [retrieved online from https://www.insideprecisionmedicine.com/topics/translational-research/proteomics/digging-deep-to-release-the-power-of-the-proteome/] (2023).

Mehan et al.: Chapter 20. Highly Multiplexed Proteomic Platform for Biomarker Discovery, Diagnostics, and Therapeutics. Complement Therapeutics, Advances in Experimental Medicine and Biology, Lambris, J. D et al. (eds.), Springer Science+Business Media, New York, pp. 283-300. doi:10.1007/978-1-4614-4118-2 (2013).

Mertens et al.: On the use of double cross-validation for the combination of proteomic mass spectral data for enhanced diagnosis and prediction. Statistics & Probability Letters 81(7):759- 766 (2011).

Micallef, J. et al. Applying mass spectrometry based proteomic technology to advance the understanding of multiple myeloma. Journal of hematology & oncology 3, 1 (2010).

Milani et al.: Reversible versus irreversible binding of transferrin to polystyrene nanoparticles: soft and hard corona. ACS Nano. 6(3):2532-2541 doi:10.1021/nn204951s (2012).

Miller, A., Hoogstraten, B., Staquet, M. & Winkler, A. Reporting results of cancer treatment. cancer 4 7, 207-214 (1981).

Millioni et al., High Abundance Proteins Depletion vs Low Abundance Proteins Enrichment: Comparison of Methods to Reduce the Plasma Proteome Complexity, PloS One, 2011, 6, 5, e19603.

Miotto G, et al. Protein corona as a proteome fingerprint: The example of hidden biomarkers for cow mastitis. Colloids Surf B Biointerfaces. 2016; 140:40-49. doi: 10.1016/j.colsurfb.2015.11. 043.

Mirshafiee, et al., Protein corona significantly reduces active targeting yield. Chemical communications vol. 49,25(2013): 2557-9. doi:10.1039/c3cc37307j.

Mirshafiee, V. et al., The importance of selecting a proper biological milieu for protein corona analysis in vitro: Human plasma versus human serum. Int J Biochem Cell Biol. Jun. 2016; 75:188-95. doi: 10.1016/j.biocel.2015.11.019. Epub Nov. 28, 2015.

Mirshafiee, V., Kim, R., Park, S., Mahmoudi, M. & Kraft, M.L. Impact of protein pre-coating on the protein corona composition and nanoparticle cellular uptake. Biomaterials 75, 295-304 (2016).

Misek, D. E., Patwa, T. H., Lubman, D. M. & Simeone, D. M. Early detection and biomarkers in pancreatic cancer. Journal of the National Comprehensive Cancer Network 5, 1034-1041 (2007).

Mody, et al. Introduction to metallic nanoparticles. Journal of Pharmacy and Bioallied Sciences 2.4 (2010): 282-289.

Mohtashemi et al.: Improving LC-MS Data Analysis Pipelines to Leverage Distributed Compute Engines. Seer, Inc., Redwood City, CA, poster 1 page (2022).

Monopoli, et al. Nanoparticle coronas take shape. Nature Nanotechnology, Jan. 2011. vol. 6; 11-12.

Monopoli, M.P., Aberg, C., Salvati, A. & Dawson, K.A. Biomolecular coronas provide the biological identity of nanosized materials. Nat Nanotechnol 7, 779-786 (2012).

Monopoli, M.P., et al. Physical-chemical aspects of protein corona: relevance to in vitro and in vivo biological impacts of nanoparticles. J Am Chem Soc 133, 2525-2534 (2011).

Mortensen, N. P.; Hurst, G. B.; Wang, W.; Foster, C. M.; Nallathamby, P. D.; Retterer, S. T., Dynamic development of the protein corona on silica nanoparticles: composition and role in toxicity. Nanoscale 2013, 5 (14), 6372-6380.

Moss et al.: Integrated Plasma Multi-Omics Using Nanoparticle Technology and Single Shot Capillary MS. University of Wisconsin-Madison, Madison, WI, 53706, USA; Morgridge Institute for Research, Madison, WI , 53715, USA; and Seer, Redwood City, CA, poster 1 page (2022).

Motamedchaboki et al.: Deep plasma protein profiling in Alzheimer's disease (AD) with a novel unbiased and scalable proteogenomics approach. Seer, Inc., Redwood City, CA, poster 1 page (2022).

Mozaffarian, D., Benjamin, E. J., Go, A. S., et al. Executive Summary: Heart Disease and Stroke Statistics—2016 Update: A Report from the American Heart Association. Circulation 2016, 133, 44 7.

Muntoni, S. et al. Serum lipoproteins and cancer. Nutrition, Metabolism and Cardiovascular Diseases 19, 218-225 (2009).

Nakamura et al.: Differential profiling analysis of proteins involved in anti-proliferative effect of interferon-alpha on renal cell carcinoma cell lines by protein biochip technology. Int J Oncol. 28(4):965-970 (2006).

Nanni et al.: Serum protein profiling in patients with inflammatory bowel diseases using selective solid-phase bulk extraction, matrix-assisted laser desorption/ionization time-of-flight mass spectrom-

(56) References Cited

OTHER PUBLICATIONS etry and chemometric data analysis. Rapid Commun Mass Spectrom. 21(24):4142-4148 doi:10.1002/rcm.3323 (2007).
Nel, A.E. et al. Understanding biophysicochemical interactions at the nano-bio interface. Nature materials 8, 543 2009.
Nie, S. et al. Glycoprotein biomarker panel for pancreatic cancer discovered by quantitative proteomics analysis. Journal of proteome research 13, 1873-1884 (2014).
Ono, M. et al. Prolyl 4-Hydroxylation of α-Fibrinogen: A Novel Protein Modification Revealed By Plasma Proteomics. Journal of Biological Chemistry 284, 29041-29049 (2009).
O'Rourke, N. & Edwards, R. Lung cancer treatment waiting times and tumour growth. Clinical Oncology 12, 141-144 (2000).
Orr, W. S., Sandoval, J. A., Malkas, L. H. & Hickey, R. J. Acute Phase Proteins as Cancer Biomarkers. (INTECH Open Access Publisher, 2011).
Ostrand-Rosenberg, S., Cancer and complement. Nature biotechnology vol. 26, No. 12, Dec. 2008; 1348-1349.
Paez, J. G. et al. EGFR mutations in lung cancer: correlation with clinical response to gefitinib therapy. Science 304, 1497-1500 (2004).
Page et al.: A Cloud-Scalable Software Suite for Large-Scale Proteogenomics Data Analysis and Visualization. Seer, Inc., Redwood City, CA, poster 1 page (2023).
Palchetti, et al. Exploitation of nanoparticle-protein corona for emerging therapeutic and diagnostic applications. Journal of Materials Chemistry B 4.25 (May 23, 2016): 4376-4381.
Palchetti, S.; Colapicchioni, V.; Digiacomo, L.; Caracciolo, G.; Pozzi, D.; Capriotti, A. L.; La Barbera, G.; Lagana, A., The protein corona of circulating PEGylated liposomes. Biochimica et Biophysica Acta (BBA)-Biomembranes 2016, 1858 (2), 189-196.
Palchetti, S. et al. Nanoparticles-cell association predicted by protein corona fingerprints. Nanoscale 8(25):12755-12763 doi:10.1039/C6NR03898K (2016).
Palmieri, V. et al. Dynamic light scattering for the characterization and counting of extracellular vesicles: a powerful noninvasive tool. Journal of Nanoparticle Research 16, 1-8 (2014).
Pan, S., Brentnall, T. A. & Chen, R. Proteomics analysis of bodily fluids in pancreatic cancer. Proteomics 15, 2705-2715 (2015).
Pan, S. et al. Multiplex targeted proteomic assay for biomarker detection in plasma: a pancreatic cancer biomarker case study. Journal of proteome research 11, 1937-1948 (2012).
Pan, S. et al. Protein alterations associated with pancreatic cancer and chronic pancreatitis found in human plasma using global quantitative proteomics profiling. Journal of proteome research 10, 2359-2376 (2011).
Panda, et al., Affinity Pulldown of Biotinylated RNA for Detection of Protein-RNA Complexes. Bio Protoc. Dec. 20, 2016; 6(24): e2062, pp. 1-10.
Pang, W.W., Abdul-Rahman, P. S., Izlina Wan-Ibrahim, W. & Haji Hashim, 0. Can the acute-phase reactant proteins be used as cancer biomarkers? International Journal of Biological Markers 25, 1 (2010).
Papi et al.: Principal component analysis of personalized biomolecular corona data for early disease detection. Nano Today 21:14-17 doi:10.1016/j.nantod.2018.03.001 (2018).
Papi, M. et al., Exploitation of nanoparticle-protein interactions for early disease detection, Applied Physics Letters 2019, 114, paper 163702, 5 pages.
Pardo, et al., Resolving Affinity Purified Protein Complexes by Blue Native Page and Protein Correlation Profiling. J Vis Exp. 2017; 122:55498, pp. 1-11.
Patra, et al., Component-Specific Analysis of Plasma Protein Corona Formation on Gold Nanoparticles Using Multiplexed Surface Plasmon Resonance. Small, 2016; 12(9): 1174-1182.
Patwa, T. H. et al. The identification of phosphoglycerate kinase-1 and histone H4 autoantibodies in pancreatic cancer patient serum using a natural protein microarray. Electrophoresis 30, 2215-2226 (2009).

PCT/US2017/067013 International Search Report dated May 1, 2018.
PCT/US2017/067013 Written Opinion of the International Searching Authority dated May 1, 2018.
PCT/US2020/024426 International Search Report and Written Opinion dated Jul. 31, 2020.
Pease et al.: Evaluation of blood-based sample types for deep plasma proteomics. Application Note, Seer, Inc., Redwood City, CA, pp. 1-4 (2023).
Peer, D. et al. Nanocarriers as an emerging platform for cancer therapy. Nature nanotechnology 2, 751-760 (2007).
Pepe, M. S. et al. Phases of biomarker development for early detection of cancer. Journal of the National Cancer Institute 93, 1054-1061 (2001).
Pernemalm et al.: Mass spectrometry-based plasma proteomics: state of the art and future outlook. Expert Rev. Proteomics 11(4):431-448 doi:10.1586/14789450.2014.901157 (2014).
Petricoin, E. F. & Liotta, L.A. SELDI-TOF-based serum proteomic pattern diagnostics for early detection of cancer. Current Opinion in Biotechnology 15, 24-30 (2004).
Petricoin III, E. F., et al., "Use of proteomic patterns in serum to identify ovarian cancer". The Lancet (2002), 359:572-577.
Pichler, M. et al. High plasma fibrinogen level represents an independent negative prognostic factor regarding cancer-specific, metastasis-free, as well as overall survival in a European cohort of non-metastatic renal cell carcinoma patients. British journal of cancer 109, 1123 (2013).
Pio, R., Ajona, D. & Lambris, J. D. Complement inhibition in cancer therapy. Seminars in Immunology 25, 54-64, doi: http://dx.doi.org/10.1016/j.smim.2013.04.001 (2013).
Pio, R., Corrales, L. & Lambris, J. D. The Role of Complement in Tumor Growth, Adv Exp Med Biol., 229-262 (Springer, 2014).
Platt et al.: A Cloud-scalable Software Suite for Large-Scale Proteogenomics Data Analysis and Visualization. Seer, Inc., Redwood City, CA, poster 1 page (2022).
Please et al.: Deep and unbiased proteomics analysis reveals differences between serum and plasma proteome in matched donors. Seer, Inc., Redwood City, CA, poster 1 page (2022).
Popescu, I. D. et al. Potential serum biomarkers for glioblastoma diagnostic assessed by proteomic approaches. Proteome science 12, 1 (2014).
Pourshams, A. et al. Cohort profile: the Golestan Cohort Study—a prospective study of oesophageal cancer in northern Iran. International journal of epidemiology 39, 52-59 (2010).
Pozzi, et al., Surface chemistry and serum type both determine the nanoparticle-protein corona. Journal of Proteomics, 2015, 119, 209-217.
Puri et al.: Lipid-based nanoparticles as pharmaceutical drug carriers: from concepts to clinic. Critical Reviews™ in Therapeutic Drug Carrier Systems. 26(6):523-580 (2009).
Qian, W.-J. et al. Enhanced detection of low abundance human plasma proteins using a tandem IgY12-SuperMix immunoaffinity separation strategy. Molecular & Cellular Proteomics 7, 1963-1973 (2008).
Qu, Yinsheng, et al., "Boosted decision tree analysis of surface-enhanced laser desorption/ionization mass spectral serum profiles discriminates prostate cancer from noncancer patients". Clinical Chemistry (2002), 48(10): 1835-1843.
Rahimi, M. et al. Zeolite Nanoparticles for Selective Sorption of Plasma Proteins. Scientific reports 5, 17259-17259 (2015).
Rahman et al., Nanoparticle and Protein Corona, Chapter 2 in Protein-Nanoparticle Interactions, Springer Series in Biophysics 15, pp. 21-44 (Springer Science & Business Media, 2013).
Rahman M et al.: Disease specific protein corona, Progress in Biomedical Optics and Imaging, SPIE—International Society for Optical Engineering, Bellingham, WA, US, vol. 9338, Mar. 11, 2015 (Mar. 11, 2015), pp. 93380V-93380V,XP060049391,ISSN: 1605-7422, DOI: 10.1117 /12.2079771ISBN: 978-1-5106-0027-0.
Rakow, N. A., Suslick, K. S. A Colorimetric Sensor Array for Odour Visualization. Nature 2000, 406, 710-713.

(56) References Cited

OTHER PUBLICATIONS

Ridker, P. M., Hennekens, C. H., Suring, J. E., Rifai, N. C-Reactive Protein and Other Markers of Inflammation in the Prediction of Cardiovascular Disease in Women. New England Journal of Medicine 2000, 342, 836-843.
Ritz, S. et al., Protein Corona of Nanoparticles: Distinct Proteins Regulate the Cellular Uptake, Biomacromolecules 2015, 16, 1311-1321, with 11 pages of supporting information.
RNA (ribonucleic acid), 1988. Illustrated Dictionary of Science, Andromeda. Retrieved online on Feb. 8, 2012 http://www.credoreference.com/etry/andidsci/rna_ribonucleic_acid.
Rubio-Perez, C. et al. In silico prescription of anticancer drugs to cohorts of 28 tumor types reveals targeting opportunities. Cancer cell 27, 382-396 (2015).
Sacanna et al.: Thermodynamically stable pickering emulsions. Phys Rev Lett. 98(15):158301 doi:10.1103/PhysRevLett.98.158301 (2007).
Safarik, et al., Magnetic techniques for the isolation and purification of proteins and peptides. Biomagn Res Technol. 2004; 2(7): 1-17.
Saha, K. et al. Regulation of Macrophage Recognition through the Interplay of Nanoparticle Surface Functionality and Protein Corona. ACS nano 10, 4421-4430 (2016).
Sakulkhu et al., Ex situ evaluation of the composition of protein corona of intravenously injected superparamagnetic nanoparticles in rats. Nanoscale, Aug. 2014; 6:11439-11450.
Sakulkhu et al.: Protein corona composition of superparamagnetic iron oxide nanoparticles with various physico-chemical properties and coatings. Sci Rep. 4:5020:1-9 doi: 10.1038/srep05020 (2014).
Sakulkhu, et al. Significance of surface charge and shell material of superparamagnetic iron oxide nanoparticle SPION) based core/shell nanoparticles on the composition of the protein corona. Biomater. Sci., Jan. 20, 2015; vol. 3, 265-278.
Salvador-Morales, C., Zhang, L., Langer, R. & Farokhzad, O.C. Immunocompatibility properties of lipid-polymer hybrid nanoparticles with heterogeneous surface functional groups. Biomaterials 30, 2231-2240 (2009).
Salvati, A. et al. Transferrin-functionalized nanoparticles lose their targeting capabilities when a biomolecule corona adsorbs on the surface. Nature nanotechnology 8, 137-143 (2013).
Schindelin, et al. Fiji: an open-source platform for biological-image analysis. Nat Methods. Jun. 28, 2012;9(7):676-682. doi: 10.1038/nmeth.2019.
Schrittwieser, S. et al. Direct protein quantification in complex sample solutions by surface-engineered nanorod probes. Scientific Reports, 2017, 7(4752): https://doi.org/10.1038/s41598-017-04970-5.
Schroder, et al. Screening and prostate-cancer mortality in a randomized European study. N. Engl J Med. Mar. 26, 2009;360(13):1320-8. doi: 10.1056/NEJMoa0810084. Epub Mar. 18, 2009.
Schwamborn et al.: Serum proteomic profiling in patients with bladder cancer. Eur Urol. 56(6):989-997 doi:10.1016/j.eururo.2009.02.031 (2009).
Seer, Inc.: Press release PPT, with online publications (published Sep. 2022).
Seer, Inc. ProteographTM Quickstart Series: Step-by-Step on SP100 Automation Instrument, YouTube, Jan. 7, 2022 URL: https://www.youtube.com/watch?v=zBrCzhmLiJU.
Seer, Inc.: Release Notes, Proteograph™ Analysis Suite v2.0, pp. 1-2 (published Aug. 3, 2022).
Seer: Proteograph Product Suite: An Automated Workflow that scales with your studies. Seer, Inc., online video presentation available at https://seer.bio/resources/video-gallery/?tx_category=publications&wchannelid=dfl89n6go7&wmediaid=7ac7qj2qpi (2022).
Semb, K. A., Aamdal, S. & Oian, P. Capillary protein leak syndrome appears to explain fluid retention in cancer patients who receive docetaxel treatment. Journal of Clinical Oncology 16, 3426-3432 (1998).
Senyo, S.E. et al. Mammalian heart renewal by pre-existing cardiomyocytes. Nature 493, 433-436 (2013).
Shakeri, R. et al. Multiplex H. pylori serology and risk of gastric cardia and noncardia adenocarcinomas. Cancer research 75, 4876-4883 (2015).
Sharma, S., Ray, S., Moiyadi, A., Sridhar, E. & Srivastava, S. Quantitative proteomic analysis of meningiomas for the identification of surrogate protein markers. Scientific reports 4, 7140 (2014).
Shi, J., Kantoff, P.W., Wooster, R. & Farokhzad, O.C. Cancer nanomedicine: progress, challenges and opportunities. Nat Rev Cancer 17, 20-37 (2017).
Shi, T. et al. IgY14 and SuperMix immunoaffinity separations coupled with liquid chromatography-mass spectrometry for human plasma proteomics biomarker discovery. Methods 56, 246-253 (2012).
Shoji, M. et al. Activation of coagulation and angiogenesis in cancer: immunohistochemical localization in situ of clotting proteins and vascular endothelial growth factor in human cancer. The American journal of pathology 152, 399 (1998).
Siddiqui et al.: Deep and Unbiased Plasma Protein Profiling of Alzheimer's and Mild Cognitive Impairment Subjects with a Novel Multi-nanoparticle Approach. Seer, Inc. (Mar. 2022).
Siddiqui et al.: Deep plasma protein profiling in Alzheimer's subjects with a novel unbiased and scalable proteogenomics approach. Seer Inc., Redwood City, CA USA, poster 1 page (2022).
Siegel et al. Cancer statistics, 2015. CA Cancer J Clin 65:5-29 (2015).
Siegel et al. Cancer statistics, 2016. CA Cancer J Clin 66:7-30 (2016).
Simberg, et al. Differential proteomics analysis of the surface heterogeneity of dextran iron oxide nanoparticles and the implications for their in vivo clearance. Biomaterials. Aug. 2009; 30(23-24): 3926-3933.
Singh, et al. Drug delivery: advancements and challenges. Nanostructures for Drug Delivery. Elsevier, 2017. 865-886.
Smith, R. A. et al. American Cancer Society guidelines for the early detection of cancer. CA: a cancer journal for clinicians 52, 8-22 (2002).
Snider, et al., Fundamentals of protein interaction network mapping. Mol Syst Biol. Dec. 2015; 11(848):1-20.
Sparano et al.: Prospective Validation of a 21-Gene Expression Assay in Breast Cancer. N Engl J Med. 373(21):2005-2014 doi:10.1056/NEJMoa1510764 (2015).
Star, A., Joshi, V., Skarupo, S., Thomas, D., Gabriel, J.-C. P. Gas Sensor Array Based on Metal-Decorated Carbon Nanotubes. The Journal of Physical Chemistry B 2006, 110, 21014-21020.
Staton, C.A., Brown, N.J. & Lewis, C.E. The role of fibrinogen and related fragments in tumour angiogenesis and metastasis. Expert opinion on biological therapy 3, 1105-1120 (2003).
Strehlitz, et al., Protein detection with aptamer biosensors, sensors, Jul. 23, 2008. vol. 8, No. 7 p. 4296-4307.
Strojan, K. et al. Dispersion of nanoparticles in different media importantly determines the composition of their protein corona. PloS one 12, e0169552 (2017).
Stukalov et al.: Experimental & Computational Approach to Profile Nanoparticle-Protein Interactions for Deep Plasma Proteomics. Seer Inc., Redwood City, CA USA, poster 1 page (2022).
Sun, C., Rosendahl, A.H., Ansari, D. & Andersson, R. Proteome-based biomarkers in pancreatic cancer. World J Gastroenterol 17, 4845-4852 (2011).
Sun, Z.-L. et al. Serum proteomic-based analysis of pancreatic carcinoma for the identification of potential cancer biomarkers. Biochimica et Biophysica Acta (BBA)-Proteins and Proteomics 1774, 764-771 (2007).
Sung, H.J., et al. Identification and validation of SAA as a potential lung cancer biomarker and its involvement in metastatic pathogenesis of lung cancer. J Proteome Res 10, 1383-1395 (2011).
Suslick, B.A., Feng, L. & Suslick, K.S. Discrimination of complex mixtures by a colorimetric sensor array: coffee aromas. Analytical chemistry 82, 2067-2073 (2010).
Szala, A. et al. Ficolin-2 and ficolin-3 in women with malignant and benign ovarian tumours. Cancer Immunology, Immunotherapy 62, 1411-1419 (2013).

(56) References Cited

OTHER PUBLICATIONS

Tan et al.: Multi-dimensional on-particle detection technology for multi-category disease classification. Chem Commun (Camb). 52(17):3490-3493 doi:10.1039/c5cc09419d (2016).

Tan, H. T., Low, J., Lim, S. G. & Chung, M. Serum autoantibodies as biomarkers for early cancer detection. FEBS journal 276, 6880-6904 (2009).

Tenzer, S., et al. Nanoparticle size is a critical physicochemical determinant of the human blood plasma corona: a comprehensive quantitative proteomic analysis. ACS Nano 5, 7155-7167 (2011).

Tenzer, S., et al. Rapid formation of plasma protein corona critically affects nanoparticle pathophysiology. Nat Nanotechnol 8, 772-781 (2013).

Terracciano et al.: Peptidome profiling of induced sputum by mesoporous silica beads and MALDI-TOF MS for non-invasive biomarker discovery of chronic inflammatory lung diseases. Proteomics 11(16):3402-3414 doi:10.1002/pmic.201000828 (2011).

Thermo Fisher Scientific "Orbitrap Velos Pro Hardware Manual, Revision A-1288290", Jun. 2011, 202 pages.

Tirtaatmadja, N. et al. Nanoparticles-induced inflammatory cytokines in human plasma concentration manner: an ignored factor at the nanobio-interface. Journal of the Iranian Chemical Society 12, 317-323 (2015).

Tiss et al.: Serum peptide profiling using MALDI mass spectrometry: avoiding the pitfalls of coated magnetic beads using well-established ZipTip technology. Proteomics 7 Suppl 1:77-89 doi:10.1002/pmic.200700746 (2007).

Tousoulis, D., Charakida, M., Stefanadis, C. Endothelial Function and Inflammation in Coronary Artery Disease. Heart 2006, 92, 441-444.

Trendspotting: Top Diagnostics Issues in 2023. Diagnostics World, pp. 1-4 [retrieved online Jan. 18, 2023 from https://www.diagnosticsworldnews.com/news/2023/01/05/trendspotting-top-diagnostics-issues-in-2023] 2023.

Trinkle-Mulcahy, et al., Identifying specific protein interaction partners using quantitative mass spectrometry and bead proteomes. J Cell Biol. Oct. 20, 2008; 183(2): 223-239.

Troiano et al., A Quality by Design Approach to Developing and Manufacturing Polymeric Nanoparticle Drug Products, The AAPS Journal, 2016, 18, 6, 1354-1365.

Tuli et al.: LC-MS Based Detection of Differential Protein Expression. J Proteomics Bioinform. 2:416-438 doi:10.4172/jpb.1000102 (2009).

Turner, A. P., Chen, B., Piletsky, S. A. In Vitro Diagnostics in Diabetes: Meeting the Challenge. Clinical chemistry 1999, 45, 1596-1601.

UniProt: a hub for protein information; The UniProt Consortium. Nucleic Acids Research, vol. 43, Issue D1, Jan. 28, 2015, pp. D204-D212, https://doi.org/10.1093/nar/gku989.

U.S. Appl. No. 17/215,923 Non-Final Office Action dated Feb. 10, 2022.

U.S. Appl. No. 17/215,923 Notice of Allowance dated May 26, 2022.

U.S. Appl. No. 17/215,952 Non-Final Office Action dated May 12, 2022.

U.S. Appl. No. 17/215,978 Final Office Action dated Feb. 22, 2022.

U.S. Appl. No. 17/215,978 Final Office Action dated Jan. 26, 2023.

U.S. Appl. No. 15/880,627 Notice of Allowance dated Sep. 18, 2020.

U.S. Appl. No. 15/880,627 Office Action dated Dec. 18, 2018.
U.S. Appl. No. 15/880,627 Office Action dated Jan. 30, 2020.
U.S. Appl. No. 15/880,627 Office Action dated Jun. 18, 2019.
U.S. Appl. No. 15/880,627 Office Action dated Jun. 20, 2018.
U.S. Appl. No. 17/099,331 Office Action dated Apr. 20, 2021.
U.S. Appl. No. 17/099,331 Office Action dated Aug. 17, 2021.
U.S. Appl. No. 17/215,923 Office Action dated Sep. 22, 2021.
U.S. Appl. No. 17/215,952 Office Action dated Jun. 10, 2021.
U.S. Appl. No. 17/215,952 Office Action dated Sep. 17, 2021.
U.S. Appl. No. 17/215,966 Office Action dated Jun. 3, 2021.
U.S. Appl. No. 17/215,966 Office Action Sep. 23, 2021.
U.S. Appl. No. 17/215,978 Office Action dated Jun. 10, 2021.
U.S. Appl. No. 17/215,978 Office Action dated Oct. 8, 2021.

Valko et al.: Learning predictive models for combinations of heterogeneous proteomic data sources. AMIA Summit on Translational Bioinformatics, 5 pages. HAL0064339 URL: https://hal.inria.fr/hal-00643349 (2008).

Van Holten et al.: Circulating biomarkers for predicting cardiovascular disease risk; a systematic review and comprehensive overview of meta-analyses. PLoS One 8(4):e62080:1-8 doi:10.1371/journal.pone.0062080 (2013).

Van Hong Nguyen, et al. Protein corona: a new approach for nanomedicine design. International journal of nanomedicine 12 (Apr. 18, 2017): 3137-3151.

Velstra et al.: Improved classification of breast cancer peptide and protein profiles by combining two serum workup procedures. J Cancer Res Clin Oncol. 138(12):1983-1992 doi:10.1007/s00432-012-1273-4 (2012).

Venkataraman et al.: Assessment of pQTL method performance reveals optimal proteogenomic approach to assess the impact of genetic variation on plasma protein levels. Seer, Inc., Redwood City, CA; and Massachusetts General Hospital, Boston, MA. poster 1 page (2023).

Villanueva et al.: Automated serum peptide profiling. Nat Protoc. 1(2):880-891 doi:10.1038/nprot.2006.128 (2006).

Villanueva et al.: Differential exoprotease activities confer tumor-specific serum peptidome patterns. J Clin Invest. 116(1):271-284 doi:10.1172/JCI26022 (2006).

Villanueva, Josep et al., "Serum peptide profiling by magnetic particle-assisted, automated sample processing and MALDI-TOF mass spectrometry". Anal. Chem. (Mar. 15, 2004), 76(6): 1560-1570.

Vollmers, H. P. & Brandlein, S. Natural human immunoglobulins in cancer immunotherapy. (2009).

Walkey, C.D. & Chan, W.C. Understanding and controlling the interaction of nanomaterials with proteins in a physiological environment. Chem Soc Rev 41, 2780-2799 (2012).

Walkey, et al., Protein corona fingerprinting predicts the cellular interaction of gold and silver nanoparticles. ACS Nano, 2014, 8(3): 2439-2455.

Wang, J. et al. Cancer-derived immunoglobulin G promotes tumor cell growth and proliferation through inducing production of reactive oxygen species. Cell death & disease 4, e945 (2013).

Wang, Y. et al. Proteomic differential display identifies upregulated vinculin as a possible biomarker of pancreatic cancer. Oncology reports 28, 1845-1850 (2012).

Ward, D. et al. Identification of serum biomarkers for colon cancer by proteomic analysis. British journal of cancer 94, 1898 (2006).

Welter, D. et al. The NHGRI GWAS Catalog, a curated resource of SNP-trait associations. Nucleic acids research 42, D1001-D1006 (2013).

Westmeier et al.: The bio-corona and its impact on nanomaterial toxicity. European Journal of Nanomedicine 7(3):153-168 https://doi.org/10.1515/ejnm-2015-0018 (2015).

Whelan, S.A. et al. Mass spectrometry (LC-MS/MS) identified proteomic biosignatures of breast cancer in proximal fluid. Journal of proteome research 11, 5034-5045 (2012).

Wilcox et al.: A large scale multi-cancer, multi-omics biomarker study of 1,800 subjects incorporating deep unbiased plasma proteomics. PrognomiQ Inc. San Mateo, CA, poster 1 page (2022).

Wilcox et al.: Deep, unbiased multi-omics approach for the identification of pancreatic cancer biomarkers from blood. PrognomiQ, San Mateo, California, USA, poster 1 page (2022).

Wilcox et al.: Incorporation of Glycoproteome Detection Into Large Scale Unbiased Proteomics Studies Utilizing Nanoparticles. PrognomiQ Inc. (Mar. 2022).

Wildes, D. & Wells, J.A. Sampling the N-terminal proteome of human blood. Proceedings of the National Academy of Sciences 107, 4561-4566 (2010).

Wright, C.F. et al. Genetic diagnosis of developmental disorders in the DOD study: a scalable analysis of genome-wide research data. The Lancet 385, 1305-1314 (2015).

(56) References Cited

OTHER PUBLICATIONS

Wulfkuhle, J. D., Liotta, L. A. & Petricoin, E. F. Proteomic applications for the early detection of cancer. Nature reviews cancer 3, 267-275 (2003).
Xia, X.-R., Monteiro-Riviere, N.A. & Riviere, J.E. An index for characterization of nanomaterials in biological systems. Nature nanotechnology 5, 671-675 (2010).
Xu, et al., Streptavidin Bead Pulldown Assay to Determine Protein Homooligomerization. Bio Protoc. Nov. 20, 2017; 7(22): e2901, pp. 1-11.
Xue et al.: Quantifying thiol-gold interactions towards the efficient strength control. Nat Commun 5:4348:1-8 doi: 10.1038/ncomms5348 (2014).
Yan, L. et al. Confounding effect of obstructive jaundice in the interpretation of proteomic plasma profiling data for pancreatic cancer. Journal of proteome research 8, 142-148 (2008).
Yang et al.: Proteomic Profiling of Invasive Ductal Carcinoma (IDC) using Magnetic Beads-based Serum Fractionation and MALDI-TOF MS. J Clin Lab Anal. 29(4):321-327 doi:10.1002/jcla.21773 (2015).
Yang et al.: Serum peptidome profiling in patients with gastric cancer. Clin Exp Med. 12(2):79-87 doi:10.1007/s10238-011-0149-2 (2012).
Yates, J.R., Ruse, C.I. & Nakorchevsky, A. Proteomics by mass spectrometry: approaches, advances, and applications. Annual review of biomedical engineering 11, 49-79 (2009).
Yigitbasi, Turkan: "Multiplex Immunoassay and Bead Based Multiplex", Apr. 27, 2012, Trends in Immunolabelled and Related Techniques. 22:351-360, XP0556537 41, Retrieved from the Internet: URL: https://www.researchgate.net/profile/Ravichandran_Panchanathan/post/What_are_differences_of_different_types_of_multiplex_cytokine_ELISA/attachment/59d61ddf79197b807797b6fb/AS:273775503839238@144228457 4432/download/36219.pdf[retrieved on Dec. 17, 2019] (2012).
Yoneyama, T. et al. Identification of IGFBP2 and IGFBP3 as Compensatory Biomarkers for CA 19-9 in Early-Stage Pancreatic Cancer Using a Combination of Antibody-Based and LC- MS/MS-Based Proteomics. PLoS one 11, e0161009 (2016).
Yusuf et al., Global Burden of Cardiovascular Diseases. Circulation, Dec. 4, 2001;104(23):2855-64.
Zakynthinos, E., Pappa, N. Inflammatory Biomarkers in Coronary Artery Disease. Journal of cardiology 2009, 53, 317-333.
Zamanighomi et al.: Deep and Untargeted Plasma Protein Profiling of Alzheimer's Subjects with a Novel Multi-nanoparticle Approach. Seer, Inc., Redwood City, CA, online video available at URL: https://seer.bio/resources/video-gallery/?tx_category=publications&wchannelid=dfl89n6go7&wmediaid=64xoqf4r2m (2022).
Zamanighomi et al.: Deep Plasma Proteomics at Scale Enabling Precision Analyses in a Lung Cancer (NSCLC) Study. Seer, Inc., Redwood City, CA, poster 1 page (2022).
Zanganeh, et al. Protein corona: opportunities and challenges. The international journal of biochemistry & cell biology 75 (Jun. 2016): 143-147.
Zhang, C. & Suslick, K. S. Colorimetric sensor array for soft drink analysis. Journal of agricultural and food chemistry 55, 237-242 (2007).
Zhang et al.: Evaluation of a novel, integrated approach using functionalized magnetic beads, bench-top MALDI-TOF-MS with prestructured sample supports, and pattern recognition software for profiling potential biomarkers in human plasma. J Biomol Tech. 15(3):167-175 (2004).
Zhang et al.: Integrated Proteogenomic Characterization of Human High-Grade Serous Ovarian Cancer. Cell 166(3):755-765 doi:10.1016/j.cell.2016.05.069 (2016).
Zhang, et al., Quantitative proteomics analysis of adsorbed plasma proteins classifies nanoparticles with different surface properties and size. Proteomics. Dec. 2011; 11(23): 4569-4577.
Zhang, Y., Askim, J.R., Zhong, W., Orlean, P. & Suslick, K.S. Identification of pathogenic fungi with an optoelectronic nose. Analyst 139, 1922-1928 (2014).
Zheng, et al., Gold Nanoparticle-enabled blood test for early stage cancer detection and risk assessment. ACS Appl. Mater. Interfaces 2015; 7: 6819-6827.
Zheng, et al. Multiplexed electrical detection of cancer markers with nanowire sensor arrays. Nat Biotechnol. Oct. 2005;23(10):1294-301. Epub Sep. 18, 2005.
Zheng, T. et al. A Rapid Blood Test to Determine the Active Status and Duration of Acute Viral Infection. ACS Infectious Diseases (2017).
Zhi et al. Multianalyte Immunoassay with Self-Assembled Addressable Microparticle Array on a Chip. Analytical Biochemistry 318:236-243 (2003).
Zou et al.: Synthesis and evaluation of superparamagnetic silica particles for extraction of glycopeptides in the microtiter plate format. Anal Chem. 80(4):1228-1234 doi:10.1021/ac701950h (2008).
Zupancic, K. et al. Identification of plasma biomarker candidates in glioblastoma using an antibody-array-based proteomic approach. Radiology and oncology 48, 257-266 (2014).
Zwicker, J. I., Furie, B. C. & Furie, B. Cancer-associated thrombosis. Critical reviews in oncology/hematology 62, 126-136 (2007).
Alavi et al.: Applying Automated ML for Classification and Regression in Large-Scale Clinical Proteomics Datasets. Seer, Inc., Redwood City, CA, poster 1 page (2023).
Blume, et al., Analytical validation of the multi-nanoparticle proteograph platform for rapid and deep proteomic profiling. Seer, Inc. Apr. 2020. 1 Page.
Blume, et al., Efficient and scalable profiling of a median of 1,779 plasma proteins in 288 subjects with multi-nanoparticle (NP) proteograph platform enables robust detection of early-stage non-small cell lung cancer (NSCLC) and classification vs. healthy and co-morbid subjects. Seer, Inc. Apr. 2020. 1 Page.
Blume, et al., Proteograph, a novel multi-nanoparticle platform, enables rapid and deep proteomics profiling, significantly improving coverage, throughput, and scalability versus existing methods. Seer, Inc. Jun. 2020. 1 Page.
Burgess, et al., Nanoparticle-Based Method Identifies 2200 Proteins in a Cardiovascular Disease Study Covering Known Biomarkers Among Other Differentially Expressed Proteins. Seer, Inc. Nov. 2021. 1 Page.
Campos, et al., In-Depth Plasma Proteomics Profiling With Nanoparticle-Based Proteograph Workflow: A Performance Evaluation of Label-Free and TMT Multiplexing Approaches. Seer, Inc. Nov. 2021. 1 Page.
Chang, et al., Proteomic Profiling of Prostate Cancer Plasma Specimens Using Proteograph and TIMS Technology. Seer, Inc. Nov. 2021. 1 Page.
Donovan, et al., Deep, Rapid and Unbiased Plasma Proteomics with the Proteograph™ Product Suite Enables Proteogenomic Studies with Differential Analysis of Proteoforms. Seer, Inc. Sep. 2021. 5 Pages.
Donovan et al.: Functionally distinct BMP1 isoforms show an opposite pattern of abundance in plasma from non-small cell lung cancer subjects and controls. PLoS One. 18(3):e0282821, pp. 1-11. doi:10.1371/journal.pone.0282821 (2023).
Donovan et al.: Peptide-centric analyses of human plasma enable increased resolution of biological insights into non-small cell lung cancer relative to protein-centric analysis. Seer, Inc. Biorxiv 2022.01.07.475393, pp. 1-21 doi:10.1101/2022.01.07.475393 (2022).
Ferdosi, et al., Proteograph™ multi-nanoparticle proteins coronas enable deep plasma proteomics studies at scale with unmatched sensitivity in combination with trapped ion mobility. Seer, Inc. Mar. 2021. 1 Page.
Ferdosi et al.: The Nanoparticle-Based Plasma Proteomics Workflow enables the Investigation of Glycoproteome. Seer, Inc., Redwood City, CA, poster 1 page (2023).
Ferdosi, et al., Unlocking Plasma Proteomics at Scale: A multi nanoparticle approach to improve the depth of coverage. Seer, Inc. Oct. 2021. 1 Page.
Garcia et al.: A high-throughput and robust nanoparticle-based label-free mass spectrometry workflow for deep plasma proteomics at scale. Seer, Inc., Redwood City, CA, poster 1 page (2023).

(56) References Cited

OTHER PUBLICATIONS

Go from data to insight with the proteograph analysis suite. Seer. bio. Aug. 2021. Available at: https://seer.bio/resources/document-library/.

Guturu et al.: High-throughput plasma proteomics to identify diabetes associated protein biomarkers and pQTLs. 1. Seer, Inc., Redwood City, CA; and 2. Weill Cornell Medicine-Qatar, Doha, State of Qatar, poster 1 page (2023).

Hornburg, et al., Deep Plasma Proteomics at Scale: A machine learning enhanced multi nanoparticle approach to improve the depth of plasma proteome coverage. Seer, Inc. Nov. 2021. 1 Page.

Hornburg, et al., Enhanced competitive protein exchange at the nano-bio interface enables ultra-deep coverage of the human plasma proteome. Seer, Inc. Jan. 2022. pp. 1-18.

Hornburg et al.: Evaluation of an unbiased, deep, and scalable nanoparticle-based proteomics workflow for limited plasma sample volume from model organisms. Seer, Inc., Redwood City, CA, poster 1 page (2022).

Huang et al.: Deep, unbiased and quantitative mass spectrometry-based plasma proteome analyses of adaptive response to COVID-19 vaccine. 1. Seer, Inc., Redwood City, CA, USA; 2. Plexium, San Diego, CA, USA; 3. Federal University of Rio Grande do Sul, Porto Alegre, Brazil; and 4. Sanford Burnham Prebys, La Jolla, CA, USA, poster 1 page (2023).

Huang et al.: Proteoform detection in deep plasma proteomics through peptide expression correlation. Seer, Inc., Redwood City, CA, poster 1 page (2023).

Just et al.: A novel cloud-native pipeline enabling deep, unbiased proteomics at extreme scale. Seer, Inc., Redwood City, CA, poster 1 page (2023).

Kitano, et al., Cloud scalable omics data analysis pipeline using serverless task infrastructure. Seer, Inc. Nov. 2021. 1 Page.

Lacar et al.: Accelerating throughput with the ProteographTM XT Assay. Seer, Inc., Application Note (CF-1059 Rev A), pp. 1-8 (2023).

Li et al.: LC-MS MS1 image map classification enables real-time sample quality control for nanoparticle-based deep untargeted proteomics. Seer, Inc., Redwood City, CA, poster 1 page (2023).

Mohtashemi, et al., Mass spectrometry data acquisition with machine learning methods for deep plasma protein characterization. Seer, Inc. Nov. 2021. 1 Page.

Pena et al.: Evaluation of deep plasma proteomic analysis with the Proteograph TM workflow and TMT sample labeling. 1. Proteomics Shared Resource at Sanford Burnham Prebys, La Jolla, CA; and 2. Seer, Inc., Redwood City, CA, pp. 1-5 (2023).

Riley et al.: A Cloud-Scalable Software Suite for Large-Scale Proteogenomics Data Analysis and Visualization. Seer, Inc., Redwood City, CA, poster 1 page (2023).

Seer, Inc. A New Gateway to the Proteome—Unbiased, Deep, Rapid Proteomics at Scale, YouTube, Mar. 20, 2021 URL: https://www.youtube.com/watch?v=dDe--0QMAX8.

Seer, Inc. A New Gateway to the Proteome, YouTube, Mar. 20, 2021, https://www.youtube.com/watch?v=O-goKi6_1P8.

Seer, Inc. Comparison of Proteograph Product Suite to Peptide Fractionation, YouTube, Mar. 2021, https://www.youtube.com/watch?v=eUliHi7FB_I.

Seer, Inc. Customer Stories—Mark Flory Ph.D., OHSU/Knight Cancer Research Institute/CEDAR, YouTube, Apr. 30, 2021, https://www.youtube.com/watch?v=C3BTvhOzx0M.

Seer, Inc. Initialize and Prepare the SP100, YouTube, May 25, 2021 URL: https://www.youtube.com/watch?v=alD-8qhC9hY.

Seer, Inc. Loading Reagents and Plasticware onto the SP100 Work Deck, YouTube, May 25, 2021 URL: https://www.youtube.com/watch?v=ND3QYKvGub8.

Seer, Inc. Performing SP100 Clean-up and the Sample Plate Layout, YouTube, May 25, 2021 URL: https://www.youtube.com/watch?v=S070uN-KgTs.

Seer, Inc. Plasma Protein Profiling of Alzheimer's and Mild Cognitive Impairment, YouTube, Mar. 20, 2021 URL: https://www.youtube.com/watch?v=YLEa_7pfDuQ.

Seer, Inc. Preparing and Loading the Nanoparticles, Samples, and Controls, YouTube, May 25, 2021 URL: https://www.youtube.com/watch?v=I2MTSxjMaF4.

Seer Inc., Proteograph Assay quick reference work deck layout [retrieved online Jan. 2022].

Seer, Inc. Proteograph Product Suite—Detailed 10 Minute Overview, YouTube, Mar. 20, 2021, https://www.youtube.com/watch?v=jWPKiL9fsBw.

Seer, Inc. Proteograph Product Suite—Short 3 Minute Overview, YouTube, Mar. 20, 2021, https://www.youtube.com/watch?v=u0cWT-FeEl4.

Seer, Inc. Proteograph Product Suite with the Bruker tims TOF Platform, YouTube, Apr. 10, 2021, https://www.youtube.com/watch?v=upzRuK3OAbc.

Seer, Inc. Proteograph Safety Data Sheet. URL: https://seer.bio/wp-content/uploads/2021/12/Proteograph-Assay-SDS.pdf Published Nov. 2021 (retrieved online Feb. 2022) 122 Pages.

Seer, Inc., Proteograph Training Series: Initialize and prepare the SP100, YouTube, Jan. 4, 2022, https://www.youtube.com/watch?v=jUzl-VSD23k.

Seer, Inc. Proteograph™ Training Series: Loading Reagents and Plasticware onto the SP100 Work Deck, YouTube, Jan. 4, 2022, https://www.youtube.com/watch?v=gAYy7Usa0XI.

Seer, Inc. Proteograph Training Series: Preparing and Loading the nanoparticles, samples, and controls, YouTube, Jan. 4, 2022, https://www.youtube.com/watch?v=GYnleXjmDml.

Seer, Inc., Proteograph Training Series: Preparing Materials. YouTube, Jan. 4, 2022, https://www.youtube.com/watch?v=vHld20QRavA.

Seer, Inc., Proteograph Training Series: SP100 automation instrument [Functions & Components], YouTube, Jan. 4, 2022, https://www.youtube.com/watch?v=-8v2_Bqoi4Y.

Seer, Inc. Proteograph Training Series: SP100 Clean-up & Sample Plate Layout, YouTube, Jan. 4, 2022, https://www.youtube.com/watch?v=noXIYMZc0FI.

Seer, Inc. Proteograph Training Series: Starting the proteograph assay method, YouTube, Jan. 4, 2022, https://www.youtube.com/watch?v=nLqZT623u1M.

Seer, Inc., Proteograph Traning Series: Setting up the proteograph method, YouTube, Jan. 4, 2022, https://www.youtube.com/watch?v=XastVfF_wls.

Seer, Inc. ProteographTM Analysis Suite User Guide. URL: https://seer.bio/wp-content/uploads/2021/12/PAS_User_Guide_CF-1003-B.pdf Published Oct. 2021 (retrieved online Feb. 2022) 103 Pages.

Seer, Inc. ProteographTM Assay Quick Reference Work Deck Layout. CF-1020 Rev A URL:https://seer.bio/wp-content/uploads/2021/12/Seer_ProteographAssay_Quick_Reference_RevA.pdf (retrieved online Feb. 2022) 2 Pages.

Seer, Inc. ProteographTM Product Suite: An automated workflow that scales with your studies, YouTube, Jan. 4, 2022 URL: https://www.youtube.com/watch?v=hb16g8JfWnU.

Seer, Inc. ProteographTM Quickstart Series: How to Load Plastics and Reagents onto the SP100, YouTube, Jan. 7, 2022 URL: https://www.youtube.com/watch?v=ay4LDy5J0uw.

Seer, Inc. ProteographTM Quickstart Series: How to Prepare and Load the Nanoparticles, Samples & Controls, YouTube, Jan. 7, 2022 URL: https://www.youtube.com/watch?v=oP40VjQ8yoE.

Seer, Inc. ProteographTM Quickstart Series: Initialize and Prepare the SP100, YouTube, Jan. 7, 2022 URL: https://www.youtube.com/watch?v=qmvy7QKbjRI.

Seer, Inc. ProteographTM Quickstart Series: SP100 Clean-up & Sample Plate Layout, YouTube, Jan. 7, 2022 URL: https://www.youtube.com/watch?v=HSnXFkxq-Fw.

Seer, Inc. ProteographTM Quickstart Series: Starting the Proteograph Assay Method, YouTube, Jan. 7, 2022 URL: https://www.youtube.com/watch?v=aoJoWMDSWjg.

Seer, Inc. ProteographTM Quickstart Series: Step-by-Step on Preparing Materials, YouTube, Jan. 7, 2022 URL:https://www.youtube.com/watch?v=UVIt4AcjsSg.

Seer, Inc.: Safety Data Sheet. Nov. 2021. Available at: https://seer.bio/wp-content/uploads/2021/12/Proteograph-Assay-SDS.pdf.

Seer, Inc. Seer's Nanoparticle Approach: A Novel Approach to Unbiased, Deep, Rapid and Scalable Proteomics, YouTube, Mar. 20, 2021, https://www.youtube.com/watch?v=ArvpW3IPfA0.

(56) References Cited

OTHER PUBLICATIONS

Seer, Inc. SP100 Automation Instrument Site Preparation Guide (CF-1017 B). URL: https://seer.bio/wp-content/uploads/2022/02/SP100_Site_Prep_Guide_CF_1017_B-1.pdf Published Jun. 2021 (retrieved online Feb. 2022) 15 Pages.

Seer, Inc. SP100 Automation Instrument Site Preparation Guide (Int. CF-1014 A). URL: https://seer.bio/wp-content/uploads/2022/02/SP100_Site_Prep_Guide_International_CF_1015_A.pdf Published Dec. 2021 (retrieved online Feb. 2022) 15 Pages.

Seer, Inc. Starting the Proteograph Assay Method, YouTube, May 25, 2021 URL: https://www.youtube.com/watch?v=R94DH7OAOKA.

Seer, Inc. Support Frequently Asked Questions. URL: https://seer.bio/support/faq/ (retrieved online Feb. 2022) 6 Pages.

Seer, Inc. The Challenge in Proteomics Today: Why We Need Unbiased, Deep, Rapid and Scalable Proteomics, YouTube, Mar. 20, 2021, https://www.youtube.com/watch?v=Pq8qbict1dl.

Seer Inc., The proteograph product suite: See the proteome in a way that has never been possible before. Seer.bio. Mar. 2021. Available at: https://seer.bio/resources/document-library/.

Seer, Inc. Unbiased Biomarker Discovery Research with the Porteograph Product Suite, YouTube, Jul. 23, 2021, https://www.youtube.com/watch?v=AodyEDMIdmk.

Seer: Large-scale plasma proteomics with the ProteographTM XT workflow. Seer, Inc., Technical Note (CF-1059 Rev A), pp. 1-8 (2023).

Seer Nanoparticle Technology—Brief 1 Minute Overview, YouTube, Mar. 20, 2021, https://www.youtube.com/watch?v=qYFmTuz84IA.

Siddiqui, et al., Application of the Proteograph™ Product Suite to the Identification of Differential Protein Isoform Plasma Abundance in Early Lung Cancer vs. Healthy Controls. Seer, Inc. Mar. 2021. 1 Page.

Siddiqui et al.: Large-scale, deep plasma proteomics: An 1800 sample study of Alzheimer's disease. 1. Seer, Inc., Redwood City, CA, USA; and 2. Massachusetts General Hospital, Boston, MA, USA, poster 1 page (2023).

Siddiqui, et al., Plasma protein-protein interactome (PPI) maps derived from the protein corona captured at the nano-bio interface of nanoparticles reveal differential networks for non-small cell lung cancer (NSCLC) and control subjects. Seer, Inc. Apr. 2020. 1 Page.

Siddiqui, et al., Plasma Proteomics at Scale Enabling Lung Cancer, Alzheimer's Disease and Proteogenomics Studies with the Proteograph™ Product Suite. Seer, Inc. Mar. 2021. 1 Page.

Stukalov et al.: Dissecting the dynamics of protein corona formation on nanoparticles allows reconstructing deep plasma protein concentrations and discovering novel proteoforms. Seer, Inc., Redwood City, CA, poster 1 page (2023).

Suhre et al.: Nanoparticle Enrichment Mass-Spectrometry Proteomics Identifies Protein Altering Variants for Precise pQTL Mapping. Cold Spring Harbor Laboratory, bioRxiv pre-print, pp. 1-28. doi:10.1101/2023.04.20.537640 (2023).

User Guide: Proteograph Product Suite. Seer, Inc. 2021. Available at: https://seer.bio/wp-content/uploads/2021/12/Proteograph_User_Guide_CF-1016-B.pdf.

Vadapalli, et al., Proteograph™ Analysis Suite: A cloud-scalable software suite for proteogenomics data analysis and visualization. Seer, Inc. Nov. 2021. 1 Page.

Wang et al.: Building Spectral Libraries for Large-Scale Quantitative Proteomic Studies in Human Plasma. 1. Seer, Inc., Redwood City, CA; and 2. Weill Cornell Medicine-Qatar, Doha, State of Qatar, poster 1 page (2023).

Wilson, et al., The utility of nanoparticle protein coronas for studying the plasma glycoproteome. Seer, Inc. Nov. 2021. 1 Page.

Zhao, et al., Evaluation of Cell-Free DNA blood plasma for unbiased, deep, and rapid proteomics analysis enabling large-scale studies. Seer, Inc. Mar. 2021. 1 Page.

Zhou et al.: Multi-omics data integration reveals clinically relevant biomolecules associated with type 2 diabetes. 1. Seer, Inc., Redwood City, CA; and 2. Weill Cornell Medicine-Qatar, Doha, State of Qatar, poster 1 page (2022).

Anani et al., EDTA Treatment of Serum Unmasks Complement-Mediated Prozone Inhibition in Human Leukocyte Antigen Antibody EDTA Treatment of Serum Unmasks Complement-Mediated Prozone Inhibition in Human Leukocyte Antigen Antibody Testing, ( 2016), Am J Clin Pathol 2016; 146:346-352. (Year: 2016).

Batth, Tanveer S et al. Protein Aggregation Capture on Microparticles Enables Multipurpose Proteomics Sample Preparation. Molecular & cellular proteomics : MCP vol. 18,5 (2019): 1027-1035. doi:10.1074/mcp.TIR118.001270.

Baykan et al., The effect of different protease inhibitors on stability of parathyroid hormone, insulin, and prolactin levels under different lag times and storage conditions until analysis, (2017), Wiley, J Clin Lab Anal, 2017;31: e22144. (Year: 2017).

Boca Scientific. Magtivio. MagSi-Tools 600, 1.0, 3.0 Product Description: pp. 1-2. Aug. 2018.

Chen, Shao-Yung (Eric), et al., Comprehensive and automated profiling of host cell proteins using the Proteograph™ XT workflow. 8 pages. (2023). Accessed online Jan. 8, 2024. URL: https://media.seer.bio/uploads/2023/10/comprehensiveAutomatedProfilingHCP-proteographXT.pdf.

Chen, Shao-Yung (Eric), et al., Unbiased and deep proteomic analysis of secretome samples using the Proteograph™ XT workflow. 7 pages. (2023). Accessed online Jan. 8, 2024. URL: https://media.seer.bio/uploads/2023/12/Secretome-ProteographXT_AppNote_Seer.pdf.

Co-pending U.S. Appl. No. 18/318,563, inventors Li; Biao et al., filed on May 16, 2023.

Co-pending U.S. Appl. No. 18/395,124, inventors Langer; Robert S. et al., filed Dec. 22, 2023.

Co-pending U.S. Appl. No. 18/407,278, inventors Manning; William et al., filed Jan. 8, 2024.

Co-pending U.S. Appl. No. 18/460,221, inventors Farokhzad; Omid et al., filed Sep. 1, 2023.

Co-pending U.S. Appl. No. 18/460,254, inventors Farokhzad; Omid et al., filed Sep. 1, 2023.

Co-pending U.S. Appl. No. 18/547,831, inventors Hornburg; Daniel et al., filed Aug. 24, 2023.

Co-pending U.S. Appl. No. 18/557,753, inventors Siddiqui; Asim et al., filed Oct. 27, 2023.

Co-pending U.S. Appl. No. 18/578,513, inventors Platt; Theodore et al., filed Jan. 11, 2024.

Huang, Ting, et al., Deep, unbiased and quantitative mass spectrometry-based plasma proteome analyses of adaptive response to COVID-19 vaccine. 1 page. (2023) Accessed online Jan. 8, 2024. URL: https://media.seer.bio/uploads/2023/06/2023_Poster_ASMS_THuang.pdf.

Huang, Ting, et al., Protein Coronas on Functionalized Nanoparticles Enable Quantitative and Precise Large-Scale Deep Plasma Proteomics. 1 page. (2023). Accessed online Jan. 8, 2024. URL: https://media.seer.bio/uploads/2023/09/2023_Poster_Cantrell.pdf.

Hughes, Christopher S et al. Single-pot, solid-phase-enhanced sample preparation for proteomics experiments. Nature protocols vol. 14,1 (2019): 68-85. doi:10.1038/s41596-018-0082-x.

Hughes, Christopher S et al. Ultrasensitive proteome analysis using paramagnetic bead technology. Molecular systems biology vol. 10,10 (2014): 757. doi:10.15252/msb.20145625.

Jiang, Wei, et al., Human biofluids analysis using a scalable, deep, unbiased, automated, nanoparticle-based proteomics platform. 1 page. (2023). Accessed online Jan. 8, 2024. URL: https://media.seer.bio/uploads/2023/03/2023_Poster_USHUPO_Gajadhar.pdf.

Kong et al., Optofluidic sensing from inkjet-printed droplets: the enormous enhancement by evaporation evaporation induced spontaneous flow on photonic crystal biosilica, (2016), Nanoscale, 2016, 8, 17285-17294. (Year: 2016).

Magtivio B.V. MagSiMUS and MagSi Product Catalog. Magnetic Separation Solutions (2018). 32 pages.

Motamedchaboki, Khatereh, et al., Plasma Proteomic Landscape of Alzheimer's Disease: An 1800-Sample Cohort Study. 1 page. (2023). Accessed online Jan. 8, 2024. URL: https://media.seer.bio/uploads/2023/09/2023_Poster_Siddiqui.pdf.

Oka, Amita R et al. Functional Proteomic Profiling of Phosphodiesterases Using SeraFILE Separations Platform. International journal of proteomics vol. 2012 (2012): 515372. doi:10.1155/2012/515372.

(56) References Cited

OTHER PUBLICATIONS

Resyn Biosciences (Pty) Ltd. MagReSyn® SAX Strong anion exchange magnetic microparticles: pp. 1-2. Retrieved online on Jun. 4, 2023 available at https://resynbio.com/wp-content/uploads/2020/IFU_SAX.pdf.
Sielaff, Malte et al. Evaluation of FASP, SP3, and iST Protocols for Proteomic Sample Preparation in the Low Microgram Range. Journal of proteome research vol. 16,11 (2017): 4060-4072. doi:10.1021/acs.jproteome.7b00433.
U.S. Appl. No. 17/216,510 Office Action dated Feb. 29, 2024.
U.S. Appl. No. 18/088,946 Notice of Allowance dated Jan. 25, 2024.
U.S. Appl. No. 18/460,221 Office Action dated Dec. 21, 2023.
U.S. Appl. No. 18/460,254 Office Action dated Dec. 22, 2023.
Borg, et al. Spectral counting assessment of protein dynamic range in cerebrospinal fluid following depletion with plasma-designed immunoaffinity colomns. Clin Proteomics. 2011; 8(1): 6. Published online Jun. 3, 2011. doi: 10.1186/1559-0275-8-6.
Conzone, et al. Glass slides to DNA microarrays. Materials Today. 2004, vol. 7, No. 3, p. 20-26, doi: 10.1016/S1369-7021(04)00122-1.
Geyer, Philipp, et al., Revisiting biomarker discovery by plasma proteomics. Mol Syst Biol 13(9):942, pp. 1-15 (2017).
Giri, K. Engineered gold nanoparticles for identification of novel ovarian biomarkers. Mayo Clinic College of Medicine Thesis. Jan. 2016. 142 pages.
Hamad-Schifferli, K. Exploiting the novel properties of protein coronas: emerging applications in nanomedicine. Nanomedicine (Lond). May 2015;10(10):1663-74. doi: 10.2217/nnm.15.6.
Khoo, et al. 3D printing of smart materials: A review on recent progresses in 4D printing. Virtual and Physical Prototyping. 2015, vol. 10, No. 3, p. 103-122, doi: 10.1080/17452759.2015.1097054.
Lee, G. Cancerous Immunoglobulins in Cancer Immunology. J Clin Cell Immunol 2014, vol. 5, Issue 6. 8 pages. DOI: 10.4172/2155-9899.1000279.
Li, et al. An array-based approach to determine different subtype and differentiation of non-small cell lung cancer. Theranostics. Jan. 1, 2015;5(1):62-70. doi: 10.7150/thno.10145.eCollection 2015.
Li, et al. Conjugation of Graphene Oxide with DNA-Modified Gold Nanoparticles to Develop a Novel Colorimetric Sensing Platform. Part. Syst. Charact. 2014, vol. 31, No. 2, p. 201-208, DOI: 10.1002/ppsc.201300200.
Maiolo, et al. Nanomedicine delivery: does protein corona route to the target or off road? Nanomedicine (Lond). 2015;10(21):3231-47. doi: 10.2217/nnm.15.163. Epub Oct. 16, 2015.
Milani, et al. Reversible versus irreversible binding of transferrin to polystyrene nanoparticles: soft and hard corona. ACS Nano. Mar. 27, 2012;6(3):2532-2541. doi: 10.1021/nn204951s. Epub Feb. 28, 2012. Supplementary Information. pp. S1-S7.
Milani, Silvia et al. Reversible versus irreversible binding of transferrin to polystyrene nanoparticles: soft and hard corona. ACS Nano vol. 6,3: pp. 2532-2541 (2012).
Sigma-Aldrich. Seppro IgY 14 LC10 Column. Technical Bulletin. 2014. 1-4. (Year: 2014).
U.S. Appl. No. 17/901,294 Office Action dated Mar. 28, 2024.
U.S. Appl. No. 18/088,946 Notice of Allowance dated May 3, 2024.
U.S. Appl. No. 18/460,221 Notice of Allowance dated Mar. 20, 2024.
U.S. Appl. No. 18/460,254 Office Action dated Mar. 21, 2024.
U.S. Appl. No. 18/614,506 Office Action dated Jun. 17, 2024.
Zaccaria, et al. Accessing to the minor proteome of red blood cells through the influence of the nanoparticle surface properties on the corona composition. Int J Nanomedicine. Mar. 9, 2015:10:1869-1883. doi: 10.2147/IJN.S70503. eCollection 2015.
Choi, Sunkyu. et al. Sequential Fe3O4/TiO2 Enrichment for Phosphopeptide Analysis by Liquid Chromatography/tandem Mass Spectrometry. Rapid communications in mass spectrometry 24(10):1467-1474 (2010).
EP20200780035 Third Party Observations filed on Jul. 26, 2024.
EP20780035.0 Extended European Search Report dated Nov. 24, 2022.
Runa, Sabiha et al. Nanoparticle-Cell Interactions: Relevance for Public Health. The Journal of Physical Chemistry. B 122(3):1009-1016 (2018). Published online Nov. 21, 2017.
U.S. Appl. No. 18/460,254 Notice of Allowance dated Jul. 12, 2024.
Yu, Qiong-Wei et al. Sequential Enrichment with Titania-coated Magnetic Mesoporous Hollow Silica Microspheres and Zirconium Arsenate-modified Magnetic Nanoparticles For the Study of Phosphoproteome of HL60 Cells. Journal of chromatography 1365:54-60 (2014).
Yue, Xiaoshan et al. Comparing Multi-Step IMAC and Multi-Step TiO2 Methods for Phosphopeptide Enrichment. Analytical chemistry 87(17):8837-8844 (2015).
Zhao, Xuyang. et al. Citric Acid-assisted Two-step Enrichment with TiO2 Enhances the Separation of Multi- and Monophosphorylated Peptides and Increases Phosphoprotein Profiling. Journal of proteome research 12(6):2467-2476 (2013).
Adams, Nancy E. Declaration in Support of Petition for Inter Partes Review of U.S. Pat. No. 11,435,360 dated Oct. 6, 2024. 269 Pages.
Adams, Nancy E. Mlis, EdD. Curriculum Vitae. Updated: Aug. 28, 2024. 10 Pages.
Aebersold, Ruedi et al. Mass Spectrometry-Based Proteomics. Nature vol. 422,6928: pp. 198-207 (2003).
Ahmed, Farid E. Sample preparation and fractionation for proteome analysis and cancer biomarker discovery by mass spectrometry. J Sep Sci. Mar. 2009;32(5-6):771-98. doi: 10.1002/jssc.200800622.
Arvizo, Rochelle R et al. Identifying new therapeutic targets via modulation of protein corona formation by engineered nanoparticles. PLoS One. 2012;7(3):e33650. doi: 10.1371/journal.pone.0033650. Epub Mar. 19, 2012.
Arvizo, Rochelle R et al. Identifying new therapeutic targets via modulation of protein corona formation by engineered nanoparticles. PLoS One. 2012;7(3): e33650. doi: 10.1371/journal.pone.0033650. Epub Mar. 19, 2012. Supporting Information. Tables S9 and S10. 6 pages.
Bantscheff, Marcus et al. Quantitative mass spectrometry in proteomics: a critical review. Anal Bioanal Chem. Oct. 2007;389(4):1017-31. doi: 10.1007/s00216-007-1486-6. Epub Aug. 1, 2007.
Bryk, Agata H. Quantitative Analysis of Human Red Blood Cell Proteome. J Proteome Res. Aug. 4, 2017;16(8):2752-2761. doi: 10.1021/acs.jproteome.7b00025. Epub Jul. 24, 2017.
Cai, Xiaoning et al. Characterization of carbon nanotube protein corona by using quantitative proteomics. Nanomedicine: Nanotechnology, Biology and Medicine 9(5):583-593 (2013).
Cao, Bangrong et al. Latent transforming growth factor-beta binding protein-1 in circulating plasma as a novel biomarker for early detection of hepatocellular carcinoma. Int J Clin Exp Pathol. Dec. 1, 2015;8(12):16046-54. eCollection 2015.
Caracciolo, Giulio et al. Correction: Disease-specific protein corona sensor arrays may have disease detection capacity. Nanoscale horizons 5:372 (2020).
Chen, et al. Proteograph™ XT: A species-agnostic, unbiased, and deep analysis platform for model organism proteomics. Application Note (CF-1081 Rev A). Seer, Inc. (2024) Retrieved online Jul. 1, 2024. 7 pages. https://media.seer.bio/uploads/2024/06/model-org-xt-appnote-web.pdf.
DE202017007363U1 Cancellation Proceeding filed Jan. 13, 2025 (Machine Translation).
DE202017007363U1 Feature Structure of claims 1 and 7 issued Feb. 16, 2021 (Machine Translation).
DE602017053049.2 DPMAregister. Register extract for File No. 602017053049.2. Status on May 21, 2024. Last update in DPMAregister on May 2, 2024. (English Translation).
DE602017053049.2 Feature analysis of claim 1 of EP3554681B1 issued Feb. 2, 2022. (English Translation).
DE602017053049.2 (priority document).
Dean, Laura. Blood Groups and Red Cell Antigens [Internet]. Bethesda (MD): National Center for Biotechnology Information (US); 2005. Chapter 1, Blood and the cells it contains. 8 Pages. Available from: https://www.ncbi.nlm.nih.gov/books/NBK2263/.
EP 3554681 UPC Opt Out. Extract from the register of the Unified Patent Court. Date of lodging: May 26, 2023. Document signed Nov. 18, 2024. 1 page.

(56) References Cited

OTHER PUBLICATIONS

EP17881767.2 Submission of the applicant dated Jun. 11, 2021 in the examination procedure. (EP3544681).
European Patent Office. Partial Supplementary European Search Report for application 17881767.2. Mailed on Apr. 21, 2020.
Feist, Peter et al. Proteomic challenges: sample preparation techniques for microgram-quantity protein analysis from biological samples. Int J Mol Sci. Feb. 5, 2015;16(2):3537-63. doi: 10.3390/ijms16023537.
German Federal Patent Court. Letter of Service. The complaint for a declaration of invalidity of the patent EP3554681B1 (DE602017053049.2) dated Jan. 8, 2025. (Machine Translation).
German Federal Patent Court. Nullity complaint concerning the German part DE602017053049.2 of the European patent EP3554681B1 dated Nov. 18, 2024. (Machine Translation).
Graves, Paul R. et al. Molecular biologist's guide to proteomics. Microbiol Mol Biol Rev. Mar. 2002;66(1):39-63; table of contents. doi: 10.1128/MMBR.66.1.39-63.2002.
Hu, Zhengyan et al. Nanoparticle size matters in the formation of plasma protein coronas on Fe304 nanoparticles. Colloids Surf B Biointerfaces. Sep. 1, 2014;121:354-61. doi: 10.1016/j.colsurfb.2014.06.016. Epub Jun. 12, 2014.
Ishihama, Yasushi, et al., Exponentially Modified Protein Abundance Index (emPAI) for Estimation of Absolute Protein Amount in Proteomics by the Number of Sequenced Peptides Per Protein. Molecular & Cellular Proteomics 4(9):1265-1272 (2005).
JP 2023-105611 Notice of Allowance dated Aug. 6, 2024. (Machine Translation).
McDonald, W Hayes et al. Shotgun proteomics and biomarker discovery. Dis Markers. 2002;18(2):99-105. doi: 10.1155/2002/505397.
Nanjappa, V., et al. Plasma Proteome Database as a resource for proteomics research: 2014 update. Nucleic Acids Res 42, D959-965 (2014).
Norouzi, Nazila et al. Sorting cells by their density. PLoS One. Jul. 19, 2017;12(7):e0180520. doi: 10.1371/journal.pone.0180520. eCollection 2017.
Plasma Proteome Database. Website FAQs. 1 Page. Feb. 19, 2015. Available at https://web.archive.org/web/20150219211334/ http://www.plasmaproteomedatabase.org/faq.html.
Proteominer protein enrichment kits, Instruction manual. Bio-Rad. Available at: http://www.bio-rad.com/webroot/web/pdf/lsr/literature/10010636D.PDF [Accessed on Sep. 17, 2020].
Seer, Inc. Identify and Explore Variant Peptides with the Proteograph™ Analysis Suite Proteogenomics Workflow. Data Sheet (CF-1037 Rev A). (2022) Retrieved online Jul. 1, 2024. 2 pages. https://media.seer.bio/uploads/2022/08/Seer_PAS_2.0_VariantPeptides_DataSheet.pdf.
Seer, Inc. Proteograph™ Analysis Suite Quick Reference (CF-1035 Rev B) Published 2023. Retrieved online Oct. 2024. 1 Page. https://media.seer.bio/uploads/2023/10/ProteographAnalysisSuite_QuickReferenceCardQ42023.pdf.
Seer, Inc. Proteograph™ Analysis Suite Quick Reference. Proteogenomics Workflow. (CF-1036 Rev A) Published 2022. Retrieved online Oct. 2024. 1 Page. https://media.seer.bio/uploads/2022/08/Seer_PAS-2.0_Proteogenomics_QuickReferenceCard.pdf.
Seer, Inc. Proteograph™ Analysis Suite User Guide (CF-1003 C, Pas version 2.0) Published Aug. 2022. Retrieved online Oct. 2024. 122 Pages. URL: https://media.seer.bio/uploads/TechDocs/PAS_UserGuide.pdf.
Seer, Inc. Proteograph™ Assay Quick Reference Work Deck Layout. (CF-1020 Rev B) Retrieved online Oct. 2024. 2 Pages. URL: https://media.seer.bio/uploads/TechDocs/QuickReference_ProteographAssay.pdf.
Seer, Inc. Proteomics with Seer's SP100 Automation Instrument. (CF-1080 Rev A). (2024) Retrieved online Jul. 1, 2024. 1 Page. https://media.seer.bio/uploads/2024/06/ProteographXT-SP100-Automation-Instrument_One-Pager_RevA_Seer.pdf.
Seer, Inc. Quick Reference Card: Proteograph Peptide Quant & SP100 Maintenance. (CF-1026 Rev A) Retrieved online Oct. 2024. 2 Pages. https://media.seer.bio/uploads/2022/06/Seer_ProteographPeptideQuant_and_SP100Maintenance_Quick_Reference_RevA.pdf.
Seer, Inc. Quick Reference Card: Proteograph XT Assay (20 Samples). (510-000255 Rev A) Published 2023. Retrieved online Oct. 2024. 2 Pages. https://media.seer.bio/uploads/2023/06/QRC_ProteographXTAssay_20Sample.pdf.
Seer, Inc. Quick Reference Card: Proteograph XT Assay (40 Samples). (510-000276 Rev A) Published 2023. Retrieved online Oct. 2024. 2 Pages. https://media.seer.bio/uploads/2023/06/QRC_ProteographXTAssay_40Sample.pdf.
Seer, Inc. Quick Reference Card: Proteograph XT Peptide Quantification & SP100 Maintenance. (510-000254 Rev A) Published 2023. Retrieved online Oct. 2024. 2 Pages. https://media.seer.bio/uploads/2023/06/QRC_ProteographXT_PepQuantSP100Maint.pdf.
Seer, Inc. Research Guide. Harnessing the Power of Genomics and Proteomics. Published Oct. 24, 2024. Retrieved online Jan. 2025. 22 Pages. https://media.seer.bio/uploads/2024/10/Seer_Proteogenomics_Research_Guide.pdf.
Seer, Inc. Research Guide. Neurological Research Applications for Unbiased Proteomics. Oct. 4, 2024. 33 pages. Accessed online Oct. 7, 2024. Available at https://media.seer.bio/uploads/2024/10/Neurological-Research-Applications-for-Unbiased-Proteomics-from-Seer.pdf.
Seer, Inc. Research Guide. Oncology Research Applications for Unbiased Proteomics. Published Jul. 18, 2024. Retrieved online Oct. 2024. 27 Pages. https://media.seer.bio/uploads/2024/08/Seer_Oncology_Research_Guide.pdf.
Seer, Inc. Research Guide. Why Unbiased Proteomics Is Necessary. Published May 31, 2023. Retrieved online Oct. 2024. 12 Pages. https://media.seer.bio/uploads/2024/06/Seer-Why_Unbiased_Proteomics_Is_Necessary-Research_Guide-062024.pdf.
Seer, Inc. Safety Data Sheet. Revision date May 8, 2023. Rev: 02. Retrieved online Oct. 2024. 103 Pages. https://media.seer.bio/uploads/2023/06/Proteograph%E2%84%A2-XT-Assay-Kit-SDS_Rev-B.pdf.
Seer, Inc. Seer Proteograph™ Enables Unprecedented Genetic Marker Mapping for Proteogenomics Studies to Advance Drug and Biomarker Discovery. Press Release. Feb. 6, 2024. Retrieved online Jul. 1, 2024. 1 page. https://investor.seer.bio/node/8891/pdf.
Seer, Inc. Seer Proteograph™ Provides Differentiated Insights into Spaceflight Proteomic Alterations for Precision Medicine and Biomarker Discovery. Press Release. Jun. 11, 2024. Retrieved online Jul. 1, 2024. 2 pages. https://investor.seer.bio/node/9091/pdf.
Seer, Inc. Seer Technology Access Center Provides Unprecedented Scale and Depth of Coverage for PrognomiQ's Early Cancer Detection Study. Press Release. Jun. 2, 2024. Retrieved online Jul. 1, 2024. 1 page. https://investor.seer.bio/node/9076/pdf.
Seer, Inc. SP100 Site Preparation Guide: International. SP100 Automation Instrument. (CF-1015 B) Published Jun. 2023. Retrieved online Oct. 2024. 14 Pages. https://media.seer.bio/uploads/2023/06/SP100SitePrepGuide_International.pdf.
Seer, Inc. SP100 Site Preparation Guide: SP100 Automation Instrument. (CF-1017 C) Published Jun. 2023. Retrieved online Oct. 2024. 14 Pages. https://media.seer.bio/uploads/2023/06/SP100SitePrepGuide.pdf.
Seer, Inc. User Guide: Proteograph™ Product Suite. Proteograph™ Assay (CF-1016 F) Published 2023. Retrieved online Oct. 2024. 100 Pages. https://media.seer.bio/uploads/2023/10/ProteographProductSuite_UserGuide_CF-1016-F.pdf.
Seer, Inc. User Guide: Proteograph™ Product Suite. Proteograph™ Assay (CF-1053 B) Published Jun. 2023. Retrieved online Oct. 2024. 99 Pages. https://media.seer.bio/uploads/2023/06/ProteographXTAssay_User_Guide.pdf.
Suhre, et al. Nanoparticle enrichment mass-spectrometry proteomics identifies protein-altering variants for precise pQTL mapping. Nat Commun. Feb. 2, 2024;15(1):989. doi: 10.1038/s41467-024-45233-y.
Szabo, Zoltan et al. Challenges and developments in protein identification using mass spectrometry. Trends in Analytical Chemistry. vol. 69. Jun. 2015. Pages 76-87. doi: 10.1016/j.trac.2015.03.007.
U.S. Pat. No. 11,435,360 Petition for Inter Partes Review dated Oct. 7, 2024 (Case No. IPR2024-01473).

(56) References Cited

OTHER PUBLICATIONS

U.S. Appl. No. 17/215,923 File History of U.S. Pat. No. 11,435,360, filed Mar. 29, 2021.
U.S. Appl. No. 17/216,510 Office Action dated Aug. 23, 2024.
U.S. Appl. No. 18/460,254 Notice of Allowance dated Sep. 25, 2024.
U.S. Appl. No. 18/460,254 Office Action dated Jan. 16, 2025.
U.S. Appl. No. 18/606,701 Notice of Allowance dated Nov. 4, 2024.
U.S. Appl. No. 18/606,701 Notice of Allowance dated Oct. 18, 2024.
U.S. Appl. No. 18/614,506 Office Action dated Sep. 28, 2024.
U.S. Appl. No. 18/644,619 Office Action dated Oct. 10, 2024.
Vargas, Jessica. Declaration in Support of Petition for Inter Partes Review of U.S. Pat. No. 11,435,360 dated Oct. 6, 2024.
Vargas, Jessica Ph.D. Principal Scientist. Polymer Science and Materials Chemistry. Curriculum Vitae. 2024. 3 Pages.
Zhou, et al. Nanoparticle-assisted proteomics of whole blood collected through multiple dried blood spot collection devices. Seer, Inc. Apr. 2024. Retrieved online Jul. 1, 2024. 1 page. https://media.seer.bio/dev/uploads/2024/04/2024USHUPO_Microsampling_EXTERNAL_P01.07.pdf.

\* cited by examiner

* p < 0.05

* p < 0.05

*115 proteins found in both Streck and EDTA across samples.
Correlations are skewed to positive higher positive values*

COMPOSITIONS, METHODS AND SYSTEMS FOR PROTEIN CORONA ANALYSIS AND USES THEREOF

CROSS-REFERENCE

The present application is a continuation of U.S. patent application Ser. No. 17/216,510, filed on Mar. 29, 2021, which is a continuation of International Patent Application No. PCT/US2020/024426, filed Mar. 24, 2020, which claims the benefit of U.S. Provisional Patent Application No. 62/824,279, filed Mar. 26, 2019, and U.S. Provisional Patent Application No. 62/824,284, filed Mar. 26, 2019, each of which is herein incorporated by reference in its entirety for all purposes.

BACKGROUND

Biofluids contain a wide variety of proteins whose presence and concentrations may be indicative of subject health status. High abundance proteins and other proteins may overshadow the signal of an assay. Protein coronas can form on particles when they are exposed to biological fluids containing proteins. Most work on protein coronas has been performed on fluid from the blood stream (plasma or serum). The interaction of diverse biofluids with particles is largely unknown.

Fractionation may be used to reduce the signal of high abundance proteins when assaying a biological fluid. Currently, various fractionation methods exist, which facilitate the isolation and extraction of proteins. These methods allow for different profiles of proteins in assays to be detected. However, analysis of more diverse proteomics remains desired.

SUMMARY

In various aspects, the present disclosure provides a method of serially interrogating a sample, the method comprising: a) contacting the sample to a first particle type and incubating the first particle type with the sample to form a first biomolecule corona, wherein the first biomolecule corona forms upon incubation of the first particle type with the sample and wherein the first biomolecule corona comprises a protein; b) separating the first particle type comprising the first biomolecule corona from the sample; c) contacting the sample to a second particle type and incubating the second particle type with the sample to form a second biomolecule corona, wherein the second biomolecule corona forms upon incubation of the second particle type with the sample, wherein the second biomolecule corona comprises a protein, and further wherein (i) the first particle type and the second particle type are a same particle type or (ii) the first particle type and the second particle type are different; d) separating the second particle type comprising the second biomolecule corona from the sample; e) assaying the first biomolecule corona and the second biomolecule corona to determine a composition and concentration of a plurality of proteins in the sample based on the assayed first biomolecule corona and the second biomolecule corona.

In some aspects, upon the incubating the first particle type with the sample to form the first biomolecule corona, the dynamic range of the plurality of proteins in the first biomolecule corona is compressed relative to a dynamic range of a plurality of proteins in the sample, as measured by a total protein analysis method.

In some aspects, the dynamic range of the plurality of proteins in the first biomolecule corona is a first ratio of: a) a signal produced by a higher abundance protein of the plurality of proteins in the first biomolecule corona; and b) a signal produced by a lower abundance protein of the plurality of proteins in the first biomolecule corona. In some aspects, the dynamic range of the plurality of proteins in the first biomolecule corona is a first ratio of a concentration of the highest abundance protein to a concentration of the lowest abundance protein in the plurality of proteins in the first biomolecule corona. In some aspects, the dynamic range of the plurality of proteins in the first biomolecule corona is a first ratio of a top decile of proteins to a bottom decile of proteins in the plurality of proteins in the first biomolecule corona. In some aspects, the dynamic range of the plurality of proteins in the first biomolecule corona is a first ratio comprising a span of the interquartile range of proteins in the plurality of proteins in the first biomolecule corona. In some aspects, the dynamic range of the plurality of proteins in the first biomolecule corona is a first ratio comprising a slope of fitted data in a plot of all concentrations of proteins in the plurality of proteins in the first biomolecule corona versus known concentrations of the same proteins in the sample.

In some aspects, the known concentrations of the same proteins in the sample are obtained from a database. In some aspects, the dynamic range of a plurality of proteins in the sample is a second ratio of: a) a signal produced by a higher abundance protein of the plurality of proteins in the sample, as measured by a total protein analysis method; and b) a signal produced by a lower abundance protein of the plurality of proteins in the sample, as measured by a total protein analysis method. In some aspects, the dynamic range of the plurality of proteins in the sample, as measured by a total protein analysis method, is a second ratio of a concentration of the highest abundance protein to a concentration of the lowest abundance protein in the plurality of proteins in the sample. In some aspects, the dynamic range of the plurality of proteins in the sample, as measured by a total protein analysis method, is a second ratio of a top decile of proteins to a bottom decile of proteins in the plurality of proteins in the sample.

In some aspects, the dynamic range of the plurality of proteins in the sample, as measured by a total protein analysis method, is a second ratio comprising a span of the interquartile range of proteins in the plurality of proteins in the sample. In some aspects, the dynamic range of the plurality of proteins in the sample, as measured by a total protein analysis method, is a second ratio comprising a slope of fitted data in a plot of all concentrations of proteins in the plurality of proteins in the sample versus known concentrations of the same proteins in the sample. In some aspects, the known concentrations of the same proteins in the sample are obtained from a database. In some aspects, the compressing the dynamic range comprises a decreased first ratio relative to the second ratio. In further aspects, the decreased first ratio is at least 1.1-fold, at least 1.2-fold, at least 1.3-fold, at least 1.4-fold, at least 1.5-fold, at least 2-fold, at least 2.5-fold, at least 3-fold, at least 3.5-fold, at least 4-fold, at least 5-fold, or at least 10-fold less than the second ratio.

In some aspects, the method further comprises: determining the composition and concentration of a plurality of proteins in the second biomolecule corona. In some aspects, the determining the composition and concentration of the plurality of proteins in the first biomolecule corona or determining the composition and concentration of the plurality of proteins in the second biomolecule corona comprises performing mass spectrometry. In some aspects, the method further comprising repeating step a), b), and e) with one or more additional particle types to form one or more additional biomolecule coronas. In some aspects, the one or more additional particle types are the same as the first particle type or the second particle type. In some aspects, the one or more additional particle types are different from the first particle type, the second particle type, or a combination thereof.

In some aspects, the one or more additional biomolecule coronas comprise proteins from the sample. In some aspects, the first biomolecule corona, the second biomolecule corona, the one or more additional biomolecule coronas, or any combination thereof comprises at least 100 distinct proteins. In some aspects, the first biomolecule corona, the second biomolecule corona, the one or more additional biomolecule coronas, or any combination thereof comprises at least 200 distinct proteins, at least 300 distinct proteins, at least 400 distinct proteins, at least 500 distinct proteins, at least 1000 distinct proteins, at least 2000 distinct proteins, or at least 5000 distinct proteins.

In some aspects, the first biomolecule corona, the second biomolecule corona, the one or more additional biomolecule coronas, or any combination thereof comprises a different composition of proteins, a different concentration of a subset of proteins, or a combination thereof. In some aspects, upon incubating the one or more additional particle types with the sample to form one or more additional biomolecule coronas, a dynamic range of a plurality of proteins in the one or more additional biomolecule coronas is compressed relative to a dynamic range of a plurality of proteins in the sample, as measured by a total protein analysis method.

In some aspects, the dynamic range of the plurality of proteins in the one or more additional biomolecule coronas is an additional ratio of: a) a signal produced by a higher abundance protein of the plurality of proteins in the one or more additional biomolecule coronas; and b) a signal produced by a lower abundance protein of the plurality of proteins in the one or more additional biomolecule coronas.

In some aspects, the dynamic range of the plurality of proteins in the one or more additional biomolecule coronas is an additional ratio of a concentration of the highest abundance protein to a concentration of the lowest abundance protein in the plurality of proteins in the one or more biomolecule coronas. In some aspects, the dynamic range of the plurality of proteins in the one or more additional biomolecule coronas is an additional ratio of a top decile of proteins to a bottom decile of proteins in the plurality of proteins in the one or more biomolecule coronas. In some aspects, the dynamic range of the plurality of proteins in the one or more additional biomolecule coronas is an additional ratio comprising a span of the interquartile range of proteins in the plurality of proteins in the one or more biomolecule coronas.

In some aspects, the dynamic range of the plurality of proteins in the one or more additional biomolecule coronas is an additional ratio comprising a slope of fitted data in a plot of all concentrations of proteins in the plurality of proteins in the one or more biomolecule coronas versus known concentrations of the same proteins in the sample. In some aspects, the known concentrations of the same proteins in the sample are obtained from a database. In some aspects, the compressing the dynamic range comprises a decreased additional ratio relative to the second ratio. In further aspects, the decreased first ratio is at least 1.1-fold, at least 1.2-fold, at least 1.3-fold, at least 1.4-fold, at least 1.5-fold, at least 2-fold, at least 2.5-fold, at least 3-fold, at least 3.5-fold, at least 4-fold, at least 5-fold, or at least 10-fold less than the second ratio.

In some aspects, the total protein analysis method comprises direct quantification of the plurality of proteins in the sample by mass spectrometry, gel electrophoresis, or liquid chromatography. In some aspects, the sample comprises a sample volume of no more than about 1000 µL, no more than about 900 µL, no more than about 800 µL, no more than about 700 µL, no more than about 600 µL, no more than about 500 µL, no more than about 400 µL, no more than about 300 µL, no more than about 200 µL, no more than about 100 µL, no more than about 50 µL, no more than about 20 µL, no more than about 10 µL, no more than about 5 µL, no more than about 2 µL, or no more than about 1 µL.

In some aspects, the sample comprises a biological sample. In some aspects, the biological sample comprises a biofluid. In some aspects, the biofluid is selected from the group consisting of plasma, serum, urine, cerebrospinal fluid, synovial fluid, tears, saliva, whole blood, milk, nipple aspirate, ductal lavage, vaginal fluid, nasal fluid, ear fluid, gastric fluid, pancreatic fluid, trabecular fluid, lung lavage, sweat, crevicular fluid, semen, prostatic fluid, sputum, fecal matter, bronchial lavage, fluid from swabbings, bronchial aspirants, fluidized solids, fine needle aspiration samples, tissue homogenates, and cell culture samples. In some aspects, the biofluid is plasma or serum. In some aspects, the biofluid is cerebrospinal fluid. In some aspects, the first particle type, the second particle type, the one or more additional particle types, or any combination thereof are selected from TABLE 1.

In some aspects, the method further comprises removing high abundance proteins from the sample by depleting or fractioning the sample prior to step a). In some aspects, the one or more additional biomolecule coronas comprises a protein. In some aspects, the first biomolecule corona, the second biomolecule corona, the one or more additional biomolecule coronas, or any combination thereof comprises a lipid, a nucleic acid, a polysaccharide, or any combination thereof.

In some aspects, the first particle type, the second particle type, or the one or more additional particle types differ by at least one physicochemical properties. In some aspects, the first particle type and the second particle type differ by at least one physicochemical property and wherein the first biomolecule corona comprises a distinct but overlapping set of proteins relative to the second biomolecule corona. In some aspects, the composition of the plurality of proteins and the concentration of a protein of the plurality of proteins is determined based on the distinct but overlapping set of proteins in the first biomolecule corona and the second biomolecule corona.

In some aspects, the first particle type, the second particle type, the one or more additional particle types, or any combination thereof is selected from the group consisting of a nanoparticle, a microparticle, a micelle, a liposome, an iron oxide particle, a graphene particle, a silica particle, a protein-based particle, a polystyrene particle, a silver particle, a gold particle, a metal particle, a quantum dot, a superparamagnetic particle, or any combination thereof. In some aspects, the first particle type, the second particle type, the one or more additional particle types, or any combination thereof is a superparamagnetic particle.

In some aspects, the first particle type, the second particle type, the one or more additional particle types, or any combination thereof is selected from TABLE 1. In some aspects, the first particle type and the second particle type are the same particle type and wherein at least 70%, at least 80%, at least 90%, or at least 95% of proteins assayed in the first biomolecule corona and the second biomolecule corona are the same. In some aspects, the first particle type and the second particle type are different and wherein no more than 70%, no more than 80%, no more than 90%, or no more than 95% of proteins assayed in the first biomolecule corona and the second biomolecule corona are the same.

In various aspects, the present disclosure provides a high throughput method of analyzing a plurality of biofluids, the method comprising: a) contacting a first biofluid and a second biofluid of the plurality of biofluids with a particle type; b) in a first volume, separating the particle type from a first biofluid of the plurality of biofluids and determining the composition and concentration of a plurality of proteins in a first biomolecule corona corresponding to the particle type; and c) in a second volume, separating the particle type from a second biofluid of the plurality of biofluids and determining the composition and concentration of a plurality of proteins in a second biomolecule corona corresponding to the particle type, wherein the first biofluid and the second biofluid are different biofluids.

In some aspects, a biofluid of the plurality of biofluids is selected from the group consisting of plasma, serum, urine, cerebrospinal fluid, synovial fluid, tears, saliva, whole blood, milk, nipple aspirate, ductal lavage, vaginal fluid, nasal fluid, ear fluid, gastric fluid, pancreatic fluid, trabecular fluid, lung lavage, sweat, crevicular fluid, semen, prostatic fluid, sputum, fecal matter, bronchial lavage, fluid from swabbings, bronchial aspirants, fluidized solids, fine needle aspiration samples, tissue homogenates, and cell culture samples. In further aspects, the biofluid is plasma or serum. In other aspects, the biofluid is cerebrospinal fluid.

In some aspects, a biomolecule corona forms upon contacting the particle type with the sample and wherein the first biomolecule corona comprises a protein. In some aspects, the biomolecule corona comprises a lipid, a nucleic acid, a polysaccharide, or any combination thereof. In some aspects, the method further comprises removing high abundance proteins from the sample by depleting or fractioning the sample prior to step a).

In some aspects, the particle type is selected from the group consisting of a nanoparticle, a microparticle, a micelle, a liposome, an iron oxide particle, a graphene particle, a silica particle, a protein-based particle, a polystyrene particle, a silver particle, a gold particle, a metal particle, a quantum dot, a superparamagnetic particle, or any combination thereof. In some aspects, the particle type is a superparamagnetic particle. In some aspects, the particle type is selected from TABLE 1. In some aspects, the separating comprises magnetic separation, filtration, gravitational separation, or centrifugation. In some aspects, the contacting occurs in vitro. In some aspects, the method further comprises identifying a biological state of the biofluid processing the composition and concentration of the plurality of proteins in the biomolecule corona using a trained algorithm to identify the biological state.

In some aspects, the biofluid is isolated from a subject. In further aspects, the subject is a human. In other aspects, the subject is a non-human animal. In some aspects, the subject has a condition. In further aspects, the condition is a disease state. In still further aspects, the disease state is cancer. In still further aspects, the cancer is prostate cancer, colorectal cancer, lung cancer, or breast cancer. In other aspects, the disease state is Alzheimer's disease. In some aspects, the separating comprises magnetic separation, column-based separation, filtration, spin column-based separation, centrifugation, ultracentrifugation, density or gradient-based centrifugation, gravitational separation, or any combination thereof.

In various aspects, the present disclosure provides a method of analyzing a biofluid, the method comprising: a) contacting a biofluid in a biofluid collection tube with a particle type, wherein the blood collection tube comprises a stabilization reagent, wherein the stabilization reagent stabilizes cell-free nucleic acid molecules in the biofluid; and b) incubating the biofluid and the particle type in the biofluid collection tube to permit binding of proteins of the biofluid to the particle type, thereby forming a biomolecule corona comprising proteins bound to the particle type, wherein the biomolecule corona comprises a population of proteins that is also detected when the particle type is incubated in the biofluid when stored in EDTA and permitted to form a control biomolecule corona; and wherein the biofluid and the particle type are incubated in the biofluid collection tube at from about 20° C. to about 35° C. and wherein 50% or more of the population of proteins of the biomolecule corona is also detectable in the control biomolecule corona.

In some aspects, 60% or more, 70% or more, 80% or more, or 90% or more of the population of proteins of the biomolecule corona is also detectable in the control biomolecule corona. In some aspects, at least a subset of the population of proteins is detected at a higher abundance than when the particle type is incubated in the biofluid when stored in EDTA. In some aspects, at least 5% of the population of proteins is detected at a higher abundance than when the particle type is incubated in the biofluid when stored in EDTA. In some aspects, at least 10%, at least 20%, at least 30%, at least 40%, at least 50%, at least 60%, at least 70%, at least 80%, at least 90%, or 100% of the population of proteins is detected at a higher abundance than when the particle type is incubated in the biofluid when stored in EDTA.

In some aspects, the method further comprises assaying the proteins in the biomolecule corona at a lower limit of detection than when the particle type is incubated in the biofluid when stored in EDTA. In some aspects, the incubating comprises incubating at room temperature. In some aspects, the incubating comprises incubating for up to 14 days, up to 13 days, up to 12 days, up to 11 days, up to 10 days, up to 9 days, up to 8 days, up to 7 days, up to 6 days, up to 5 days, up to 4 days, or up to 3 days. In some aspects, the incubating comprises incubating for up to 14 days. In some aspects, the biomolecule corona comprises a unique protein that is absent from the control biomolecule corona. In some aspects, the biomolecule corona comprises at least 100 distinct proteins, at least 200 distinct proteins, at least 300 distinct proteins, at least 400 distinct proteins, at least 500 distinct proteins, at least 1000 distinct proteins, at least 2000 distinct proteins, or at least 5000 distinct proteins. In some aspects, the particle type binds 100 or more distinct proteins.

In further aspects, the biofluid comprises plasma, serum, urine, cerebrospinal fluid, synovial fluid, tears, saliva, whole blood, milk, nipple aspirate, ductal lavage, vaginal fluid, nasal fluid, ear fluid, gastric fluid, pancreatic fluid, trabecular fluid, lung lavage, sweat, crevicular fluid, semen, prostatic fluid, sputum, fecal matter, bronchial lavage, fluid from swabbings, bronchial aspirants, fluidized solids, fine needle aspiration samples, tissue homogenates, or cell culture samples. In further aspects, the biofluid is plasma, serum, urine, cerebrospinal fluid, synovial fluid, tears, saliva, whole blood, milk, nipple aspirate, ductal lavage, vaginal fluid, nasal fluid, ear fluid, gastric fluid, pancreatic fluid, trabecular fluid, lung lavage, sweat, crevicular fluid, semen, prostatic fluid, sputum, fecal matter, bronchial lavage, a fluid from swabbing, a bronchial aspirant, a fluidized solid, a fine needle aspiration sample, a tissue homogenate, or a cell culture sample.

In some aspects, the method further comprises separating the particle type from the biofluid. In some aspects, the separating comprises magnetic separation, filtration, gravitational separation, or centrifugation. In some aspects, the method further comprises determining the composition and concentration of proteins in the biomolecule corona. In some aspects, the method further comprises determining the composition and concentration of proteins in the control biomolecule corona. In some aspects, the determining the composition and concentration of proteins comprises mass spectrometry, gel electrophoresis, or liquid chromatography.

In some aspects, the stabilization reagent comprises a metabolic inhibitor, a protease inhibitor, a phosphatase inhibitor, a nuclease inhibitor, a preservative agent, or a combination thereof. In some aspects, the metabolic inhibitor comprises glyceraldehyde, dihydroxyacetone phosphate, glyceraldehyde 3-phosphate, 1,3-bisphosphoglycerate, 3-phosphoglycerate, 2-phosphoglycerate, phosphoenolpyruvate, pyruvate and glycerate dihydroxyacetate, sodium fluoride, or K2C2O4. In some aspects, the protease inhibitor comprises antipain, aprotinin, chymostatin, elastatinal, phenylmethylsulfonyl fluoride (PMSF), APMSF, TLCK, TPCK, leupeptin, soybean trypsin inhibitor, indoleacetic acid (IAA), E-64, EDTA, pepstatin, VdLPFFVdL, 1,10-phenanthroline, phosphoramodon, amastatin, bestatin, diprotin A, diprotin B, alpha macroglobulin, lima bean trypsin inhibitor, pancreatic protease inhibitor, or egg white ovostatin egg white cystatin.

In some aspects, the phosphatase inhibitor comprises calyculin A, nodularin, NIPP-1, microcystin LR, tautomycin, okadaic acid, cantharidin, microcystin LR, okadaic acid, fostriecin, tautomycin, cantharidin, endothall, nodularin, cyclosporin A, FK 506/immunophilin complexes, cypermethrin, deltamethrin, fenvalerate, bpV(phen), dephostatin, mpV(pic) DMHV, or sodium orthovanadate. In some aspects, the nuclease inhibitor comprises diethyl pyrocarbonate, ethanol, aurintricarboxylic acid (ATA), formamide, vanadyl-ribonucleoside complexes, macaloid, ethylenediamine tetraacetic acid (EDTA), proteinase K, heparin, hydroxylamine-oxygen-cupric ion, bentonite, ammonium sulfate, dithiothreitol (DTT), beta-mercaptoethanol, cysteine, dithioerythritol, tris(2-carboxyethyl) phosphene hydrochloride, or a divalent cation such as Mg+2, Mn+2, Zn+2, Fe+2, Ca+2, or Cu+2.

In some aspects, the preservative agent comprises diazolidinyl urea, imidazolidinyl urea, dimethoylol-5,5-dimethylhydantoin, dimethylol urea, 2-bromo-2-nitropropane-1,3-diol, oxazolidines, sodium hydroxymethyl glycinate, 5-hydroxymethoxymethyl-1-1aza-3,7-dioxabicyclo[3.3.0]octane, 5-hydroxymethyl-1-1aza-3,7dioxabicyclo[3.3.0]octane, 5-hydroxypoly[methyleneoxy]methyl-1-1aza-3,7dioxabicyclo[3.3.0]octane, or quaternary adamantine. In some aspects, the biofluid collection tube is a blood collection tube. In some aspects, the particle type is a nanoparticle or a microparticle.

In some aspects, the particle type is selected from the group consisting of a nanoparticle, a microparticle, a micelle, a liposome, an iron oxide particle, a graphene particle, a silica particle, a protein-based particle, a polystyrene particle, a silver particle, a gold particle, a metal particle, a quantum dot, a superparamagnetic particle, and any combination thereof. In some aspects, the particle type is selected from TABLE 1.

In some aspects, the method further comprises contacting the biofluid with one or more additional particle types, incubating the biofluid with the one or more additional particle types to permit binding of proteins of the biofluid to the one or more additional particle type, thereby forming one or more additional biomolecule coronas comprising proteins bound to the one or more additional particle types. In some aspects, the one or more additional particle types binds a population of proteins that is distinct but overlapping with the population of proteins in the biomolecule proteins of the particle type. In some aspects, the contacting the biofluid with the one or more additional particle types occurs after the contacting the biofluid with the particle type.

The present disclosure analyzes the protein corona from the interaction of nanoparticles and diverse fluids such as CSF, urine, tear and saliva. Various biofluids, including CSF, urine, tear and saliva are used to incubate with nanoparticles. The resulted protein coronas were separated and analyzed with mass spectrometry. The present disclosure provides how proteins from diverse biofluids will interact with nanoparticles. The proteins (or biomarkers) identified from these protein corona may be used in the discovery of advanced diagnostic tools as well as therapeutic targets.

In some aspects, the present disclosure provides a method of analyzing of a plurality of biofluids, the method comprising: (a) separately contacting each biofluid of the plurality of biofluids with a nanoparticle; (b) isolating the first nanoparticle and analyzing a first protein corona corresponding to a first biofluid of the plurality of biofluids; and (c) isolating the second nanoparticle and analyzing a second protein corona corresponding to a second biofluid of the plurality of biofluids, wherein step (b) and step (c) occur simultaneously.

In some embodiments, the method further comprises contacting the plurality of biofluids with a third nanoparticle. In some embodiments, the method further comprises contacting the plurality of biofluids with a fourth nanoparticle. In some embodiments, the method further comprises contacting the plurality of biofluids with a fifth nanoparticle. In some embodiments, the first nanoparticle and the second nanoparticle are the same.

In some embodiments, the method further comprises contacting the plurality of biofluids with up to 10 different nanoparticles.

In some embodiments, the nanoparticle is made of a material selected from a lipid, a polymer, a metal, or any combination thereof. In some embodiments, the polymer comprises PS, PLA, PGA, PLGA, or PVP. In some embodiments, the lipid comprises EPC, DOPC, DOPG, or DPPG. In some embodiments, the metal comprises iron oxide, gold, or silver. In some embodiments, the nanoparticle comprises a positive surface charge. In some embodiments, the nanoparticle comprises a negative surface charge. In some embodiments, the nanoparticle comprises a neutral surface charge.

In some embodiments, the nanoparticle comprises a size of 1-400 nm.

In some embodiments, the biofluid comprises plasma, serum, CSF, urine, tear, or saliva.

In some embodiments, the method further comprises comparing the first protein corona to a first control protein corona identified by contacting the first biofluid with the first nanoparticle. In some embodiments, the method further comprises comparing the second protein corona to a second control protein corona identified by contacting the second biofluid with the second nanoparticle.

In some embodiments, the method further comprises correlating the first protein corona to a first biological state. In some embodiments, the method further comprises correlating the second protein corona to a second biological state.

The present disclosure provides methods and systems for analyzing diverse proteomics. As disclosed herein, abundant proteins are first removed by fractionation or by nanoparticle depletion, thereby generating a depleted sample. The depleted sample is then incubated with a nanoparticle, which leads to the formation of a protein corona with high affinity low abundant proteins. The methods and systems disclosed herein provided a diverse protein corona profile, which may be used in the discovery of advanced diagnostic tools as well as therapeutic targets.

In some aspects, the present disclosure provides a method of identifying a biological state of a sample of a subject, the method comprising: incubating the sample with a depletion nanoparticle, thereby generating a depleted sample; incubating the depleted sample with a first nanoparticle to generate a protein corona; generating protein data corresponding to a protein in the protein corona associated with the first nanoparticle; and processing the protein data using a trained algorithm to identify the biological state of the subject.

In some embodiments, incubating the sample with the depletion nanoparticle comprises the incubating the sample with the depletion nanoparticle for at least about 30 minutes and extracting the depletion nanoparticle from the sample. In some embodiments, incubating the sample with the depletion nanoparticle for at least about 30 min and extracting the depletion nanoparticle from the sample removes at least about 80% of high abundance proteins from the sample.

In some embodiments, the method further comprises analyzing a protein corona associated with the depletion nanoparticle. In some embodiments, incubating the sample with the depletion nanoparticle comprises incubating the sample with the depletion nanoparticle for at least about 60 minutes and extracting the depletion nanoparticle from the sample at least two times. In some embodiments, incubating the sample with the depletion nanoparticle for at least about 60 minutes and removing the depletion nanoparticle from the sample at least two times removes 99% of high abundance proteins.

In some embodiments, the depletion nanoparticle comprises at least one different physicochemical property from the first nanoparticle. The different physicochemical property may comprise size, surface charge, or a chemical moiety.

In some embodiments, processing the protein data comprises analyzing the protein corona, analyzing the sample prior to depletion, or analyzing the depleted sample.

In some aspects, the present disclosure provides a method of identifying a biological state of a protein sample from a subject, the method comprising: fractionating the protein sample, thereby generating a fractionated sample comprising a subset of proteins in the protein sample; incubating the depleted sample with a first nanoparticle to generate a protein corona; generating protein data corresponding to a protein of the protein corona associated with the first nanoparticle; and processing the protein data using a trained algorithm to identify the biological state of the subject, wherein fractionating the sample comprises separating high abundance proteins with a method selected from the group consisting of Cohn's method, column chromatograph, ion-exchange chromatography, affinity chromatography, size exclusion chromatography, centrifugation, filtration, ultrafiltration and cryo-precipitation.

In some embodiments, processing the protein data comprises analyzing the protein corona, analyzing the protein sample prior to fractionation, or analyzing the fractionated sample.

In some embodiments for the methods disclosed herein, a concentration of the first nanoparticle in the depleted sample is from 1-50 mg/mL. In some embodiments, generating protein data corresponding to the protein in the protein corona associated with the first nanoparticle comprises determining a concentration of each unique protein in the protein corona and correlating the concentration of each unique protein in the protein corona to the biological state. In some embodiments, processing the protein data using a trained algorithm to identify the biological state of the subject comprises associating the biological state with a biomolecule fingerprint. In some embodiments, the sample is plasma or serum.

In some aspects, the present disclosure provides a method for assaying a biological sample, comprising (a) obtaining a biological sample comprising a plurality of biomolecules, which plurality of biomolecules comprises protein; (b) enriching said biological sample based on one or more features selected from the group consisting of: size, charge, hydrophobicity, structure and affinity, to yield a processed biological sample; (c) generating at least a first subset of biomolecules and a second subset of biomolecules from said processed biological sample of (b) with the aid of one or more nanoparticles, wherein said first subset of biomolecules associates with said one or more nanoparticles and said second subset of biomolecules does not associate with said one or more nanoparticles; and (d) separately conducting one or more assays on at least said first subset of biomolecules or said second subset of biomolecules.

In some embodiments, the method further comprises (e) isolating said first subset of biomolecules from said second subset of biomolecules.

In some embodiments, the one or more assays comprise an assay selected from the group consisting of: mass spectrometry and enzyme-linked immunosorbent assay (ELISA). In some embodiments, the one or more assays comprise mass spectrometry.

In some embodiments, enriching said biological sample comprises fractionation to yield said processed biological sample. In some embodiments, the fractionation comprises separating high abundance proteins with a method selected from the group consisting of Cohn's method, ion-exchange chromatography, affinity chromatography, size exclusion chromatography, centrifugation, filtration, ultrafiltration and cryo-precipitation. In some embodiments, enriching said biological sample to yield said processed biological sample comprises depleting one or more proteins.

In some embodiments, in (b), one or more depletion nanoparticles are used to yield said processed biological sample. In some embodiments, the one or more depletion nanoparticles of (b) are different from said one or more nanoparticles of (c).

In some embodiments, the one or more assays are conducted on said first subset, which assay is ELISA.

In some embodiments, the biological sample is a biofluid selected from the group consisting of: plasma, serum, urine, cerebrospinal fluid, tears, saliva, whole blood, nipple aspirate, ductal lavage, vaginal fluid, nasal fluid, ear fluid, gastric fluid, pancreatic fluid, trabecular fluid, lung lavage, sweat, pericrevicular fluid, semen, prostatic fluid, sputum, synovial fluid, fecal matter, trabecular fluid, bronchial lavage, fluid from swabbings, and bronchial aspirants.

In some embodiments, the one or more assays yields proteomic data, and further comprising processing said proteomic data to predict a biological state. In some embodiments, processing said proteomic data comprises use of a trained algorithm, which trained algorithm is trained using an independent set of biological samples.

In some embodiments, the first subset of biomolecules associates with said one or more nanoparticles upon incubation with said one or more nanoparticles to form protein coronas.

In some embodiments, the biological sample is depleted prior to (a).

In some embodiments, the first subset of biomolecules and said second subset of biomolecules comprise protein.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIG. 6A shows the total number of proteins identified with different conditions. With single particle protein corona (P39, HX42 and HX56), 234, 303 and 353 unique proteins can be identified for the three particles, respectively. A total of 411 unique proteins were identified when all particles were run separately, as shown in the column labeled "P39+HX42+HX56." With particle mixing at higher concentration ("3NP_8," final total NP concentration of 8 mg/mL) and lower concentration ("3NP_3," final total NP concentration of 3 mg/mL), 305 and 284 unique proteins were identified. With post-digestion mixing of all three protein coronas ("3NP_PM," 303 unique proteins were identified. FIG. 6B shows the overlap of proteins between particle run separately ("P39+HX42+ HX56"), particle mixing ("P39+HX42+HX56 NP Mixing"), and post-digestion mixing ("P39+HX42+HX56 Post Digestion Mixing").

FIG. 8A illustrates a workflow for serial interrogation of a sample with particles. The sample may be repeatedly interrogated using the same or different particle types. FIG. 8B illustrates a workflow comprising serial interrogation of a sample with a first particle type and a second particle type. The corona of each particle type are analyzed following interrogation. FIG. 8C illustrates a workflow comprising serial interrogation of a sample with a first particle type, a second particle type, and a third particle type. The corona of each particle type are analyzed following interrogation. FIG. 8D illustrates a workflow comprising serial interrogation of a sample with a first particle type, a second particle type, a third particle type, and a fourth particle type. The corona of each particle type are analyzed following interrogation. FIG. 8E illustrates a workflow comprising serial interrogation of a sample with a particle type a first time and a second time. The corona of the particle type are analyzed following each interrogation. FIG. 8F illustrates a workflow comprising serial interrogation of a sample with a particle type a first time, a second time, and a third time. The corona of the particle type are analyzed following each interrogation. FIG. 8G illustrates a workflow comprising serial interrogation of a sample with a particle type a first time, a second time, a third time, and a fourth time. The corona of the particle type are analyzed following each interrogation.

FIG. 22A shows the number of common and unique proteins identified in each patient sample collected in EDTA blood collection tubes, and FIG. 22B shows the number of common and unique proteins identified in each patient sample collected in Streck blood collection tubes.

FIG. 25A shows the number of protein groups containing at least one plasma protein identified in each sample. FIG. 25B shows the number of protein groups identified in each sample that do not contain at least one plasma protein identified in each sample. Classification of proteins as plasma proteins was based on the set of 5,304 plasma proteins identified by Keshishian et al. (*Mol. Cell Proteomics* 14, 2375-2393 (2015)), which is incorporated herein by reference in its entirety.

FIG. 30A shows the correlation of C-reactive protein (CRP). FIG. 30B shows the correlation of a Calgranulin A and B heterodimer ("S100"). FIG. 30C shows the correlation of MUC16/CA125 ("CA125").

DETAILED DESCRIPTION

Figure 1:
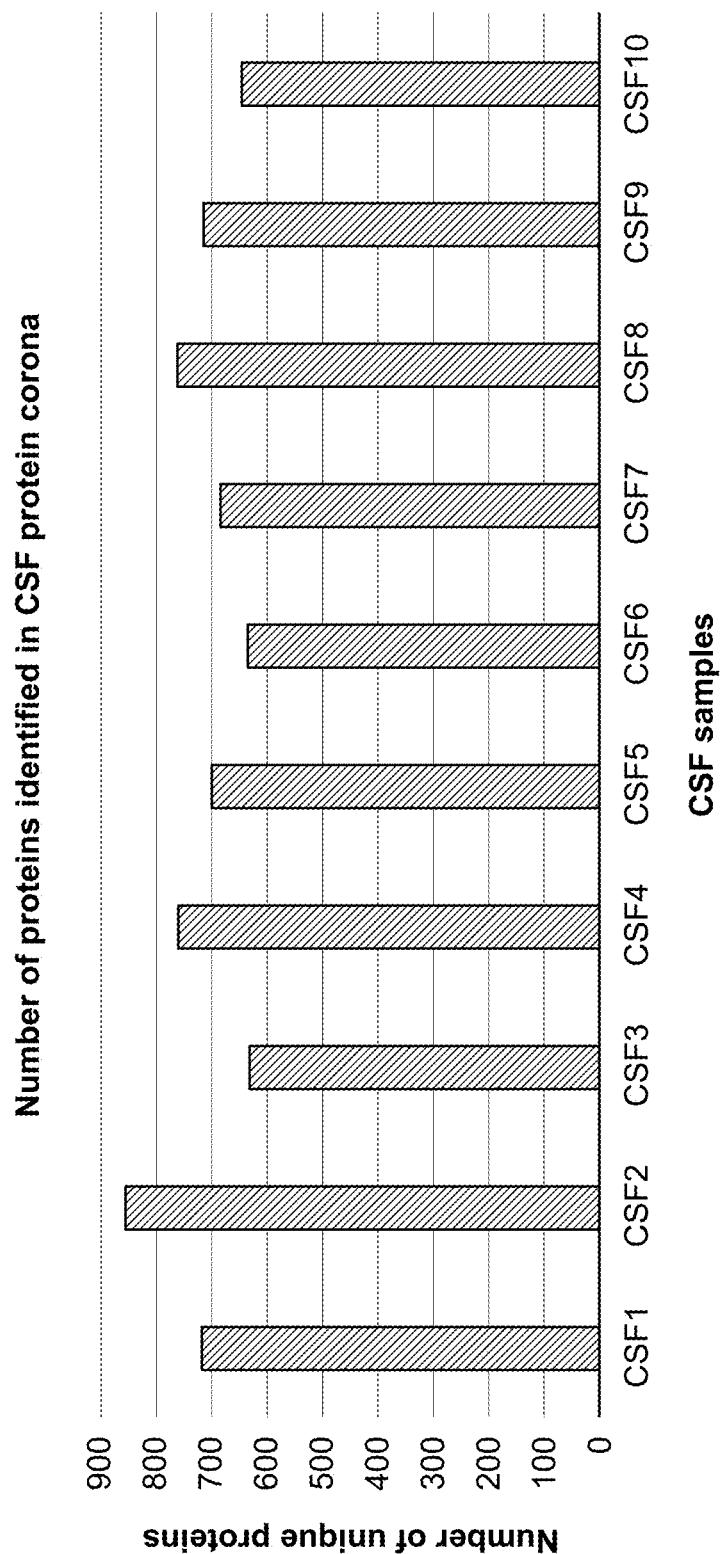
FIG. 1 shows the total number of proteins identified in different cerebral spinal fluid ("CSF") samples. A set of 10 individual CSF samples were contacted with P39 to create 10 protein coronas for mass spectrometry analysis. The total number of unique proteins identified was counted for each sample.

Provided herein are compositions of particles that may be incubated with various biological samples. Various particle types, alone or in combination, can be incubated with a wide range of biological samples to analyze the proteins present in said biological sample based on binding to particle surface to form protein coronas. A single particle type may be used to assay the proteins in a particular biological sample or multiple particle types can be used together to assay the proteins in the biological sample. A protein corona analysis may be performed on a biological sample (e.g., a biofluid) by contacting the biological sample with a plurality of particles, incubating the biological sample with the plurality of particles to form a protein corona, separating the particles from the biological sample, and analyzing the protein corona to determine the composition of the protein corona. In some embodiments, analyzing the protein corona is performed using mass spectrometry. Interrogation of a sample with a plurality of particles followed by analysis of the protein corona formed on the plurality of particles may be referred to herein as "protein corona analysis." A biological sample may be interrogated with one or more particle types. The protein corona of each particle type may be analyzed separately. In some embodiments, the protein corona of one or more particle types may be analyzed in combination.

The present disclosure provides several biological samples that can be assayed using the particles disclosed herein and the methods provided herein. For example, a biological sample may be a biofluid sample such as cerebral spinal fluid (CSF), synovial fluid (SF), urine, plasma, serum, tears, crevicular fluid, semen, whole blood, milk, nipple aspirate, ductal lavage, vaginal fluid, nasal fluid, ear fluid, gastric fluid, pancreatic fluid, trabecular fluid, lung lavage, prostatic fluid, sputum, fecal matter, bronchial lavage, fluid from swabbings, bronchial aspirants, sweat or saliva. A biofluid may be a fluidized solid, for example a tissue homogenate, or a fluid extracted from a biological sample. A biological sample may be, for example, a tissue sample or a fine needle aspiration (FNA) sample. In some embodiments a biological sample may be a cell culture sample. In some embodiments, a biofluid is a fluidized biological sample. For example, a biofluid may be a fluidized cell culture extract.

Also provided herein are methods of depleting a sample of highly abundant proteins and compositions for doing so. In some embodiments, depletion can comprise using one or more particles to deplete a biological sample (e.g., a biofluid) of highly abundant proteins. Depletion of a sample with particles may include one or more rounds of depletion of the sample with a one or more particle types (e.g., a particle with a unique material composition). In other cases, plasma depletion kits, columns, chromatography, centrifugation, or other systems may be used to deplete a biological sample of highly abundant proteins. Any of these methods of depletion can be followed up by serial interrogation of the sample using the various particle types disclosed herein and corona analysis of said various particle types, as disclosed herein.

Figure 8A:
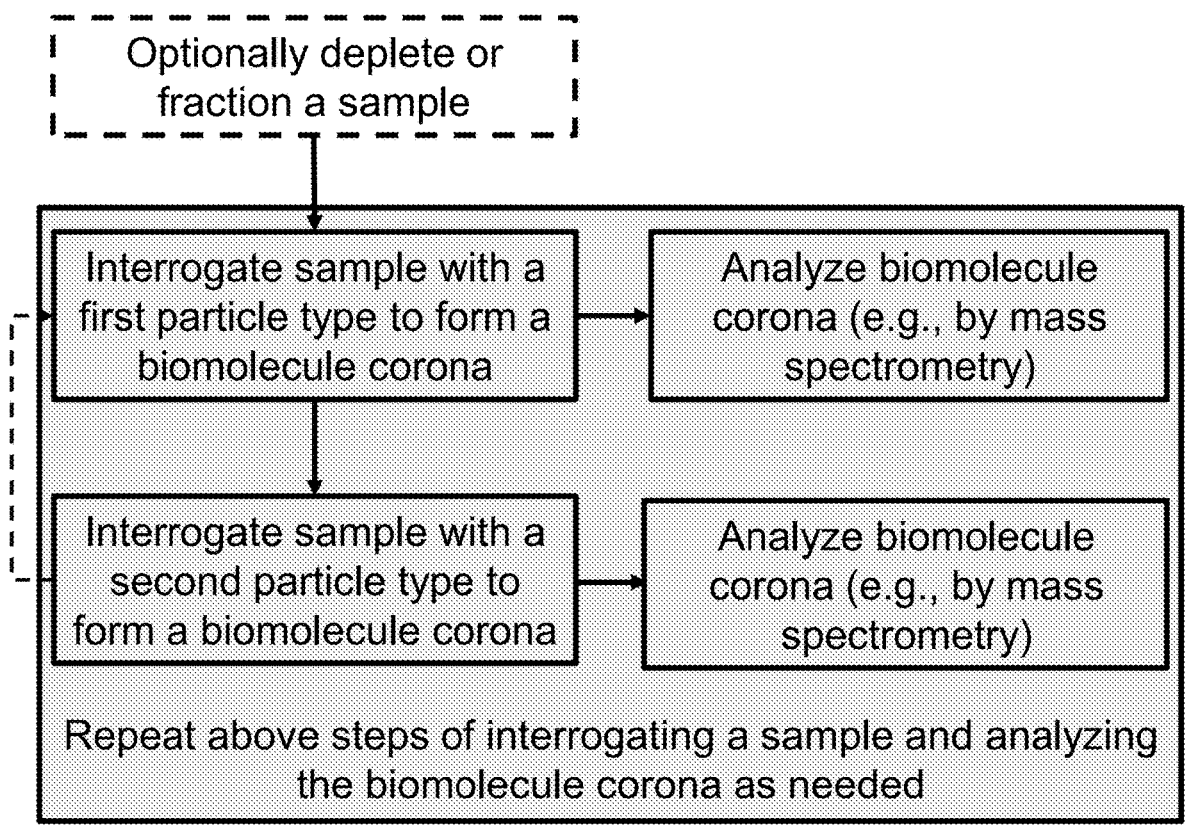
FIG. 8A-FIG. 8G illustrate various workflows for depletion methods disclosed herein.

Example workflows of the present disclosure are illustrated in FIG. 8A-FIG. 8G. FIG. 8A illustrates a workflow for serial interrogation of a sample with particles. A sample (e.g., a biological sample) may be repeatedly interrogated using the same or different particle types. Optionally, the sample may be depleted or fractioned prior to serial interrogation. Interrogation of the sample with the same particle type or different particle types may be repeated 2, 3, 4, 5, 6, 7, 8, 9, 10, 11, 12, 13, 14, 15, 16, 17, 18, 19, 20, or more times. In some embodiments, any 2, 3, 4, 5, 6, 7, 8, 9, 10, 11, 12, 13, 14, 15, 16, 17, 18, 19, 20, or more particle types may be the same particle type. In some embodiments, any 2, 3, 4, 5, 6, 7, 8, 9, 10, 11, 12, 13, 14, 15, 16, 17, 18, 19, 20, or more particle types may be different particle types. A sample may be interrogated with a particle type by incubating the sample with the particles to form biomolecule corona on the particles. Following interrogation of the sample with a particle type, the particles comprising the biomolecule corona may be separated from the sample (e.g., using magnetic separation, centrifugation, filtration, or gravitational separation). The biomolecule corona on the separated particles may be analyzed (e.g., by mass spectrometry, gel electrophoresis, chromatography, spectroscopy, or immunoassays). Protein corona analysis of the biomolecule corona may compress the dynamic range of the analysis compared to a total protein analysis method.

Figure 8B:
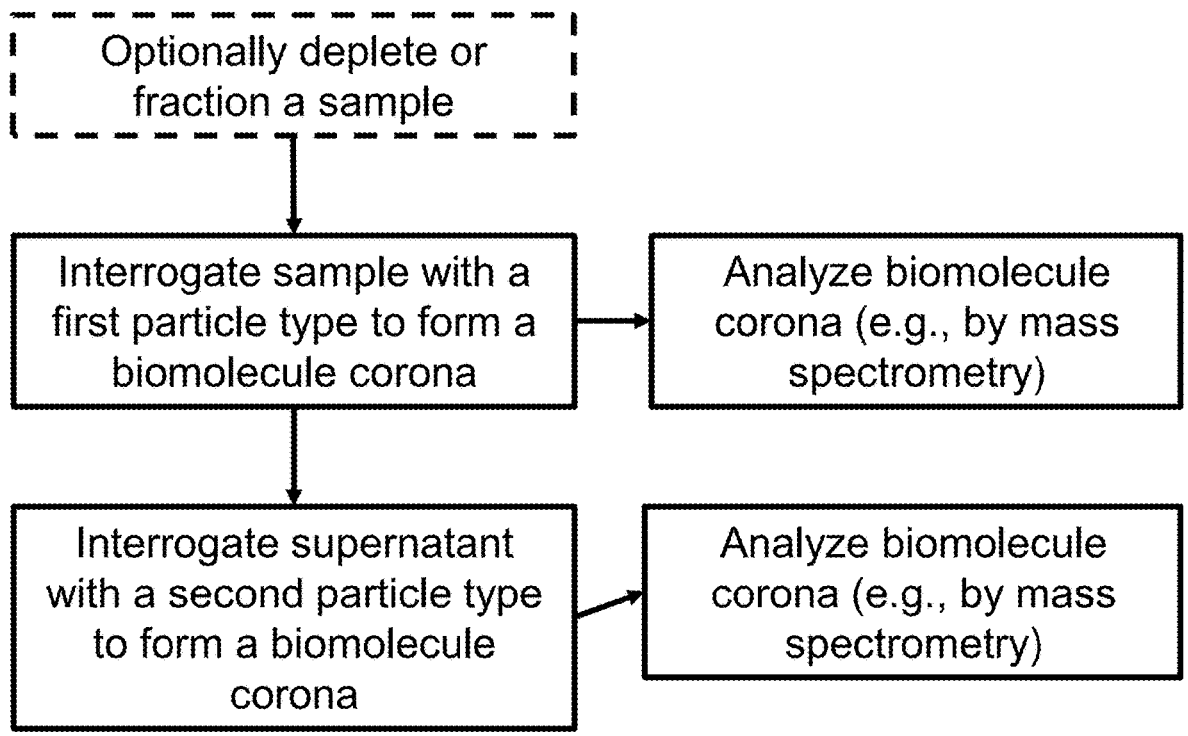

A first example of a workflow is provided in FIG. 8B. FIG. 8B illustrates a workflow comprising serial interrogation of a sample with a first particle type and a second particle type. The first particle type may be a particle selected from TABLE 1. The second particle type may be a particle selected from TABLE 1. The corona of each particle type are analyzed following interrogation. Optionally, the sample is depleted or fractioned prior to interrogation.

Figure 8C:
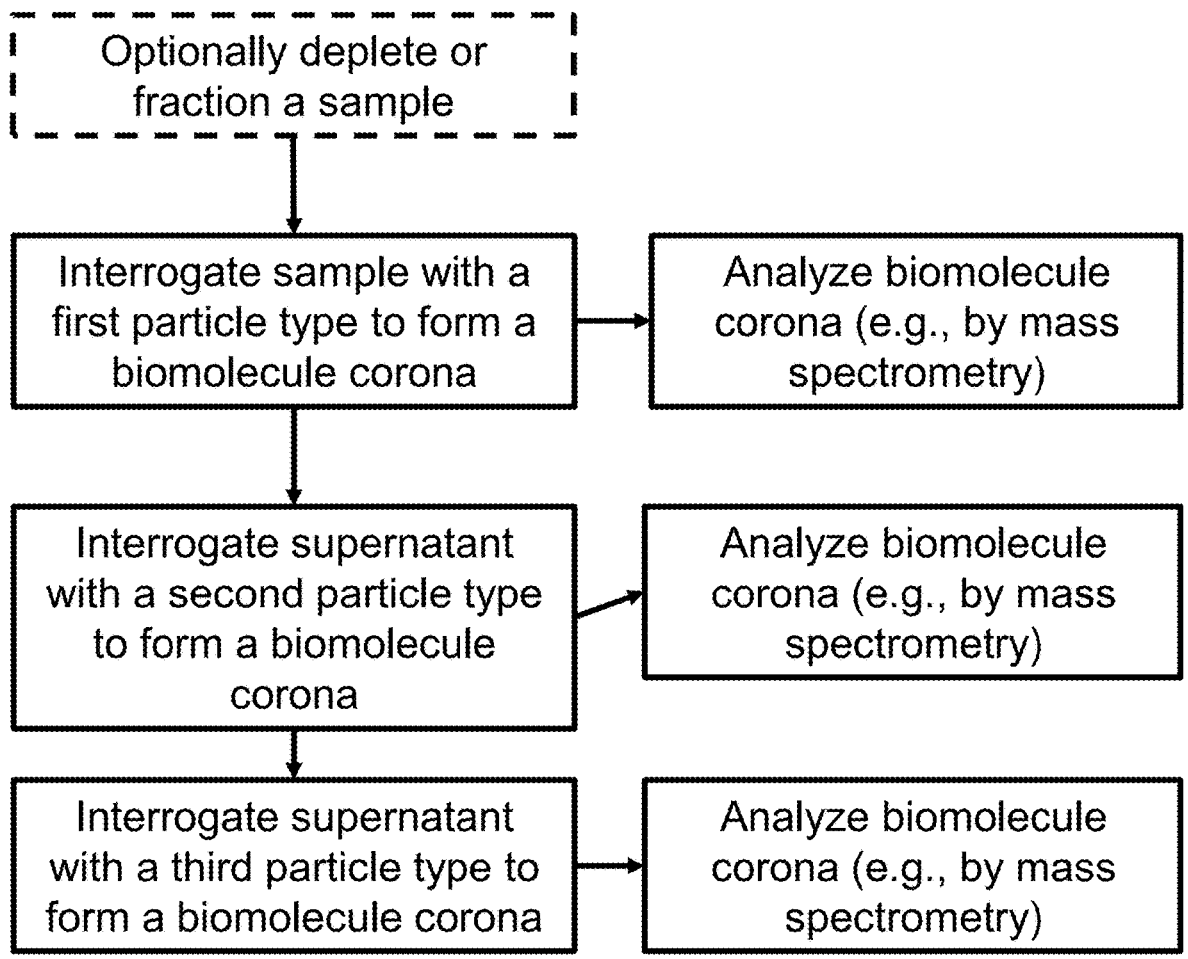

A second example of a workflow is provided in FIG. 8B. FIG. 8C illustrates a workflow comprising serial interrogation of a sample with a first particle type, a second particle type, and a third particle type. The first particle type may be a particle selected from TABLE 1. The second particle type may be a particle selected from TABLE 1. The third particle type may be a particle selected from TABLE 1. The corona of each particle type are analyzed following interrogation. Optionally, the sample is depleted or fractioned prior to interrogation.

Figure 8D:
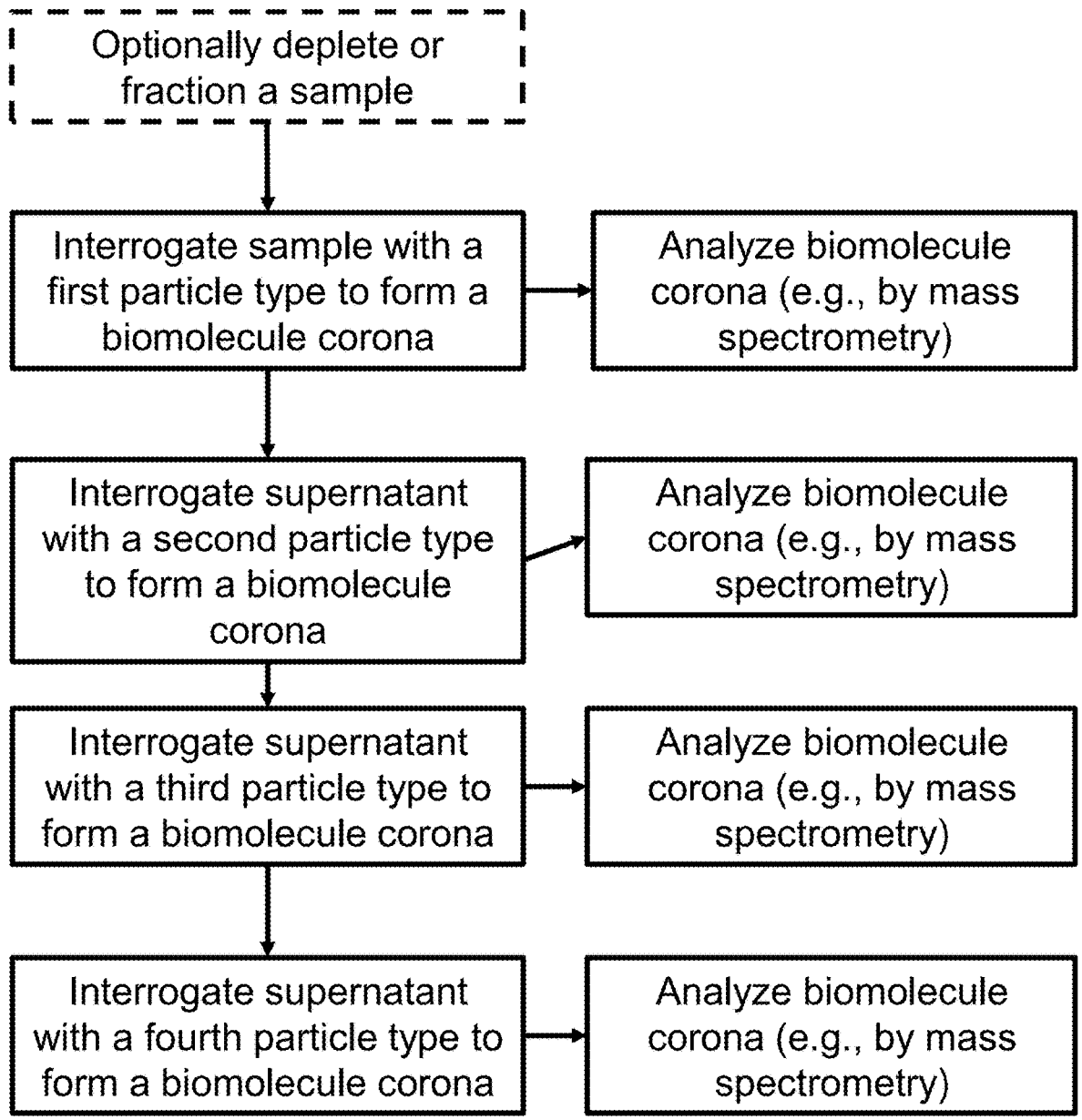

A third example of a workflow is provided in FIG. 8B. FIG. 8D illustrates a workflow comprising serial interrogation of a sample with a first particle type, a second particle type, a third particle type, and a fourth particle type. The first particle type may be a particle selected from TABLE 1. The second particle type may be a particle selected from TABLE 1. The third particle type may be a particle selected from TABLE 1. The fourth particle type may be a particle selected from TABLE 1. The corona of each particle type are analyzed following interrogation. Optionally, the sample is depleted or fractioned prior to interrogation.

Figure 8E:
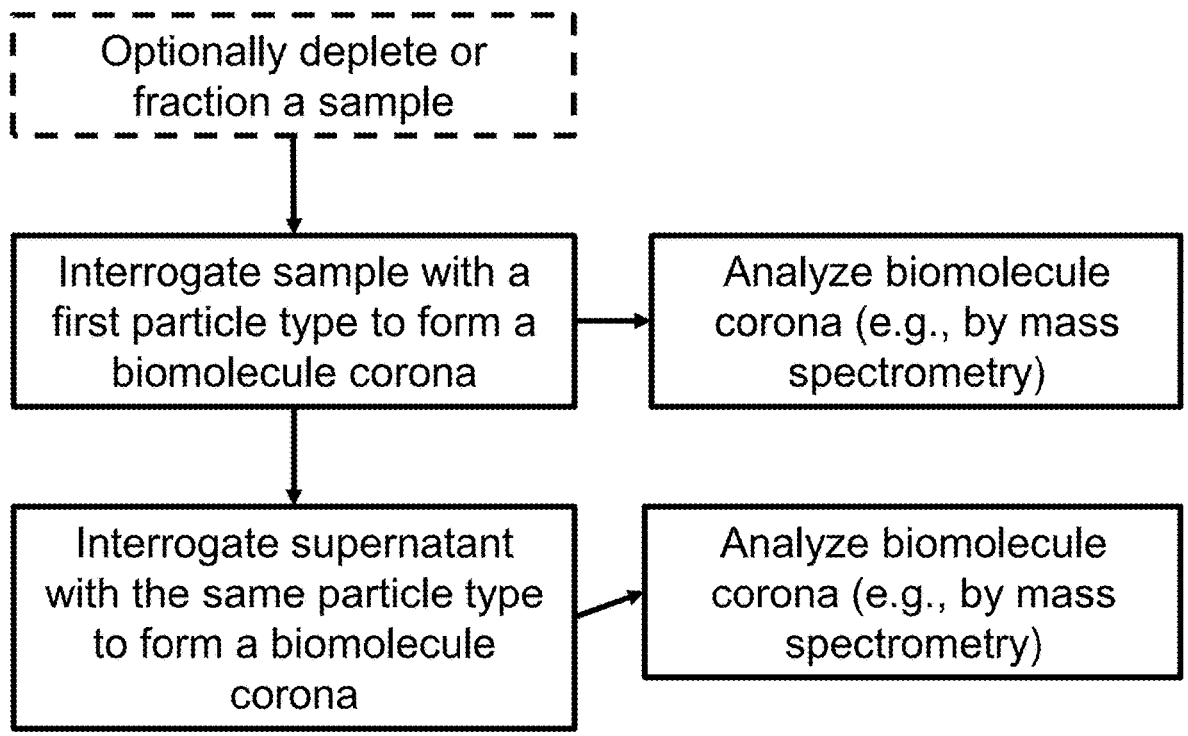

A fourth example of a workflow is provided in FIG. 8B. FIG. 8E illustrates a workflow comprising serial interrogation of a sample with a particle type a first time and a second time. The particle type may be a particle selected from TABLE 1. The corona of the particle type are analyzed following each interrogation. Optionally, the sample is depleted or fractioned prior to interrogation.

Figure 8F:
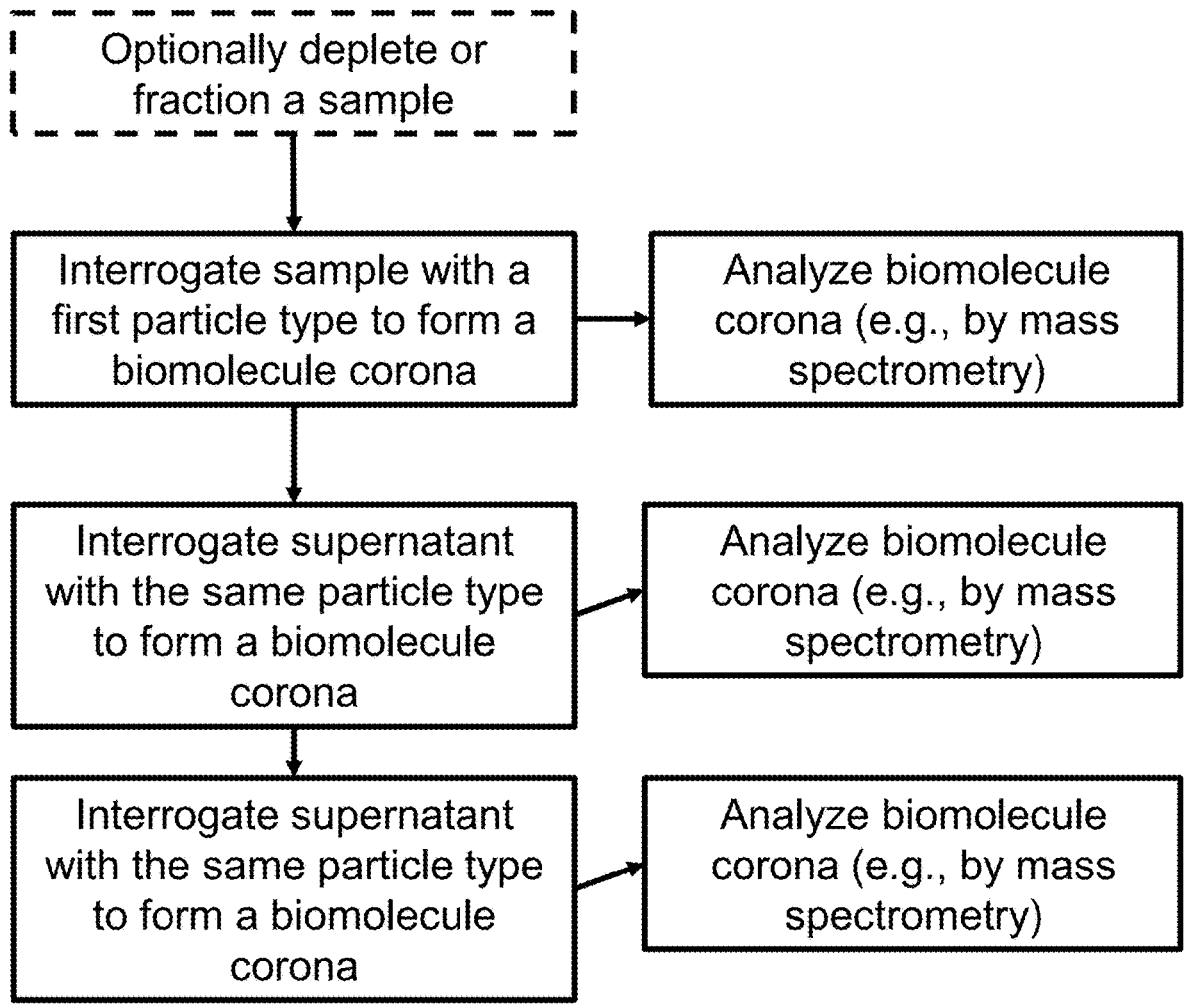

A fifth example of a workflow is provided in FIG. 8B. FIG. 8F illustrates a workflow comprising serial interrogation of a sample with a particle type a first time, a second time, and a third time. The particle type may be a particle selected from TABLE 1. The corona of the particle type are analyzed following each interrogation. Optionally, the sample is depleted or fractioned prior to interrogation.

Figure 8G:
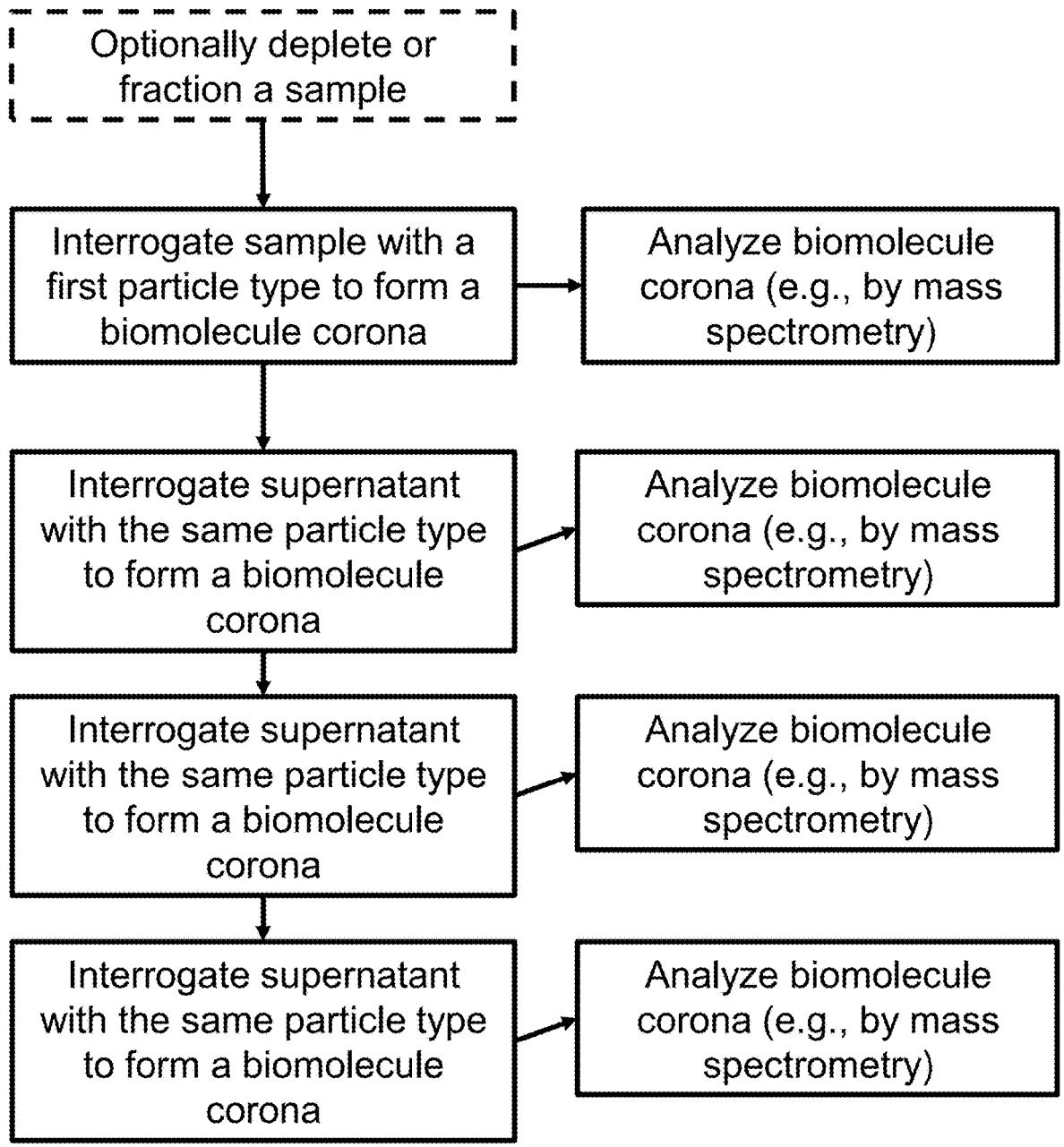

A sixth example of a workflow is provided in FIG. 8B. FIG. 8G illustrates a workflow comprising serial interrogation of a sample with a particle type a first time, a second time, a third time, and a fourth time. The particle type may be a particle selected from TABLE 1. The corona of the particle type are analyzed following each interrogation.

While examples of workflows are provided in FIG. 8B-FIG. 8G, serial interrogation of a sample may be performed any number of times with any number or types of particle types. Serial interrogation may be performed with a combination of same particle types and different particle types in any order.

The present disclosure also provides methods and compositions for fractioning a biological sample, such as a biofluid. A biofluid may be separated into fractions by sequentially contacting the fluid or a supernatant of the fluid to different types of particles. A biofluid may be contacted with a first particle type, and the first particle type may be separated from the biological sample (e.g., by centrifugation or magnetic separation) along with any biological molecules (e.g., proteins) bound to the first particle type. The separated first particle type and bound biological molecules may constitute a first fraction. The remaining biofluid (e.g., a supernatant) may be contacted with a second particle type, and the second particle type may be separated from the biological sample along with any biological molecules bound to the second particle type. This process may be repeated with additional particle types, thereby fractioning the biofluid. In some embodiments, a biological sample may be fractionated using a chromatography, centrifugation, precipitation, electrophoresis, or any other method of biochemical separation. After fractioning a sample, the sample may be assayed for proteins using the methods of serial interrogation with various particle types, as disclosed herein.

The particles, compositions, and methods disclosed herein are compatible with various sample collection and stabilization methods and compositions. The protein corona analysis methods provided herein may be performed on a stabilized biological sample. A stabilized biological sample may comprise a biological sample (e.g., a biofluid) that has been treated with a stabilizing reagent (e.g., a preservative). In some embodiments, a biological sample may be treated with a liquid preservative that maintains cellular antigen expression. The stabilizing reagent may be contained within a sample collection container (e.g., a blood collection tube). The stabilized biological sample may be analyzed by protein corona analysis using any of the particles, compositions, or methods disclosed herein. In some embodiments, the stabilized biological sample may be stored unrefrigerated prior to protein corona analysis.

Particle Types

Particle types consistent with the methods disclosed herein can be made from various materials. For example, particle materials consistent with the present disclosure include metals, polymers, magnetic materials, and lipids. Magnetic particles may be iron oxide particles. Examples of metal materials include any one of or any combination of gold, silver, copper, nickel, cobalt, palladium, platinum, iridium, osmium, rhodium, ruthenium, rhenium, vanadium, chromium, manganese, niobium, molybdenum, tungsten, tantalum, iron and cadmium, or any other material described in U.S. Pat. No. 7,749,299. In some embodiments, a particle may be a superparamagnetic iron oxide nanoparticle (SPION).

Examples of polymers include any one of or any combination of polyethylenes, polycarbonates, polyanhydrides, polyhydroxyacids, polypropylfumerates, polycaprolactones, polyamides, polyacetals, polyethers, polyesters, poly(orthoesters), polycyanoacrylates, polyvinyl alcohols, polyurethanes, polyphosphazenes, polyacrylates, polymethacrylates, polycyanoacrylates, polyureas, polystyrenes, or polyamines, a polyalkylene glycol (e.g., polyethylene glycol (PEG)), a polyester (e.g., poly(lactide-co-glycolide) (PLGA), polylactic acid, or polycaprolactone), or a copolymer of two or more polymers, such as a copolymer of a polyalkylene glycol (e.g., PEG) and a polyester (e.g., PLGA). In some embodiments, the polymer is a lipid-terminated polyalkylene glycol and a polyester, or any other material disclosed in U.S. Pat. No. 9,549,901.

Examples of lipids that can be used to form the particles of the present disclosure include cationic, anionic, and neutrally charged lipids. For example, particles can be made of any one of or any combination of dioleoylphosphatidylglycerol (DOPG), diacylphosphatidylcholine, diacylphosphatidylethanolamine, ceramide, sphingomyelin, cephalin, cholesterol, cerebrosides and diacylglycerols, dioleoylphosphatidylcholine (DOPC), dimyristoylphosphatidylcholine (DMPC), and dioleoylphosphatidylserine (DOPS), phosphatidylglycerol, cardiolipin, diacylphosphatidylserine, diacylphosphatidic acid, N-dodecanoyl phosphatidylethanolamines, N-succinyl phosphatidylethanolamines, N-glutarylphosphatidylethanolamines, lysylphosphatidylglycerols, palmitoyloleyolphosphatidylglycerol (POPG), lecithin, lysolecithin, phosphatidylethanolamine, lysophosphatidylethanolamine, dioleoylphosphatidylethanolamine (DOPE), dipalmitoyl phosphatidyl ethanolamine (DPPE), dimyristoylphosphoethanolamine (DMPE), distearoyl-phosphatidyl-ethanolamine (DSPE), palmitoyl-leoyl-phosphatidylethanolamine (POPE) palmitoyl-leoylphosphatidylcholine (POPC), egg phosphatidylcholine (EPC), di stearoylphosphatidylcholine (DSPC), dioleoylphosphatidylcholine (DOPC), dipalmitoylphosphatidylcholine (DPPC), dioleoylphosphatidylglycerol (DOPG), dipalmitoylphosphatidylglycerol (DPPG), palmitoyloleyol phosphatidylglycerol (POPG), 16-O-monomethyl PE, 16-O-dimethyl PE, 18-1-trans PE, palmitoyloleoyl-phosphatidylethanolamine (POPE), 1-stearoyl-2-oleoyl-phosphatidyethanolamine (SOPE), phosphatidylserine, phosphatidylinositol, sphingomyelin, cephalin, cardiolipin, phosphatidic acid, cerebrosides, dicetylphosphate, and cholesterol, or any other material listed in U.S. Pat. No. 9,445,994, which is incorporated herein by reference in its entirety.

Examples of particles of the present disclosure are provided in TABLE 1.

TABLE 1

Example particles of the present disclosure

| Batch No. | Type | Particle ID | Description |
| --- | --- | --- | --- |
| S-001-001 | HX-13 | SP-001 | Carboxylate (Citrate) superparamagnetic iron oxide NPs (SPION) |
| S-002-001 | HX-19 | SP-002 | Phenol-formaldehyde coated SPION |
| S-003-001 | HX-20 | SP-003 | Silica-coated superparamagnetic iron oxide NPs (SPION) |
| S-004-001 | HX-31 | SP-004 | Polystyrene coated SPION |
| S-005-001 | HX-38 | SP-005 | Carboxylated Poly(styrene-co-methacrylic acid), P(St-co-MAA) coated SPION |
| S-006-001 | HX-42 | SP-006 | N-(3-Trimethoxysilylpropyl)diethylenetriamine coated SPION |
| S-007-001 | HX-56 | SP-007 | poly(N-(3-(dimethylamino)propyl) methacrylamide) (PDMAPMA)-coated SPION |
| S-008-001 | HX-57 | SP-008 | 1,2,4,5-Benzenetetracarboxylic acid coated SPION |
| S-009-001 | HX-58 | SP-009 | poly(vinylbenzyltrimethylammonium chloride) (PVBTMAC) coated SPION |
| S-010-001 | HX-59 | SP-010 | Carboxylate, PAA coated SPION |
| S-011-001 | HX-86 | SP-011 | poly(oligo(ethylene glycol) methyl ether methacrylate) (POEGMA)-coated SPION |
| P-033-001 | P33 | SP-333 | Carboxylate microparticle, surfactant free |
| P-039-003 | P39 | SP-339 | Polystyrene carboxyl functionalized |
| P-041-001 | P41 | SP-341 | Carboxylic acid |
| P-047-001 | P47 | SP-365 | Silica |
| P-048-001 | P48 | SP-348 | Carboxylic acid, 150 nm |
| P-053-001 | P53 | SP-353 | Amino surface microparticle, 0.4-0.6 µm |
| P-056-001 | P56 | SP-356 | Silica amino functionalized microparticle, 0.1-0.39 µm |
| P-063-001 | P63 | SP-363 | Jeffamine surface, 0.1-0.39 µm |
| P-064-001 | P64 | SP-364 | Polystyrene microparticle, 2.0-2.9 µm |
| P-065-001 | P65 | SP-365 | Silica |
| P-069-001 | P69 | SP-369 | Carboxylated Original coating, 50 nm |
| P-073-001 | P73 | SP-373 | Dextran based coating, 0.13 µm |
| P-074-001 | P74 | SP-374 | Silica Silanol coated with lower acidity |

A particle of the present disclosure may be synthesized, or a particle of the present disclosure may be purchased from a commercial vendor. For example, particles consistent with the present disclosure may be purchased from commercial vendors including Sigma-Aldrich, Life Technologies, Fisher Biosciences, nanoComposix, Nanopartz, Spherotech, and other commercial vendors. In some embodiments, a particle of the present disclosure may be purchased from a commercial vendor and further modified, coated, or functionalized.

Particles that are consistent with the present disclosure can be made and used in methods of forming protein coronas after incubation in a biofluid at a wide range of sizes. In some embodiments, a particle of the present disclosure may be a nanoparticle. In some embodiments, a nanoparticle of the present disclosure may be from about 10 nm to about 1000 nm in diameter. For example, the nanoparticles disclosed herein can be at least 10 nm, at least 100 nm, at least 200 nm, at least 300 nm, at least 400 nm, at least 500 nm, at least 600 nm, at least 700 nm, at least 800 nm, at least 900 nm, from 10 nm to 50 nm, from 50 nm to 100 nm, from 100 nm to 150 nm, from 150 nm to 200 nm, from 200 nm to 250 nm, from 250 nm to 300 nm, from 300 nm to 350 nm, from 350 nm to 400 nm, from 400 nm to 450 nm, from 450 nm to 500 nm, from 500 nm to 550 nm, from 550 nm to 600 nm, from 600 nm to 650 nm, from 650 nm to 700 nm, from 700 nm to 750 nm, from 750 nm to 800 nm, from 800 nm to 850 nm, from 850 nm to 900 nm, from 100 nm to 300 nm, from 150 nm to 350 nm, from 200 nm to 400 nm, from 250 nm to 450 nm, from 300 nm to 500 nm, from 350 nm to 550 nm, from 400 nm to 600 nm, from 450 nm to 650 nm, from 500 nm to 700 nm, from 550 nm to 750 nm, from 600 nm to 800 nm, from 650 nm to 850 nm, from 700 nm to 900 nm, or from 10 nm to 900 nm in diameter. In some embodiments, a nanoparticle may be less than 1000 nm in diameter.

In some embodiments, a particle of the present disclosure may be a microparticle. A microparticle may be a particle that is from about 1 µm to about 1000 µm in diameter. For example, the microparticles disclosed here can be at least 1 µm, at least 10 µm, at least 100 µm, at least 200 µm, at least 300 µm, at least 400 µm, at least 500 µm, at least 600 µm, at least 700 µm, at least 800 µm, at least 900 µm, from 10 µm to 50 µm, from 50 µm to 100 µm, from 100 µm to 150 µm, from 150 µm to 200 µm, from 200 µm to 250 µm, from 250 µm to 300 µm, from 300 µm to 350 µm, from 350 µm to 400 µm, from 400 µm to 450 µm, from 450 µm to 500 µm, from 500 µm to 550 µm, from 550 µm to 600 µm, from 600 µm to 650 µm, from 650 µm to 700 µm, from 700 µm to 750 µm, from 750 µm to 800 µm, from 800 µm to 850 µm, from 850 µm to 900 µm, from 100 µm to 300 µm, from 150 µm to 350 µm, from 200 µm to 400 µm, from 250 µm to 450 µm, from 300 µm to 500 µm, from 350 µm to 550 µm, from 400 µm to 600 µm, from 450 µm to 650 µm, from 500 µm to 700 µm, from 550 µm to 750 µm, from 600 µm to 800 µm, from 650 µm to 850 µm, from 700 µm to 900 µm, or from 10 µm to 900 µm in diameter. In some embodiments, a microparticle may be less than 1000 µm in diameter.

A particle of the present disclosure may be contacted with a biological sample (e.g., a biofluid) to form a biomolecule corona. The particle and biomolecule corona may be separated from the biological sample, for example by centrifugation, magnetic separation, filtration, or gravitational separation. The particle types and biomolecule corona may be separated from the biological sample using a number of separation techniques. Non-limiting examples of separation techniques include comprises magnetic separation, column-based separation, filtration, spin column-based separation, centrifugation, ultracentrifugation, density or gradient-based centrifugation, gravitational separation, or any combination thereof. A protein corona analysis may be performed on the separated particle and biomolecule corona. A protein corona analysis may comprise identifying one or more proteins in the biomolecule corona, for example by mass spectrometry. In some embodiments, a single particle type (e.g., a particle of a type listed in TABLE 1) may be contacted to a biological sample. In some embodiments, a plurality of particle types (e.g., a plurality of the particle types provided in TABLE 1) may be contacted to a biological sample. The plurality of particle types may be combined and contacted to the biological sample in a single sample volume. The plurality of particle types may be sequentially contacted to a biological sample and separated from the biological sample prior to contacting a subsequent particle type to the biological sample. Protein corona analysis of the biomolecule corona may compress the dynamic range of the analysis compared to a total protein analysis method.

The particles of the present disclosure may be used to serially interrogate a sample by incubating a first particle type with the sample to form a biomolecule corona on the first particle type, separating the first particle type, incubating a second particle type with the sample to form a biomolecule corona on the second particle type, separating the second particle type, and repeating the interrogating (by incubation with the sample) and the separating for any number of particle types. In some embodiments, the biomolecule corona on each particle type used for serial interrogation of a sample may be analyzed by protein corona analysis. In some embodiments, the biomolecule content of the supernatant may be analyzed following serial interrogation with one or more particle types.

In some embodiments, a particle type of the present disclosure can be used to serially interrogate a sample followed by corona analysis of proteins in the protein corona formed upon incubation of the particle type with the sample. Serial interrogation may be performed with two particle types in a round-by-round fashion. Serial interrogation may also include subsequent interrogation with additional particle times. In some embodiments, a particle of the present disclosure may be used to deplete a sample prior to the above described method of serial interrogation. A particle type may be contacted to a sample to form biomolecule corona on a surface of the particle type, and the particle may be separated from the sample, thereby depleting the sample. This strategy may be used to deplete one or more proteins (e.g., one or more high abundance proteins) from a sample. In some embodiments, the biomolecule content of the supernatant of a depleted sample may be analyzed. In some embodiments, the supernatant of the depleted sample may be used in any of the protein corona analysis methods disclosed herein.

An example of a particle type of the present disclosure may be a carboxylate (Citrate) superparamagnetic iron oxide nanoparticle (SPION), a phenol-formaldehyde coated SPION, a silica-coated SPION, a polystyrene coated SPION, a carboxylated poly(styrene-co-methacrylic acid) coated SPION, a N-(3-Trimethoxysilylpropyl)diethylenetriamine coated SPION, a poly(N-(3-(dimethylamino)propyl) methacrylamide) (PDMAPMA)-coated SPION, a 1,2,4,5-Benzenetetracarboxylic acid coated SPION, a poly(Vinylbenzyltrimethylammonium chloride) (PVBTMAC) coated SPION, a carboxylate, PAA coated SPION, a poly(oligo (ethylene glycol) methyl ether methacrylate) (POEGMA)-coated SPION, a carboxylate microparticle, a polystyrene carboxyl functionalized particle, a carboxylic acid coated particle, a silica particle, a carboxylic acid particle of about 150 nm in diameter, an amino surface microparticle of about 0.4-0.6 µm in diameter, a silica amino functionalized microparticle of about 0.1-0.39 µm in diameter, a Jeffamine surface particle of about 0.1-0.39 µm in diameter, a polystyrene microparticle of about 2.0-2.9 µm in diameter, a silica particle, a carboxylated particle with an original coating of about 50 nm in diameter, a particle coated with a dextran based coating of about 0.13 µm in diameter, or a silica silanol coated particle with low acidity.

Sample Collection and Extraction Methods

A variety of samples may be assayed in accordance with the methods and compositions of this disclosure. The samples disclosed herein may be analyzed by protein corona analysis after serially interrogating the sample with various particle types. In some embodiments, a sample may be fractioned prior to protein corona analysis. In some embodiments, a sample may be depleted prior to protein corona analysis. In some embodiments, a method of this disclosure may comprise contacting a sample with one or more particle types and performing a protein corona analysis on the sample.

A sample may be a biological sample. For example, a biological sample may be a biofluid sample such as cerebrospinal fluid (CSF), synovial fluid (SF), urine, plasma, serum, tear, crevicular fluid, semen, whole blood, milk, nipple aspirate, ductal lavage, vaginal fluid, nasal fluid, ear fluid, gastric fluid, pancreatic fluid, trabecular fluid, lung lavage, prostatic fluid, sputum, fecal matter, bronchial lavage, fluid from swabbings, bronchial aspirants, sweat or saliva. A biofluid may be a fluidized solid, for example a tissue homogenate, or a fluid extracted from a biological sample. A biological sample may be, for example, a tissue sample or a fine needle aspiration (FNA) sample. In some embodiments a biological sample may be a cell culture sample. For example, a sample that may be used in the methods disclosed herein can either include cells grow in cell culture or can include acellular material taken from cell cultures. In some embodiments, a biofluid is a fluidized biological sample. For example, a biofluid may be a fluidized cell culture extract. In some embodiments, a sample may be extracted from a fluid sample, or a sample may be extracted from a solid sample. For example, a sample may comprise gaseous molecules extracted from a fluidized solid (e.g., a volatile organic compound).

Figure 34:
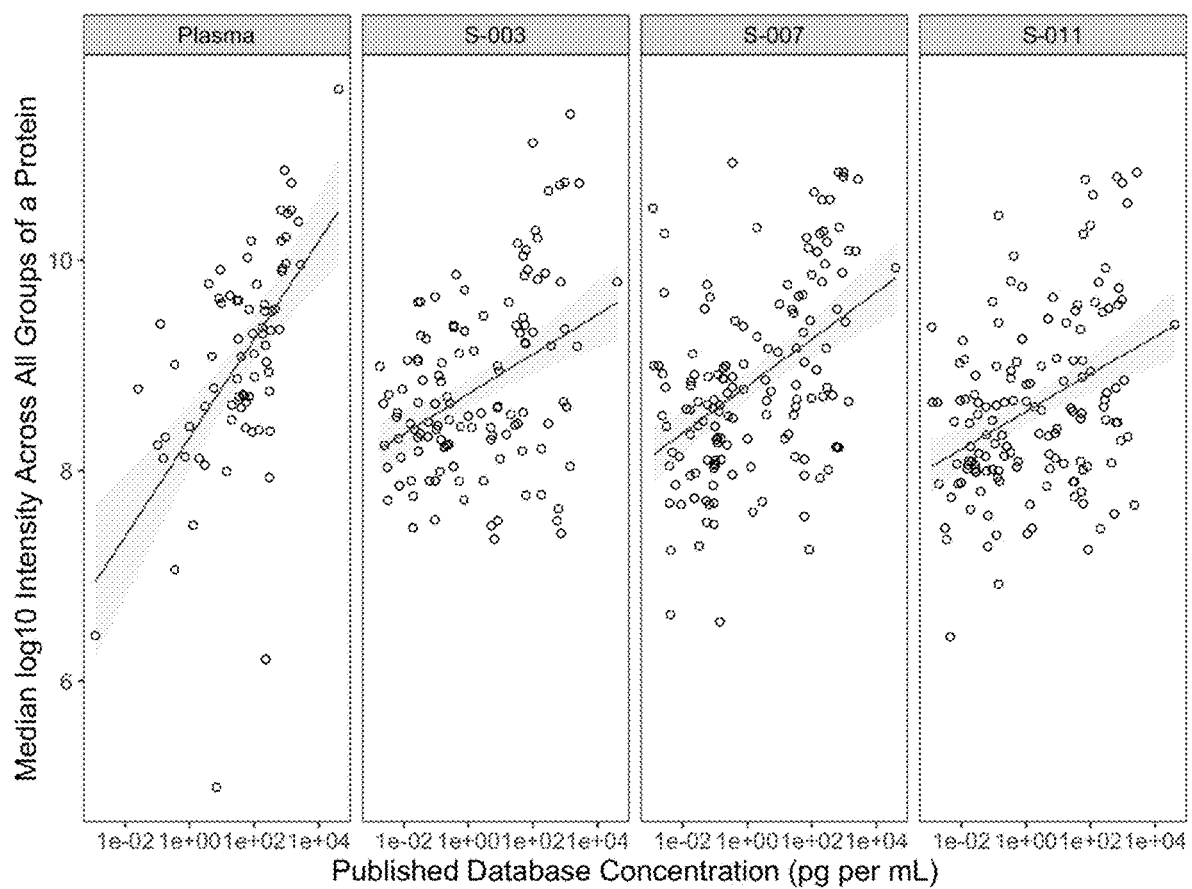
FIG. 34 shows correlation of the maximum intensities of particle corona proteins and plasma proteins to the published concentration of the same proteins. The blue plotted lines are linear regression models to the data and the shaded regions represent the standard error of the model fit. The dynamic range of the samples assayed with particles ("S-003," "S-007," and "S-011") exhibited a compressed dynamic range as compared to the plasma sample not assayed with particles ("Plasma"), as shown by the decrease in slopes of the linear fits. The slopes of each plot are 0.47, 0.19, 0.22, and 0.18 for, plasma without particles, plasma with S-003 particles, plasma with S-007 particles, and plasma with S-011 particles, respectively.
Figure 35:
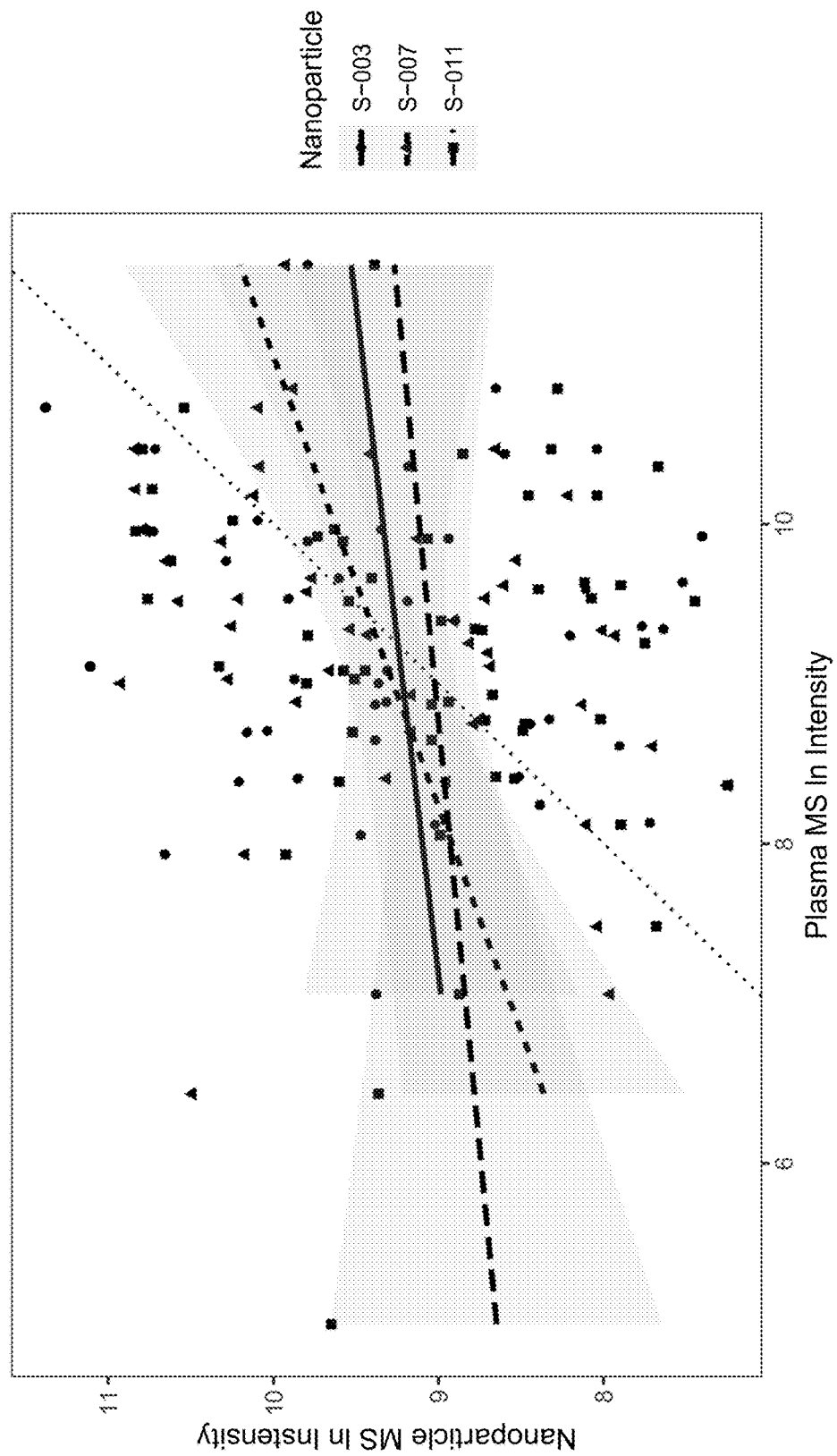
FIG. 35 shows the dynamic range compression of a protein corona analysis assay with mass spectrometry as compared to mass spectrometry without particle corona formation. Protein intensities of common proteins identified in particle corona in the plasma samples assayed in FIG. 34 ("Nanoparticle MS ln Intensity") are plotted against the protein intensity identified by mass spectrometry of plasma without particles ("Plasma MS ln Intensity"). The lightest dotted line shows a slope of 1, indicating the dynamic range of mass spectrometry without particles. The slopes of the linear fits to the protein intensity was 0.12, 0.36, and 0.093 for S-003, S-007, and S-011 particles, respectively. The grayed area indicates the standard error region of the regression fit.

The protein corona analysis methods described herein may comprise assaying proteins in a sample of the present disclosure across a wide dynamic range. The dynamic range of proteins assayed in a sample may be a range of measured signals of protein abundances as measured by an assay method (e.g., mass spectrometry, chromatography, gel electrophoresis, spectroscopy, or immunoassays) for the proteins contained within a sample. For example, an assay capable of detecting proteins across a wide dynamic range may be capable of detecting proteins of very low abundance to proteins of very high abundance. The dynamic range of an assay may be directly related to the slope of assay signal intensity as a function of protein abundance. For example, an assay with a low dynamic range may have a low (but positive) slope of the assay signal intensity as a function of protein abundance, e.g., the ratio of the signal detected for a high abundance protein to the ratio of the signal detected for a low abundance protein may be lower for an assay with a low dynamic range than an assay with a high dynamic range. The protein corona analysis methods described herein may compress the dynamic range of an assay. The dynamic range of an assay may be compressed relative to another assay if the slope of the assay signal intensity as a function of protein abundance is lower than that of the other assay. For example, a plasma sample assayed using protein corona analysis with mass spectrometry may have a compressed dynamic range compared to a plasma sample assayed using mass spectrometry alone, directly on the sample or compared to provided abundance values for plasma proteins in databases (e.g., the database provided in Keshishian et al., *Mol. Cell Proteomics* 14, 2375-2393 (2015), also referred to herein as the "Carr database"), as shown in FIG. 34 and FIG. 35. The compressed dynamic range may enable the detection of more low abundance proteins in the plasma sample using protein corona analysis with mass spectrometry than using mass spectrometry alone.

Compression of a dynamic range of an assay may enable the detection of low abundance proteins using the methods disclosed herein (e.g., serial interrogation with a particle followed by an assay for quantitating protein abundance such as mass spectrometry). For example, an assay (e.g., mass spectrometry) may be capable of detecting a dynamic range of 3 orders of magnitude. In a sample comprising five proteins, A, B, C, D, and E, in abundances of 1 ng/mL, 10 ng/mL, 100 ng/mL, 1,000 ng/mL, and 10,000 ng/mL, respectively, the assay (e.g., mass spectrometry) may detect proteins B, C, D, and E. However, using the methods disclosed herein of incubating the sample with a particle, proteins A, B, C, D, and E may have different affinities for the particle surface and may adsorb to the surface of the particle to form the biomolecule corona at different abundancies than present in the sample. For example, proteins A, B, C, D, and E may be present in the biomolecule corona at abundancies of 1 ng/mL, 231 ng/mL, 463 ng/mL, 694 ng/mL, and 926 ng/mL, respectively. Thus, using the particles disclosed herein in methods of interrogating a sample results in compressing the dynamic range to 2 orders of magnitude and the resulting assay (e.g., mass spectrometry) can detect all five proteins.

Multiple biofluids may be processed in parallel using the methods and compositions of this disclosure. A protein corona analysis may be performed in parallel on multiple biological samples by performing each step of a protein corona analysis assay on multiple biological samples at the same time. For example, a protein corona analysis may be performed in parallel on multiple biological samples by performing a first step of a protein corona analysis assay on the multiple biological samples simultaneously, performing a second step of a protein corona analysis assay on the multiple biological samples simultaneously, and performing a third step of a protein corona analysis assay on the multiple biological samples simultaneously. Simultaneous performance of each step of a protein corona analysis on the multiple biological samples may be repeated until all steps of a protein corona analysis assay have been performed on the multiple biological samples. In some instances, the multiple biological samples may be obtained from the same subject. These samples may be portions of a sample obtained from a subject (e.g., multiple aliquots of a plasma sample). These samples may be different biofluids collected from the same subject.

In some embodiments, a protein corona analysis may be performed in parallel on multiple biological samples by sequentially performing a first step of a protein corona analysis assay on each sample of a plurality of biological samples, sequentially performing a second step of a protein corona analysis assay on each sample of a plurality of biological samples, and sequentially performing a third step of a protein corona analysis assay on each sample of a plurality of biological samples. Sequential performance of each step of a protein corona analysis may be performed on each sample of a plurality of biological samples may be repeated until all steps of a protein corona analysis assay have been performed on each biological sample of the plurality of biological samples.

A protein of interest (e.g., a low abundance protein) may be enriched in a biomolecule corona relative to the untreated sample (e.g., a sample that is not assayed using particles). In some embodiments, a level of enrichment may be the percent increase or fold increase in concentration of the protein of interest relative to the total protein concentration in the biomolecule corona as compared to the untreated sample. A protein of interest may be enriched in a biomolecule corona by increasing the concentration of the protein of interest in the biomolecule corona as compared to the sample that has not been contacted to a particle. A protein of interest may be enriched by decreasing the concentration of a high abundance protein in the biomolecule corona as compared to the sample that has not been contacted to a particle. A protein corona analysis assay may be used to rapidly identify low abundance proteins in a biological sample (e.g., a biofluid). In some embodiments, a protein corona analysis may identify at least about 500 low abundance proteins in a biological sample in no more than about 8 hours from first contacting the biological sample with a particle. In some embodiments, a protein corona analysis may identify at least about 1000 low abundance proteins in a biological sample in no more than about 8 hours from first contacting the biological sample with a particle. In some embodiments, a protein corona analysis may identify at least about 500 low abundance proteins in a biological sample in no more than about 4 hours from first contacting the biological sample with a particle. In some embodiments, a protein corona analysis may identify at least about 1000 low abundance proteins in a biological sample in no more than about 4 hours from first contacting the biological sample with a particle.

A biological sample may be collected in a sample collection tube comprising a stabilizing reagent. The stabilizing reagent may stabilize nucleated cells in a biofluid sample or other biomolecules in the biofluid sample, such as proteins or nucleic acids (e.g., RNA or DNA, including cell free RNA or DNA). In some embodiments, a sample collection tube may comprise a metabolic inhibitor, a protease inhibitor, a phosphatase inhibitor, a nuclease inhibitor, a preservative agent, a polyamide, or a combination thereof. A metabolic inhibitor may comprise glyceraldehyde, dihydroxyacetone phosphate, glyceraldehyde 3-phosphate, 1,3-bisphosphoglycerate, 3-phosphoglycerate, 2-phosphoglycerate, phosphoenolpyruvate, pyruvate and glycerate dihydroxyacetate, sodium fluoride, or $K_2C_2O_4$. A protease inhibitor may comprise antipain, aprotinin, chymostatin, elastatinal, phenylmethylsulfonyl fluoride (PMSF), APMSF, TLCK, TPCK, leupeptin, soybean trypsin inhibitor, indoleacetic acid (IAA), E-64, EDTA, pepstatin, VdLPFFVdL, 1,10-phenanthroline, phosphoramodon, amastatin, bestatin, diprotin A, diprotin B, alpha-2-macroglobulin, lima bean trypsin inhibitor, pancreatic protease inhibitor, or egg white ovostatin egg white cystatin. A phosphatase inhibitor may comprise calyculin A, nodularin, NIPP-1, microcystin LR, tautomycin, okadaic acid, cantharidin, microcystin LR, okadaic acid, fostriecin, tautomycin, cantharidin, endothall, nodularin, cyclosporin A, FK 506/immunophilin complexes, cypermethrin, deltamethrin, fenvalerate, bpV(phen), dephostatin, mpV(pic) DMHV, or sodium orthovanadate. A nuclease inhibitor may comprise diethyl pyrocarbonate, ethanol, aurintricarboxylic acid (ATA), formamide, vanadyl-ribonucleoside complexes, macaloid, ethylenediamine tetraacetic acid (EDTA), proteinase K, heparin, hydroxylamine-oxygen-cupric ion, bentonite, ammonium sulfate, dithiothreitol (DTT), beta-mercaptoethanol, cysteine, dithioerythritol, tris(2-carboxyethyl) phosphene hydrochloride, or a divalent cation such as $Mg^{+2}$, $Mn^{+2}$, $Zn^{+2}$, $Fe^{+2}$, $Ca^{+2}$, or $Cu^{+2}$. A preservative agent may comprise diazolidinyl urea, imidazolidinyl urea, dimethoylol-5,5-dimethylhydantoin, dimethylol urea, 2-bromo-2-nitropropane-1,3-diol, oxazolidines, sodium hydroxymethyl glycinate, 5-hydroxymethoxymethyl-1-1aza-3,7-dioxabicyclo[3.3.0]octane, 5-hydroxymethyl-1-1aza-3,7dioxabicyclo[3.3.0]octane, 5-hydroxypoly[methyleneoxy]methyl-1-1aza-3,7dioxabicyclo[3.3.0]octane, or quaternary adamantine. A sample collection tube may comprise stabilizing agents disclosed in U.S. Pat. Nos. 8,304,187, 8,586,306, 9,657,227, 9,926,590, 10,144,955, and 10,294,513, and U.S. application Ser. No. 16/377,344, each of which is incorporated herein by reference in its entirety, and other protein separation techniques.

Cerebrospinal Fluid (CSF) Sample. The present disclosure provides methods of assaying for proteins in a cerebrospinal fluid sample using one or more of the particles disclosed herein (e.g., and one or more of the particles disclosed in TABLE 1). The relatively low abundance of proteins in CSF may confound protein detection using traditional means (e.g., ELISA, immunofluorescence, gel electrophoresis, or chromatography). The methods and compositions disclosed herein may be well suited for detecting proteins in samples with low protein concentration. For example, the protein corona analysis assays disclosed herein may be capable of detecting proteins in samples with no more than about 1.0 mg/mL, no more than about 0.9 mg/mL, no more than about 0.8 mg/mL, no more than about 0.7 mg/mL, no more than about 0.6 mg/mL, no more than about 0.5 mg/mL, no more than about 0.4 mg/mL, no more than about 0.3 mg/mL, no more than about 0.2 mg/mL, or no more than about 0.1 mg/mL total protein concentration.

Sample collection volumes of CSF may be small, ranging from about 1 mL to about 10 mL, limiting the number of assays that may be performed with each sample. The methods and compositions disclosed herein may be well suited for detecting proteins in small sample volumes. For example, the protein corona analysis assays disclosed herein may be capable of detecting proteins in sample volumes of no more than about 1000 µL, no more than about 900 µL, no more than about 800 µL, no more than about 700 µL, no more than about 600 µL, no more than about 500 µL, no more than about 400 µL, no more than about 300 µL, no more than about 200 µL, no more than about 100 µL, no more than about 50 µL, no more than about 20 µL, no more than about 10 µL, no more than about 5 µL, no more than about 2 or µL, no more than about 1 µL.

A protein corona analysis assay may be used to rapidly identify low abundance proteins in a CSF sample. A protein corona analysis may identify low abundance proteins in a CSF sample in no more than about 2 hours, no more than about 2.5 hours, no more than about 3 hours, no more than about 3.5 hours, no more than about 4 hours, no more than about 4.5 hours, no more than about 5 hours, no more than about 5.5 hours, no more than about 6 hours, no more than about 6.5 hours, no more than about 7 hours, no more than about 7.5 hours, no more than about 8 hours, no more than about 8.5 hours, no more than about 9 hours, no more than about 9.5 hours, or no more than about 10 hours from first contacting the CSF sample with a particle.

In some embodiments, a protein corona analysis may identify at least about 500 low abundance proteins in a CSF sample in no more than about 8 hours from first contacting the biological sample with a particle. In some embodiments, a protein corona analysis may identify at least about 1000 low abundance proteins in a CSF sample in no more than about 8 hours from first contacting the CSF sample with a particle. In some embodiments, a protein corona analysis may identify at least about 500 low abundance proteins in a CSF sample in no more than about 4 hours from first contacting the CSF sample with a particle. In some embodiments, a protein corona analysis may identify at least about 1000 low abundance proteins in a CSF sample in no more than about 4 hours from first contacting the CSF sample with a particle.

The methods disclosed herein are superior to other methods of assaying for proteins in CSF and provide sampling of proteins in CSF across a wide dynamic range in a short period of time. In some embodiments, the methods disclosed herein utilize one or more of the particles to rapidly enrich for proteins in a CSF sample. For example, in some embodiments, one or more of the particle types disclosed herein can be used in a method of assaying for a protein of interest (high abundance protein, medium abundance protein, or low abundance protein) in a CSF sample, the method including incubating said one or more particle types in the CSF sample allowing for formation of a biomolecule corona on the particle and enrichment of proteins in the CSF sample, separating the particle from unbound biomolecules in the CSF sample (e.g., by magnetic separation), and trypsinizing and analyzing the biomolecules in the corona for the protein of interest. Further, using said methods allows for efficient enrichment of the protein of interest in the biomolecule coronas formed around the particle type. A protein of interest may be enriched in a biomolecule corona by at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, or at least about 100% relative to the CSF sample that has not been contacted to a particle. A protein of interest may be enriched in a biomolecule corona by at least about 1.1-fold, at least about 1.2-fold, at least about 1.3-fold, at least about 1.4-fold, at least about 1.5-fold, at least about 2-fold, at least about 2.5-fold, at least about 3-fold, at least about 3.5-fold, at least about 4-fold, at least about 4.5-fold, at least about 5-fold, at least about 5.5-fold, at least about 6-fold, at least about 6.5-fold, at least about 7-fold, at least about 7.5-fold, at least about 8-fold, at least about 8.5-fold, at least about 9-fold, at least about 9.5-fold, at least about 10-fold, at least about 20-fold, at least about 30-fold, at least about 40-fold, at least about 50-fold, at least about 60-fold, at least about 70-fold, at least about 80-fold, at least about 90-fold, or at least about 100-fold relative to the CSF sample that has not been contacted to a particle. In some embodiments, any one or more of the particles disclosed herein (e.g., any one or more of the particle types disclosed in TABLE 1) can result in capturing at least about 500, at least about 600, at least about 650, at least about 700, at least about 750, at least about 800, at least about 850, at least about 900, at least about 950, at least about 1000 proteins, at least about 1050 proteins, at least about 1100 proteins, at least about 1150 proteins, or at least about 1200 distinct proteins from a CSF sample.

Synovial Fluid Sample. The present disclosure provides methods of assaying for proteins in a synovial fluid sample using one or more of the particles disclosed herein (e.g., and one or more of the particles disclosed in TABLE 1). The relatively high concentration of high abundance proteins (e.g., albumin) relative to total protein in SF may confound protein detection using traditional means (e.g., ELISA, immunofluorescence, gel electrophoresis, or chromatography). The methods and compositions disclosed herein may be well suited for detecting low abundance proteins in samples with high concentrations of high abundance proteins. For example, the protein corona analysis assays disclosed herein may be capable of detecting low abundance proteins in samples with at least about 10%, at least about 20%, at least about 30%, at least about 40%, at least about 45%, at least about 50%, at least about 55%, at least about 60%, or at least about 70% by weight of a high abundance protein relative to total protein content. In some embodiments, the protein corona analysis assays disclosed herein may be performed on a sample comprising a relatively high concentration of high abundance proteins without the need for additional fractionation or depletion steps.

Sample collection volumes of SF may be small, ranging from about 2 mL to about 20 mL, limiting the number of assays that may be performed with each sample. The methods and compositions disclosed herein may be well suited for detecting proteins in small sample volumes. For example, the protein corona analysis assays disclosed herein may be capable of detecting proteins in sample volumes of no more than about 1000 µL, no more than about 900 µL, no more than about 800 µL, no more than about 700 µL, no more than about 600 µL, no more than about 500 µL, no more than about 400 µL, no more than about 300 µL, no more than about 200 µL, no more than about 100 µL, no more than about 50 µL, or no more than about 20 µL, no more than about 10 µL, no more than about 5 µL, no more than about 2 µL, or no more than about 1 µL.

A protein corona analysis assay may be used to rapidly identify low abundance proteins in a SF sample. A protein corona analysis may identify low abundance proteins in a SF sample in no more than about 2 hours, no more than about 2.5 hours, no more than about 3 hours, no more than about 3.5 hours, no more than about 4 hours, no more than about 4.5 hours, no more than about 5 hours, no more than about 5.5 hours, no more than about 6 hours, no more than about 6.5 hours, no more than about 7 hours, no more than about 7.5 hours, no more than about 8 hours, no more than about 8.5 hours, no more than about 9 hours, no more than about 9.5 hours, or no more than about 10 hours from first contacting the SF sample with a particle.

In some embodiments, a protein corona analysis may identify at least about 500 low abundance proteins in a SF sample in no more than about 8 hours from first contacting the biological sample with a particle. In some embodiments, a protein corona analysis may identify at least about 1000 low abundance proteins in a SF sample in no more than about 8 hours from first contacting the SF sample with a particle. In some embodiments, a protein corona analysis may identify at least about 500 low abundance proteins in a SF sample in no more than about 4 hours from first contacting the SF sample with a particle. In some embodiments, a protein corona analysis may identify at least about 1000 low abundance proteins in a SF sample in no more than about 4 hours from first contacting the SF sample with a particle.

The methods disclosed herein are superior to other methods of assaying for proteins in synovial fluid and provide sampling of proteins in synovial fluid across a wide dynamic range in a short period of time. In some embodiments, the methods disclosed herein utilize one or more of the particles to rapidly enrich for proteins in a synovial fluid sample. For example, in some embodiments, one or more of the particle types disclosed herein can be used in a method of assaying for a protein of interest (high abundance protein, medium abundance protein, or low abundance protein) in a synovial fluid sample, the method including incubating said one or more particle types in the synovial fluid sample allowing for formation of a biomolecule corona on the particle and enrichment of proteins in the synovial fluid sample, separating the particle from unbound biomolecules in the synovial fluid sample (e.g., by magnetic separation), and trypsinizing and analyzing the biomolecules in the corona for the protein of interest. Further, using said methods allows for efficient enrichment of the protein of interest in the biomolecule coronas formed around the particle type. A protein of interest may be enriched in a biomolecule corona by at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, or at least about 100% relative to the SF sample that has not been contacted to a particle. A protein of interest may be enriched in a biomolecule corona by at least about 1.1-fold, at least about 1.2-fold, at least about 1.3-fold, at least about 1.4-fold, at least about 1.5-fold, at least about 2-fold, at least about 2.5-fold, at least about 3-fold, at least about 3.5-fold, at least about 4-fold, at least about 4.5-fold, at least about 5-fold, at least about 5.5-fold, at least about 6-fold, at least about 6.5-fold, at least about 7-fold, at least about 7.5-fold, at least about 8-fold, at least about 8.5-fold, at least about 9-fold, at least about 9.5-fold, at least about 10-fold, at least about 20-fold, at least about 30-fold, at least about 40-fold, at least about 50-fold, at least about 60-fold, at least about 70-fold, at least about 80-fold, at least about 90-fold, or at least about 100-fold relative to the SF sample that has not been contacted to a particle. In some embodiments, any one or more of the particles disclosed herein (e.g., any one or more of the particle types disclosed in TABLE 1) can result in enrichment of at least about 500, at least about 600, at least about 700, at least about 800, at least about 900, at least about 1000, at least about 1100, at least about 1200, at least about 1300, at least about 1400, at least about 1500, at least about 1600, at least about 1700, at least about 1800, at least about 1900, at least about 2000, at least about 2100, at least about 2200, at least about 2300, at least about 2400, at least about 2500, at least about 2750, at least about 3000, at least about 3250, at least about 3500, at least about 3750, or at least about 4000 from a synovial fluid sample.

Urine Sample. The present disclosure provides methods of assaying for proteins in a urine sample using one or more of the particles disclosed herein (e.g., and one or more of the particles disclosed in TABLE 1). The relatively low abundance of proteins in urine may confound protein detection using traditional means (e.g., ELISA, immunofluorescence, gel electrophoresis, or chromatography). The methods and compositions disclosed herein may be well suited for detecting proteins in samples with low protein concentration. For example, the protein corona analysis assays disclosed herein may be capable of detecting proteins in samples with no more than about 10 mg/mL, no more than about 5.0 mg/mL, no more than about 4.0 mg/mL, no more than about 3.0 mg/mL, no more than about 2.0 mg/mL, no more than about 1.0 mg/mL, no more than about 0.9 mg/mL, no more than about 0.8 mg/mL, no more than about 0.7 mg/mL, no more than about 0.6 mg/mL, no more than about 0.5 mg/mL, no more than about 0.4 mg/mL, no more than about 0.3 mg/mL, no more than about 0.2 mg/mL, no more than about 0.1 mg/mL, no more than about 0.05 mg/mL, or no more than about 0.02 mg/mL total protein concentration.

The relatively high concentration of high abundance proteins (e.g., albumin) relative to total protein in urine may confound protein detection using traditional means. The methods and compositions disclosed herein may be well suited for detecting low abundance proteins in samples with high concentrations of high abundance proteins. For example, the protein corona analysis assays disclosed herein may be capable of detecting low abundance proteins in samples with at least about 10%, at least about 20%, at least about 30%, at least about 40%, at least about 45%, at least about 50%, at least about 55%, at least about 60%, at least about 70%, at least about 80%, at least about 90%, or at least about 95% by weight of a high abundance protein relative to total protein content. In some embodiments, the protein corona analysis assays disclosed herein may be performed on a sample comprising a relatively high concentration of high abundance proteins without the need for additional fractionation or depletion steps.

A protein corona analysis assay may be used to rapidly identify low abundance proteins in a urine sample. A protein corona analysis may identify low abundance proteins in a urine sample in no more than about 2 hours, no more than about 2.5 hours, no more than about 3 hours, no more than about 3.5 hours, no more than about 4 hours, no more than about 4.5 hours, no more than about 5 hours, no more than about 5.5 hours, no more than about 6 hours, no more than about 6.5 hours, no more than about 7 hours, no more than about 7.5 hours, no more than about 8 hours, no more than about 8.5 hours, no more than about 9 hours, no more than about 9.5 hours, or no more than about 10 hours from first contacting the urine sample with a particle.

In some embodiments, a protein corona analysis may identify at least about 500 low abundance proteins in a urine sample in no more than about 8 hours from first contacting the biological sample with a particle. In some embodiments, a protein corona analysis may identify at least about 1000 low abundance proteins in a urine sample in no more than about 8 hours from first contacting the urine sample with a particle. In some embodiments, a protein corona analysis may identify at least about 500 low abundance proteins in a urine sample in no more than about 4 hours from first contacting the urine sample with a particle. In some embodiments, a protein corona analysis may identify at least about 1000 low abundance proteins in a urine sample in no more than about 4 hours from first contacting the urine sample with a particle.

The methods disclosed herein are superior to other methods of assaying for proteins in urine and provide sampling of proteins in urine across a wide dynamic range in a short period of time. In some embodiments, the methods disclosed herein utilize one or more of the particles to rapidly enrich for proteins in a urine sample. For example, in some embodiments, one or more of the particle types disclosed herein can be used in a method of assaying for a protein of interest (high abundance protein, medium abundance protein, or low abundance protein) in a urine sample, the method including incubating said one or more particle types in the urine sample allowing for formation of a biomolecule corona on the particle and enrichment of proteins in the urine sample, separating the particle from unbound biomolecules in the urine sample (e.g., by magnetic separation), and trypsinizing and analyzing the biomolecules in the corona for the protein of interest. Further, using said methods allows for efficient enrichment of the protein of interest in the biomolecule coronas formed around the particle type. A protein of interest may be enriched in a biomolecule corona by at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, or at least about 100% relative to the urine sample that has not been contacted to a particle. A protein of interest may be enriched in a biomolecule corona by at least about 1.1-fold, at least about 1.2-fold, at least about 1.3-fold, at least about 1.4-fold, at least about 1.5-fold, at least about 2-fold, at least about 2.5-fold, at least about 3-fold, at least about 3.5-fold, at least about 4-fold, at least about 4.5-fold, at least about 5-fold, at least about 5.5-fold, at least about 6-fold, at least about 6.5-fold, at least about 7-fold, at least about 7.5-fold, at least about 8-fold, at least about 8.5-fold, at least about 9-fold, at least about 9.5-fold, at least about 10-fold, at least about 20-fold, at least about 30-fold, at least about 40-fold, at least about 50-fold, at least about 60-fold, at least about 70-fold, at least about 80-fold, at least about 90-fold, or at least about 100-fold relative to the urine sample that has not been contacted to a particle. In some embodiments, any one or more of the particles disclosed herein (e.g., any one or more of the particle types disclosed in TABLE 1) can result in enrichment of at least about 291, at least about 294, at least about 300, at least about 350, at least about 400, at least about 450, at least about 470, at least about 500, at least about 550, at least about 600, at least about 618, at least about 650, at least about 700, at least about 709, at least about 718, at least about 750, at least about 800, at least about 838, at least about 840, at least about 847, at least about 850, at least about 900, at least about 950, at least about 984, at least about 1000, at least about 1050, at least about 1100, at least about 1150, or at least about 1200 from a urine sample.

Fluidized Solid Sample. The present disclosure provides methods of assaying for proteins in a fluidized solid sample using one or more of the particles disclosed herein (e.g., and one or more of the particles disclosed in TABLE 1). A fluidized solid (e.g., a tissue homogenate) may comprise inhomogeneities, which may confound protein detection using traditional means (e.g., ELISA, immunofluorescence, gel electrophoresis, or chromatography). The methods and compositions disclosed herein may be well suited for detecting proteins in heterogeneous samples. For example, the protein corona analysis assays disclosed herein may be performed on a fluidized solid without the need for additional purification, fractionation, or depletion steps.

The methods disclosed herein are superior to other methods of assaying for proteins in fluidized solid and provide sampling of proteins in fluidized solid across a wide dynamic range in a short period of time. In some embodiments, the methods disclosed herein utilize one or more of the particles to rapidly enrich for proteins in a fluidized solid sample. For example, in some embodiments, one or more of the particle types disclosed herein can be used in a method of assaying for a protein of interest (high abundance protein, medium abundance protein, or low abundance protein) in a fluidized solid sample, the method including incubating said one or more particle types in the fluidized solid sample allowing for formation of a biomolecule corona on the particle and enrichment of proteins in the fluidized solid sample, separating the particle from unbound biomolecules in the fluidized solid sample (e.g., by magnetic separation), and trypsinizing and analyzing the biomolecules in the corona for the protein of interest. Further, using said methods allows for efficient enrichment of the protein of interest in the biomolecule coronas formed around the particle type. A protein of interest may be enriched in a biomolecule corona by at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, or at least about 100% relative to the fluidized solid sample that has not been contacted to a particle. A protein of interest may be enriched in a biomolecule corona by at least about 1.1-fold, at least about 1.2-fold, at least about 1.3-fold, at least about 1.4-fold, at least about 1.5-fold, at least about 2-fold, at least about 2.5-fold, at least about 3-fold, at least about 3.5-fold, at least about 4-fold, at least about 4.5-fold, at least about 5-fold, at least about 5.5-fold, at least about 6-fold, at least about 6.5-fold, at least about 7-fold, at least about 7.5-fold, at least about 8-fold, at least about 8.5-fold, at least about 9-fold, at least about 9.5-fold, at least about 10-fold, at least about 20-fold, at least about 30-fold, at least about 40-fold, at least about 50-fold, at least about 60-fold, at least about 70-fold, at least about 80-fold, at least about 90-fold, or at least about 100-fold relative to the fluidized solid sample that has not been contacted to a particle. In some embodiments, any one or more of the particles disclosed herein (e.g., any one or more of the particle types disclosed in TABLE 1) can result in enrichment of at least about 291, at least about 294, at least about 300, at least about 350, at least about 400, at least about 450, at least about 470, at least about 500, at least about 550, at least about 600, at least about 618, at least about 650, at least about 700, at least about 709, at least about 718, at least about 750, at least about 800, at least about 838, at least about 840, at least about 847, at least about 850, at least about 900, at least about 950, at least about 984, at least about 1000, at least about 1100, at least about 1200, at least about 1300, at least about 1400, at least about 1500, at least about 1600, at least about 1700, at least about 1800, at least about 1900, at least about 2000, at least about 2100, at least about 2200, at least about 2300, at least about 2400, at least about 2500, at least about 2750, at least about 3000, at least about 3250, at least about 3500, at least about 3750, or at least about 4000 from a fluidized solid sample.

A protein corona analysis assay may be used to rapidly identify low abundance proteins in a fluidized solid sample. A protein corona analysis may identify low abundance proteins in a fluidized solid sample in no more than about 2 hours, no more than about 2.5 hours, no more than about 3 hours, no more than about 3.5 hours, no more than about 4 hours, no more than about 4.5 hours, no more than about 5 hours, no more than about 5.5 hours, no more than about 6 hours, no more than about 6.5 hours, no more than about 7 hours, no more than about 7.5 hours, no more than about 8 hours, no more than about 8.5 hours, no more than about 9 hours, no more than about 9.5 hours, or no more than about 10 hours from first contacting the fluidized solid sample with a particle.

In some embodiments, a protein corona analysis may identify at least about 500 low abundance proteins in a fluidized solid sample in no more than about 8 hours from first contacting the biological sample with a particle. In some embodiments, a protein corona analysis may identify at least about 1000 low abundance proteins in a fluidized solid sample in no more than about 8 hours from first contacting the fluidized solid sample with a particle. In some embodiments, a protein corona analysis may identify at least about 500 low abundance proteins in a fluidized solid sample in no more than about 4 hours from first contacting the fluidized solid sample with a particle. In some embodiments, a protein corona analysis may identify at least about 1000 low abundance proteins in a fluidized solid sample in no more than about 4 hours from first contacting the fluidized solid sample with a particle.

Cell Culture Sample. The present disclosure provides methods of assaying for proteins in a cell culture sample (a cellular sample, a cell permeated sample, or an extracellular sample) using one or more of the particles disclosed herein (e.g., and one or more of the particles disclosed in TABLE 1). A cell culture sample may comprise inhomogeneities, which may confound protein detection using traditional means (e.g., ELISA, immunofluorescence, gel electrophoresis, or chromatography). The methods and compositions disclosed herein may be well suited for detecting proteins in heterogeneous samples. For example, the protein corona analysis assays disclosed herein may be performed on a cell culture sample without the need for additional purification, fractionation, or depletion steps.

The methods disclosed herein are superior to other methods of assaying for proteins in a cell culture sample (a cellular sample, a cell permeated sample, or an extracellular sample) and provide sampling of proteins in a cell culture sample (a cellular sample, a cell permeated sample, or an extracellular sample) across a wide dynamic range in a short period of time. In some embodiments, the methods disclosed herein utilize one or more of the particles to rapidly enrich for proteins in a cell culture sample (a cellular sample, a cell permeated sample, or an extracellular sample). For example, in some embodiments, one or more of the particle types disclosed herein can be used in a method of assaying for a protein of interest (high abundance protein, medium abundance protein, or low abundance protein) in a cell culture sample (a cellular sample, a cell permeated sample, or an extracellular sample), the method including incubating said one or more particle types in the cell culture sample (a cellular sample, a cell permeated sample, or an extracellular sample) allowing for formation of a biomolecule corona on the particle and enrichment of proteins in the cell culture sample (a cellular sample, a cell permeated sample, or an extracellular sample), separating the particle from unbound biomolecules in the a cell culture sample (a cellular sample, a cell permeated sample, or an extracellular sample) (e.g., by magnetic separation), and trypsinizing and analyzing the biomolecules in the corona for the protein of interest. Further, using said methods allows for efficient enrichment of the protein of interest in the biomolecule coronas formed around the particle type. A protein of interest may be enriched in a biomolecule corona by at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, or at least about 100% relative to the cell culture sample that has not been contacted to a particle. A protein of interest may be enriched in a biomolecule corona by at least about 1.1-fold, at least about 1.2-fold, at least about 1.3-fold, at least about 1.4-fold, at least about 1.5-fold, at least about 2-fold, at least about 2.5-fold, at least about 3-fold, at least about 3.5-fold, at least about 4-fold, at least about 4.5-fold, at least about 5-fold, at least about 5.5-fold, at least about 6-fold, at least about 6.5-fold, at least about 7-fold, at least about 7.5-fold, at least about 8-fold, at least about 8.5-fold, at least about 9-fold, at least about 9.5-fold, at least about 10-fold, at least about 20-fold, at least about 30-fold, at least about 40-fold, at least about 50-fold, at least about 60-fold, at least about 70-fold, at least about 80-fold, at least about 90-fold, or at least about 100-fold relative to the cell culture sample that has not been contacted to a particle. In some embodiments, any one or more of the particles disclosed herein (e.g., any one or more of the particle types disclosed in TABLE 1) can result in capturing at least about 100, at least about 200, at least about 300, at least about 350, at least about 400, at least about 450, at least about 470, at least about 500, at least about 550, at least about 600, at least about 618, at least about 650, at least about 700, at least about 709, at least about 718, at least about 750, at least about 800, at least about 838, at least about 840, at least about 847, at least about 850, at least about 900, at least about 950, at least about 984, at least about 1000, at least about 1100, at least about 1200, at least about 1300, at least about 1400, at least about 1500, at least about 1600, at least about 1700, at least about 1800, at least about 1900, at least about 2000, at least about 2100, at least about 2200, at least about 2300, at least about 2400, at least about 2500, at least about 2750, at least about 3000, at least about 3250, at least about 3500, at least about 3750, or at least about 4000 proteins from a cell culture sample (a cellular sample, a cell permeated sample, or an extracellular sample) in the corona that forms on the surface of the particle type upon incubation with the cell culture sample.

A protein corona analysis assay may be used to rapidly identify low abundance proteins in a cell culture sample. A protein corona analysis may identify low abundance proteins in a cell culture sample in no more than about 2 hours, no more than about 2.5 hours, no more than about 3 hours, no more than about 3.5 hours, no more than about 4 hours, no more than about 4.5 hours, no more than about 5 hours, no more than about 5.5 hours, no more than about 6 hours, no more than about 6.5 hours, no more than about 7 hours, no more than about 7.5 hours, no more than about 8 hours, no more than about 8.5 hours, no more than about 9 hours, no more than about 9.5 hours, or no more than about 10 hours from first contacting the cell culture sample with a particle.

In some embodiments, a protein corona analysis may identify at least about 500 low abundance proteins in a cell culture sample in no more than about 8 hours from first contacting the biological sample with a particle. In some embodiments, a protein corona analysis may identify at least about 1000 low abundance proteins in a cell culture sample in no more than about 8 hours from first contacting the cell culture sample with a particle. In some embodiments, a protein corona analysis may identify at least about 500 low abundance proteins in a cell culture sample in no more than about 4 hours from first contacting the cell culture sample with a particle. In some embodiments, a protein corona analysis may identify at least about 1000 low abundance proteins in a cell culture sample in no more than about 4 hours from first contacting the cell culture sample with a particle.

The biological samples of this disclosure may be collected may many different techniques. A tissue sample may be collected through a biopsy, dissection, fine needle aspiration, or surgical excision. A tissue sample may be fluidized, for example by homogenization or centrifugation. A fluid sample (e.g., blood, serum, plasma, urine, or semen) may be collected in a sample collection tube. Commercially available collection tubes may be used for the collection of a fluid sample. For example, commercially available collection tubes that may be used to collect a sample of this disclosure include EDTA collection tubes, collection tubes comprising a nucleic acid stabilizing agent (e.g., Streck tubes), serum-separating tubes (SST), sodium citrate collection tubes, citrate, theophylline, adenosine and dipyridamole (CTAD) collection tubes, lithium/sodium heparin collection tubes, sodium fluoride collection tubes, acid citrate dextrose (ACD) collection tubes, or sodium polyanethol sulfonate (SPS) collection tubes.

In some embodiments, a biofluid may be collected in a sample collection tube comprising stabilizing reagents (e.g., preservatives, protease inhibitors, phosphatase inhibitors, or crosslinkers). The stabilizing reagents may stabilize the biofluid to be stored unfrozen. The biofluid may be stored at an ambient temperature, at a room temperature, or at any temperature from 0° C. to 37° C. For example, the biofluid collected in the sample collection tube comprising a stabilizing reagent may be stored unfrozen (e.g., at a temperature of from 0° C. to 37° C.) for up to 1, up to 2, up to 3, up to 4, up to 5, up to 6, up to 7, up to 8, up to 9, up to 10, up to 11, up to 12, up to 13, or up to 14 days. Following storage at room temperature, the biofluid may be analyzed (e.g., via corona analysis) or frozen for later use. For example, a biofluid sample may be collected in a collection tube comprising a nucleic acid stabilizing agent (e.g., a Streck tube) and stored at room temperature overnight, or the biofluid sample may be collected in the blood collection tube comprising a nucleic acid stabilizing agent and shipped without ice or dry ice. The unfrozen biofluid may be processed at separate facility from where the sample was collected.

The biofluids collected in collection tubes and stored unfrozen may be suitable for analysis by protein corona analysis. Following storage at a temperature from 0° C. to 37° C., at least 100, at least 200, at least 300, at least 400, at least 500, at least 600, at least 700, at least 800, at least 900, at least 1000, at least 1100, at least 1200, at least 1300, at least 1400, or at least 1500 proteins may be detected in the biofluid using corona analysis. In some embodiments, following storage at a temperature from 0° C. to 37° C., at least 1000, at least 1100, at least 1200, at least 1300, at least 1400, at least 1500, at least 1600, at least 1700, at least 1800, at least 1900, at least 2000, at least 2500, at least 3000, at least 3500, at least 4000, at least 4500, or at least 5000 peptides may be detected in the biofluid using corona analysis. In some embodiments, following storage at a temperature from 0° C. to 37° C., at least 5000, at least 6000, at least 7000, at least 7100, at least 7200, at least 7300, at least 7400, at least 7500, at least 7600, at least 7700, at least 7800, at least 7900, at least 8000, at least 8500, or at least 9000 protein features may be detected in the biofluid using corona analysis. A frozen biofluid may be shipped on ice, on dry ice, or with liquid nitrogen. The frozen biofluid may be thawed and processed at separate facility from where the sample was collected. For example, a biofluid may be collected in a tube comprising a nucleic acid stabilizing agent (e.g., a Streck tube) at a medical facility and shipped under ambient conditions to a research facility for corona analysis.

In some embodiments, a biofluid may be collected in a sample collection tube and frozen. A biofluid may be frozen within about 10 minutes, about 20 minutes, about 30 minutes, about 40 minutes, about 50 minutes, about 60 minutes, about 1 hour, about 2 hours, about 3 hours, about 4 hours, about 5 hours, or about 6 hours. Biofluids that have been collected in sample collection tubes and frozen may be suitable for analysis by protein corona analysis. Following frozen storage (e.g., storage at a temperature below 0° C.), at least 100, at least 200, at least 300, at least 400, at least 500, at least 600, at least 700, at least 800, at least 900, at least 1000, at least 1100, at least 1200, at least 1300, at least 1400, or at least 1500 proteins may be detected in the biofluid using corona analysis. In some embodiments, following storage at a temperature below 0° C., at least 1000, at least 1100, at least 1200, at least 1300, at least 1400, at least 1500, at least 1600, at least 1700, at least 1800, at least 1900, at least 2000, at least 2500, at least 3000, at least 3500, at least 4000, at least 4500, or at least 5000 peptides may be detected in the biofluid using corona analysis. In some embodiments, following storage at a temperature below 0° C., at least 5000, at least 6000, at least 7000, at least 7100, at least 7200, at least 7300, at least 7400, at least 7500, at least 7600, at least 7700, at least 7800, at least 7900, at least 8000, at least 8500, or at least 9000 protein features may be detected in the biofluid using corona analysis.

In some embodiments, the methods disclosed herein provide for collection of a biofluid in a Streck blood collection tube, incubation with particles to form coronas, and subsequent analysis of the proteins in the coronas at a later time point (e.g., up to 14 days after incubation of said sample in the Streck blood collection tube at room temperature).

Protein Corona Analysis in Biological Samples

The particles and methods of use thereof disclosed herein can bind a large number of unique proteins in a biological sample (e.g., a biofluid). Non-limiting examples of biological samples that may be analyzed using the protein corona analysis methods described herein include biofluid samples (e.g., cerebral spinal fluid (CSF), synovial fluid (SF), urine, plasma, serum, tears, semen, whole blood, milk, nipple aspirate, ductal lavage, vaginal fluid, nasal fluid, ear fluid, gastric fluid, pancreatic fluid, trabecular fluid, lung lavage, prostatic fluid, sputum, fecal matter, bronchial lavage, fluid from swabbings, bronchial aspirants, sweat or saliva), fluidized solids (e.g., a tissue homogenate), or samples derived from cell culture. For example, a particle disclosed herein can be incubated with any biological sample disclosed herein to form a protein corona comprising at least 100 unique proteins, at least 120 unique proteins, at least 140 unique proteins, at least 160 unique proteins, at least 180 unique proteins, at least 200 unique proteins, at least 220 unique proteins, at least 240 unique proteins, at least 260 unique proteins, at least 280 unique proteins, at least 300 unique proteins, at least 320 unique proteins, at least 340 unique proteins, at least 360 unique proteins, at least 380 unique proteins, at least 400 unique proteins, at least 420 unique proteins, at least 440 unique proteins, at least 460 unique proteins, at least 480 unique proteins, at least 500 unique proteins, at least 520 unique proteins, at least 540 unique proteins, at least 560 unique proteins, at least 580 unique proteins, at least 600 unique proteins, at least 620 unique proteins, at least 640 unique proteins, at least 660 unique proteins, at least 680 unique proteins, at least 700 unique proteins, at least 720 unique proteins, at least 740 unique proteins, at least 760 unique proteins, at least 780 unique proteins, at least 800 unique proteins, at least 820 unique proteins, at least 840 unique proteins, at least 860 unique proteins, at least 880 unique proteins, at least 900 unique proteins, at least 920 unique proteins, at least 940 unique proteins, at least 960 unique proteins, at least 980 unique proteins, at least 1000 unique proteins, from 100 to 1000 unique proteins, from 150 to 950 unique proteins, from 200 to 900 unique proteins, from 250 to 850 unique proteins, from 300 to 800 unique proteins, from 350 to 750 unique proteins, from 400 to 700 unique proteins, from 450 to 650 unique proteins, from 500 to 600 unique proteins, from 200 to 250 unique proteins, from 250 to 300 unique proteins, from 300 to 350 unique proteins, from 350 to 400 unique proteins, from 400 to 450 unique proteins, from 450 to 500 unique proteins, from 500 to 550 unique proteins, from 550 to 600 unique proteins, from 600 to 650 unique proteins, from 650 to 700 unique proteins, from 700 to 750 unique proteins, from 750 to 800 unique proteins, from 800 to 850 unique proteins, from 850 to 900 unique proteins, from 900 to 950 unique proteins, from 950 to 1000 unique proteins. In some embodiments, several different types of particles can be used, separately or in combination, to identify large numbers of proteins in a particular biological sample. In other words, particles can be multiplexed in order to bind and identify large numbers of proteins in a biological sample. Protein corona analysis of the biomolecule corona may compress the dynamic range of the analysis compared to a total protein analysis method.

The compositions and methods disclosed herein can be used to identify various biological states in a particular biological sample. For example, a biological state can refer to an elevated or low level of a particular protein or a set of proteins. In other examples, a biological state can refer to identification of a disease, such as cancer. One or more particle types can be incubated with CSF, allowing for formation of a protein corona. Said protein corona can then be analyzed by gel electrophoresis or mass spectrometry in order to identify a pattern of proteins. Analysis of protein corona (e.g., by mass spectrometry or gel electrophoresis) may be referred to as corona analysis. The pattern of proteins can be compared to the same methods carried out on a control sample. Upon comparison of the patterns of proteins, it may be identified that the first CSF sample comprises an elevated level of markers corresponding to a particular type of brain cancer. The particles and methods of use thereof, can thus be used to diagnose a particular disease state.

Corona Analysis by Serial Interrogation

Provided herein are several methods for compressing the dynamic range of a proteomic analysis assay to facilitate the detection of low abundance proteins relative to high abundance proteins. As used herein, the phrase "dynamic range" is the ratio of the highest concentration of a molecule in a sample to the lowest concentration of a molecule in a sample. The dynamic range may be quantified by a number of methods consistent with evaluating the ratio of the highest concentration of a molecule in a sample to the lowest concentration of a molecule in a sample. For example, the dynamic range may be quantified as a ratio of the top decile of proteins in a sample to the bottom decile of proteins in the sample. The dynamic range may be quantified by a ratio of the concentration of the highest concentration detectable in a sample to the lowest concentration detectable in the sample. The dynamic range may be quantified as a span of the interquartile range (a ratio of the $75^{th}$ percentile and $25^{th}$ percentile) of proteins in a sample. The dynamic range may be quantified by measuring the slope of fitted data in a plot of all concentrations of proteins detected in a sample (e.g., using a method disclosed herein such as serial interrogation with a particle) against published concentrations of said proteins (e.g., using the Carr database of plasma proteins). The dynamic range may be quantified by measuring the slope between any two points in a plot of protein concentration detected in a sample (e.g., using a method disclosed herein such as serial interrogation with a particle) against published concentrations of said protein (e.g., using the Carr database of plasma proteins). Thus, the dynamic range captures the range of concentrations, or orders of magnitude, at which a molecule is detectable in the sample. For example, "dynamic range" may refer to the ratio of the highest detectable concentration of a protein in a sample to the lowest detectable concentration of another protein in the sample. Thus, in this example, the dynamic range captures the range of concentrations, or orders of magnitude, at which proteins are detectable in the sample. As used herein, the phrase "compressing the dynamic range" or "compression of the dynamic range" refers to a decrease in the ratio of the highest concentration of a molecule in a sample to the lowest concentration of a molecule in a sample. Thus, the dynamic range is compressed when the range of concentrations, or orders of magnitude, at which a molecule is detectable in a sample is decreased. For example, a particle type of the present disclosure can be used to serially interrogate a sample. Upon incubation of the particle type in the sample, a biomolecule corona comprising forms on the surface of the particle type. If proteins are directly detected in the sample without the use of said particle types, for example by direct mass spectrometric analysis of the sample, the dynamic range may span a wider range of concentrations, or more orders of magnitude, than if the proteins are directed on the surface of the particle type. Thus, using the particle types disclosed herein compresses the dynamic range of proteins in a sample. Without being limited by theory, this effect may be observed due to more capture of higher affinity, lower abundance proteins in the biomolecule corona of the particle type and less capture of lower affinity, higher abundance proteins in the biomolecule corona of the particle type. A dynamic range of a proteomic analysis assay may be the slope of a plot of a protein signal measured by the proteomic analysis assay as a function of total abundance of the protein in the sample. Compressing the dynamic range may comprise decreasing the slope of the plot of a protein signal measured by a proteomic analysis assay as a function of total abundance of the protein in the sample relative to the slope of the plot of a protein signal measured by a second proteomic analysis assay as a function of total abundance of the protein in the sample. The protein corona analysis assays disclosed herein may compress the dynamic range relative to the dynamic range of a total protein analysis method (e.g., mass spectrometry, gel electrophoresis, or liquid chromatography).

In some embodiments, the dynamic range of a proteomic analysis assay may be the ratio of the signal produced by highest abundance proteins (e.g., the highest 10% of proteins by abundance) to the signal produced by the lowest abundance proteins (e.g., the lowest 10% of proteins by abundance). Compressing the dynamic range of a proteomic analysis may comprise decreasing the ratio of the signal produced by the highest abundance proteins to the signal produced by the lowest abundance proteins for a first proteomic analysis assay relative to that of a second proteomic analysis assay. The protein corona analysis assays disclosed herein may compress the dynamic range relative to the dynamic range of a total protein analysis method (e.g., mass spectrometry, gel electrophoresis, or liquid chromatography).

Compressing the dynamic range of a proteomic analysis may be achieved by serial interrogation. A method for compressing the dynamic range of a proteomic analysis may comprise serially interrogating a sample (e.g., a biological sample) with particles and performing a protein corona analysis of the proteomic data captured by the particles. In some embodiments, a method for compressing the dynamic range of a proteomic analysis may comprise depleting high abundance proteins from a sample or enriching low abundance proteins in a sample, serially interrogating the sample with a single particle type multiple times or various particle types, and performing a protein corona analysis of the particles. In some embodiments, a method for compressing the dynamic range of a proteomic analysis may comprise fractioning a sample and interrogating a fraction that is enriched for low abundance proteins or depleted of high abundance proteins using the methods of serially interrogating the sample with various particle types, as disclosed herein. In some embodiments, serial interrogation of a sample may be performed before, after, or in lieu of sample fractionation or sample depletion.

The serial interrogation methods disclosed herein may increase the detection of low abundance proteins by protein corona analysis. For example, a serial interrogation method may comprise depleting a sample of high abundance proteins that impact the ability to assay for low abundance proteins. The serial interrogation methods disclosed herein may increase the detection of low abundance proteins by protein corona analysis, because the compressed dynamic range of proteins captured in the protein corona allows for locally concentrating a low abundance protein on the particle surface instead of sampling for said low abundance protein directly in the sample where confounding high abundance proteins are present. In another example, a serial interrogation method may comprise enriching low abundance proteins in biomolecule corona formed on particles. The methods disclosed herein for serially interrogating a sample with various sample types may be preceded by depletion or fractionation. These methods of depletion can include depletion using a depletion kit. These methods of depletion can also include depletion with a novel particle disclosed herein (e.g., any one of the particles in TABLE 1).

A corona analysis after serially interrogating a sample with various particle types may be performed on a biological sample that has been depleted prior to corona analysis. A corona analysis after serially interrogating a sample with various particle types may be performed on individual fractions of fractionated biological sample. A corona analysis after serially interrogating a sample with various particle types may be performed on one or more of the particle types separated from a serially interrogated sample. Fractionation may be used to deplete a sample, and serial interrogation of the sample with various particle types and corona analysis may be performed on the sample that has been fractioned. Fractionation or depletion of a biological sample prior to corona analysis may increase the sensitivity, accuracy, or specificity of the corona analysis. In some embodiments, serial interrogation, fractionation, or depletion of a biological sample prior to corona analysis may enable detection of one or more biological molecules that could not be detected in a sample that is directly assayed for total protein content (e.g., by a gel analysis or mass spectrometry). Serial interrogation of a sample with various particle types and corona analysis of an individual fraction of a fractioned sample may enable detection of a desired subset of biological molecules. A sample may be depleted then serially interrogated with various particle types, which are then analyzed by protein corona analysis. In another example, a sample may be fractioned, and one or more fractions may be serially interrogated with various particle types, which are then analyzed by protein corona analysis.

Serial Interrogation. A sample (e.g., a biological sample) may be serially interrogated with one or more particle types of the present disclosure. A particle type may be separated from the sample, and a protein corona analysis may be performed. Serial interrogation may comprise contacting a sample with a particle type to forming protein corona on the particle, separating the particle type, and repeating the contacting and the separating one or more times on the same sample with the same particle type, a different particle type, or a combination thereof. A protein corona analysis may be performed on one or more of the separated particle types. Serial interrogation of a sample may be well suited for small sample sizes. For example, a protein corona analysis using a panel of particle types (e.g., a panel of 1, 2, 3, 4, 5, 6, 7, 8, 9, 10, or more particle types) may be performed using a sample volume as low as about of no more than about 1000 µL, no more than about 900 µL, no more than about 800 µL, no more than about 700 µL, no more than about 600 µL, no more than about 500 µL, no more than about 400 µL, no more than about 300 µL, no more than about 200 µL, no more than about 100 µL, no more than about 50 µL, or no more than about 20 µL, no more than about 10 µL, no more than about 5 µL, no more than about 2 µL, or no more than about 1 µL. This may provide an advantage over other protein corona analysis methods that involve dividing a sample prior to contacting with one or more particle types. Serial interrogation of a sample may increase the number of proteins that can be identified by protein corona analysis as compared to interrogation of the sample with a single particle type.

A biomolecule composition of a sample may not change substantially during serial interrogation. For example, the biomolecule composition of a sample prior to contacting the sample with first particle type may be substantially the same as the biomolecule composition of the sample following separation of the first particle type from the sample. In some embodiments, the biomolecule composition of a sample prior to contacting the sample with first particle type may be substantially the same as the biomolecule composition of the sample following separation of the second particle type, the third particle type, the fourth particle type, the fifth particle type, or more particle types, from the sample. The biomolecule composition of the sample may be substantially the same if the total biomolecule mass changes by no more than about 1% by mass, no more than about 2% by mass, no more than about 3% by mass, no more than about 4% by mass, no more than about 5% by mass, no more than about 6% by mass, no more than about 7% by mass, no more than about 8% by mass, no more than about 9% by mass, no more than about 10% by mass, no more than about 11% by mass, no more than about 12% by mass, no more than about 13% by mass, no more than about 14% by mass, or no more than about 15% by mass. In some embodiments, the total biomolecule mass of the sample may change by less than about 1% by mass. The biomolecule composition of the sample may be substantially the same if a mass of a subset of biomolecules changes by no more than about 1% by mass, no more than about 2% by mass, no more than about 3% by mass, no more than about 4% by mass, no more than about 5% by mass, no more than about 6% by mass, no more than about 7% by mass, no more than about 8% by mass, no more than about 9% by mass, no more than about 10% by mass, no more than about 11% by mass, no more than about 12% by mass, no more than about 13% by mass, no more than about 14% by mass, or no more than about 15% by mass. In some embodiments, the subset of biomolecules may comprise a medium abundance protein. In some embodiments, the subset of biomolecules may comprise a low abundance protein.

In some embodiments, serial interrogation may be performed by contacting the sample with a first particle type, allowing biological molecules to bind to the first particle type, and separating the first particle type along with the bound biological molecules from the biofluid. For example, the particles may be separated from the biofluid using centrifugation or magnetic separation. The biofluid may be further interrogated by contacting the fluid with a second particle type, allowing biological molecules to bind to the second particle type, and separating the second particle type along with the bound biological molecules from the biofluid. In some embodiments, serial interrogation may be performed by sequentially contacting a biological sample with the same or different particle types, allowing biological molecules to bind to the particle type, and separating each particle type and the bound biological molecules before adding the next particle type. Each separated particle type and bound biological molecules may constitute a fraction. In some embodiments, serial interrogation may be performed with at least 1, at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, or at least 20 particle types.

In some embodiments, serial interrogation with a particle type may be repeated using the sample particle type. In some embodiments, corona analysis may be performed on a fraction of the serially interrogated biological sample. In some embodiments, corona analysis may be performed on a remaining supernatant of the biological sample following serial interrogation.

Depletion. Provided herein are methods of depleting a sample of highly abundant proteins and compositions for doing so. These methods of depleting a sample of high abundance proteins can be carried out prior to the methods described herein of serially interrogating a sample with various particle types, which are then analyzed using the protein corona analysis methods disclosed herein. In some embodiments, one or more nanoparticles can be used to deplete a biological sample of highly abundant proteins. Depletion of a sample with particles may include round-by-round depletion of the sample, wherein within each round, a different type of particle (e.g., a particle with a unique material composition) may be used for the depletion. In other cases, plasma depletion kits, columns, chromatography, or other systems may be used to deplete a biological sample of highly abundant proteins. Depletion followed by serial interrogation of the sample with various particle types and protein corona analysis may increase the number of proteins that can be identified as compared to carrying out the same method in an undepleted sample. However, depletion may not be necessary and serial interrogation of the sample with various particle types and protein corona analysis may be used to identify various proteins in a shorter assay time than if the sample was depleted first.

Sample depletion may comprise reducing a level of at least one biological molecule (e.g., a protein) in the biofluid sample. For example, sample depletion may comprise reducing a level of a highly abundant protein in the sample. The highly abundant protein may be albumin, IgG, or a ribosomal protein. In some embodiments, sample depletion may be performed by contacting the biofluid with a first particle type, allowing biological molecules to bind to the first particle type, and separating the first particle type along with the bound biological molecules from the biofluid. For example, the particles may be separated from the biofluid using centrifugation or magnetic separation. The biofluid may be further depleted by contacting the fluid with a second particle type, allowing biological molecules to bind to the second particle type, and separating the second particle type along with the bound biological molecules from the biofluid. Depletion may be performed on a biofluid by contacting the biofluid with different particle types and separating each particle type before contacting the biofluid with the next particle type, in a round-by-round manner. In some embodiments, depletion may be performed with at least 1, at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, or at least 20 particle types. In some embodiments, sample depletion may be performed using chromatography or electrophoresis.

In some embodiments, sample depletion may comprise depleting the sample using a commercially available kit. A kit that may be used to deplete a sample may be a spin column-based depletion kit, an albumin depletion kit, an immunodepletion kit, or an abundant protein depletion kit. Non-limiting examples of kits that may be used for sample depletion include a PureProteome™ Human Albumin/Immunoglobulin depletion kit (EMD Millipore Sigma), a ProteoPrep® Immunoaffinity Albumin & IgG Depletion Kit (Millipore Sigma), a Seppro® Protein Depletion kit (Millipore Sigma), Top 12 Abundant Protein Depletion Spin Columns (Pierce), or a Proteome Purify™ Immunodepletion Kit (R&D Systems). While these kits are listed by way of example, one of skill in the art could envision numerous other kits that may be used for sample depletion.

A kit of the present disclosure may comprise a particle type to serially interrogate a sample. The kit may be pre-packaged in discrete aliquots. In another example, the kit can comprise a plurality of different particle types that can be used to serially interrogate a sample. The plurality of particle types can be pre-packaged where each particle type of the plurality is packaged separately. Alternately, the plurality of particle types can be packaged together to contain combination of particle types in a single package.

Depleting a sample may comprise precipitating a component from a sample. In some embodiments, depleting a sample may comprise precipitating an undesired component (e.g. a high abundance protein). An undesired component may be precipitated, and the supernatant may be further processed (e.g., by protein corona analysis, serial interrogation, fractionation, or depletion). In some embodiments, a precipitated undesired component may be removed from the supernatant by filtration, centrifugation, ultracentrifugation, or gravitational separation. Methods of precipitating an undesired component may comprise cryo-precipitation or chemical precipitation (e.g., Cohn process or ethanol precipitation). In some embodiments, depleting a sample may comprise precipitating a desired component (e.g., a low abundance protein). A desired component may be precipitated, the supernatant may be discarded, and the precipitate may be resuspended for further processing (e.g., serial interrogation with various particle types, which are then assayed by protein corona analysis, fractionation, or depletion). In some embodiments, a precipitated desired component may be separated from the supernatant by filtration, centrifugation, ultracentrifugation, or gravitational separation. Methods of precipitating a desired component may comprise cryo-precipitation or chemical precipitation (e.g., Cohn process or ethanol precipitation). In some embodiments, an untreated sample may comprise an undesired precipitate. An undesired precipitate may be removed from the supernatant by filtration, centrifugation, ultracentrifugation, or gravitational separation.

Depleting a sample may comprise separating and undesired component from a desired component (e.g., separating a high abundance protein from a low abundance protein). In some embodiments, components may be separated based on a biochemical property (e.g., binding affinity, charge, or size). In some embodiments, depletion may be performed using chromatography or gel electrophoresis. In some embodiments, a sample may be separated into two or more fractions based on a biochemical property. A first fraction may comprise a desired component, and a second fraction may comprise an undesired component. Fractions comprising desired components may be further processed (e.g., by serial interrogation with various particle types and corona analysis, further fractionation, or depletion). Fractions comprising undesired components may be discarded. Non-limiting examples of depletion methods may include ion-exchange chromatography, affinity chromatography, size exclusion chromatography, gel electrophoresis, or reverse phase chromatography. While these methods are listed by way of example, one of skill in the art could envision numerous other methods that may be used for sample depletion.

Using the compositions and methods disclosed herein, depletion can result in removal of at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 91%, at least 92%, at least 93%, at least 94%, at least 95%, at least 96%, at least 97%, at least 98%, at least 99%, 100%, from 5% to 20%, from 5% to 100%, from 10% to 95%, from 15% to 90%, from 20% to 85%, from 25% to 80%, from 30% to 75%, from 35% to 70%, from 40% to 65%, from 45% to 60%, from 50% to 55%, from 60% to 70%, from 60% to 80%, or from 50% to 90% of high abundance proteins from a biological sample. In some embodiments, the methods of depletion disclosed herein and the compositions used to deplete a sample can remove all, or 100%, of a highly abundant protein. A corona analysis may be performed on the depleted biological sample.

Fractionation. Provided herein are methods of separating components of a sample (e.g., a biological sample) into fractions. A first fraction may differ from a second fraction in biomolecule composition. For example, a first fraction may be enriched in high abundance proteins, and a second fraction may be enriched in low abundance proteins, relative to the unfractioned sample. A fraction may be further interrogated using the methods and compositions disclosed herein (e.g., serially interrogating the sample followed by protein corona analysis of each particle type used in the serial interrogation). In some embodiments, fractionation may facilitate protein corona analysis by separating high abundance proteins from low abundance proteins, thereby increasing the detection of low abundance proteins. In some embodiments, fractionation may facilitate protein corona analysis by separating a sample into fractions that are well-suited for a particular particle type. For example, a first fraction may be interrogated with a first particle type, and a second fraction may be interrogated with a second particle type. Fractionation followed by protein corona analysis may increase the number of proteins that can be identified as compared to protein corona analysis of an unfractioned sample.

Sample fractionation may comprise separating components of a biological sample. In some embodiments, components may be separated based on a biochemical property (e.g., binding affinity, charge, or size). In some embodiments, fractionation may be performed using chromatography or gel electrophoresis. One or more fractions may be further processed (e.g., by serially interrogating the sample followed by protein corona analysis of each particle type used in the serial interrogation, further fractionation, or depletion). Non-limiting examples of fractionation methods may include ion-exchange chromatography, affinity chromatography, size exclusion chromatography, gel electrophoresis, or reverse phase chromatography. While these methods are listed by way of example, one of skill in the art could envision numerous other methods that may be used for sample fractionation.

Protein Corona Analysis Methods

The methods disclosed herein include isolating one or more particle types from one or more than one sample (e.g., a biological sample or a serially interrogated sample). The particle types can be rapidly isolated or separated from the sample using a magnetic. Moreover, multiple samples that are spatially isolated can be processed in parallel. Thus, the methods disclosed herein provide for isolating or separating a particle type from unbound protein in a sample. A particle type may be separated by a variety of means, including but not limited to magnetic separation, centrifugation, filtration, or gravitational separation. In some embodiments, particle panels may be incubated with a plurality of spatially isolated samples, wherein each spatially isolated sample is in a well in a well plate (e.g., a 96-well plate). In some embodiments, after incubation, the particle types in each of the wells of the well plate can be separated from unbound protein present in the spatially isolated samples by placing the entire plate on a magnet. This simultaneously pulls down the superparamagnetic particles in the particle panel. The supernatant in each sample can be removed to remove the unbound protein. These steps (incubate, pull down) can be repeated to effectively wash the particles, thus removing residual background unbound protein that may be present in a sample. This is one example, but one of skill in the art could envision numerous other scenarios in which superparamagnetic particles are rapidly isolated from one or more than one spatially isolated samples at the same time.

In some embodiments, the methods and compositions of the present disclosure provide identification and measurement of particular proteins in the biological samples by processing of the proteomic data via digestion of coronas formed on the surface of particles. Examples of proteins that can be identified and measured include highly abundant proteins, proteins of medium abundance, and low-abundance proteins. A low abundance protein may be present in a sample at concentrations at or below about 10 ng/mL. A high abundance protein may be present in a sample at concentrations at or above about 10 µg/mL. A protein of moderate abundance may be present in a sample at concentrations between about 10 ng/mL and about 10 µg/mL. Examples of proteins that are highly abundant proteins include albumin, IgG, and the top 14 proteins in abundance that contribute 95% of the mass in plasma. Additionally, any proteins that may be purified using a conventional depletion column may be directly detected in a sample using the particle panels disclosed herein. Examples of proteins may be any protein listed in published databases such as Keshishian et al. (Mol Cell Proteomics. 2015 September; 14(9): 2375-93. doi: 10.1074/mcp.M114.046813. Epub 2015 Feb. 27.), Farr et al. (J Proteome Res. 2014 Jan. 3; 13(1):60-75. doi: 10.1021/pr4010037. Epub 2013 Dec. 6.), or Pernemalm et al. (Expert Rev Proteomics. 2014 August; 11(4):431-48. doi: 10.1586/14789450.2014.901157. Epub 2014 Mar. 24.).

In some embodiments, examples of proteins that can be measured and identified using the methods and compositions disclosed herein include albumin, IgG, lysozyme, CEA, HER-2/neu, bladder tumor antigen, thyroglobulin, alpha-fetoprotein, PSA, CA125, CA19.9, CA 15.3, leptin, prolactin, osteopontin, IGF-II, CD98, fascin, sPigR, 14-3-3 eta, troponin I, B-type natriuretic peptide, BRCA1, c-Myc, IL-6, fibrinogen. EGFR, gastrin, PH, G-CSF, desmin. NSE, FSH, VEGF, P21, PCNA, calcitonin, PR, CA125, LH, somatostatin. S100, insulin. alpha-prolactin, ACTH, Bcl-2, ER alpha, Ki-67, p53, cathepsin D, beta catenin. VWF, CD15, k-ras, caspase 3, EPN, CD10, FAS, BRCA2. CD30L, CD30, CGA, CRP, prothrombin, CD44, APEX, transferrin, GM-CSF, E-cadherin, IL-2, Bax, IFN-gamma, beta-2-MG, TNF alpha, c-erbB-2, trypsin, cyclin D1, MG B, XBP-1, HG-1, YKL-40, S-gamma, NESP-55, netrin-1, geminin, GADD45A, CDK-6, CCL21, BrMS1, 17betaHDI, PDG-FRA, Pcaf, CCL5, MMP3, claudin-4, and claudin-3. In some embodiments, other examples of proteins that can be measured and identified using the particle panels disclosed herein are any proteins or protein groups listed in the open targets database for a particular disease indication of interest (e.g., prostate cancer, lung cancer, or Alzheimer's disease).

The proteomic data of the biological sample can be identified, measured, and quantified using a number of different analytical techniques. For example, proteomic data can be analyzed using SDS-PAGE or any gel-based separation technique. Peptides and proteins can also be identified, measured, and quantified using an immunoassay, such as ELISA. Alternatively, proteomic data can be identified, measured, and quantified using mass spectrometry, high performance liquid chromatography, LC-MS/MS, Edman Degradation, immunoaffinity techniques, methods disclosed in EP3548652, WO2019083856, WO2019133892, each of which is incorporated herein by reference in its entirety, and other protein separation techniques.

Computer Control Systems

Figure 29:
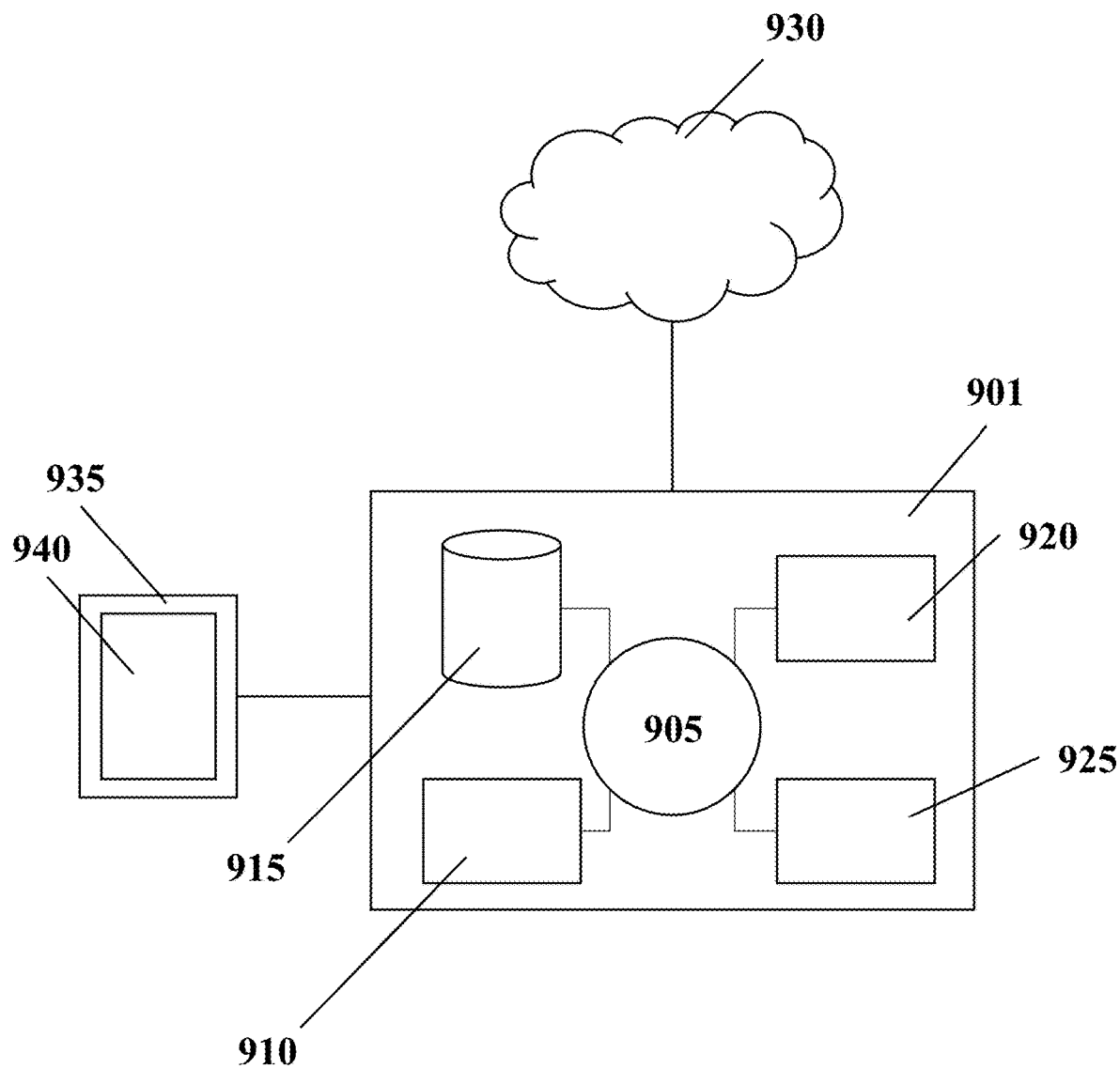
FIG. 29 shows a computer system that is programmed or otherwise configured to implement methods provided herein.

The present disclosure provides computer control systems that are programmed to implement methods of the disclosure. FIG. 29 shows a computer system that is programmed or otherwise configured to implement methods provided herein. The computer system 901 can regulate various aspects of the assays disclosed herein, which are capable of being automated (e.g., movement of any of the reagents disclosed herein on a substrate). The computer system 901 can be an electronic device of a user or a computer system that is remotely located with respect to the electronic device. The electronic device can be a mobile electronic device.

The computer system 901 includes a central processing unit (CPU, also "processor" and "computer processor" herein) 905, which can be a single core or multi core processor, or a plurality of processors for parallel processing. The computer system 901 also includes memory or memory location 910 (e.g., random-access memory, read-only memory, flash memory), electronic storage unit 915 (e.g., hard disk), communication interface 920 (e.g., network adapter) for communicating with one or more other systems, and peripheral devices 925, such as cache, other memory, data storage and/or electronic display adapters. The memory 910, storage unit 915, interface 920 and peripheral devices 925 are in communication with the CPU 905 through a communication bus (solid lines), such as a motherboard. The storage unit 915 can be a data storage unit (or data repository) for storing data. The computer system 901 can be operatively coupled to a computer network ("network") 930 with the aid of the communication interface 920. The network 930 can be the Internet, an internet and/or extranet, or an intranet and/or extranet that is in communication with the Internet. The network 930 in some cases is a telecommunication and/or data network. The network 930 can include one or more computer servers, which can enable distributed computing, such as cloud computing. The network 930, in some cases with the aid of the computer system 901, can implement a peer-to-peer network, which may enable devices coupled to the computer system 901 to behave as a client or a server.

The CPU 905 can execute a sequence of machine-readable instructions, which can be embodied in a program or software. The instructions may be stored in a memory location, such as the memory 910. The instructions can be directed to the CPU 905, which can subsequently program or otherwise configure the CPU 905 to implement methods of the present disclosure. Examples of operations performed by the CPU 905 can include fetch, decode, execute, and writeback.

The CPU 905 can be part of a circuit, such as an integrated circuit. One or more other components of the system 901 can be included in the circuit. In some cases, the circuit is an application specific integrated circuit (ASIC).

The storage unit 915 can store files, such as drivers, libraries and saved programs. The storage unit 915 can store user data, e.g., user preferences and user programs. The computer system 901 in some cases can include one or more additional data storage units that are external to the computer system 901, such as located on a remote server that is in communication with the computer system 901 through an intranet or the Internet.

The computer system 901 can communicate with one or more remote computer systems through the network 930. For instance, the computer system 901 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 901 via the network 930.

Methods as described herein can be implemented by way of machine (e.g., computer processor) executable code stored on an electronic storage location of the computer system 901, such as, for example, on the memory 910 or electronic storage unit 915. The machine executable or machine readable code can be provided in the form of software. During use, the code can be executed by the processor 905. In some cases, the code can be retrieved from the storage unit 915 and stored on the memory 910 for ready access by the processor 905. In some situations, the electronic storage unit 915 can be precluded, and machine-executable instructions are stored on memory 910.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 901, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 901 can include or be in communication with an electronic display 935 that comprises a user interface (UI) 940 for providing, for example a readout of the proteins identified using the methods disclosed herein. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 905.

Determination, analysis or statistical classification is done by methods known in the art, including, but not limited to, for example, a wide variety of supervised and unsupervised data analysis and clustering approaches such as hierarchical cluster analysis (HCA), principal component analysis (PCA), Partial least squares Discriminant Analysis (PLSDA), machine learning (also known as random forest), logistic regression, decision trees, support vector machine (SVM), k-nearest neighbors, naive bayes, linear regression, polynomial regression, SVM for regression, K-means clustering, and hidden Markov models, among others. The computer system can perform various aspects of analyzing the protein sets or protein corona of the present disclosure, such as, for example, comparing/analyzing the biomolecule corona of several samples to determine with statistical significance what patterns are common between the individual biomolecule coronas to determine a protein set that is associated with the biological state. The computer system can be used to develop classifiers to detect and discriminate different protein sets or protein corona (e.g., characteristic of the composition of a protein corona). Data collected from the presently disclosed sensor array can be used to train a machine learning algorithm, specifically an algorithm that receives array measurements from a patient and outputs specific biomolecule corona compositions from each patient. Before training the algorithm, raw data from the array can be first denoised to reduce variability in individual variables.

Machine learning can be generalized as the ability of a learning machine to perform accurately on new, unseen examples/tasks after having experienced a learning data set. Machine learning may include the following concepts and methods. Supervised learning concepts may include AODE; Artificial neural network, such as Backpropagation, Autoencoders, Hopfield networks, Boltzmann machines, Restricted Boltzmann Machines, and Spiking neural networks; Bayesian statistics, such as Bayesian network and Bayesian knowledge base; Case-based reasoning; Gaussian process regression; Gene expression programming; Group method of data handling (GMDH); Inductive logic programming; Instance-based learning; Lazy learning; Learning Automata; Learning Vector Quantization; Logistic Model Tree; Minimum message length (decision trees, decision graphs, etc.), such as Nearest Neighbor Algorithm and Analogical modeling; Probably approximately correct learning (PAC) learning; Ripple down rules, a knowledge acquisition methodology; Symbolic machine learning algorithms; Support vector machines; Random Forests; Ensembles of classifiers, such as Bootstrap aggregating (bagging) and Boosting (meta-algorithm); Ordinal classification; Information fuzzy networks (IFN); Conditional Random Field; ANOVA; Linear classifiers, such as Fisher's linear discriminant, Linear regression, Logistic regression, Multinomial logistic regression, Naive Bayes classifier, Perceptron, Support vector machines; Quadratic classifiers; k-nearest neighbor; Boosting; Decision trees, such as C4.5, Random forests, ID3, CART, SLIQ SPRINT; Bayesian networks, such as Naive Bayes; and Hidden Markov models. Unsupervised learning concepts may include; Expectation-maximization algorithm; Vector Quantization; Generative topographic map; Information bottleneck method; Artificial neural network, such as Self-organizing map; Association rule learning, such as, Apriori algorithm, Eclat algorithm, and FPgrowth algorithm; Hierarchical clustering, such as Singlelinkage clustering and Conceptual clustering; Cluster analysis, such as, K-means algorithm, Fuzzy clustering, DBSCAN, and OPTICS algorithm; and Outlier Detection, such as Local Outlier Factor. Semi-supervised learning concepts may include; Generative models; Low-density separation; Graph-based methods; and Co-training. Reinforcement learning concepts may include; Temporal difference learning; Q-learning; Learning Automata; and SARSA. Deep learning concepts may include; Deep belief networks; Deep Boltzmann machines; Deep Convolutional neural networks; Deep Recurrent neural networks; and Hierarchical temporal memory. A computer system may be adapted to implement a method described herein. The system includes a central computer server that is programmed to implement the methods described herein. The server includes a central processing unit (CPU, also "processor") which can be a single core processor, a multi core processor, or plurality of processors for parallel processing. The server also includes memory (e.g., random access memory, read-only memory, flash memory); electronic storage unit (e.g. hard disk); communications interface (e.g., network adaptor) for communicating with one or more other systems; and peripheral devices which may include cache, other memory, data storage, and/or electronic display adaptors. The memory, storage unit, interface, and peripheral devices are in communication with the processor through a communications bus (solid lines), such as a motherboard. The storage unit can be a data storage unit for storing data. The server is operatively coupled to a computer network ("network") with the aid of the communications interface. The network can be the Internet, an intranet and/or an extranet, an intranet and/or extranet that is in communication with the Internet, a telecommunication or data network. The network in some cases, with the aid of the server, can implement a peer-to-peer network, which may enable devices coupled to the server to behave as a client or a server.

The storage unit can store files, such as subject reports, and/or communications with the data about individuals, or any aspect of data associated with the present disclosure.

The computer server can communicate with one or more remote computer systems through the network. The one or more remote computer systems may be, for example, personal computers, laptops, tablets, telephones, Smart phones, or personal digital assistants.

In some applications the computer system includes a single server. In other situations, the system includes multiple servers in communication with one another through an intranet, extranet and/or the internet.

The server can be adapted to store measurement data or a database as provided herein, patient information from the subject, such as, for example, medical history, family history, demographic data and/or other clinical or personal information of potential relevance to a particular application. Such information can be stored on the storage unit or the server and such data can be transmitted through a network.

Methods as described herein can be implemented by way of machine (or computer processor) executable code (or software) stored on an electronic storage location of the server, such as, for example, on the memory, or electronic storage unit. During use, the code can be executed by the processor. In some cases, the code can be retrieved from the storage unit and stored on the memory for ready access by the processor. In some situations, the electronic storage unit can be precluded, and machine-executable instructions are stored on memory. Alternatively, the code can be executed on a second computer system.

Aspects of the systems and methods provided herein, such as the server, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical, and electromagnetic waves, such as used across physical interfaces between local devices, through wired and optical landline networks and over various air-links. The physical elements that carry such waves, such as wired or wireless likes, optical links, or the like, also may be considered as media bearing the software. As used herein, unless restricted to non-transitory, tangible "storage" media, terms such as computer or machine "readable medium" can refer to any medium that participates in providing instructions to a processor for execution.

The computer systems described herein may comprise computer-executable code for performing any of the algorithms or algorithms-based methods described herein. In some applications the algorithms described herein will make use of a memory unit that is comprised of at least one database.

Data relating to the present disclosure can be transmitted over a network or connections for reception and/or review by a receiver. The receiver can be but is not limited to the subject to whom the report pertains; or to a caregiver thereof, e.g., a health care provider, manager, other health care professional, or other caretaker; a person or entity that performed and/or ordered the analysis. The receiver can also be a local or remote system for storing such reports (e.g. servers or other systems of a "cloud computing" architecture). In one embodiment, a computer-readable medium includes a medium suitable for transmission of a result of an analysis of a biological sample using the methods described herein.

Aspects of the systems and methods provided herein can be embodied in programming. Various aspects of the technology may be thought of as "products" or "articles of manufacture" typically in the form of machine (or processor) executable code and/or associated data that is carried on or embodied in a type of machine readable medium. Machineexecutable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide nontransitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Classification of Protein Corona Using Machine Learning

The method of determining a set of proteins associated with the disease or disorder and/or disease state include the analysis of the corona of the at least two samples. This determination, analysis or statistical classification is done by methods known in the art, including, but not limited to, for example, a wide variety of supervised and unsupervised data analysis, machine learning, deep learning, and clustering approaches including hierarchical cluster analysis (HCA), principal component analysis (PCA), Partial least squares Discriminant Analysis (PLS-DA), random forest, logistic regression, decision trees, support vector machine (SVM), k-nearest neighbors, naive bayes, linear regression, polynomial regression, SVM for regression, K-means clustering, and hidden Markov models, among others. In other words, the proteins in the corona of each sample are compared/analyzed with each other to determine with statistical significance what patterns are common between the individual corona to determine a set of proteins that is associated with the disease or disorder or disease state.

Generally, machine learning algorithms are used to construct models that accurately assign class labels to examples based on the input features that describe the example. In some case it may be advantageous to employ machine learning and/or deep learning approaches for the methods described herein. For example, machine learning can be used to associate the protein corona with various disease states (e.g. no disease, precursor to a disease, having early or late stage of the disease, etc.). For example, in some cases, one or more machine learning algorithms are employed in connection with a method of the invention to analyze data detected and obtained by the protein corona and sets of proteins derived therefrom. For example, in one embodiment, machine learning can be coupled with the sensor array described herein to determine not only if a subject has a pre-stage of cancer, cancer or does not have or develop cancer, but also to distinguish the type of cancer.

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," "less than or equal to," or "at most" precedes the first numerical value in a series of two or more numerical values, the term "no more than," "less than" or "less than or equal to," or "at most" applies to each of the numerical values in that series of numerical values. For example, less than or equal to 3, 2, or 1 is equivalent to less than or equal to 3, less than or equal to 2, or less than or equal to 1.

Where values are described as ranges, it will be understood that such disclosure includes the disclosure of all possible sub-ranges within such ranges, as well as specific numerical values that fall within such ranges irrespective of whether a specific numerical value or specific sub-range is expressly stated.

Numbered Embodiments

The following embodiments recite non-limiting permutations of combinations of features disclosed herein. Other permutations of combinations of features are also contemplated. In particular, each of these numbered embodiments is contemplated as depending from or relating to every previous or subsequent numbered embodiment, independent of their order as listed. 1. A method of serially interrogating a sample, the method comprising: a) contacting the sample to a first particle type and incubating the first particle type with the sample to form a first biomolecule corona, wherein the first biomolecule corona forms upon incubation of the first particle type with the sample and wherein the first biomolecule corona comprises a protein; b) separating the first particle type comprising the first biomolecule corona from the sample; c) contacting the sample to a second particle type and incubating the second particle type with the sample to form a second biomolecule corona, wherein the second biomolecule corona forms upon incubation of the second particle type with the sample, wherein the second biomolecule corona comprises a protein, and further wherein (i) the first particle type and the second particle type are a same particle type or (ii) the first particle type and the second particle type are different; d) separating the second particle type comprising the second biomolecule corona from the sample; e) assaying the first biomolecule corona and the second biomolecule corona to determine a composition and concentration of a plurality of proteins in the sample based on the assayed first biomolecule corona and the second biomolecule corona. 2. The method of embodiment 1, wherein upon the incubating the first particle type with the sample to form the first biomolecule corona, the dynamic range of the plurality of proteins in the first biomolecule corona is compressed relative to a dynamic range of a plurality of proteins in the sample, as measured by a total protein analysis method. 3. The method of embodiment 2, wherein the dynamic range of the plurality of proteins in the first biomolecule corona is a first ratio of: a) a signal produced by a higher abundance protein of the plurality of proteins in the first biomolecule corona; and b) a signal produced by a lower abundance protein of the plurality of proteins in the first biomolecule corona. 4. The method of embodiment 2, wherein the dynamic range of the plurality of proteins in the first biomolecule corona is a first ratio of a concentration of the highest abundance protein to a concentration of the lowest abundance protein in the plurality of proteins in the first biomolecule corona. 5. The method of embodiment 2, wherein the dynamic range of the plurality of proteins in the first biomolecule corona is a first ratio of a top decile of proteins to a bottom decile of proteins in the plurality of proteins in the first biomolecule corona. 6. The method of embodiment 2, wherein the dynamic range of the plurality of proteins in the first biomolecule corona is a first ratio comprising a span of the interquartile range of proteins in the plurality of proteins in the first biomolecule corona. 7. The method of embodiment 2, wherein the dynamic range of the plurality of proteins in the first biomolecule corona is a first ratio comprising a slope of fitted data in a plot of all concentrations of proteins in the plurality of proteins in the first biomolecule corona versus known concentrations of the same proteins in the sample. 8. The method of embodiment 7, wherein the known concentrations of the same proteins in the sample are obtained from a database. 9. The method of any one of embodiments 2-8, wherein the dynamic range of a plurality of proteins in the sample is a second ratio of: a) a signal produced by a higher abundance protein of the plurality of proteins in the sample, as measured by a total protein analysis method; and b) a signal produced by a lower abundance protein of the plurality of proteins in the sample, as measured by a total protein analysis method. 10. The method of any one of embodiments 2-8, wherein the dynamic range of the plurality of proteins in the sample, as measured by a total protein analysis method, is a second ratio of a concentration of the highest abundance protein to a concentration of the lowest abundance protein in the plurality of proteins in the sample. 11. The method of any one of embodiments 2-8, wherein the dynamic range of the plurality of proteins in the sample, as measured by a total protein analysis method, is a second ratio of a top decile of proteins to a bottom decile of proteins in the plurality of proteins in the sample. 12. The method of any one of embodiments 2-8, wherein the dynamic range of the plurality of proteins in the sample, as measured by a total protein analysis method, is a second ratio comprising a span of the interquartile range of proteins in the plurality of proteins in the sample. 13. The method of any one of embodiments 2-8, wherein the dynamic range of the plurality of proteins in the sample, as measured by a total protein analysis method, is a second ratio comprising a slope of fitted data in a plot of all concentrations of proteins in the plurality of proteins in the sample versus known concentrations of the same proteins in the sample. 14. The method of embodiment 13, wherein the known concentrations of the same proteins in the sample are obtained from a database. 15. The method of any one of embodiments 9-14, wherein the compressing the dynamic range comprises a decreased first ratio relative to the second ratio. 16. The method of embodiment 15, wherein the decreased first ratio is at least 1.1-fold, at least 1.2-fold, at least 1.3-fold, at least 1.4-fold, at least 1.5-fold, at least 2-fold, at least 2.5-fold, at least 3-fold, at least 3.5-fold, at least 4-fold, at least 5-fold, or at least 10-fold less than the second ratio. 17. The method of any one of embodiments 1-16, wherein the method further comprises: determining the composition and concentration of a plurality of proteins in the second biomolecule corona. 18. The method of any one of embodiments 1-17, wherein the determining the composition and concentration of the plurality of proteins in the first biomolecule corona or determining the composition and concentration of the plurality of proteins in the second biomolecule corona comprises performing mass spectrometry. 19. The method of any one of embodiments 1-18, the method further comprising repeating step a), b), and e) with one or more additional particle types to form one or more additional biomolecule coronas. 20. The method of embodiment 19, wherein the one or more additional particle types are the same as the first particle type or the second particle type. 21. The method of embodiment 19, wherein the one or more additional particle types are different from the first particle type, the second particle type, or a combination thereof. 22. The method of any one of embodiments 19-21, wherein the one or more additional biomolecule coronas comprise proteins from the sample. 23. The method of any one of embodiments 19-22, wherein the first biomolecule corona, the second biomolecule corona, the one or more additional biomolecule coronas, or any combination thereof comprises at least 100 distinct proteins. 24. The method of any one of embodiments 19-23, wherein the first biomolecule corona, the second biomolecule corona, the one or more additional biomolecule coronas, or any combination thereof comprises at least 200 distinct proteins, at least 300 distinct proteins, at least 400 distinct proteins, at least 500 distinct proteins, at least 1000 distinct proteins, at least 2000 distinct proteins, or at least 5000 distinct proteins. 25. The method of any one of embodiments 19-24, wherein the first biomolecule corona, the second biomolecule corona, the one or more additional biomolecule coronas, or any combination thereof comprises a different composition of proteins, a different concentration of a subset of proteins, or a combination thereof. 26. The method of any one of embodiments 19-25, upon incubating the one or more additional particle types with the sample to form one or more additional biomolecule coronas, a dynamic range of a plurality of proteins in the one or more additional biomolecule coronas is compressed relative to a dynamic range of a plurality of proteins in the sample, as measured by a total protein analysis method. 27. The method of embodiment 26, wherein the dynamic range of the plurality of proteins in the one or more additional biomolecule coronas is an additional ratio of: a) a signal produced by a higher abundance protein of the plurality of proteins in the one or more additional biomolecule coronas; and b) a signal produced by a lower abundance protein of the plurality of proteins in the one or more additional biomolecule coronas. 28. The method of embodiment 26, wherein the dynamic range of the plurality of proteins in the one or more additional biomolecule coronas is an additional ratio of a concentration of the highest abundance protein to a concentration of the lowest abundance protein in the plurality of proteins in the one or more biomolecule coronas. 29. The method of embodiment 26, wherein the dynamic range of the plurality of proteins in the one or more additional biomolecule coronas is an additional ratio of a top decile of proteins to a bottom decile of proteins in the plurality of proteins in the one or more biomolecule coronas. 30. The method of embodiment 26, wherein the dynamic range of the plurality of proteins in the one or more additional biomolecule coronas is an additional ratio comprising a span of the interquartile range of proteins in the plurality of proteins in the one or more biomolecule coronas. 31. The method of embodiment 26, wherein the dynamic range of the plurality of proteins in the one or more additional biomolecule coronas is an additional ratio comprising a slope of fitted data in a plot of all concentrations of proteins in the plurality of proteins in the one or more biomolecule coronas versus known concentrations of the same proteins in the sample. 32. The method of embodiment 31, wherein the known concentrations of the same proteins in the sample are obtained from a database. 33. The method of any one of embodiments 27-32, wherein the compressing the dynamic range comprises a decreased additional ratio relative to the second ratio. 34. The method of embodiment 33, wherein the decreased first ratio is at least 1.1-fold, at least 1.2-fold, at least 1.3-fold, at least 1.4-fold, at least 1.5-fold, at least 2-fold, at least 2.5-fold, at least 3-fold, at least 3.5-fold, at least 4-fold, at least 5-fold, or at least 10-fold less than the second ratio. 35. The method of any one of embodiments 2-34, wherein the total protein analysis method comprises direct quantification of the plurality of proteins in the sample by mass spectrometry, gel electrophoresis, or liquid chromatography. 36. The method of any one of embodiments 1-35, wherein the sample comprises a sample volume of no more than about 1000 µL, no more than about 900 µL, no more than about 800 µL, no more than about 700 µL, no more than about 600 µL, no more than about 500 µL, no more than about 400 µL, no more than about 300 µL, no more than about 200 µL, no more than about 100 µL, no more than about 50 µL, no more than about 20 µL, no more than about 10 µL, no more than about 5 µL, no more than about 2 µL, or no more than about 1 µL. 37. The method of any one of embodiments 1-36, wherein the sample comprises a biological sample. 38. The method of embodiment 37, wherein the biological sample comprises a biofluid. 39. The method of embodiment 38, wherein the biofluid is selected from the group consisting of plasma, serum, urine, cerebrospinal fluid, synovial fluid, tears, saliva, whole blood, milk, nipple aspirate, ductal lavage, vaginal fluid, nasal fluid, ear fluid, gastric fluid, pancreatic fluid, trabecular fluid, lung lavage, sweat, crevicular fluid, semen, prostatic fluid, sputum, fecal matter, bronchial lavage, fluid from swabbings, bronchial aspirants, fluidized solids, fine needle aspiration samples, tissue homogenates, and cell culture samples. 40. The method of any one of embodiments 38-39, wherein the biofluid is plasma or serum. 41. The method of any one of embodiments 38-39, wherein the biofluid is cerebrospinal fluid. 42. The method of any one of embodiments 19-41, wherein the first particle type, the second particle type, the one or more additional particle types, or any combination thereof are selected from TABLE 1. 43. The method of any one of embodiments 1-42, comprising removing high abundance proteins from the sample by depleting or fractioning the sample prior to step a). 44. The method of any one of embodiments 19-43, wherein the one or more additional biomolecule coronas comprises a protein. 45. The method of any one of embodiments 19-44, wherein the first biomolecule corona, the second biomolecule corona, the one or more additional biomolecule coronas, or any combination thereof comprises a lipid, a nucleic acid, a polysaccharide, or any combination thereof. 46. The method of any one of embodiments 19-45, wherein the first particle type, the second particle type, or the one or more additional particle types differ by at least one physicochemical properties. 47. The method of any one of embodiments 1-46, wherein the first particle type and the second particle type differ by at least one physicochemical property and wherein the first biomolecule corona comprises a distinct but overlapping set of proteins relative to the second biomolecule corona. 48. The method of any one of embodiments 1-47, wherein the composition of the plurality of proteins and the concentration of a protein of the plurality of proteins is determined based on the distinct but overlapping set of proteins in the first biomolecule corona and the second biomolecule corona. 49. The method of any one of embodiments 19-48, wherein the first particle type, the second particle type, the one or more additional particle types, or any combination thereof is selected from the group consisting of a nanoparticle, a microparticle, a micelle, a liposome, an iron oxide particle, a graphene particle, a silica particle, a protein-based particle, a polystyrene particle, a silver particle, a gold particle, a metal particle, a quantum dot, a superparamagnetic particle, or any combination thereof. 50. The method of any one of embodiments 1-49, wherein the first particle type, the second particle type, the one or more additional particle types, or any combination thereof is a superparamagnetic particle. 51. The method of any one of embodiments 1-50, wherein the first particle type, the second particle type, the one or more additional particle types, or any combination thereof is selected from TABLE 1. 52. The method of any one of embodiments 1-51, wherein the first particle type and the second particle type are the same particle type and wherein at least 70%, at least 80%, at least 90%, or at least 95% of proteins assayed in the first biomolecule corona and the second biomolecule corona are the same. 53. The method of any one of embodiments 1-52, wherein the first particle type and the second particle type are different and wherein no more than 70%, no more than 80%, no more than 90%, or no more than 95% of proteins assayed in the first biomolecule corona and the second biomolecule corona are the same. 54. A high throughput method of analyzing a plurality of biofluids, the method comprising: a) contacting a first biofluid and a second biofluid of the plurality of biofluids with a particle type; b) in a first volume, separating the particle type from a first biofluid of the plurality of biofluids and determining the composition and concentration of a plurality of proteins in a first biomolecule corona corresponding to the particle type; and c) in a second volume, separating the particle type from a second biofluid of the plurality of biofluids and determining the composition and concentration of a plurality of proteins in a second biomolecule corona corresponding to the particle type, wherein the first biofluid and the second biofluid are different biofluids. 55. The method of embodiment 54, wherein a biofluid of the plurality of biofluids is selected from the group consisting of plasma, serum, urine, cerebrospinal fluid, synovial fluid, tears, saliva, whole blood, milk, nipple aspirate, ductal lavage, vaginal fluid, nasal fluid, ear fluid, gastric fluid, pancreatic fluid, trabecular fluid, lung lavage, sweat, crevicular fluid, semen, prostatic fluid, sputum, fecal matter, bronchial lavage, fluid from swabbings, bronchial aspirants, fluidized solids, fine needle aspiration samples, tissue homogenates, and cell culture samples. 56. The method of embodiment 55, wherein the biofluid is plasma or serum. 57. The method of embodiment 55, wherein the biofluid is cerebrospinal fluid. 58. The method of any one of embodiments 54-57, wherein a biomolecule corona forms upon contacting the particle type with the sample and wherein the first biomolecule corona comprises a protein. 59. The method of embodiment 58, wherein the biomolecule corona comprises a lipid, a nucleic acid, a polysaccharide, or any combination thereof. 60. The method of any one of embodiments 54-59, comprising removing high abundance proteins from the sample by depleting or fractioning the sample prior to step a). 61. The method of any one of embodiments 54-60, wherein the particle type is selected from the group consisting of a nanoparticle, a microparticle, a micelle, a liposome, an iron oxide particle, a graphene particle, a silica particle, a protein-based particle, a polystyrene particle, a silver particle, a gold particle, a metal particle, a quantum dot, a superparamagnetic particle, or any combination thereof. 62. The method of any one of embodiments 54-61, wherein the particle type is a superparamagnetic particle. 63. The method of any one of embodiments 54-62, wherein the particle type is selected from TABLE 1. 64. The method of any one of embodiments 1-63, wherein the separating comprises magnetic separation, filtration, gravitational separation, or centrifugation. 65. The method of any one of embodiments 1-64, wherein the contacting occurs in vitro. 66. The method of any one of embodiments 38-53 or 55-65, wherein the method further comprises identifying a biological state of the biofluid processing the composition and concentration of the plurality of proteins in the biomolecule corona using a trained algorithm to identify the biological state. 67. The method of any one of embodiments 38-53 or 55-66, wherein the biofluid is isolated from a subject. 68. The method of embodiment 67, wherein the subject is a human. 69. The method of embodiment 67, wherein the subject is a non-human animal. 70. The method of any one of embodiments 67-69, wherein the subject has a condition. 71. The method of embodiment 70, wherein the condition is a disease state. 72. The method of embodiment 71, wherein the disease state is cancer. 73. The method of embodiment 72, wherein the cancer is prostate cancer, colorectal cancer, lung cancer, or breast cancer. 74. The method of embodiment 71, wherein the disease state is Alzheimer's disease. 75. The method of any one of embodiments 1-74, wherein the separating comprises magnetic separation, column-based separation, filtration, spin column-based separation, centrifugation, ultracentrifugation, density or gradient-based centrifugation, gravitational separation, or any combination thereof. 76. A method of analyzing a biofluid, the method comprising: a) contacting a biofluid in a biofluid collection tube with a particle type, wherein the blood collection tube comprises a stabilization reagent, wherein the stabilization reagent stabilizes cell-free nucleic acid molecules in the biofluid; and b) incubating the biofluid and the particle type in the biofluid collection tube to permit binding of proteins of the biofluid to the particle type, thereby forming a biomolecule corona comprising proteins bound to the particle type, wherein the biomolecule corona comprises a population of proteins that is also detected when the particle type is incubated in the biofluid when stored in EDTA and permitted to form a control biomolecule corona; and wherein the biofluid and the particle type are incubated in the biofluid collection tube at from about 20° C. to about 35° C. and wherein 50% or more of the population of proteins of the biomolecule corona is also detectable in the control biomolecule corona. 77. The method of embodiment 76, wherein 60% or more, 70% or more, 80% or more, or 90% or more of the population of proteins of the biomolecule corona is also detectable in the control biomolecule corona. 78. The method of any one of embodiments 76-77, wherein at least a subset of the population of proteins is detected at a higher abundance than when the particle type is incubated in the biofluid when stored in EDTA. 79. The method of any one of embodiments 76-78, wherein at least 5% of the population of proteins is detected at a higher abundance than when the particle type is incubated in the biofluid when stored in EDTA. 80. The method of any one of embodiments 76-79, wherein at least 10%, at least 20%, at least 30%, at least 40%, at least 50%, at least 60%, at least 70%, at least 80%, at least 90%, or 100% of the population of proteins is detected at a higher abundance than when the particle type is incubated in the biofluid when stored in EDTA. 81. The method of any one of embodiments 76-80, further comprising assaying the proteins in the biomolecule corona at a lower limit of detection than when the particle type is incubated in the biofluid when stored in EDTA. 82. The method of any one of embodiments 76-81, wherein the incubating comprises incubating at room temperature. 83. The method of any one of embodiments 76-82, wherein the incubating comprises incubating for up to 14 days, up to 13 days, up to 12 days, up to 11 days, up to 10 days, up to 9 days, up to 8 days, up to 7 days, up to 6 days, up to 5 days, up to 4 days, or up to 3 days. 84. The method of any one of embodiments 76-83, wherein the incubating comprises incubating for up to 14 days. 85. The method of any one of embodiments 76-84, wherein the biomolecule corona comprises a unique protein that is absent from the control biomolecule corona. 86. The method of any one of embodiments 76-85, wherein the biomolecule corona comprises at least 100 distinct proteins, at least 200 distinct proteins, at least 300 distinct proteins, at least 400 distinct proteins, at least 500 distinct proteins, at least 1000 distinct proteins, at least 2000 distinct proteins, or at least 5000 distinct proteins. 87. The method of any one of embodiments 76-86, wherein the particle type binds 100 or more distinct proteins 88. The method of any one of embodiments 86-87, wherein the biofluid comprises plasma, serum, urine, cerebrospinal fluid, synovial fluid, tears, saliva, whole blood, milk, nipple aspirate, ductal fluid, vaginal fluid, nasal fluid, ear fluid, gastric fluid, pancreatic fluid, trabecular fluid, lung lavage, sweat, crevicular fluid, semen, prostatic fluid, sputum, fecal matter, bronchial lavage, fluid from swabbings, bronchial aspirants, fluidized solids, fine needle aspiration samples, tissue homogenates, or cell culture samples. 89. The method of any one of embodiments 86-88, wherein the biofluid is plasma, serum, urine, cerebrospinal fluid, synovial fluid, tears, saliva, whole blood, milk, nipple aspirate, ductal lavage, vaginal fluid, nasal fluid, ear fluid, gastric fluid, pancreatic fluid, trabecular fluid, lung lavage, sweat, crevicular fluid, semen, prostatic fluid, sputum, fecal matter, bronchial lavage, a fluid from swabbing, a bronchial aspirant, a fluidized solid, a fine needle aspiration sample, a tissue homogenate, or a cell culture sample. 90. The method of any one of embodiments 76-89, further comprising separating the particle type from the biofluid. 91. The method of embodiment 90, wherein separating comprises magnetic separation, filtration, gravitational separation, or centrifugation. 92. The method of any one of embodiments 76-91, further comprising determining the composition and concentration of proteins in the biomolecule corona. 93. The method of any one of embodiments 76-92, further comprising determining the composition and concentration of proteins in the control biomolecule corona. 94. The method of any one of embodiments 76-93, wherein the determining the composition and concentration of proteins comprises mass spectrometry, gel electrophoresis, or liquid chromatography. 95. The method of any one of embodiments 76-94, wherein the stabilization reagent comprises a metabolic inhibitor, a protease inhibitor, a phosphatase inhibitor, a nuclease inhibitor, a preservative agent, or a combination thereof. 96. The method of embodiment 95, wherein the metabolic inhibitor comprises glyceraldehyde, dihydroxyacetone phosphate, glyceraldehyde 3-phosphate, 1,3-bisphosphoglycerate, 3-phosphoglycerate, 2-phosphoglycerate, phosphoenolpyruvate, pyruvate and glycerate dihydroxyacetate, sodium fluoride, or K2C2O4. 97. The method of embodiment 95 or embodiment 96, wherein the protease inhibitor comprises antipain, aprotinin, chymostatin, elastatinal, phenylmethylsulfonyl fluoride (PMSF), APMSF, TLCK, TPCK, leupeptin, soybean trypsin inhibitor, indoleacetic acid (IAA), E-64, EDTA, pepstatin, VdLPFFVdL, 1,10-phenanthroline, phosphoramodon, amastatin, bestatin, diprotin A, diprotin B, alpha-2-macroglobulin, lima bean trypsin inhibitor, pancreatic protease inhibitor, or egg white ovostatin egg white cystatin. 98. The method of any one of embodiments 95-97, wherein the phosphatase inhibitor comprises calyculin A, nodularin, NIPP-1, microcystin LR, tautomycin, okadaic acid, cantharidin, microcystin LR, okadaic acid, fostriecin, tautomycin, cantharidin, endothall, nodularin, cyclosporin A, FK 506/immunophilin complexes, cypermethrin, deltamethrin, fenvalerate, bpV(phen), dephostatin, mpV(pic) DMHV, or sodium orthovanadate. 99. The method of any one of embodiments 95-98, wherein the nuclease inhibitor comprises diethyl pyrocarbonate, ethanol, aurintricarboxylic acid (ATA), formamide, vanadyl-ribonucleoside complexes, macaloid, ethylenediamine tetraacetic acid (EDTA), proteinase K, heparin, hydroxylamine-oxygen-cupric ion, bentonite, ammonium sulfate, dithiothreitol (DTT), beta-mercaptoethanol, cysteine, dithioerythritol, tris(2-carboxyethyl) phosphene hydrochloride, or a divalent cation such as $Mg^{+2}$, $Mn^{+2}$, $Zn^{+2}$, $Fe^{+2}$, $Ca^{+2}$, or $Cu^{+2}$. 100. The method of any one of embodiments 95-99, wherein the preservative agent comprises diazolidinyl urea, imidazolidinyl urea, dimethoylol-5,5-dimethylhydantoin, dimethylol urea, 2-bromo-2-nitropropane-1,3-diol, oxazolidines, sodium hydroxymethyl glycinate, 5-hydroxymethoxymethyl-1-1aza-3,7-dioxabicyclo[3.3.0]octane, 5-hydroxymethyl-1-1aza-3,7dioxabicyclo[3.3.0]octane, 5-hydroxypoly[methyleneoxy]methyl-1-1aza-3,7dioxabicyclo[3.3.0]octane, or quaternary adamantine. 101. The method of any one of embodiments 76-100, wherein the biofluid collection tube is a blood collection tube. 102. The method of any one of embodiments 76-101, wherein the particle type is a nanoparticle or a microparticle. 103. The method of any one of embodiments 76-102, wherein the particle type is selected from the group consisting of a nanoparticle, a microparticle, a micelle, a liposome, an iron oxide particle, a graphene particle, a silica particle, a protein-based particle, a polystyrene particle, a silver particle, a gold particle, a metal particle, a quantum dot, a superparamagnetic particle, and any combination thereof. 104. The method of any one of embodiments 76-103, wherein the particle type is selected from TABLE 1. 105. The method of any one of embodiments 76-104, further comprising contacting the biofluid with one or more additional particle types, incubating the biofluid with the one or more additional particle types to permit binding of proteins of the biofluid to the one or more additional particle type, thereby forming one or more additional biomolecule coronas comprising proteins bound to the one or more additional particle types. 106. The method of embodiment 105, wherein the one or more additional particle types binds a population of proteins that is distinct but overlapping with the population of proteins in the biomolecule proteins of the particle type. 107. The method of any one of embodiments 105-106, wherein the contacting the biofluid with the one or more additional particle types occurs after the contacting the biofluid with the particle type. 1. A method of analyzing of a plurality of biofluids, the method comprising: (a) separately contacting each biofluid of the plurality of biofluids with a nanoparticle (b) isolating the first nanoparticle and analyzing a first protein corona corresponding to a first biofluid of the plurality of biofluids; and (c) isolating the second nanoparticle and analyzing a second protein corona corresponding to a second biofluid of the plurality of biofluids, wherein step (b) and step (c) occur simultaneously. 2. The method of embodiment 1, the method further comprising contacting the plurality of biofluids with a third nanoparticle. 3. The method of any one of embodiments 1-2, the method further comprising contacting the plurality of biofluids with a fourth nanoparticle. 4. The method of any one of embodiments 1-3, the method further comprising contacting the plurality of biofluids with a fifth nanoparticle. 5. The method of embodiment 1, wherein the first nanoparticle and the second nanoparticle are the same. 6. The method of embodiment 1, the method further comprising contacting the plurality of biofluids with up to 10 different nanoparticles. 7. The method of embodiment 1, wherein the nanoparticle is made of a material selected from a lipid, a polymer, a metal, or any combination thereof. 8. The method of embodiment 7, wherein the polymer comprises PS, PLA, PGA, PLGA, or PVP. 9. The method of embodiment 7, wherein the lipid comprises EPC, DOPC, DOPG, or DPPG. 10. The method of embodiment 7, wherein the metal comprises iron oxide, gold, or silver. 11. The method of embodiment 1, wherein the nanoparticle comprises a positive surface charge. 12. The method of embodiment 1, wherein the nanoparticle comprises a negative surface charge. 13. The method of embodiment 1, wherein the nanoparticle comprises a neutral surface charge. 14. The method of embodiment 1, wherein the nanoparticle comprises a size of 1-400 nm. 15. The method of embodiment 1, wherein biofluid comprises plasma, serum, CSF, urine, tear, or saliva. 16. The method of embodiment 1, wherein the method further comprises comparing the first protein corona to a first control protein corona identified by contacting the first biofluid with the first nanoparticle. 17. The method of embodiment 1, wherein the method further comprising comparing the second protein corona to a second control protein corona identified by contacting the second biofluid with the second nanoparticle. 18. The method of embodiment 1, wherein the method further comprises correlating the first protein corona to a first biological state. 19. The method of embodiment 1, wherein the method further comprises correlating the second protein corona to a second biological state. 1. A method of identifying a biological state of a sample of a subject, the method comprising: incubating the sample with a depletion nanoparticle, thereby generating a depleted sample; incubating the depleted sample with a first nanoparticle to generate a protein corona; generating protein data corresponding to a protein in the protein corona associated with the first nanoparticle; and processing the protein data using a trained algorithm to identify the biological state of the subject. 2. A method of identifying a biological state of a protein sample from a subject, the method comprising: fractionating the protein sample, thereby generating a fractionated sample comprising a subset of proteins in the protein sample; incubating the depleted sample with a first nanoparticle to generate a protein corona; generating protein data corresponding to a protein of the protein corona associated with the first nanoparticle; and processing the protein data using a trained algorithm to identify the biological state of the subject, wherein fractionating the sample comprises separating high abundance proteins with a method selected from the group consisting of Cohn's method, column chromatograph, ion-exchange chromatography, affinity chromatography, size exclusion chromatography, centrifugation, filtration, ultrafiltration and cryo-precipitation. 3. The method of embodiment 1, wherein incubating the sample with the depletion nanoparticle comprises the incubating the sample with the depletion nanoparticle for at least about 30 minutes and extracting the depletion nanoparticle from the sample. 4. The method of embodiment 3, wherein incubating the sample with the depletion nanoparticle for at least about 30 min and the extracting the depletion nanoparticle from the sample removes at least about 80% of high abundance proteins from the sample. 5. The method of embodiment 1, further comprising analyzing a protein corona associated with the depletion nanoparticle. 6. The method of embodiment 1, wherein the incubating the sample with the depletion nanoparticle comprises incubating the sample with the depletion nanoparticle for at least about 60 minutes and extracting the depletion nanoparticle from the sample at least two times. 7. The method of embodiment 6, wherein the incubating the sample with the depletion nanoparticle for at least about 60 minutes and removing the depletion nanoparticle from the sample at least two times removes 99% of high abundance proteins. 8. The method of embodiment 1 or 2, wherein a concentration of the first nanoparticle in the depleted sample is from 1-50 mg/mL. 9. The method of embodiment 1 or 2, wherein a concentration of the first nanoparticle in the depleted sample is from 2.5-10 mg/mL. 10. The method of embodiment 1, wherein the depletion nanoparticle comprises at least one different physicochemical property from the first nanoparticle. 11. The method of embodiment 10, wherein the different physicochemical property comprises size, surface charge, or a chemical moiety. 12. The method of embodiment 1 or 2, wherein the generating protein data corresponding to the protein in the protein corona associated with the first nanoparticle comprises determining a concentration of each unique protein in the protein corona and correlating the concentration of each unique protein in the protein corona to the biological state. 13. The method of embodiment 1 or 2, wherein processing the protein data using a trained algorithm to identify the biological state of the subject comprises associating the biological state with a biomolecule fingerprint. 14. The method of embodiment 1 or 2, wherein the sample is plasma or serum. 15. The method of embodiment 1, wherein processing the protein data comprises analyzing the protein corona, analyzing the sample prior to depletion, or analyzing the depleted sample. 16. The method of embodiment 2, wherein processing the protein data comprises analyzing the protein corona, analyzing the protein sample prior to fractionation, or analyzing the fractionated sample. 17. A method for assaying a biological sample, comprising (a) obtaining a biological sample comprising a plurality of biomolecules, which plurality of biomolecules comprises protein; (b) enriching said biological sample based on one or more features selected from the group consisting of: size, charge, hydrophobicity, structure and affinity, to yield a processed biological sample; (c) generating at least a first subset of biomolecules and a second subset of biomolecules from said processed biological sample of (b) with the aid of one or more nanoparticles, wherein said first subset of biomolecules associates with said one or more nanoparticles and said second subset of biomolecules does not associate with said one or more nanoparticles; and (d) separately conducting one or more assays on at least said first subset of biomolecules or said second subset of biomolecules. 18. The method of embodiment 17, further comprising (e) isolating said first subset of biomolecules from said second subset of biomolecules. 19. The method of embodiment 17, wherein said one or more assays comprises an assay selected from the group consisting of: mass spectrometry and enzyme-linked immunosorbent assay (ELISA). 20. The method of embodiment 17, wherein said one or more assays comprise mass spectrometry. 21. The method of embodiment 17, wherein the enriching said biological sample comprises fractionation to yield said processed biological sample. 22. The method of embodiment 21, wherein the fractionation comprises separating high abundance proteins with a method selected from the group consisting of Cohn's method, ion-exchange chromatography, affinity chromatography, size exclusion chromatography, centrifugation, filtration, ultrafiltration and cryo-precipitation. 23. The method of embodiment 17, wherein the enriching said biological sample to yield said processed biological sample comprises depleting one or more proteins. 24. The method of embodiment 17, wherein, in (b), one or more depletion nanoparticles are used to yield said processed biological sample. 25. The method of embodiment 24, wherein said one or more depletion nanoparticles of (b) are different from said one or more nanoparticles of (c). 26. The method of embodiment 17, wherein said one or more assays are conducted on said first subset, which assay is ELISA. 27. The method of embodiment 17, wherein said biological sample is a biofluid selected from the group consisting of: plasma, serum, urine, cerebrospinal fluid, tears, saliva, whole blood, nipple aspirate, ductal lavage, vaginal fluid, nasal fluid, ear fluid, gastric fluid, pancreatic fluid, trabecular fluid, lung lavage, sweat, pericrevicular fluid, semen, prostatic fluid, sputum, synovial fluid, fecal matter, trabecular fluid, bronchial lavage, fluid from swabbings, and bronchial aspirants. 28. The method of embodiment 17, wherein said one or more assays yields proteomic data, and further comprising processing said proteomic data to predict a biological state. 29. The method of embodiment 28, wherein said processing said proteomic data comprises use of a trained algorithm, which trained algorithm is trained using an independent set of biological samples. 30. The method of embodiment 17, wherein said first subset of biomolecules associates with said one or more nanoparticles upon incubation with said one or more nanoparticles to form protein coronas. 31. The method of embodiment 17, wherein said biological sample is depleted prior to (a). 32. The method of embodiment 17, said first subset of biomolecules and said second subset of biomolecules comprise protein.

EXAMPLES

The following examples are illustrative and non-limiting to the scope of the devices, methods, systems, and kits described herein.

Example 1

Identification of Proteins in Cerebrospinal Fluid (CSF) Protein Corona

This example describes the identification of proteins in cerebrospinal fluid (CSF) protein corona.

To produce protein coronas from a cerebrospinal fluid (CSF) sample, about 100 µL of P39 particles were mixed with about 100 µL of neat CSF in microtiter plates. The plates were sealed and incubated at about 37° C. for about 1 hour with shaking at 300 rpm. After incubation, the plate was placed on top of magnetic collection for about 5 minutes to pellet down the particles. Unbound proteins in biological samples were pipetted out. The protein corona was further washed with about 200 µL of PBS for three times with magnetic separation.

To digest the proteins bound onto particles, a trypsin digestion kit (iST 96X, PreOmics, Germany) was used according to the protocols provided. Briefly, after the last round of wash buffer was pipetted out from the plate, about 50 µL of lyse buffer was added to each well and the sample was heated at about 95° C. for about 10 minutes with agitation. After cooling down the plates to room temperature, trypsin digest buffer was added and the plate was incubated at about 37° C. for about 3 hours with shaking. The digestion process was stopped with a stop buffer. The supernatant was separated from the particles by a magnetic collector and further cleaned up by a peptide cleanup cartridge included in the kit. The peptide was eluted with about 75 µL of elution buffer twice and combined. Peptide concentration was measured by a quantitative colorimetric peptide assay kit from Pierce.

The peptide eluates were lyophilized and reconstituted in about 0.1% TFA. An about 2 aliquot (based on submitted protein quant values) was analyzed by nano LC/MS/MS with a Waters NanoAcquity HPLC system interfaced to a ThermoFisher Fusion Lumos. Peptides were loaded on a trapping column and eluted over a 75 µm analytical column at 350 nL/min; both columns were packed with Luna C18 resin (Phenomenex). A 2 hour gradient was employed in all cases except for sample 33295 that was also acquired with a 1 hour gradient. The mass spectrometer was operated in data-dependent mode, with MS and MS/MS performed in the Orbitrap at 60,000 FWHM resolution and 15,000 FWHM resolution, respectively. APD was turned on. The instrument was run with a 3 second cycle for MS and MS/MS. The mass spectrometry data were processed through the MaxQuant software v1.6.0.16. Swissprot was used to search for protein identifications with 1% protein and peptide false discovery rate (FDR). Peak areas were calculated for detected peptides. The MaxQuant results were parsed into the Scaffold software for visualization.

FIG. 1 shows the total number of proteins identified in different CSF samples. A set of 10 individual CSF samples were interacted with P39 to create 10 protein coronas for mass spectrometry analysis. The total number of identified proteins was counted for each sample: for CSF1—about 710 proteins; for CSF2—about 850 proteins; for CSF3—about 620 proteins; for CSF4—about 760 proteins; for CSF5—about 700 proteins; for CSF6—about 620 proteins; for CSF7—about 690 proteins; for CSF8—about 760 proteins; for CSF9—about 710 proteins; and for CSF10—about 640 proteins. The data shows significantly higher number of proteins than obtained with the same particle in plasma. The CSF proteins cluster together because the majority of them are not measurable in plasma.

Figure 2A:
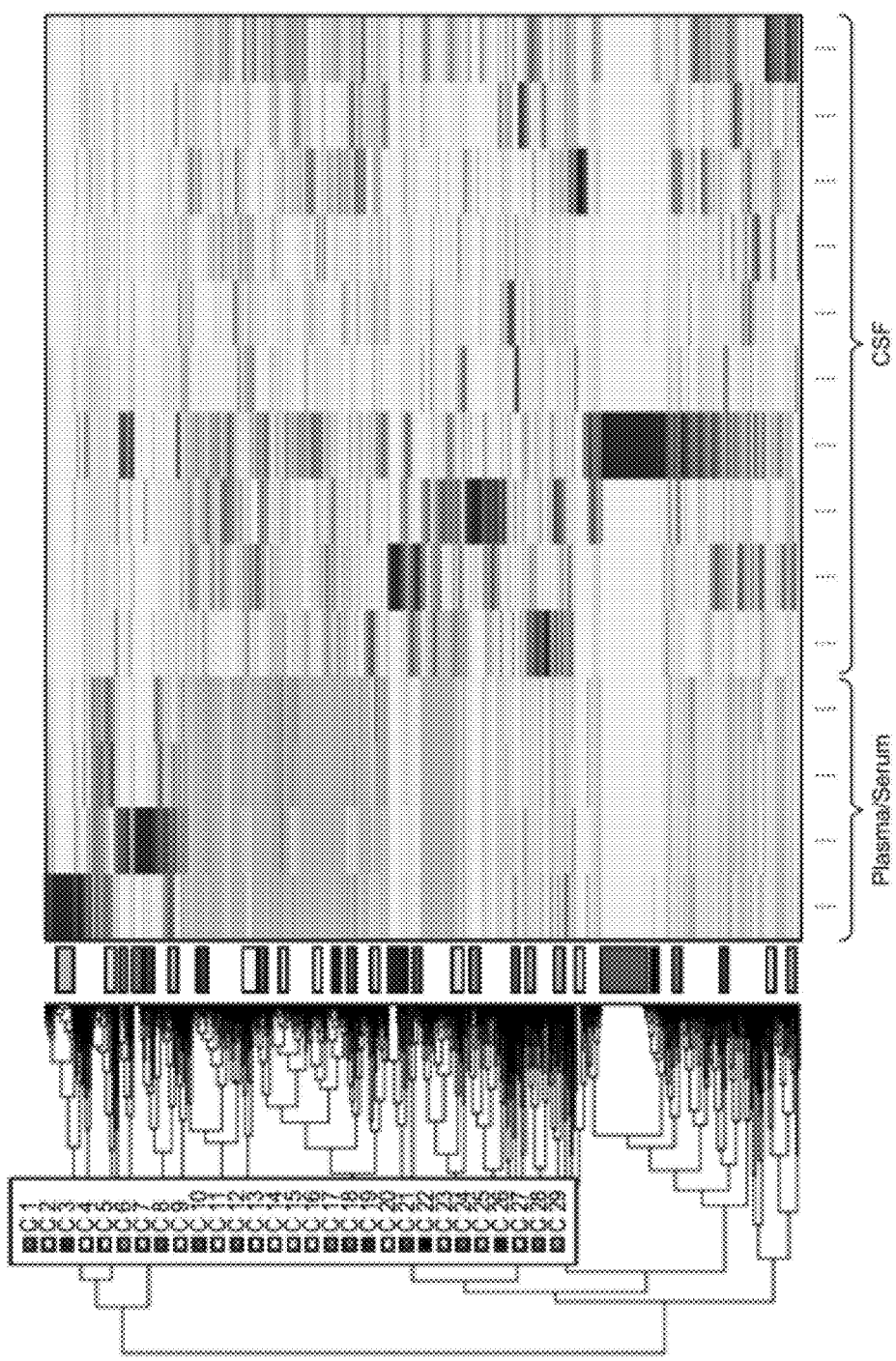
FIG. 2A and FIG. 2B show heatmap clustering of CSF protein corona and plasma/serum protein corona demonstrated good separation of the two types of samples such that separate profiles for CSF and plasma/serum were observed. Four samples of serum or plasma protein corona were clustered on the left four nodes of the heatmap. All CSF protein coronas were clustered on the right side of the heatmap.
Figure 2B:
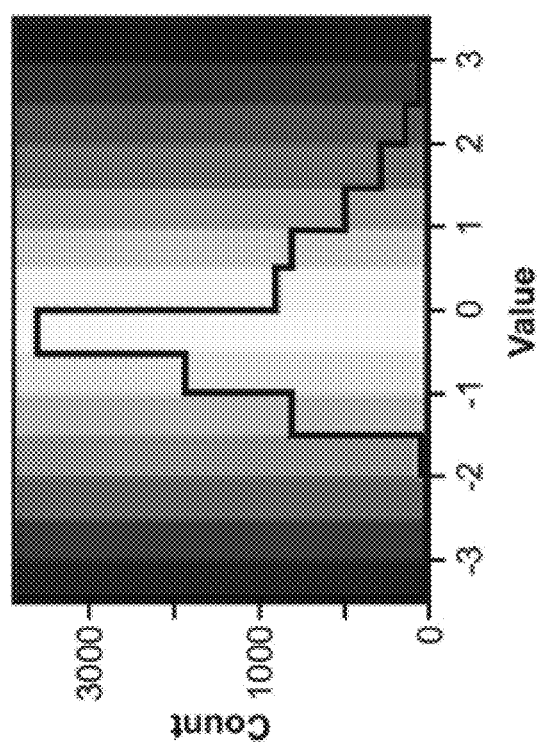
Figure 3:
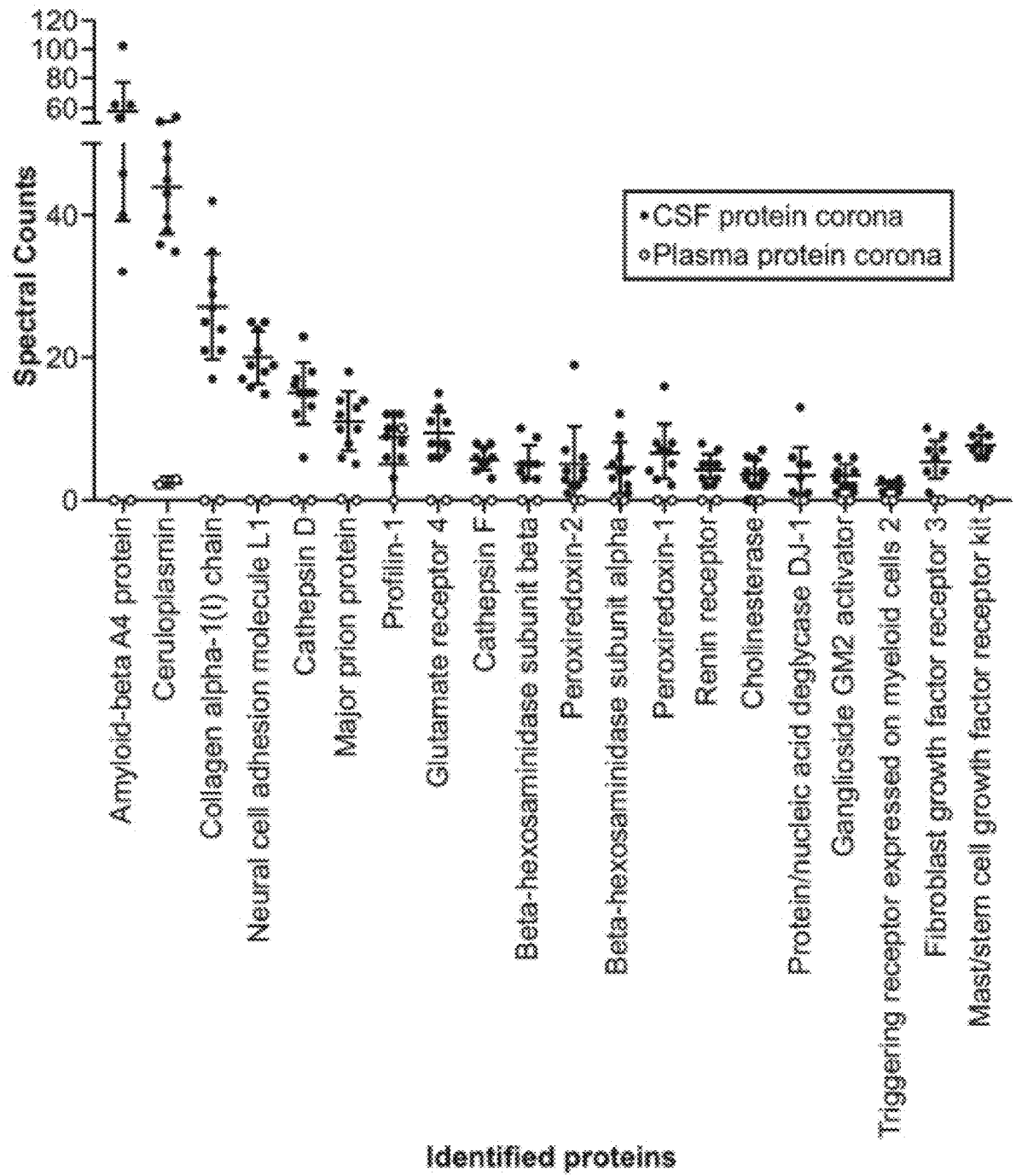
FIG. 3 shows the spectral counts associated with CSF protein corona and plasma protein corona. The proteins shown have known association with neurological disease. Spectral counts for plasma protein corona fall along the x-axis for many proteins listed (shown in hollow red circles). Spectral counts for CSF plasma protein corona are shown with solid black dots.

As shown in FIG. 2A and FIG. 2B, CSF and plasma/serum protein corona demonstrated good separation of the two types of samples. Four samples of serum or plasma protein corona were clustered on the left four nodes of the heatmap. All CSF protein corona was clustered on the right side of the heatmap. Also, FIG. 3 shows the spectral counts associated with CSF protein corona and plasma protein corona.

Figure 4:
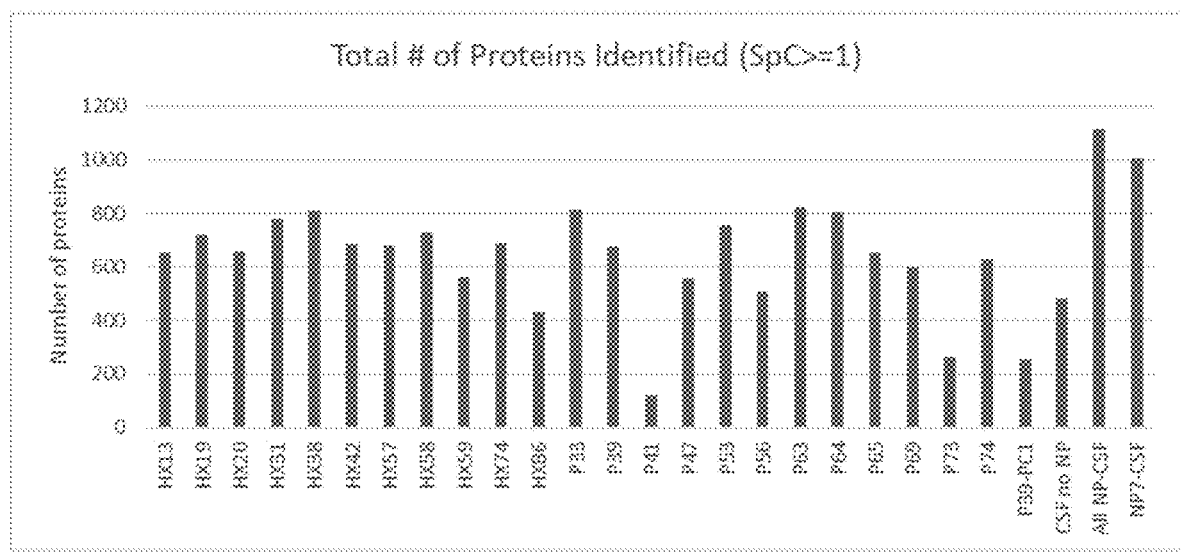
FIG. 4 shows the total number of proteins identified in CSF protein corona derived from different particles. A pooled CSF sample was used for all particles. More than 1000 unique proteins were identified with all particles.

FIG. 4 shows the total number of proteins identified in CSF protein corona derived from different particles. A pooled CSF sample was used for all particles. More than 1000 unique proteins were identified with all particles.

Example 2

Identification of Proteins in Urine Protein Corona

This example describes the identification of proteins in urine protein corona.

To produce protein coronas from a urine sample, about 100 μL of P39 particles were mixed with 100 μL of neat urine samples in microtiter plates. The plates were sealed and incubated at 37° C. for 1 hour with shaking at 300 rpm. The rest of the assay was performed the same way as CSF protein corona, as described in EXAMPLE 1.

Figure 5:
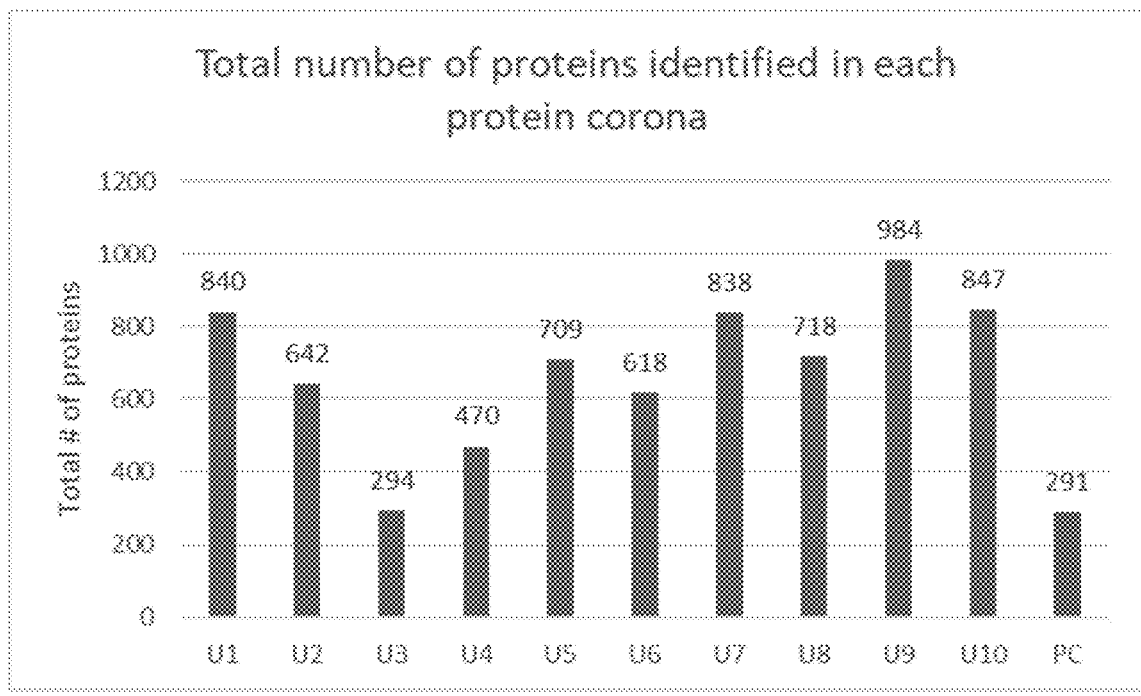
FIG. 5 shows the total number of proteins identified in different urine samples. A set of 10 individual urine samples (U1 to U10) and 1 control plasma sample (PC) were interacted with P39 particles to create 11 protein profiles from mass spectrometry analysis. In each urine sample, the total number of identified proteins in urine was greater than the total number of proteins identified in the plasma sample.

As shown in FIG. 5, a substantial number of proteins were identified in each urine sample. In FIG. 5, a set of 10 individual urine samples (U1 to U10) and 1 control plasma sample (PC) were interacted with P39 to create 11 protein coronas for mass spec analysis. The total number of identified proteins identified in each urine sample was higher than the number of protein identified in plasma for every urine sample tested.

Example 3

Sample Preparation for Identification of Peptide Corona

This example describes sample preparation for identification of peptide corona.

To generate proteomic data from a peptide corona, plasma samples were first denatured and reduced before digestion with trypsin. The resulting peptides were incubated with about 100 μL of paramagnetic particles in microtiter plates. The plates were sealed and incubated at about 37° C. for about 1 hour with shaking at 300 rpm. The peptide corona was washed 3 times with a TE buffer with magnetic separation. Bound peptides were eluted with 1% TFA in 50% of acetonitrile. The peptide eluates were lyophilized and reconstituted in 0.1% TFA before submitting for mass spectrometry analysis.

Example 4

Multiplexing Measurement of Protein Corona

This example describes multiplexing measurement of protein corona.

Protein corona can be multiplexed in two different ways: particle mixing and post-digestion mixing.

With particle mixing, the particles were prepared at about equal concentrations and pre-mixed before being plated to the microtiter plate at about 100 μL. Biological samples were prepared as usual and mixed with the particles completely by pipetting the mixture up and down for at least about 10 times. The plates were sealed and incubated at about 37° C. for about 1 hour with shaking at 300 rpm. The rest of the assay was performed the same way as CSF protein corona, as described in EXAMPLE 1.

With post-digestion mixing, the protein corona assay was performed the same way as CSF protein corona, as described above. After digested peptides were eluted out, peptides derived from different particles were combined and mixed before lyophilization. The peptide elutes were lyophilized and reconstituted in 0.1% TFA before submitting for mass spectrometry analysis.

Figure 6A:
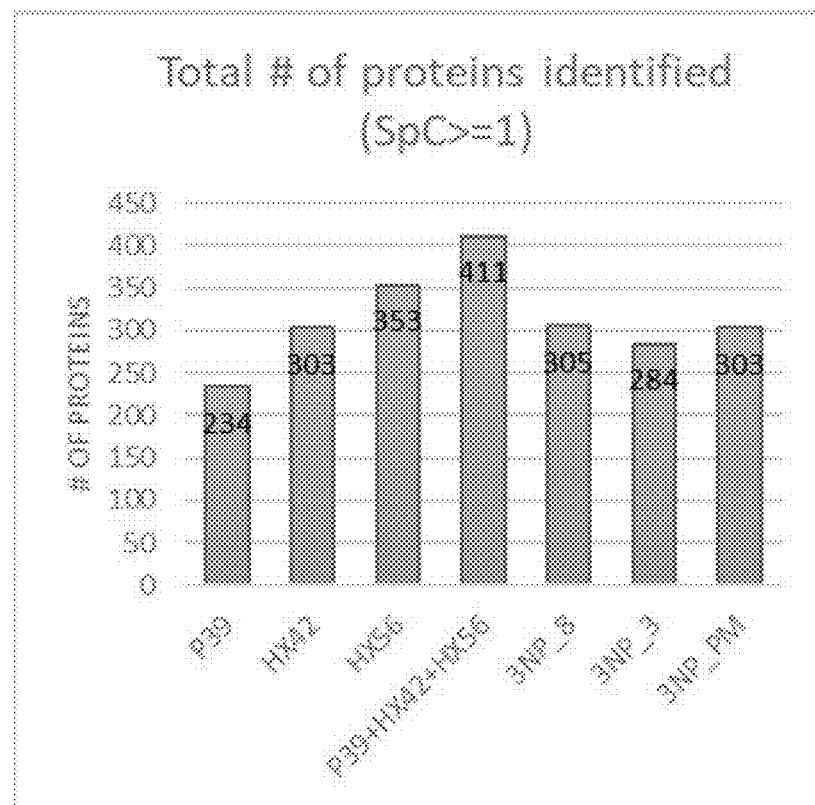
FIG. 6A and FIG. 6B show the proteins identified from multiplexed measurement of protein coronas derived from particles P39, HX42 and HX56. A pooled plasma sample that was diluted 5× with TE buffer was used in this experiment for particles and particle combinations.
Figure 6B:
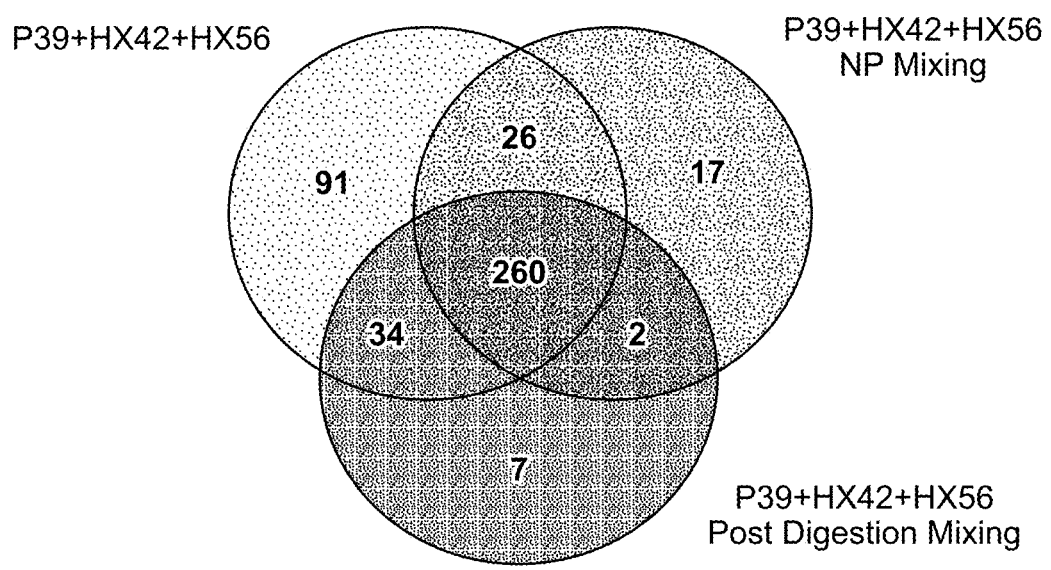

FIG. 6A and FIG. 6B show the proteins identified from multiplexing measurement of protein coronas derived from particles P39, HX42 and HX56. A pooled plasma sample that was diluted 5× with TE buffer was used in this experiment for particles and particle combinations. FIG. 6A shows the total number of proteins identified with different conditions. With single particle protein corona (P39, HX42 and HX56), 234, 303 and 353 unique proteins can be identified for the three particles, respectively. A total of 411 unique proteins were identified when all particles were run separately, as shown in the column labeled "P39+HX42+HX56." With particle mixing at higher concentration ("3NP_8," final total NP concentration of 8 mg/mL) and lower concentration ("3NP_3," final total NP concentration of 3 mg/mL), 305 and 284 unique proteins were identified. With post-digestion mixing of all three protein coronas ("3NP_PM," 303 unique proteins were identified. FIG. 6B shows the overlap of proteins between particle run separately ("P39+HX42+HX56"), particle mixing ("P39+HX42+HX56 NP Mixing"), and post-digestion mixing ("P39+HX42+HX56 Post Digestion Mixing").

Example 5

Identification of a Variety of Proteins in Particle Protein Corona

This example describes the identification of a variety of proteins in particle protein corona.

Proteins identified in the corona of 23 different particle types were compared to the cellular concentration of the identified protein.

Figure 7A:
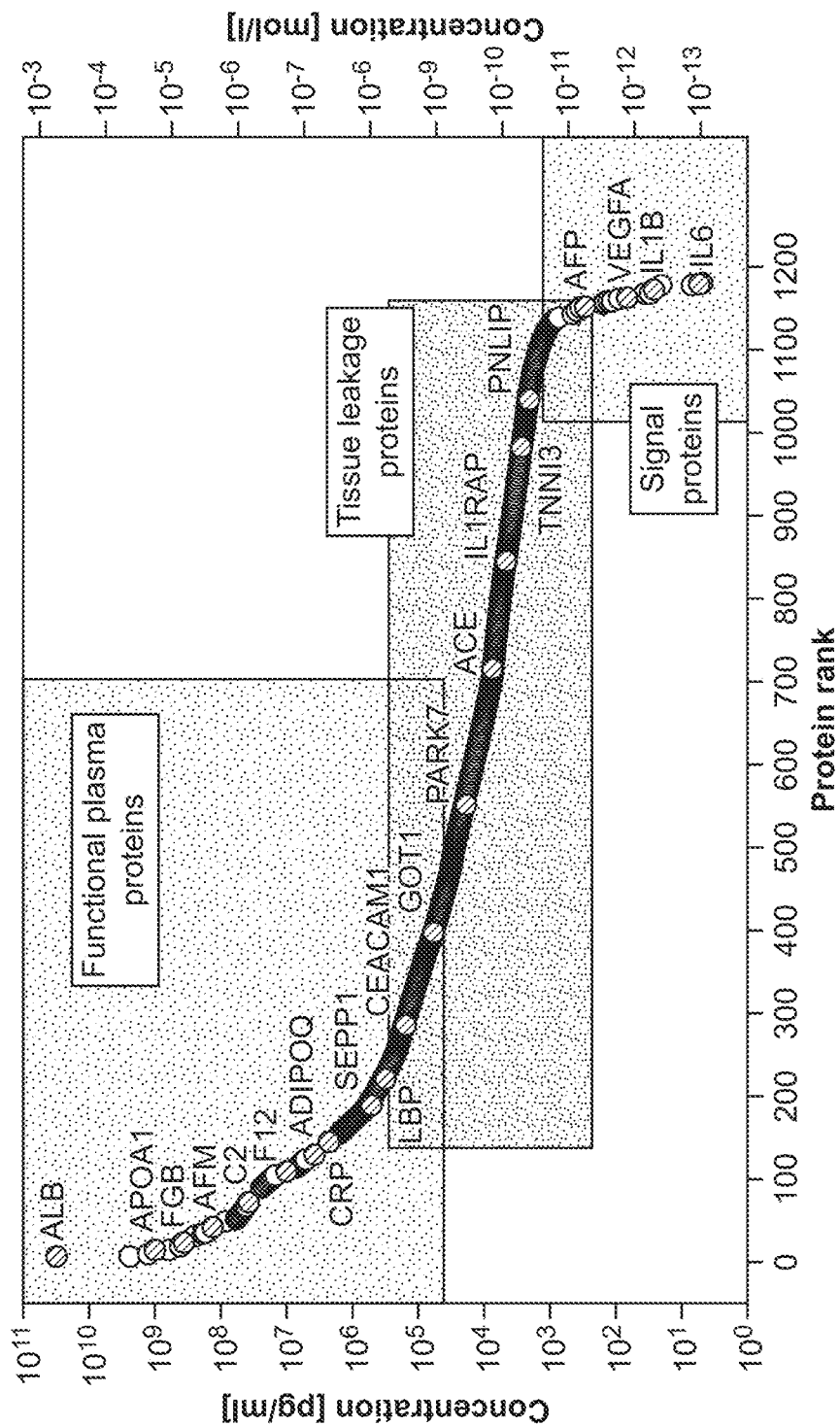
FIG. 7A shows the broad range of the proteome in biofluids. This shows that broad interrogation is difficult and slow. Proteins are ranked based on concentration of identified proteins from plasma or serum extracted from the Plasma Proteome Project as described in Geyer, et al. *Mol Syst Biol* 13, 942-15 (2017), which is incorporated herein by reference in its entirety.
Figure 7B:
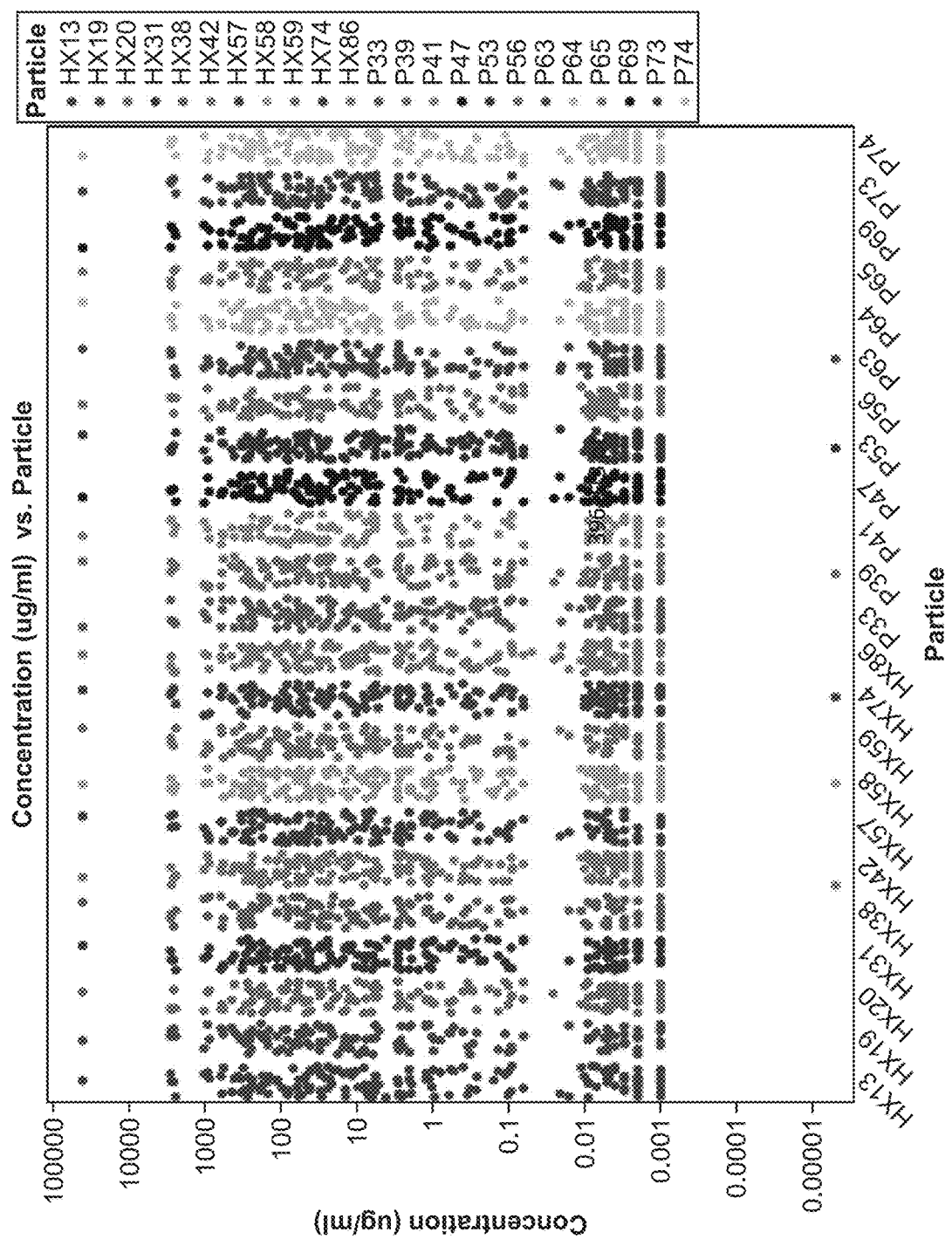
FIG. 7B shows the particle biosensors of the present disclosure (listed on the X-axis label and in a legend to the right of FIG. 7B) are able to interrogate the proteome with depth, breadth, and efficiency. Each point represents a protein identified in a corona of the corresponding particle and the plasma concentration of that protein as found in literature. Proteins can be identified at a wide range of concentrations in the protein corona of a number of different particle types. The particle biosensors rapidly interrogate the proteome across its wide dynamic range (e.g., by assaying proteins present at concentrations at about 0.001 ug/ml up to almost $10^5$ μg/ml).

FIG. 7A shows the broad range of the proteome in biofluids. This shows that broad interrogation is difficult and slow. Proteins are ranked based on concentration of identified proteins from plasma or serum extracted from the Plasma Proteome Project as described in Geyer, et al. *Mol Syst Biol* 13, 942-15 (2017), which is incorporated herein by reference in its entirety. FIG. 7B shows the particle biosensors of the present disclosure (listed on the X-axis label and in a legend to the right of FIG. 7B) are able to interrogate the proteome with depth, breadth, and efficiency. Each point represents a protein identified in a corona of the corresponding particle and the plasma concentration of that protein as found in literature. Proteins can be identified at a wide range of concentrations in the protein corona of a number of different particle types. The particle biosensors rapidly interrogate the proteome across its wide dynamic range (e.g., by assaying proteins present at concentrations at about 0.001 ug/ml up to almost $10^5$ μg/ml).

Example 6

Procedure for Particle-Based Serial Interrogation

This example describes a procedure for particle-based serial interrogation.

Plasma was interrogated with various particles at the first step, and serially interrogated with a new or same particle to further look at subtle changes of proteins-particle and/or protein-protein interactions. An example of a workflow for such serial interrogation is provided in TABLE 2. Particle types can be changed depending on experimental design.

TABLE 2

Example of sequence for sample depletion using particles

| Step | Source of proteins | Particle (NP) |
|---|---|---|
| 1 | Diluted plasma | NP1 |
| 2 | Plasma interrogated by NP1 | NP1 |
| 3 | Plasma interrogated by NP1-NP1 | NP1 |
| 4 | Plasma interrogated by NP1-NP1-NP-1 | NP2 |

Figure 9:
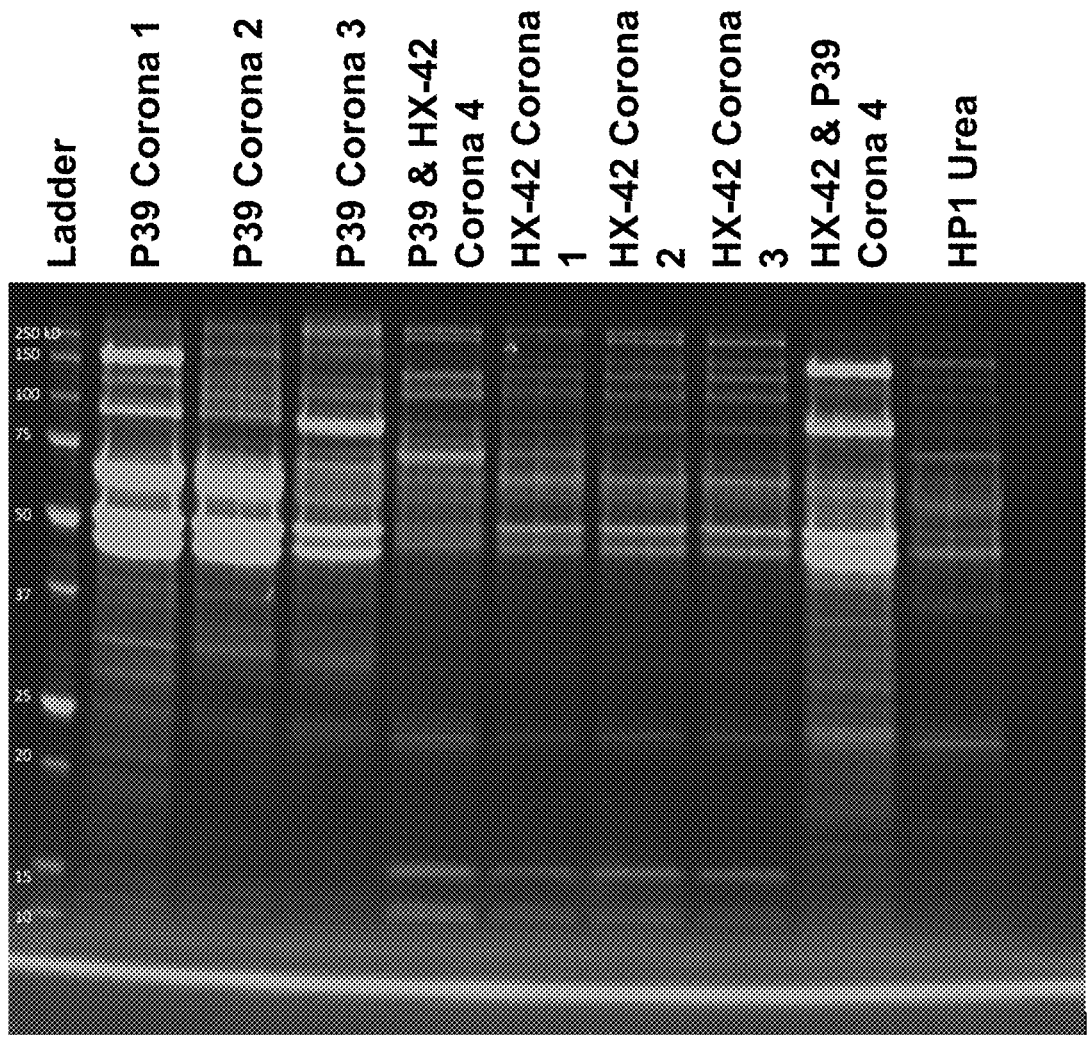
FIG. 9 shows a gel of a plasma sample that has been serially interrogated with particles. The sample was interrogated with P39 particles, the particles were extracted, and the resulting corona were run on the gel (P39 Corona 1). The supernatant was interrogated with P39 particles a second time and a third time, the particles were extracted each time, and the resulting corona were run on the gel (P39 Corona 2 and P39 Corona 3). The supernatant was then interrogated with HX-42 particles, the particles were extracted, and the resulting corona were run on the gel (P39 and HX-42 Corona 4). Separately, the sample was interrogated with HX-42 particles, the particles were extracted, and the resulting corona were run on the gel (HX-42 Corona 1). The supernatant was interrogated with HX-42 particles a second time and a third time, the particles were extracted each time, and the resulting corona were run on the gel (HX-42 Corona 2 and HX-42 Corona 3). The supernatant was then interrogated with P39 particles, the particles were extracted, and the resulting corona were run on the gel (HX-42 and P39 Corona 4). Separated particles were treated with 8M urea to release proteins from the particles to be run on the gel. Plasma denatured with 8M Urea (HP1 Urea) was run as a control.

FIG. 9 shows a gel of a plasma sample that has been serially interrogated with particles. The sample was interrogated with P39 particles, the particles were extracted, and the resulting corona were run on the gel (P39 Corona 1). The supernatant was interrogated with P39 particles a second time and a third time, the particles were extracted each time, and the resulting corona were run on the gel (P39 Corona 2 and P39 Corona 3). The supernatant was then interrogated with HX-42 particles, the particles were extracted, and the resulting corona were run on the gel (P39 and HX-42 Corona 4). Separately, the sample was interrogated with HX-42 particles, the particles were extracted, and the resulting corona were run on the gel (HX-42 Corona 1). The supernatant was interrogated with HX-42 particles a second time and a third time, the particles were extracted each time, and the resulting corona were run on the gel (HX-42 Corona 2 and HX-42 Corona 3). The supernatant was then interrogated with P39 particles, the particles were extracted, and the resulting corona were run on the gel (HX-42 and P39 Corona 4). Separated particles were treated with 8M urea to release proteins from the particles to be run on the gel. Plasma denatured with 8M Urea (HP1 Urea) was run as a control.

As shown in FIG. 9, the multiple steps allow for the analysis of more diverse proteins once the abundant proteins are first removed. Different coronas were created during serial interrogation. Change of protein abundance on protein corona was observed even with high abundance proteins in plasma samples.

Example 7

Depletion and Serial Interrogation Assay

This example describes a depletion assay followed by serial incubation and assaying with particles.

For depletion, the PureProteome™ Human Albumin/Immunoglobulin depletion kit from EMD Millipore Sigma was used. The original buffer of the beads was removed, the beads were washed twice with TE, and 4× diluted plasma was added and vortexed. Then, the beads and plasma were incubated at about room temperature with rotation for about 1 hour. The supernatant was removed.

In a second assay, plasma samples were depleted using magnetic beads against albumin and immunoglobulin (Ig). Depleted plasma was depleted using a series of two HPLC columns to (1) deplete most abundant proteins and (2) to deplete moderate abundance proteins. Depleted and undepleted samples were interrogated with particles to form protein corona.

Figure 10:
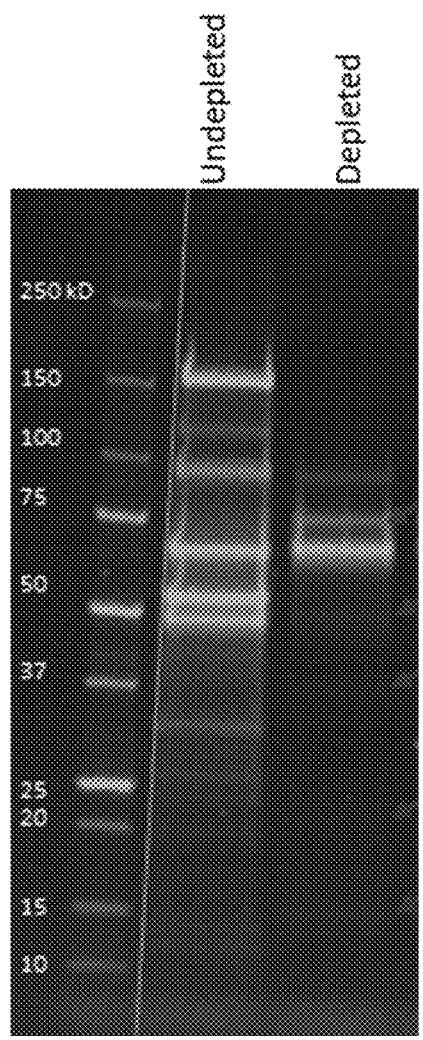
FIG. 10 shows that protein corona derived from undepleted and depleted plasma had different proteins bound to particles based on gel image. Undepleted or depleted plasma samples were interrogated with P39 particles, and the protein corona were assayed. Red arrows indicate proteins (exemplified by bands) which differ in protein coronas derived from undepleted vs. depleted plasma samples. Particles were treated with 8M urea to release proteins from the particles to be run on the gel.

FIG. 10 shows that protein corona derived from undepleted and depleted plasma had different proteins bound to particles based on gel image. Undepleted or depleted plasma samples were interrogated with P39 particles, and the protein corona were assayed. Red arrows indicate proteins (exemplified by bands) which differ in protein coronas derived from undepleted vs. depleted plasma samples. Particles were treated with 8M urea to release proteins from the particles to be run on the gel.

Example 8

Procedure for Depletion with Spin Columns

This example describes a procedure for depletion with spin columns.

For depletion with spin columns, the depletion spin column is equilibrated to about room temperature, 100 µL of sample is directly added to the resin slurry in the column, the mixture is incubated in the column with gentle end-over-end mixing for about 10 minutes at about room temperature, and then the mixture is centrifuged at 1,000×g for about 2 minutes. Then, the flow through is collected.

Example 9

Protein Depletion and Corona Analysis of Synovial Fluid Samples

This example describes protein depletion and coronal analysis of synovial fluid samples.

Synovial fluid (SF) samples were incubated with particles to form particle protein corona. 100 µL of sample was incubated with 100 µL of particles for 1 hour. Following incubation, particles were pelleted using a magnet. Supernatants were removed using a pipette. The pellet was washed with PBS and re-pelleted three times. Proteins bound to the particles were digested with a trypsin digestion kit (iST 96X, PreOmics, Germany) according to the protocols provided in the kit and summarized in EXAMPLE 1. Peptide concentrations were measured by a quantitative colorimetric peptide assay kit from Thermo Fisher Scientific. Mass spectrometry was performed on the eluted peptides following the method described in EXAMPLE 1.

Figure 11:
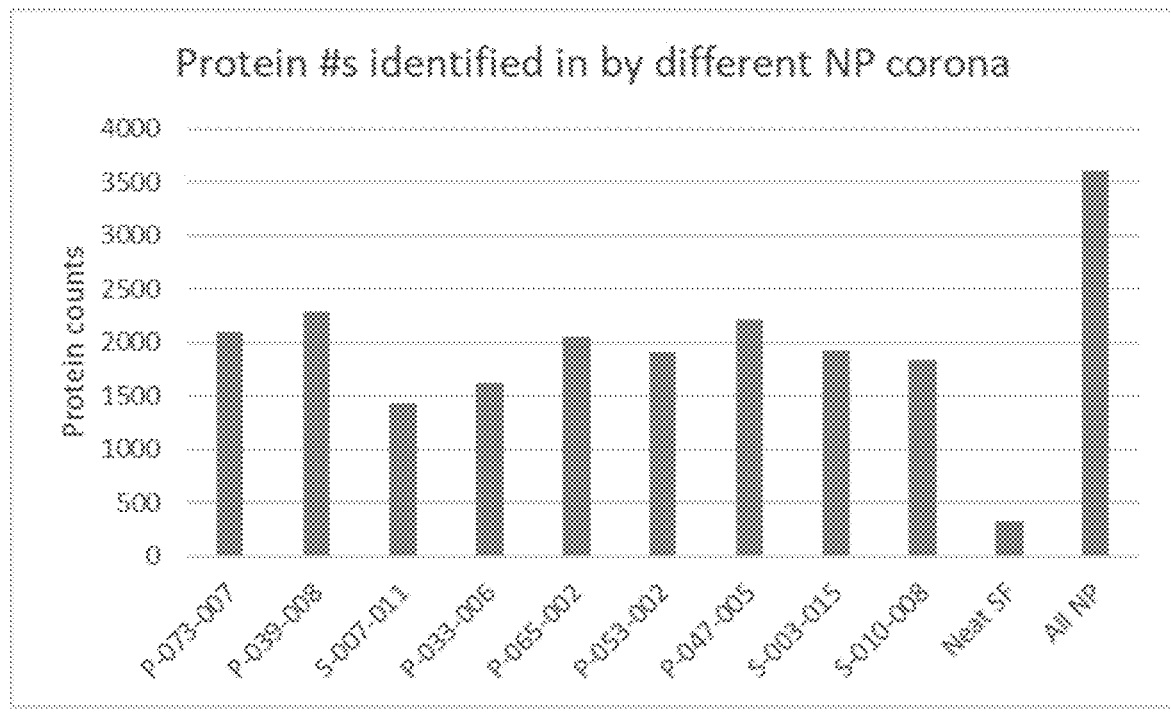
FIG. 11 shows corona analysis experimental results from a single synovial fluid (SF) sample assayed with nine different particles. Specific particle treatments are indicated on the x-axis. A corona analysis ("Proteograph") assay was also run with synovial fluid that had not been contacted to particles ("neat SF") as a control. The number of unique proteins identified by all nine particles was also plotted ("All NP").

FIG. 11 shows corona analysis experimental results from a single synovial fluid (SF) sample assayed with nine different particles. Specific particle treatments are indicated on the x-axis. A corona analysis ("Proteograph") assay was also run with synovial fluid that had not been contacted to particles ("neat SF") as a control. The number of unique proteins identified by all nine particles was also plotted ("All NP").

As indicated by bar height, greater than 1000 identified proteins were detected for each particle-containing corona sample. In contrast, only 334 identified proteins were detected in the neat SF negative control. When the corona analysis results from each of the 9 particles were combined, over 3500 proteins were detected ("All NP").

Example 10

Protein Depletion and Corona Analysis of Tissue and Fine Needle Aspiration Samples This example describes protein depletion and coronal analysis of tissue and fine needle aspiration samples. Protein corona were prepared and analyzed for tissue samples and fine needle aspiration (FNA) samples as described in EXAMPLE 9 with respect to synovial fluid samples.

Figure 12:
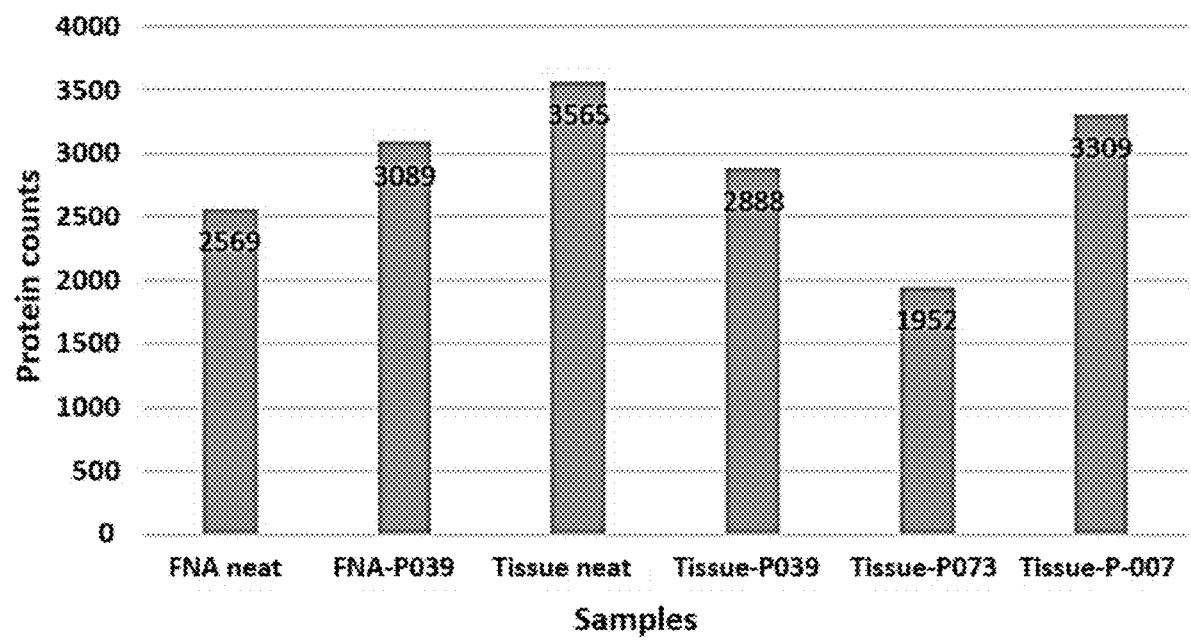
FIG. 12 shows corona analysis experimental results for two types of samples assayed with particles. Fine needle aspiration (FNA) samples were prepared using 1 mL syringes with 25 G needles. FNA samples were lysed with Mammalian Protein Extraction Reagent (M-PER) and buffer exchanged into TE buffer before corona analysis. Due to the small mass provided by FNA, a single particle (P-039) was used to assess the FNA-corona. Tissue samples were also lysed with M-PER and buffer exchanged to TE buffer before corona analysis. 100 µL of tissue samples were incubated with 100 µL of particles to form tissue-particle corona. Peptides were run on an Orbitrap Lumos instrument with 1 hour liquid chromatography (LC) gradient. Corona analysis was also performed on a neat tissue sample that had not been contacted to a particle ("Tissue neat") as a control.

FIG. 12 shows corona analysis experimental results for two types of samples assayed with particles. Fine needle aspiration (FNA) samples were prepared using 1 mL syringes with 25 G needles. FNA samples were lysed with Mammalian Protein Extraction Reagent (M-PER) and buffer exchanged into TE buffer before corona analysis. Due to the small mass provided by FNA, a single particle (P-039) was used to assess the FNA-corona. Tissue samples were also lysed with M-PER and buffer exchanged to TE buffer before corona analysis. 100 µL of tissue samples were incubated with 100 µL of particles to form tissue-particle corona. Peptides were run on an Orbitrap Lumos instrument with 1 hour liquid chromatography (LC) gradient. Corona analysis was also performed on a neat tissue sample that had not been contacted to a particle ("Tissue neat") as a control.

Example 11

Protein Corona Analysis and Protein Depletion

This example describes protein corona analysis and protein depletion. Protein corona were prepared and analyzed for matched plasma samples and serum samples as described in EXAMPLE 9 with respect to synovial fluid samples. Depleted plasma was depleted using a series of two HPLC columns to (1) deplete most abundant proteins and (2) to deplete moderate abundance proteins.

Figure 13:
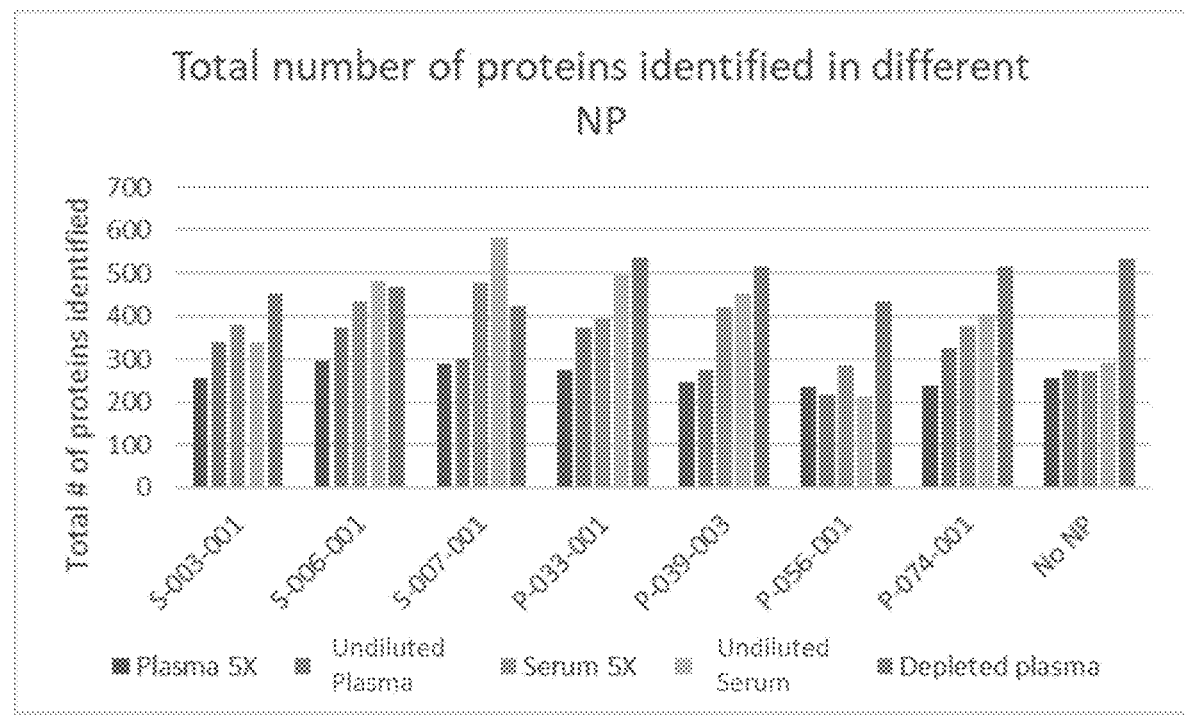
FIG. 13 shows corona analysis experimental results from a matched pair of plasma and serum samples assayed with particles. Both plasma and serum in 5× dilutions ("Plasma 5X" and "Serum 5X," respectively) and undiluted plasma and serum ("Undiluted Plasma" and "Undiluted Serum," respectively) were tested. Bars for each particle treatment correspond to, from left to right, Plasma 5X, Plasma neat, Serum 5X, Serum Neat, and Depleted plasma. Additionally, an aliquot of the plasma sample was deeply depleted with IgY14 and Supermix columns and tested with neat and diluted samples. Each sample was assayed against each of seven particles in separate wells. A set of samples without particles ("No NP") were also tested as controls.

FIG. 13 shows corona analysis experimental results from a matched pair of plasma and serum samples assayed with particles. Both plasma and serum in 5× dilutions ("Plasma 5×" and "Serum 5×," respectively) and undiluted plasma and serum ("Undiluted Plasma" and "Undiluted Serum," respectively) were tested. Bars for each particle treatment correspond to, from left to right, Plasma 5×, Plasma neat, Serum 5×, Serum Neat, and Depleted plasma. Additionally, an aliquot of the plasma sample was deeply depleted with IgY14 and Supermix columns and tested with neat and diluted samples. Each sample was assayed against each of seven particles in separate wells. A set of samples without particles ("No NP") were also tested as controls.

The experiment demonstrated that the greatest number of proteins were identified in depleted plasma samples for most particle treatments.

Example 12

Protein Corona Analysis of Samples Collected in Blood Collection Tubes Comprising a Nucleic Acid Stabilizing Agent This example describes protein corona analysis of samples collected in blood collection tubes comprising a nucleic acid stabilizing agent.

Figure 33:
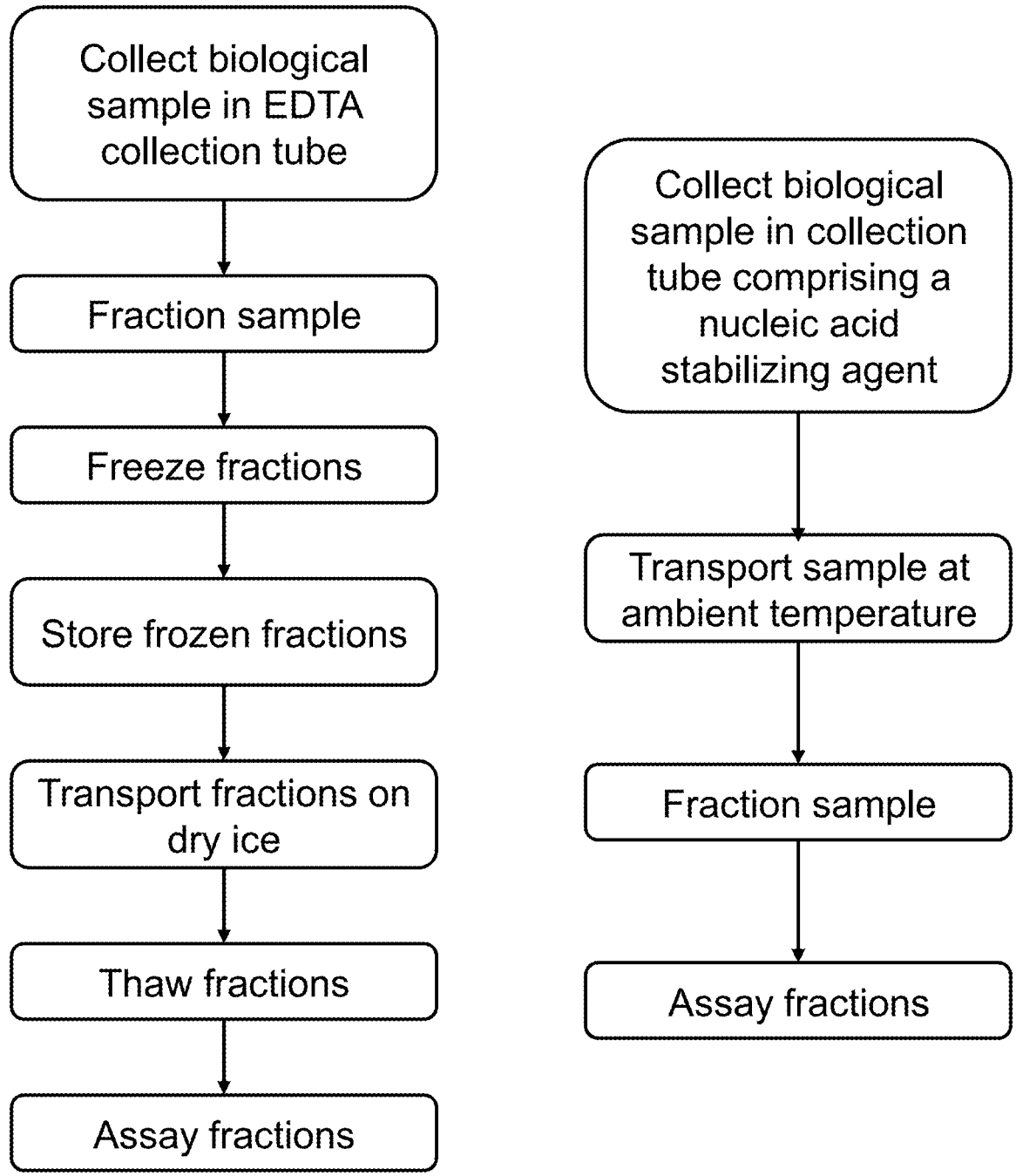
FIG. 33 illustrates examples of methods of processing biological sample collected in EDTA sample collection tubes (left) or sample collection tube comprising a nucleic acid stabilizing agent (right).

Blood samples from three patients (#1, #2, and #3) were collected in EDTA blood collection tubes (BCTs, BD Biosciences Product #366643) were centrifuged and frozen within one hour of sample collection. Blood samples from the same three patients were also collected in Streck BCTs were stored at room temperature overnight with gentle rocking, after which plasma was processed and frozen. Streck sample treatment was designed to simulate overnight shipping of a sample at ambient temperature. FIG. 33 summarizes the methods of processing biological sample collected in EDTA sample collection tubes (left) or Streck sample collection tubes (right).

Figure 14:
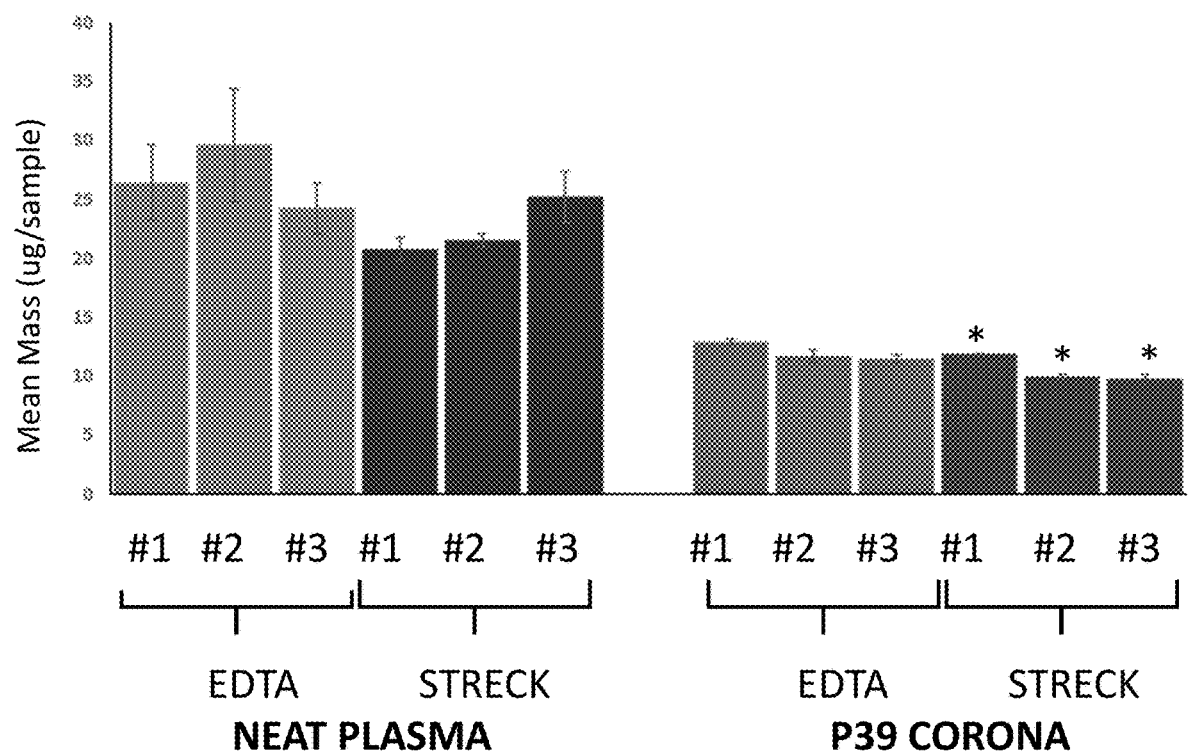
FIG. 14 shows results of experiments comparing blood samples collected in EDTA blood collection tubes ("EDTA") to samples collected in Streck blood collection tubes ("STRECK"). Streck sample treatment was designed to simulate overnight shipping of a sample at ambient temperature. Analysis of recovered peptide mass was performed on blood samples collected from three patients (#1, #2, and #3). Each sample was assayed with particles ("P39 CORONA") and without particles ("NEAT PLASMA"). Bar height indicates the mean protein mass recovered in each sample. No difference in peptide yield was observed between EDTA and STRECK plasma corona.

FIG. 14 shows results of experiments comparing blood samples collected in EDTA blood collection tubes ("EDTA") to samples collected in Streck blood collection tubes ("STRECK"). Analysis of recovered peptide mass was performed on blood samples collected from three patients (#1, #2, and #3). Each sample was assayed with particles ("P39 CORONA") and without particles ("NEAT PLASMA"). Bar height indicates the mean protein mass recovered in each sample. No different in peptide yield was observed between EDTA and STRECK plasma corona. Both EDTA and Streck plasma samples that had not been contacted to particles yielded similar peptide mass. Streck plasma samples assayed with particles also yielded similar peptide mass to EDTA plasma samples assayed with particles given the typical coefficient of variation of peptide quantification observed (about 10% to 15%).

Figure 15:
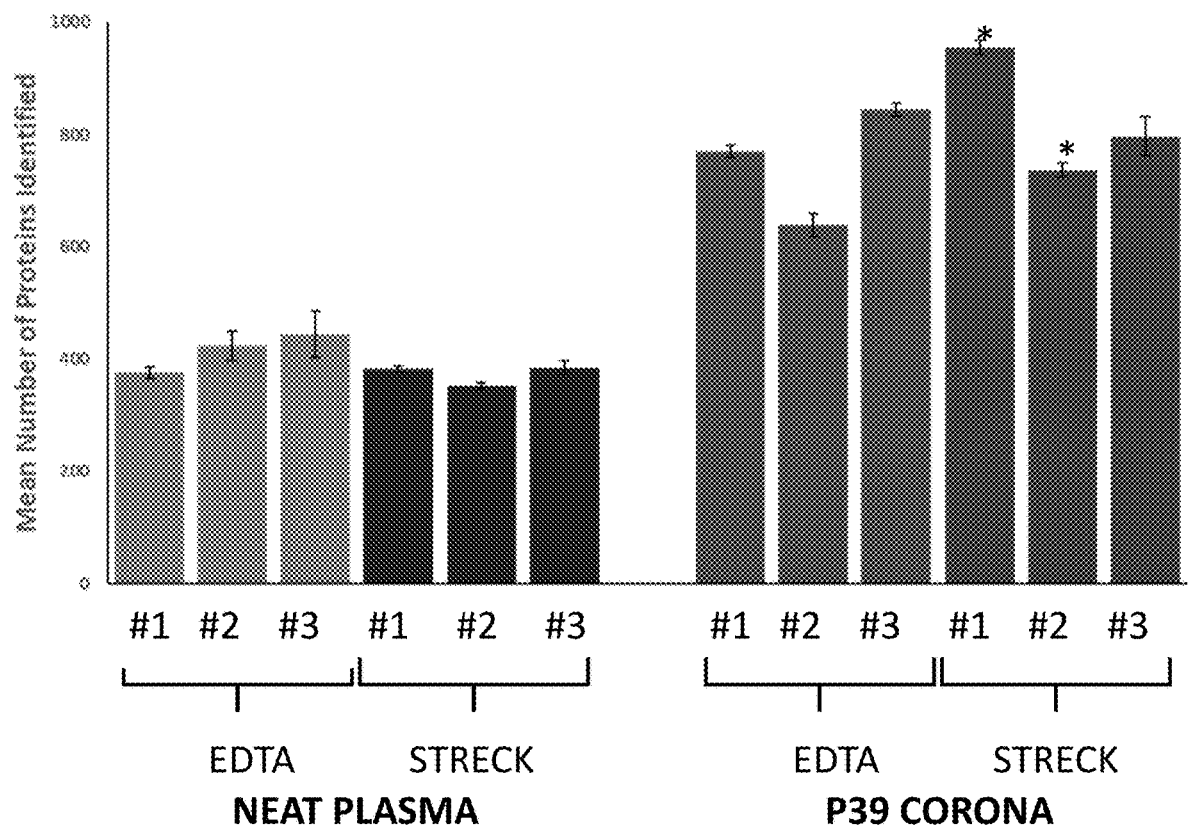
FIG. 15 shows mean number of proteins identified by corona analysis experiments performed on the samples assayed in FIG. 14. Bar height indicates the mean number of proteins identified in each sample. No difference in number of identified proteins was observed between EDTA and STRECK plasma corona.

The number of proteins, peptides, and features present in each of the samples collected in either an EDTA BCT or a Streck BCT was then determined using a protein coronal analysis assay. FIG. 15 shows mean number of proteins identified by corona analysis experiments performed on the samples. Bar height indicates the mean number of proteins identified in each sample. No difference in number of identified proteins was observed between EDTA and STRECK plasma corona. Similar numbers of proteins were identified in both EDTA and Streck plasma samples that had not been contacted to particles. More proteins were identified in Streck plasma samples assayed with particles as compared to EDTA plasma samples assayed with particles.

Figure 16:
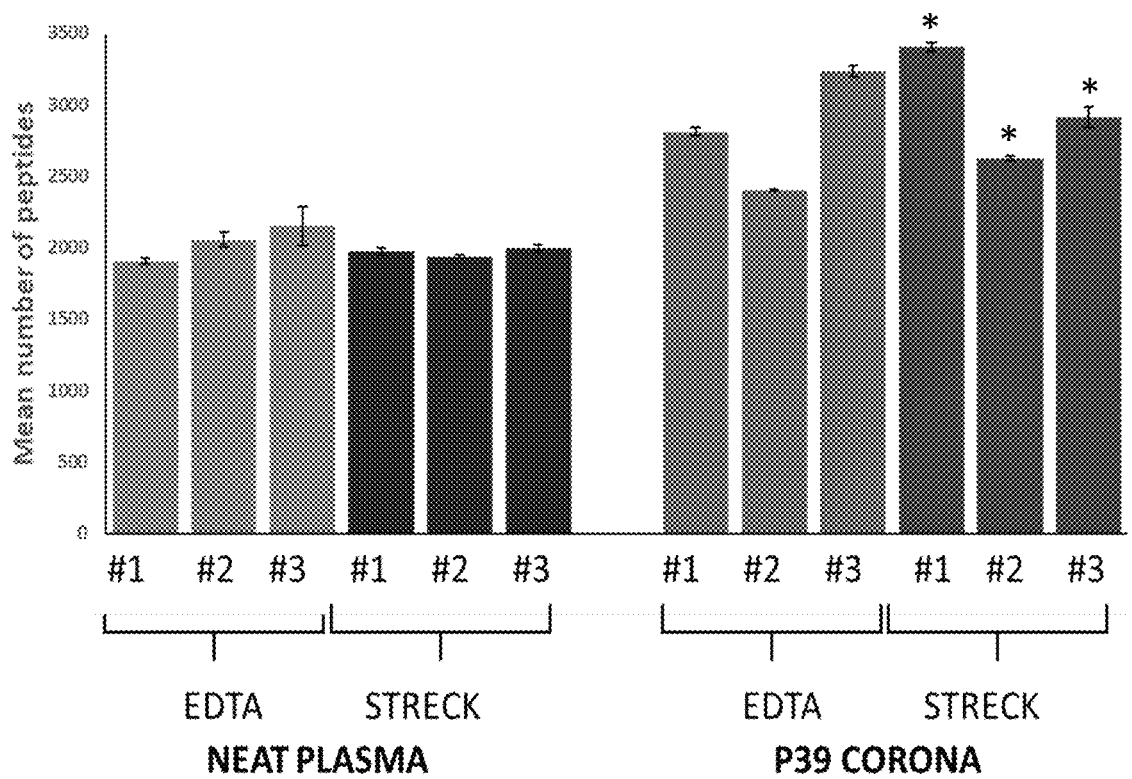
FIG. 16 shows mean number of peptides detected by corona analysis experiments performed on the samples assayed in FIG. 14-FIG. 15. Bar height indicates the mean number of peptides detected in each sample. No difference in number of identified peptides was observed between EDTA and STRECK plasma corona.

FIG. 16 shows mean number of peptides detected by corona analysis experiments performed on the samples. Bar height indicates the mean number of peptides detected in each sample. No difference in number of identified peptides was observed between EDTA and STRECK plasma corona. More peptides were detected in Streck plasma samples assayed with particles as compared to EDTA plasma samples assayed with particles.

Figure 17:
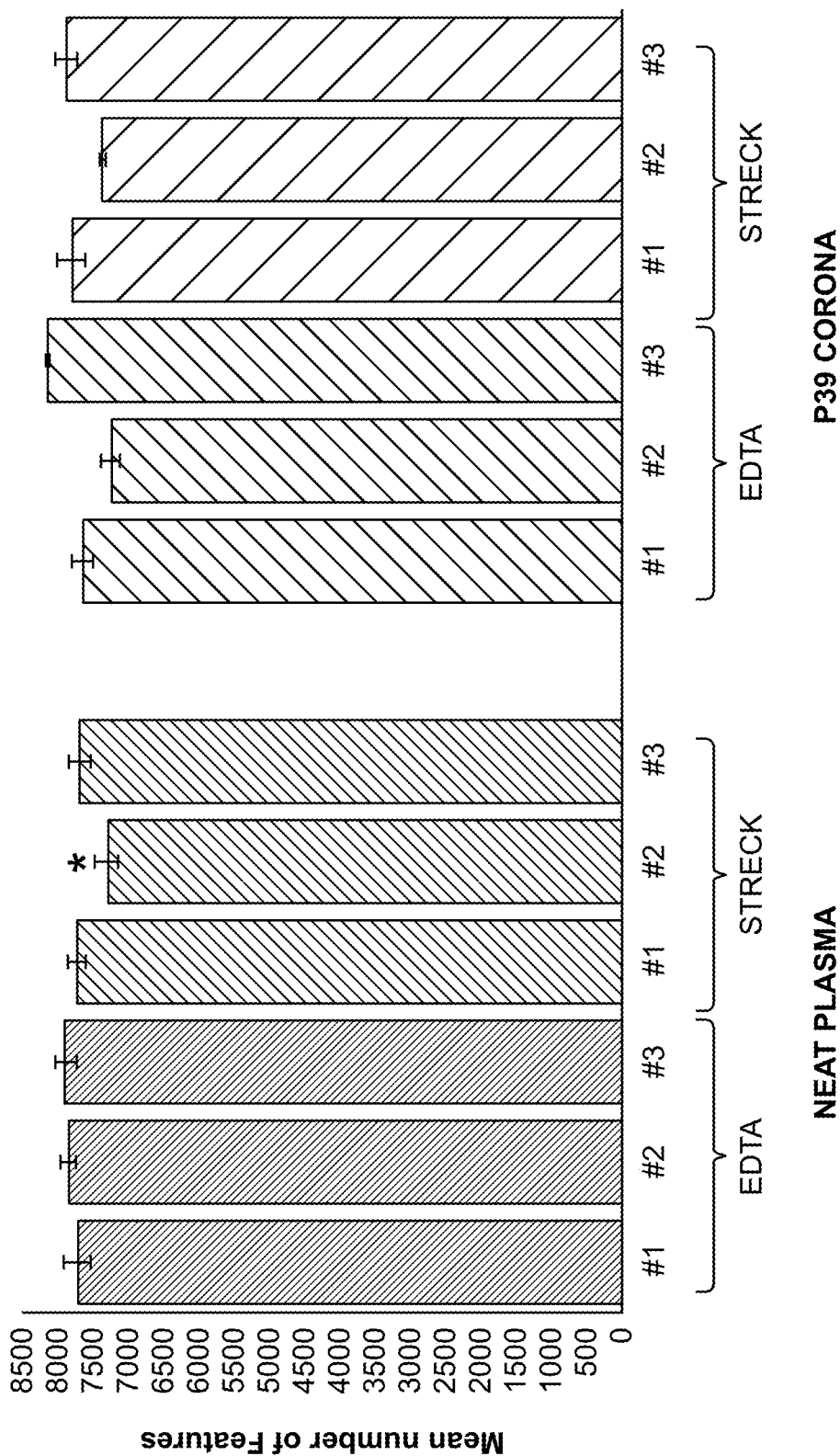
FIG. 17 shows mean number of features identified by corona analysis experiments performed on the samples assayed in FIG. 14-FIG. 16. Bar height indicates the mean number of features identified in each sample. No difference in number of features was observed between EDTA and STRECK plasma corona.

FIG. 17 shows mean number of features identified by corona analysis experiments performed on the samples. Bar height indicates the mean number of features identified in each sample. No difference in number of features was observed between EDTA and STRECK plasma corona. A similar number of features was detected in Streck plasma samples assayed with particles as compared to EDTA plasma samples assayed with particles.

Figure 18:
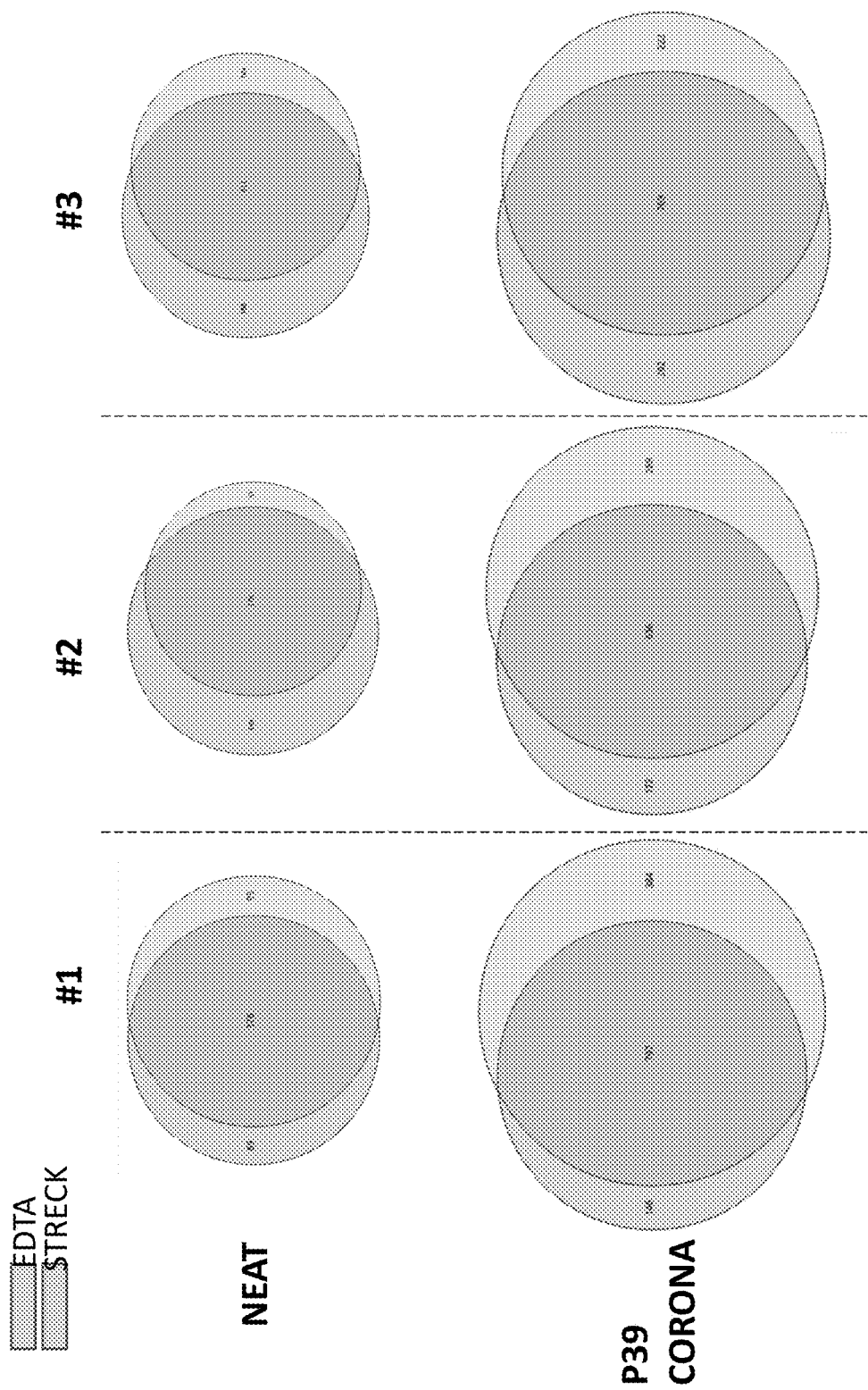
FIG. 18 shows a summary of the experimental results presented in FIG. 14-FIG. 17. Circles represent the proteins identified in each sample under the indicated condition. Overlapping regions of the circles indicate proteins that were identified in both the corresponding EDTA sample and Streck sample. Non-overlapping regions of the circles indicate proteins that were identified in only the EDTA sample or only the Streck sample assayed under corresponding conditions. Circles positioned toward the left in each pair represent EDTA samples, and circles positioned toward the right in each pair represent Streck samples.

FIG. 18 shows a summary of the experimental results presented in FIG. 14-FIG. 17. Circles represent the proteins identified in each sample under the indicated condition. Overlapping regions of the circles indicate proteins that were identified in both the corresponding EDTA sample and Streck sample. Non-overlapping regions of the circles indicate proteins that were identified in only the EDTA sample or only the Streck sample assayed under corresponding conditions. Circles positioned toward the left in each pair represent EDTA samples, and circles positioned toward the right in each pair represent Streck samples. Each patient sample (#1, #2, and #3) resulted in similar numbers of common proteins between the Streck samples assayed in the absence of particles and the EDTA samples assayed in the absence of particles. While similar numbers of common proteins between the Streck samples assayed with particles and the EDTA samples assayed with particles were identified in each patient sample, more unique proteins were identified in the Streck samples assayed with particles than the EDTA samples assayed with particles.

Figure 19:
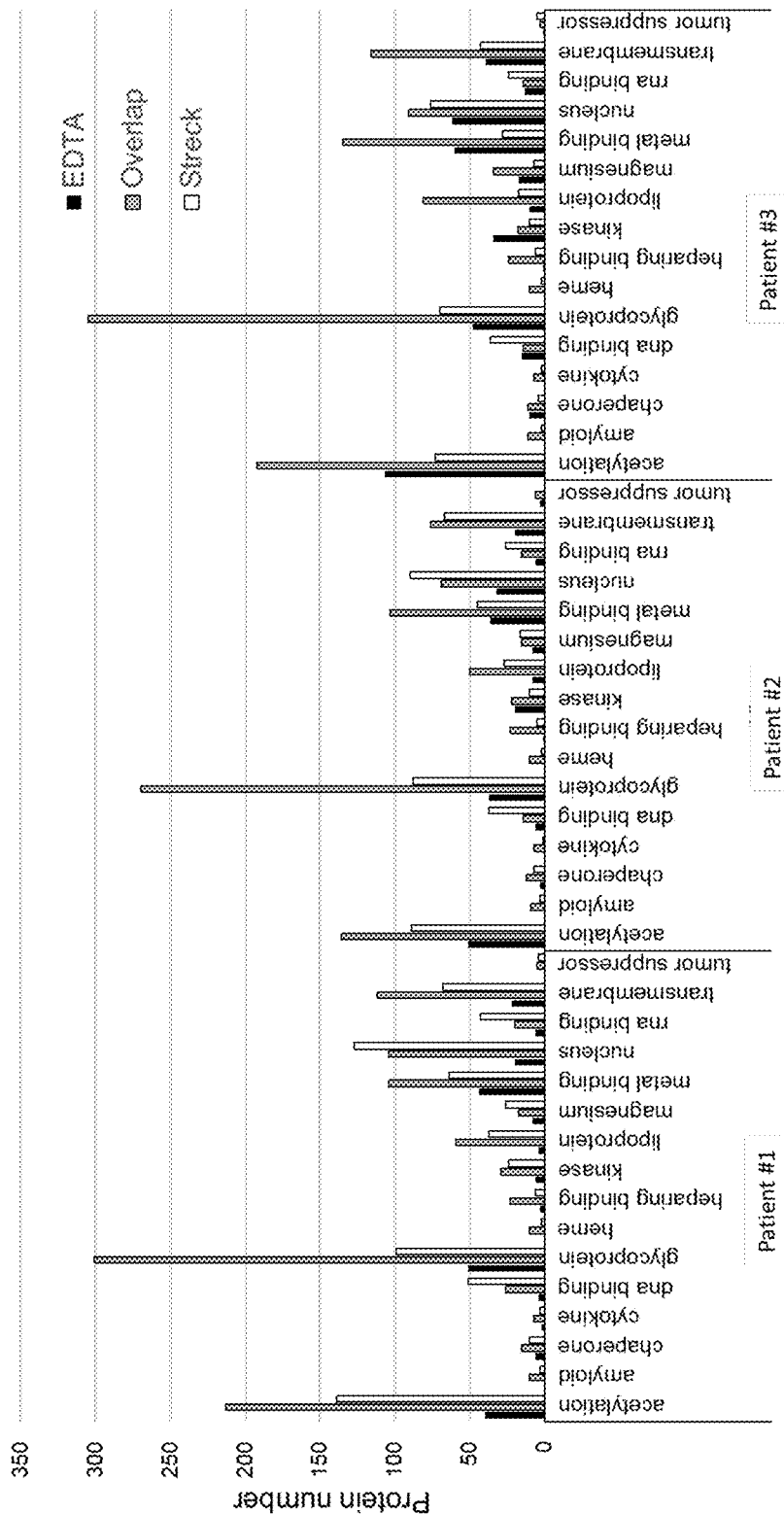
FIG. 19 shows numbers of individual proteins of selected protein types identified by corona analysis in each patient sample assayed in FIG. 14-FIG. 18. Numbers of proteins of the select protein types identified in each of the three patient samples in only Streck samples assayed with particles ("Streck") or only EDTA samples assayed with particles ("EDTA") are plotted. The number of proteins of selected protein type identified in each of the three patient samples in both Streck samples assayed with particles and EDTA samples assayed with particles ("Overlap") are also plotted.

FIG. 19 shows numbers of individual proteins of selected protein types identified by corona analysis in each patient sample. Numbers of proteins of the select protein types identified in each of the three patient samples in only Streck samples assayed with particles ("Streck") or only EDTA samples assayed with particles ("EDTA") are plotted. The number of proteins of selected protein type identified in each of the three patient samples in both Streck samples assayed with particles and EDTA samples assayed with particles ("Overlap") are also plotted. Numbers of identified glycoproteins, nuclear-related proteins, DNA-related proteins, and RNA-related proteins were the highest among the "Overlap" data which demonstrated common proteins shared by Streck samples and EDTA samples.

Figure 20:
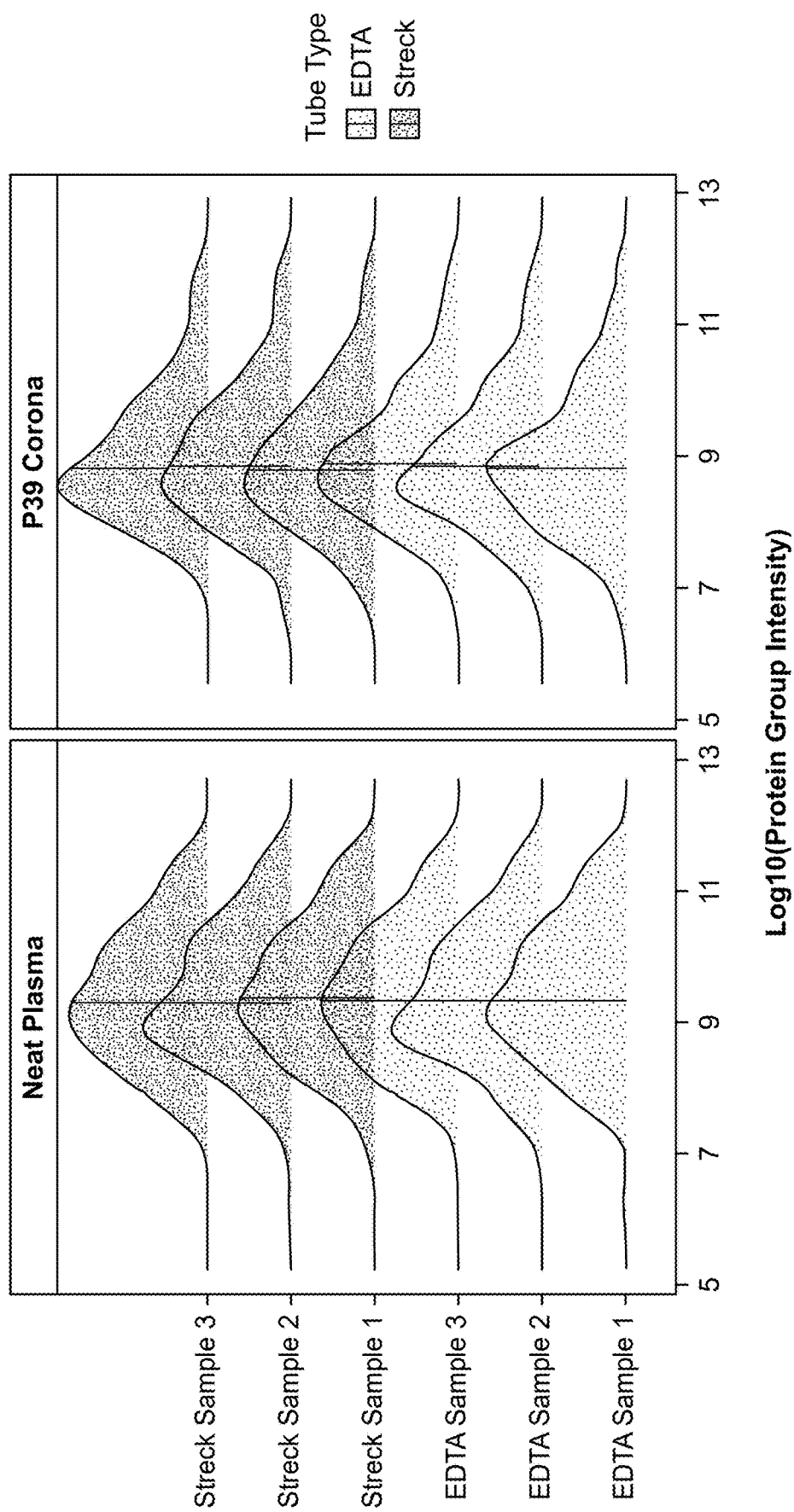
FIG. 20 shows a distribution of protein group intensity for each sample assayed in FIG. 14-FIG. 19.

FIG. 20 shows a distribution of protein group intensity for the samples plotted in FIG. 14-FIG. 19. EDTA and STRECK plasma samples showed similar peptide yields, protein counts, peptide counts, feature counts and protein categories when they were assayed with or without particles in, indicating the suitability of samples collected in sample collection tubes comprising a nucleic acid stabilizing agent in protein corona analysis assays.

Figure 21:
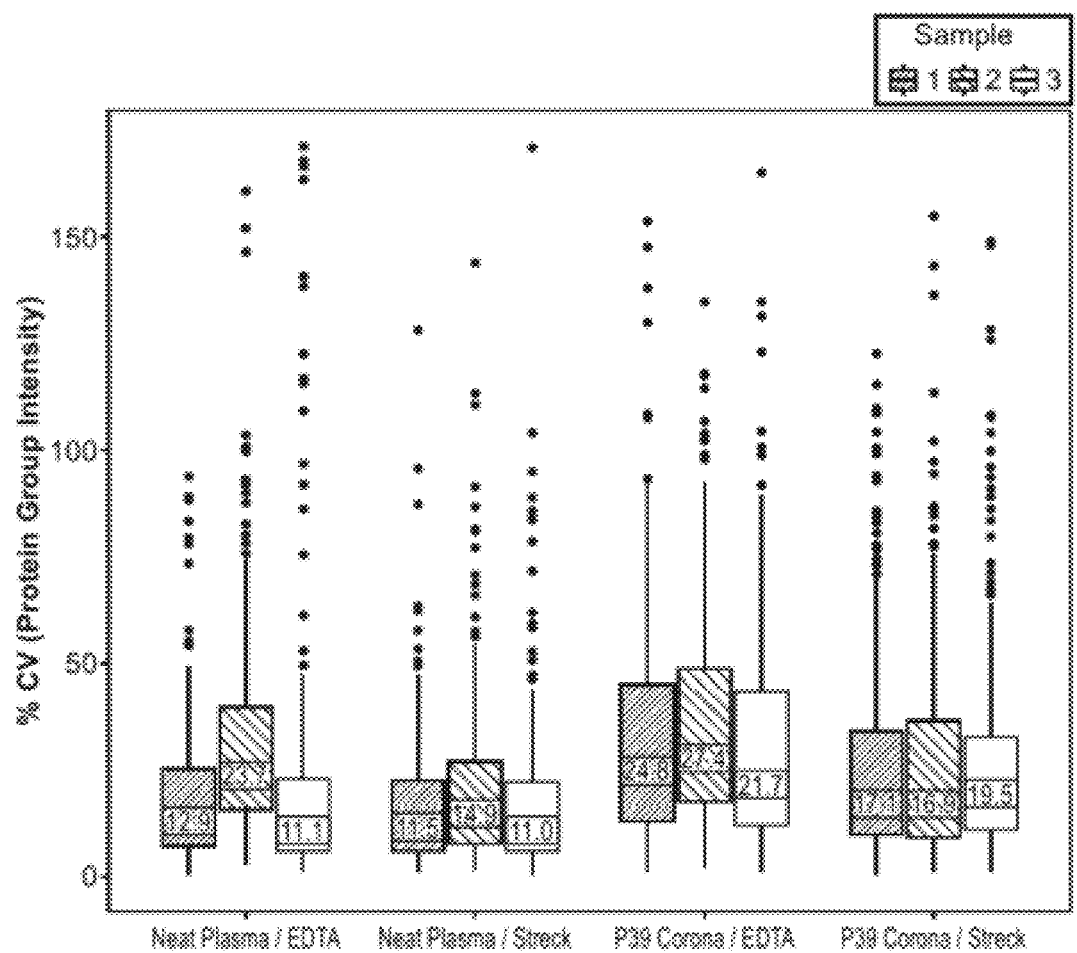
FIG. 21 shows the percent coefficient of variation (% CV) of protein group intensities for each sample assayed in FIG. 14-FIG. 20.

FIG. 21 shows the percent coefficient of variation (% CV) of protein group intensities for the samples plotted in FIG. 14-FIG. 20. EDTA and STRECK plasma samples showed similar reproducibility when they were assayed with or without particles in, indicating the suitability of samples collected in sample collection tubes comprising a nucleic acid stabilizing agent in protein corona analysis assays.

Figure 22A:
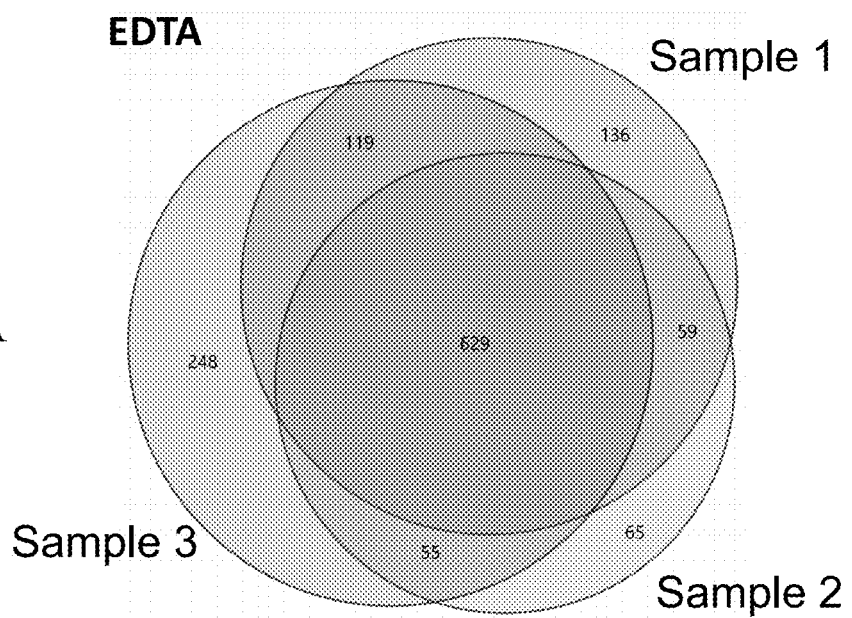
FIG. 22A and FIG. 22B show the number of common and unique proteins identified in each sample assayed in the presence of particles in FIG. 14-FIG. 21. Numbers in overlapping regions of each circle indicate proteins that were identified in each sample represented by an overlapping circle.
Figure 22B:
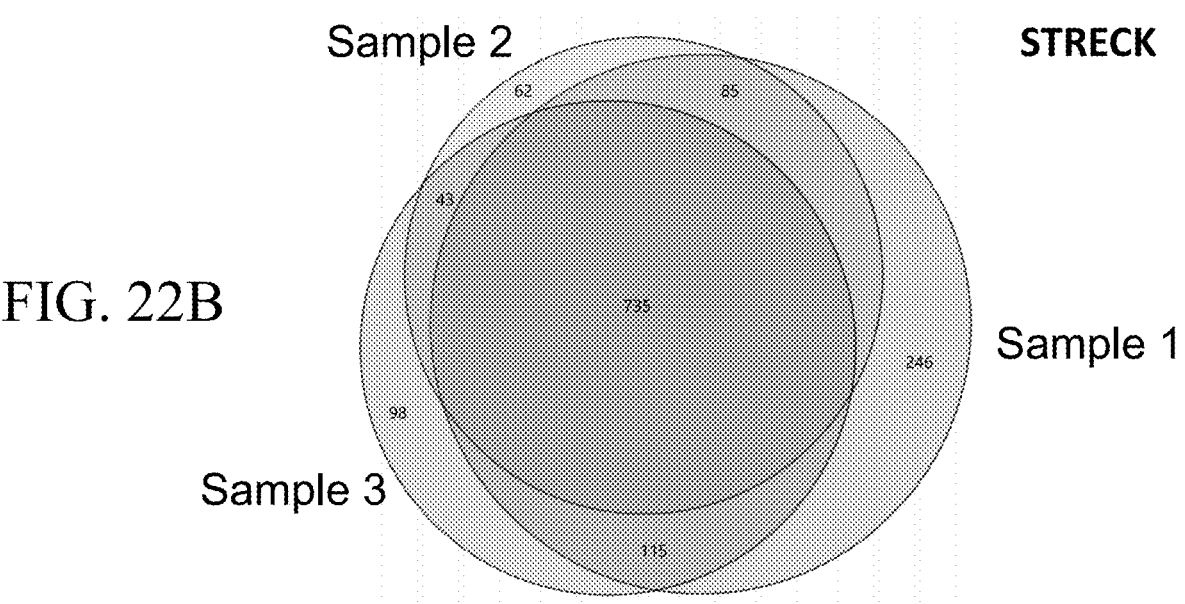

FIG. 22A and FIG. 22B show the number of common and unique proteins identified in the samples plotted in FIG. 14-FIG. 21 assayed in the presence of particles. Numbers in overlapping regions of each circle indicate proteins that were identified in each sample represented by an overlapping circle. FIG. 22A shows the number of common and unique proteins identified in each patient sample collected in EDTA blood collection tubes, and FIG. 22B shows the number of common and unique proteins identified in each patient sample collected in Streck blood collection tubes. Samples collected in Streck blood collection tubes and EDTA blood collection tubes demonstrated similar consistency among replicate samples.

Figure 23:
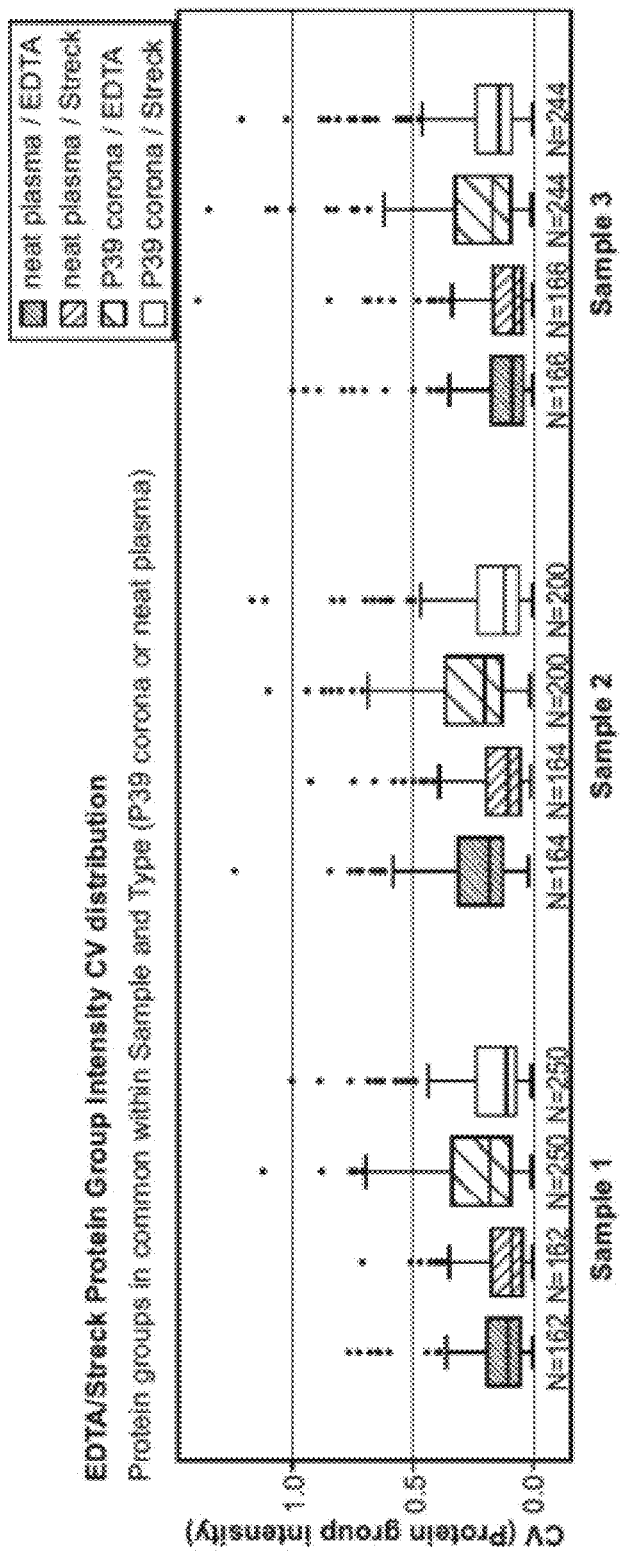
FIG. 23 shows the coefficient of variation (CV) of protein group intensities, as plotted in FIG. 21, for each sample assayed in FIG. 14-FIG. 22.

FIG. 23 shows the coefficient of variation (CV) of protein group intensities for the samples plotted in FIG. 14-FIG. 22.

Figure 24:
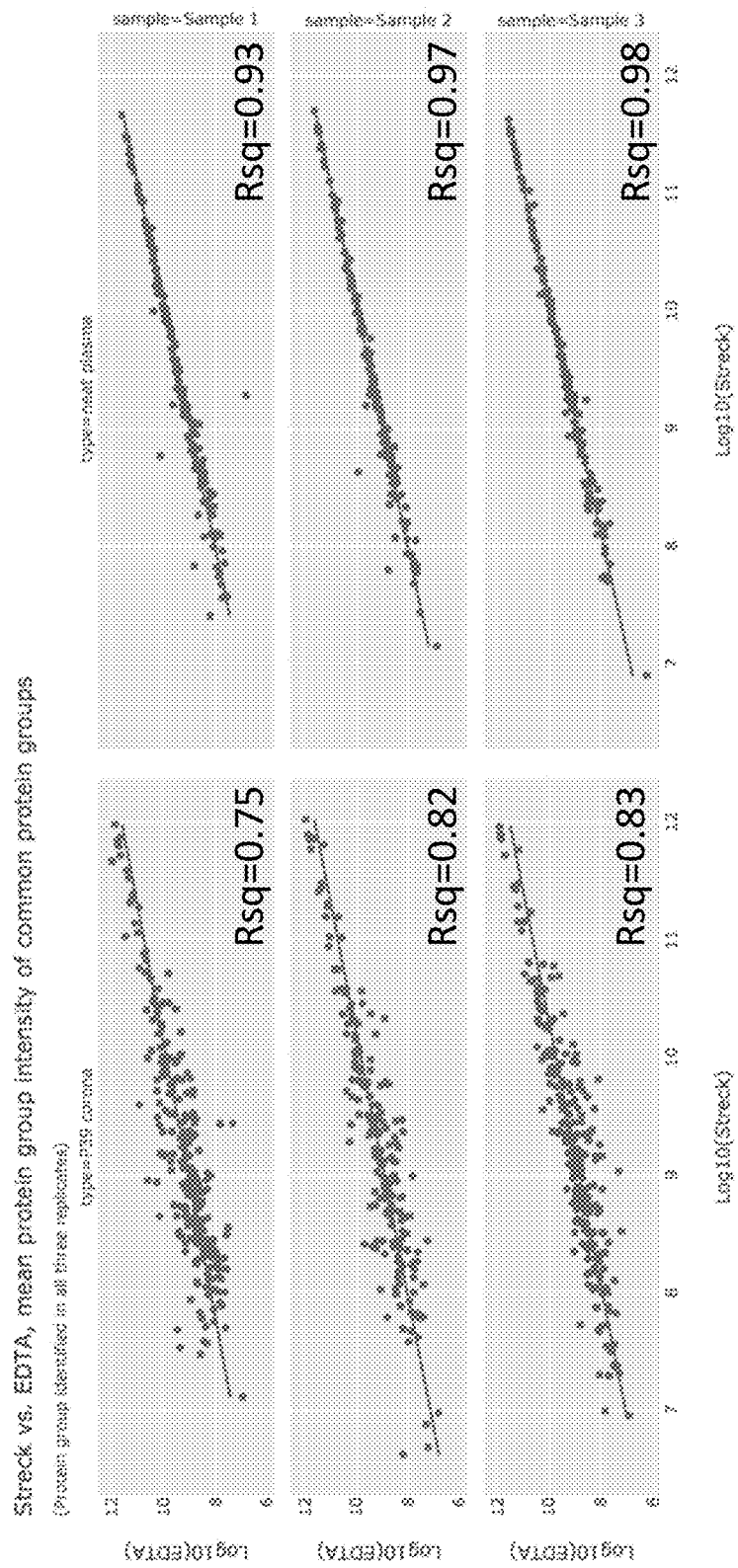
FIG. 24 shows plots of the intensities of common protein groups identified in samples collected in both Streck blood collection tubes and EDTA blood collection tubes in FIG. 14-FIG. 23. Protein group intensities of Streck samples are plotted on the x-axes. Protein group intensities of EDTA samples are plotted on the y-axes. Protein group intensities for patient samples #1 (top plots), #2 (middle plots), and #3 (bottom plots) are plotted for either samples assayed in the presence (left plots, "type=P39 corona") or absence (right plots, "type=neat plasma") of particles. $R^2$ values ("Rsq") of the linear fits are provided in the lower right corner of each plot.

FIG. 24 shows plots of the intensities of common protein groups identified in samples collected in both Streck blood collection tubes (STRECK Product #218962) and EDTA blood collection tubes and plotted in FIG. 14-FIG. 23. Protein group intensities of Streck samples are plotted on the x-axes. Protein group intensities of EDTA samples are plotted on the y-axes. Protein group intensities for patient samples #1 (top plots), #2 (middle plots), and #3 (bottom plots) are plotted for either samples assyed in the presence (left plots, "type=P39 corona") or absence (right plots, "type=neat plasma") of particles. $R^2$ values ("Rsq") of the linear fits are provided in the lower right corner of each plot. These results indicated that protein group intensity is well correlated between samples collected in EDTA blood collection tubes and Streck blood collection tubes under all tested conditions.

Figure 25A:
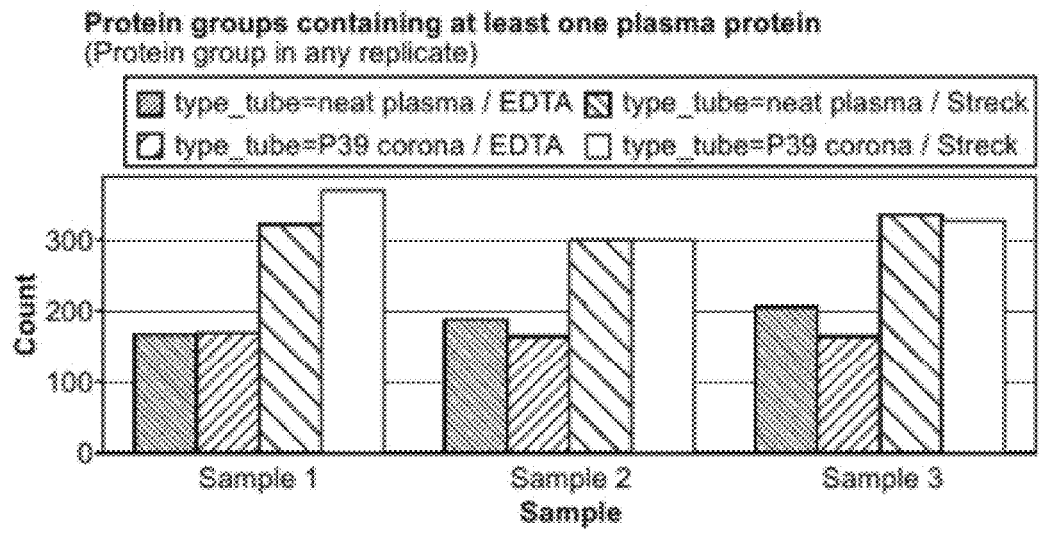
FIG. 25A and FIG. 25B show numbers of protein groups identified in samples collected in both Streck blood collection tubes and EDTA blood collection tubes in FIG. 14-FIG. 24.
Figure 25B:
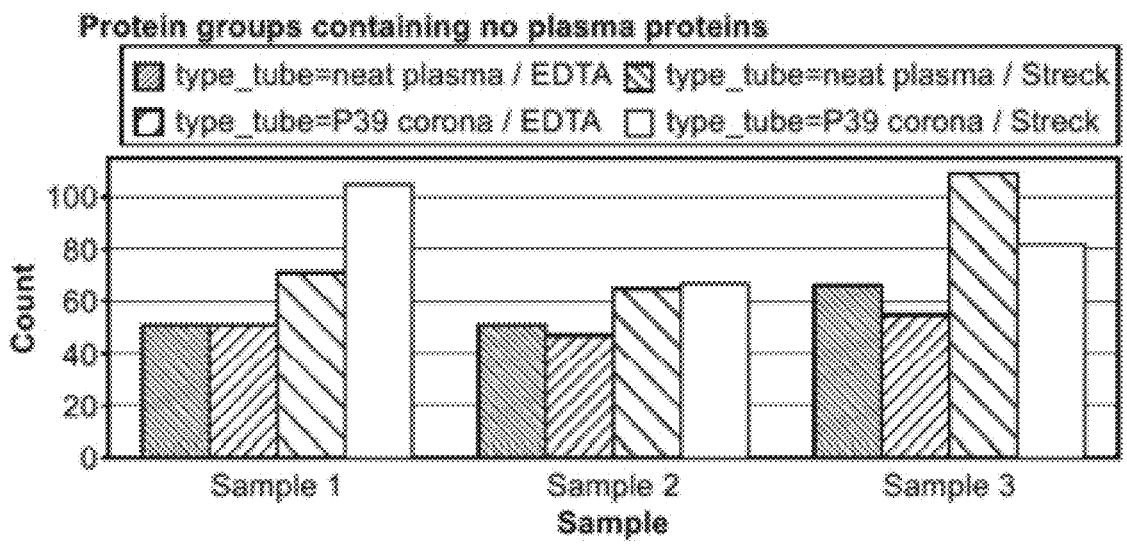

FIG. 25A and FIG. 25B show numbers of protein groups identified in the samples collected in both Streck blood collection tubes and EDTA blood collection tubes in FIG. 14-FIG. 24. FIG. 25A shows the number of protein groups containing at least one plasma protein identified in each sample. FIG. 25B shows the number of protein groups identified in each sample that do not contain at least one plasma protein identified in each sample. Classification of proteins as plasma proteins was based on the set of 5,304 plasma proteins identified by Keshishian et al. (*Mol. Cell Proteomics* 14, 2375-2393 (2015)), which is incorporated herein by reference in its entirety.

These assays indicated that protein coverage was substantially similar in corona derived from plasma collected in blood collection tubes comprising a nucleic acid stabilizing agent and in plasma collected in EDTA blood collection tubes. Proteins from certain groups of proteins, such as glycoproteins, nuclear-related proteins, DNA-related proteins, and RNA-related proteins were more frequently identified in plasma collected in blood collection tubes comprising a nucleic acid stabilizing agent than in plasma collected in EDTA blood collection tubes. Together these resulted indicated that samples collected in tubes comprising a nucleic acid stabilizing agent (e.g., Streck tubes) are suitable for protein corona analysis.

Example 13

Protein Corona Analysis of Lung Cancer Samples Collected in Tubes Comprising a Nucleic Acid Stabilizing Agent This example describes protein corona analysis of lung cancer samples collected in tubes comprising a nucleic acid stabilizing agent.

Samples were collected from subjects participating in a lung cancer study. Samples from each subject were collected in EDTA plasma collection tubes and Streck plasma collection tubes. Collected samples were processed for protein corona analysis. Samples collected in EDTA sample collection tubes were analyzed on site. Samples collected in Streck sample collection tubes were shipped overnight and analyzed at a remote facility. Samples from 20 subjects were analyzed with a single particle type. Each sample was assayed in triplicate. MS analysis was performed on each sample and replicates using a TF Lumos with 1 hour data-dependent acquisition (DDA) runs.

Figure 26:
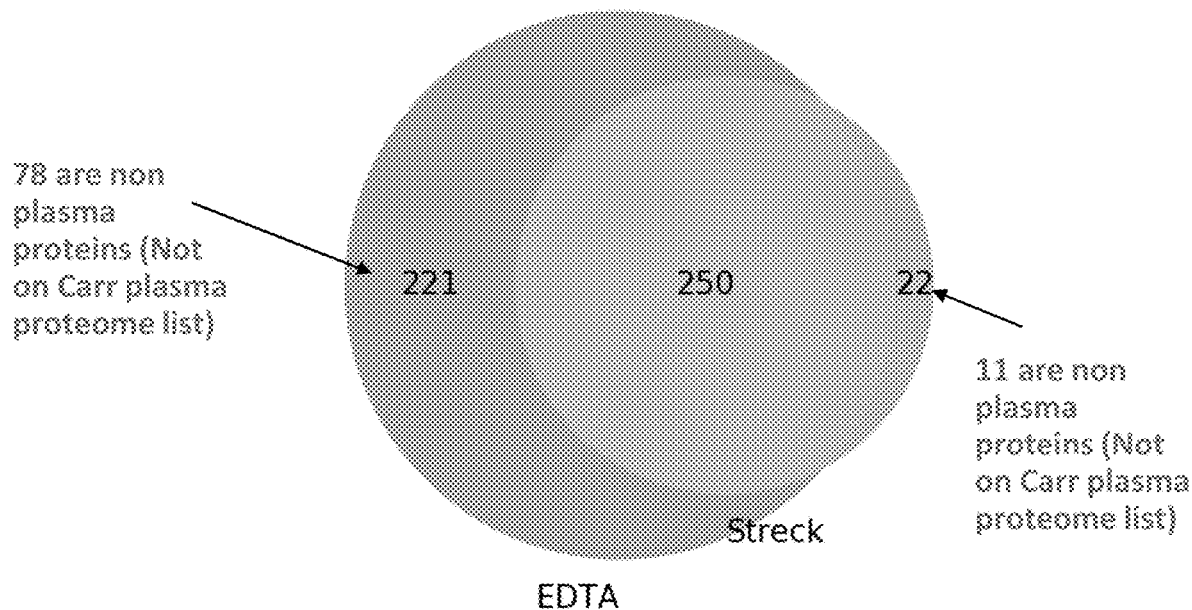
FIG. 26 shows the overlap of proteins identified experimentally in biological samples collected into an EDTA sample collection tube ("EDTA") or a Streck sample collection tube ("Streck").

FIG. 26 shows the overlap of proteins identified experimentally in biological samples collected into an EDTA sample collection tube ("EDTA") or a Streck sample collection tube ("Streck"). While more proteins were identified in samples collected in EDTA tubes, the proteins identified in samples collected in Streck tubes almost completely overlapped with the proteins identified in the samples collected in EDTA tubes.

Figure 27:
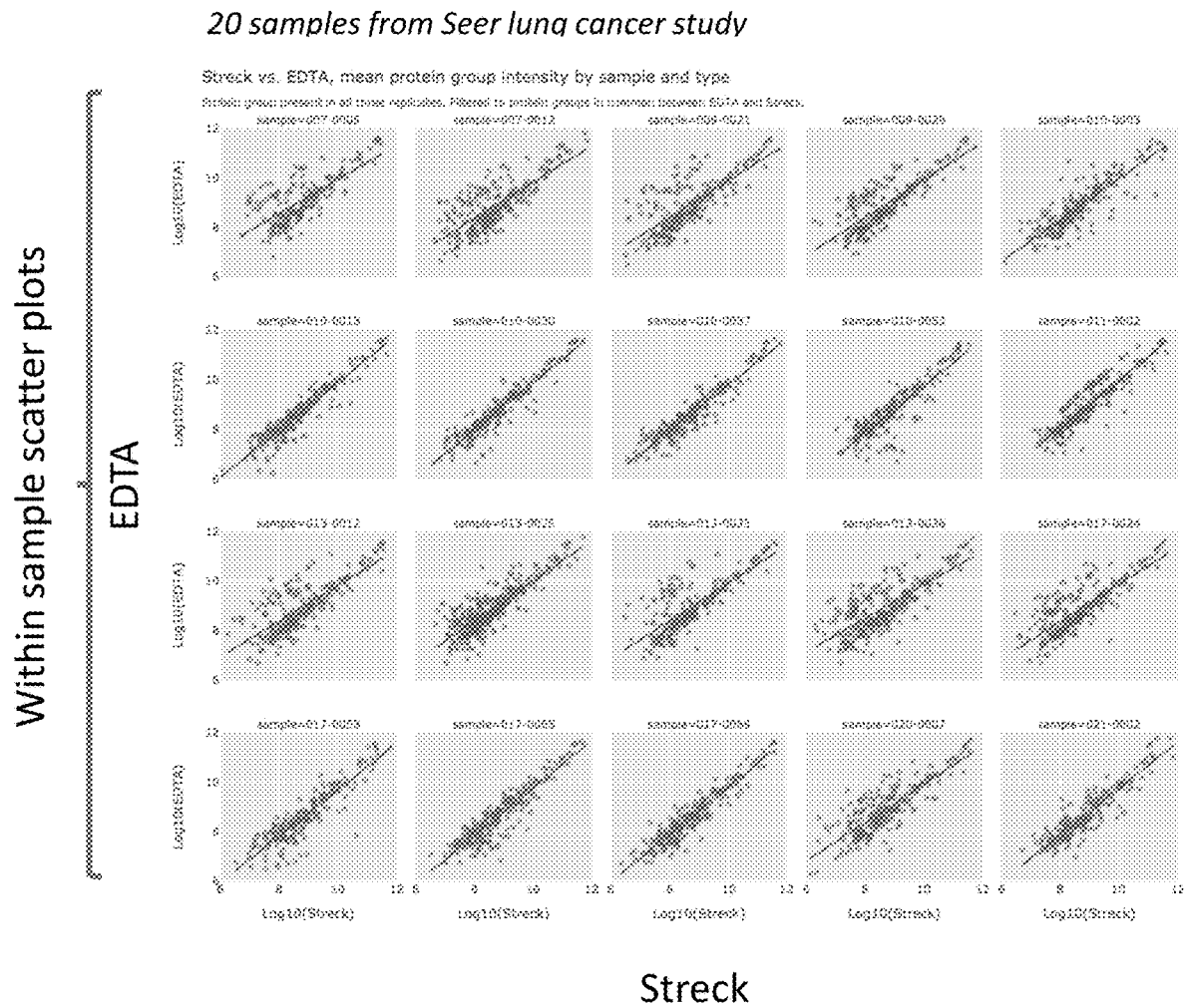
FIG. 27 shows mean protein group intensities of proteins identified in samples collected in EDTA sample collection tubes and samples collected in Streck sample collection tubes. Protein group intensities were plotted for proteins present in the Carr plasma proteome database and identified in both the analyzed in the samples collected in EDTA sample collection tubes (y-axis) and the samples collected in Streck sample collection tubes (x-axis).

FIG. 27 shows mean protein group intensities of proteins identified in samples collected in EDTA sample collection tubes and samples collected in Streck sample collection tubes. Protein group intensities were plotted for proteins present in the Carr plasma proteome database and identified in both the analyzed in the samples collected in EDTA sample collection tubes (y-axis) and the samples collected in Streck sample collection tubes (x-axis).

Figure 28A:
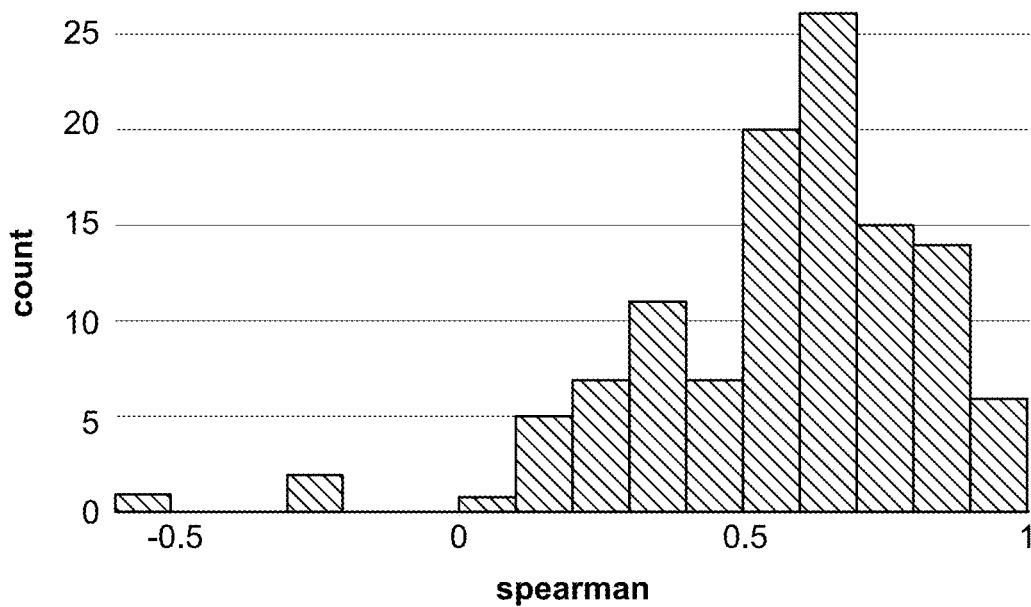
FIG. 28A and FIG. 28B show Spearman (FIG. 28A) and Pearson (FIG. 28B) correlation coefficients between the 115 protein groups identified in FIG. 27.
Figure 28B:
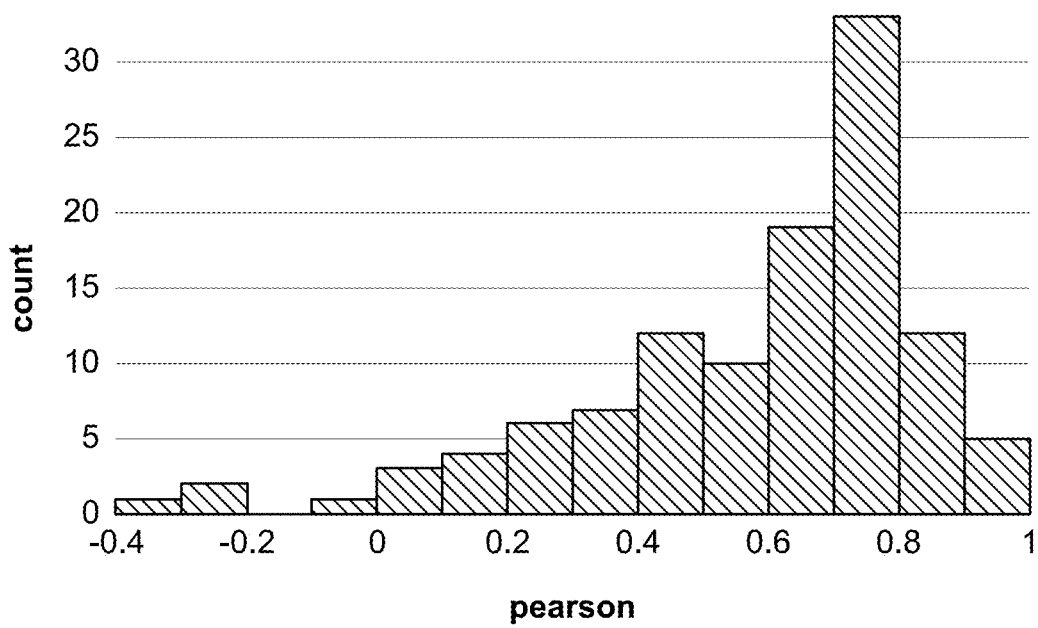

FIG. 28A and FIG. 28B show Spearman (FIG. 28A) and Pearson (FIG. 28B) correlation coefficients between the 115 protein groups identified in FIG. 27. Both the Spearman and Pearson correlation coefficients indicate a strong positive correlation in protein group intensity between samples collected in EDTA tubes and samples collected in Streck tubes. Together these results indicated that collection of biological samples in Streck tubes are suitable for large-scale proteomic profiling using particle sample preparation methods.

Example 14

Corona Analysis via Serial Interrogation of a Cerebrospinal Fluid Sample

This example describes corona analysis via serial interrogation of a cerebrospinal fluid sample. A cerebrospinal fluid sample is collected from a subject. A first particle type selected from the particles provided in TABLE 1 is added to 100 μL of the cerebrospinal fluid sample and incubated to form protein corona. The first particle type is separated from the cerebrospinal fluid sample by centrifugation or magnetic pulldown. The supernatant is collected. The pellet containing the particles is washed and resuspended, and the corona are analyzed by mass spectrometry. A second particle type selected from the particles provided in TABLE 1 is added to the supernatant and incubated to form protein corona. Optionally, the second particle type is the same as the first particle type. The second particle type is separated from the supernatant by centrifugation or magnetic pulldown. The supernatant is collected. The pellet containing the particles is washed and resuspended, and the corona are analyzed by mass spectrometry. A third particle type selected from the particles provided in TABLE 1 is added to the supernatant and incubated to form protein corona. Optionally, the third particle type is the same as the first particle type. The third particle type is separated from the supernatant by centrifugation or magnetic pulldown. The supernatant is collected. The pellet containing the particles is washed and resuspended, and the corona are analyzed by mass spectrometry.

The supernatant is re-interrogated with up to ten particle types selected from the particles provided in TABLE 1, and the protein corona formed on each particle type are analyzed by mass spectrometry. Proteins are identified from the mass spectrometry analysis of the protein corona formed on each of the up to ten particle types.

Example 15

Corona Analysis via Serial Interrogation of a Synovial Fluid Sample

This example describes corona analysis via serial interrogation of a synovial fluid sample. A synovial fluid sample is collected from a subject. A first particle type selected from the particles provided in TABLE 1 is added to 100 µL of the synovial fluid sample and incubated to form protein corona. The first particle type is separated from the synovial fluid sample by centrifugation or magnetic pulldown. The supernatant is collected. The pellet containing the particles is washed and resuspended, and the corona are analyzed by mass spectrometry. A second particle type selected from the particles provided in TABLE 1 is added to the supernatant and incubated to form protein corona. Optionally, the second particle type is the same as the first particle type. The second particle type is separated from the supernatant by centrifugation or magnetic pulldown. The supernatant is collected. The pellet containing the particles is washed and resuspended, and the corona are analyzed by mass spectrometry. A third particle type selected from the particles provided in TABLE 1 is added to the supernatant and incubated to form protein corona. Optionally, the third particle type is the same as the first particle type. The third particle type is separated from the supernatant by centrifugation or magnetic pulldown. The supernatant is collected. The pellet containing the particles is washed and resuspended, and the corona are analyzed by mass spectrometry. The supernatant is re-interrogated with up to ten particle types selected from the particles provided in TABLE 1, and the protein corona formed on each particle type are analyzed by mass spectrometry. Proteins are identified from the mass spectrometry analysis of the protein corona formed on each of the up to ten particle types.

Example 16

Corona Analysis via Serial Interrogation of a Homogenized Tissue Sample

This example describes corona analysis via serial interrogation of a homogenized tissue sample. A homogenized tissue sample is collected from a subject. A first particle type selected from the particles provided in TABLE 1 is added to 100 µL of the homogenized tissue sample and incubated to form protein corona. The first particle type is separated from the homogenized tissue sample by centrifugation or magnetic pulldown. The supernatant is collected. The pellet containing the particles is washed and resuspended, and the corona are analyzed by mass spectrometry. A second particle type selected from the particles provided in TABLE 1 is added to the supernatant and incubated to form protein corona. Optionally, the second particle type is the same as the first particle type. The second particle type is separated from the supernatant by centrifugation or magnetic pulldown. The supernatant is collected. The pellet containing the particles is washed and resuspended, and the corona are analyzed by mass spectrometry. A third particle type selected from the particles provided in TABLE 1 is added to the supernatant and incubated to form protein corona. Optionally, the third particle type is the same as the first particle type. The third particle type is separated from the supernatant by centrifugation or magnetic pulldown. The supernatant is collected. The pellet containing the particles is washed and resuspended, and the corona are analyzed by mass spectrometry. The supernatant is re-interrogated with up to ten particle types selected from the particles provided in TABLE 1, and the protein corona formed on each particle type are analyzed by mass spectrometry. Proteins are identified from the mass spectrometry analysis of the protein corona formed on each of the up to ten particle types.

Example 17

Corona Analysis via Serial Interrogation of a Plasma Sample

This example describes corona analysis via serial interrogation of a plasma sample. A plasma sample is collected from a subject. A first particle type selected from the particles provided in TABLE 1 is added to 100 µL of the plasma sample and incubated to form protein corona. The first particle type is separated from the plasma sample by centrifugation or magnetic pulldown. The supernatant is collected. The pellet containing the particles is washed and resuspended, and the corona are analyzed by mass spectrometry. A second particle type selected from the particles provided in TABLE 1 is added to the supernatant and incubated to form protein corona. Optionally, the second particle type is the same as the first particle type. The second particle type is separated from the supernatant by centrifugation or magnetic pulldown. The supernatant is collected. The pellet containing the particles is washed and resuspended, and the corona are analyzed by mass spectrometry. A third particle type selected from the particles provided in TABLE 1 is added to the supernatant and incubated to form protein corona. Optionally, the third particle type is the same as the first particle type. The third particle type is separated from the supernatant by centrifugation or magnetic pulldown. The supernatant is collected. The pellet containing the particles is washed and resuspended, and the corona are analyzed by mass spectrometry. The supernatant is re-interrogated with up to ten particle types selected from the particles provided in TABLE 1, and the protein corona formed on each particle type are analyzed by mass spectrometry. Proteins are identified from the mass spectrometry analysis of the protein corona formed on each of the up to ten particle types.

Example 18

Corona Analysis via Serial Interrogation of a Urine Sample

This example describes corona analysis via serial interrogation of a urine sample. A urine sample is collected from a subject. A first particle type selected from the particles provided in TABLE 1 is added to 100 µL of the urine sample and incubated to form protein corona. The first particle type is separated from the urine sample by centrifugation or magnetic pulldown. The supernatant is collected. The pellet containing the particles is washed and resuspended, and the corona are analyzed by mass spectrometry. A second particle type selected from the particles provided in TABLE 1 is added to the supernatant and incubated to form protein corona. Optionally, the second particle type is the same as the first particle type. The second particle type is separated from the supernatant by centrifugation or magnetic pulldown. The supernatant is collected. The pellet containing the particles is washed and resuspended, and the corona are analyzed by mass spectrometry. A third particle type selected from the particles provided in TABLE 1 is added to the supernatant and incubated to form protein corona. Optionally, the third particle type is the same as the first particle type. The third particle type is separated from the supernatant by centrifugation or magnetic pulldown. The supernatant is collected. The pellet containing the particles is washed and resuspended, and the corona are analyzed by mass spectrometry. The supernatant is re-interrogated with up to ten particle types selected from the particles provided in TABLE 1, and the protein corona formed on each particle type are analyzed by mass spectrometry. Proteins are identified from the mass spectrometry analysis of the protein corona formed on each of the up to ten particle types.

Example 19

Protein Detection by ELISA in Plasma Samples Collected in EDTA or Blood Collection Tubes Comprising a Nucleic Acid Stabilizing Agent This example describes protein detection by ELISA in plasma samples collected in EDTA or blood collection tubes comprising a nucleic acid stabilizing agent. Plasma samples were collected from human subjects into either EDTA blood collection tubes or Streck blood collection tubes. Paired EDTA and Streck samples were collected from each of 20 patients for comparison. Concentrations of three high importance proteins, C-reactive protein (CRP), Calgranulin A and B ("S100"), and MUC16/CA125 ("CA125"), were measured in each sample by enzyme-linked immunosorbent assay (ELISA). CRP is a pentameric protein found in blood plasma, whose circulating concentrations rise in response to inflammation. Elevated levels of CRP are associated with increased future risk of cancer of any type, lung cancer, and possibly colorectal cancer. Calgranulin A and B are calcium-binding proteins that are secreted in a heterodimeric form by activated immune cells, such as monocytes, granulocytes, and neutrophils and are expressed in larger amounts in inflammatory diseases such as rheumatoid arthritis, and in some types of cancer. CA125 is a component of the ocular surface, the respiratory tract and the female reproductive tract and has been shown to play a role in advancing tumorigenesis and tumor proliferation by several different mechanisms.

Figure 30A:
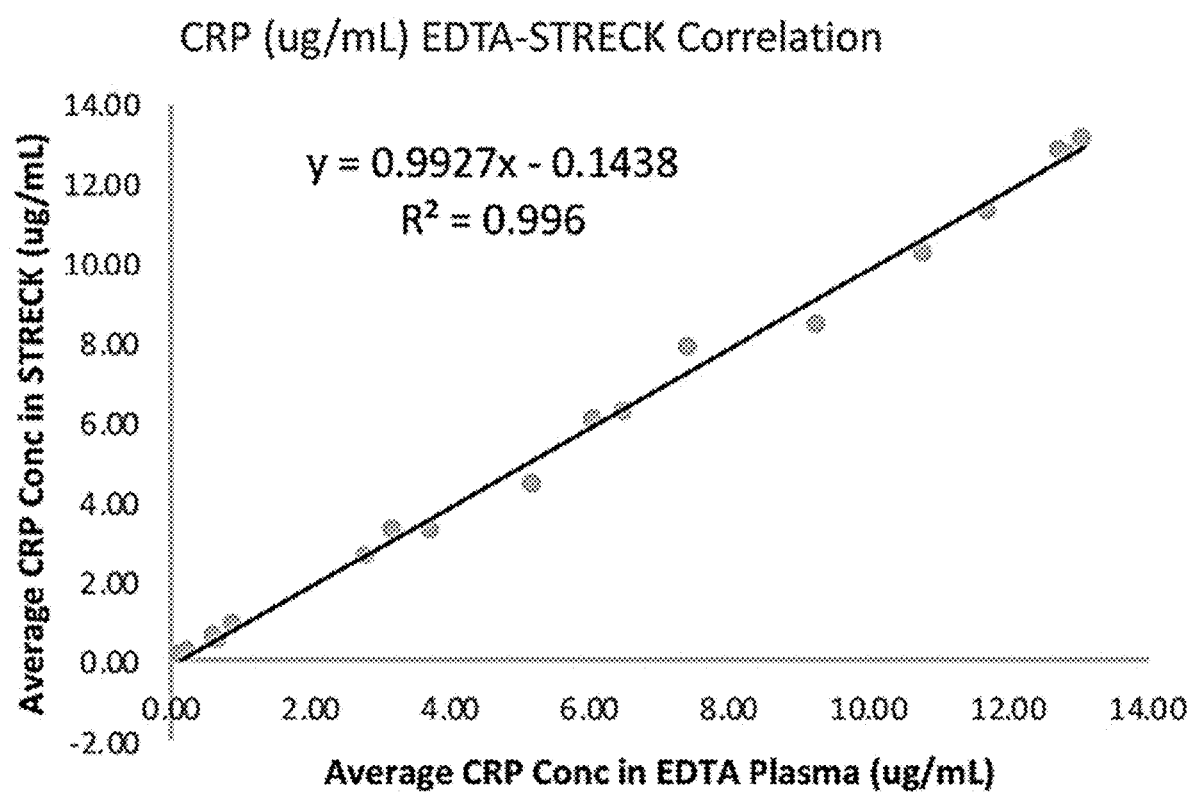
FIG. 30A-FIG. 30C show correlation of three protein concentrations as measured by enzyme-linked immunosorbent assay (ELISA) between plasma samples collected in EDTA blood collection tubes (x-axis) and plasma samples collected in Streck sample collection tubes (y-axis).
Figure 30B:
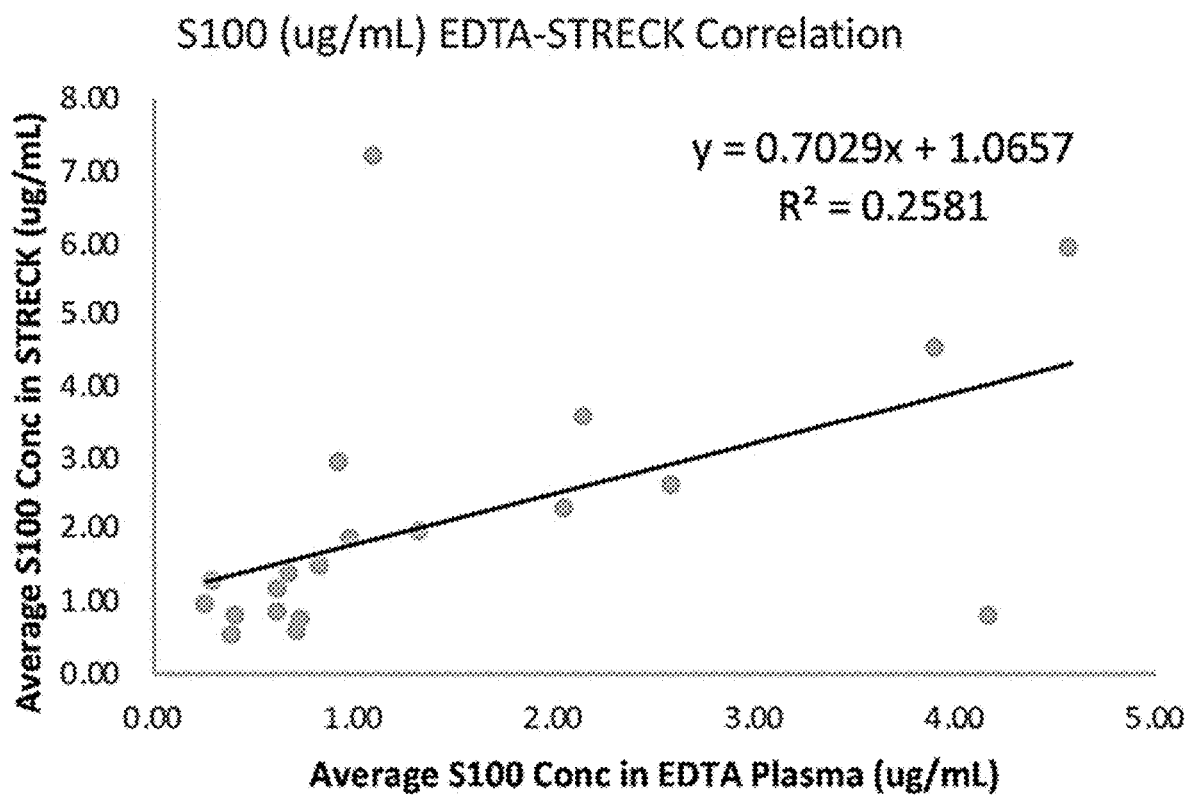
Figure 30C:
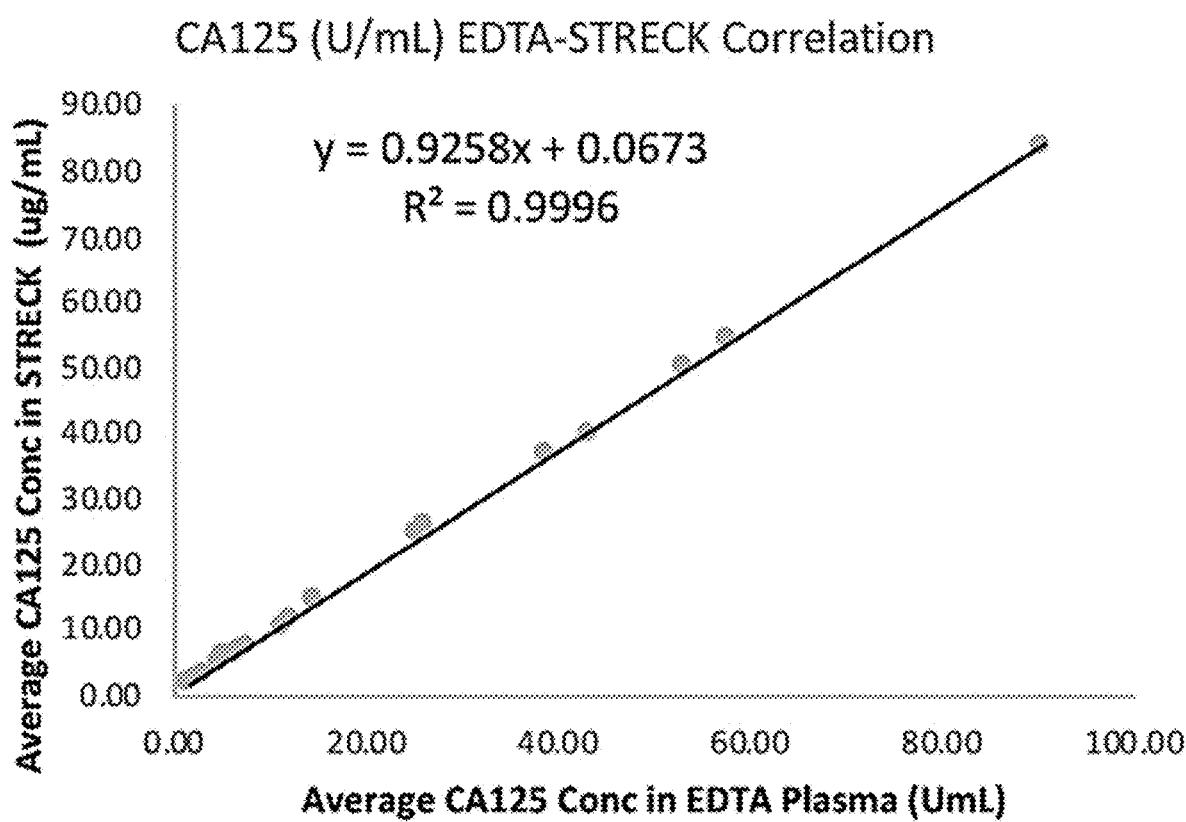
Figure 31:
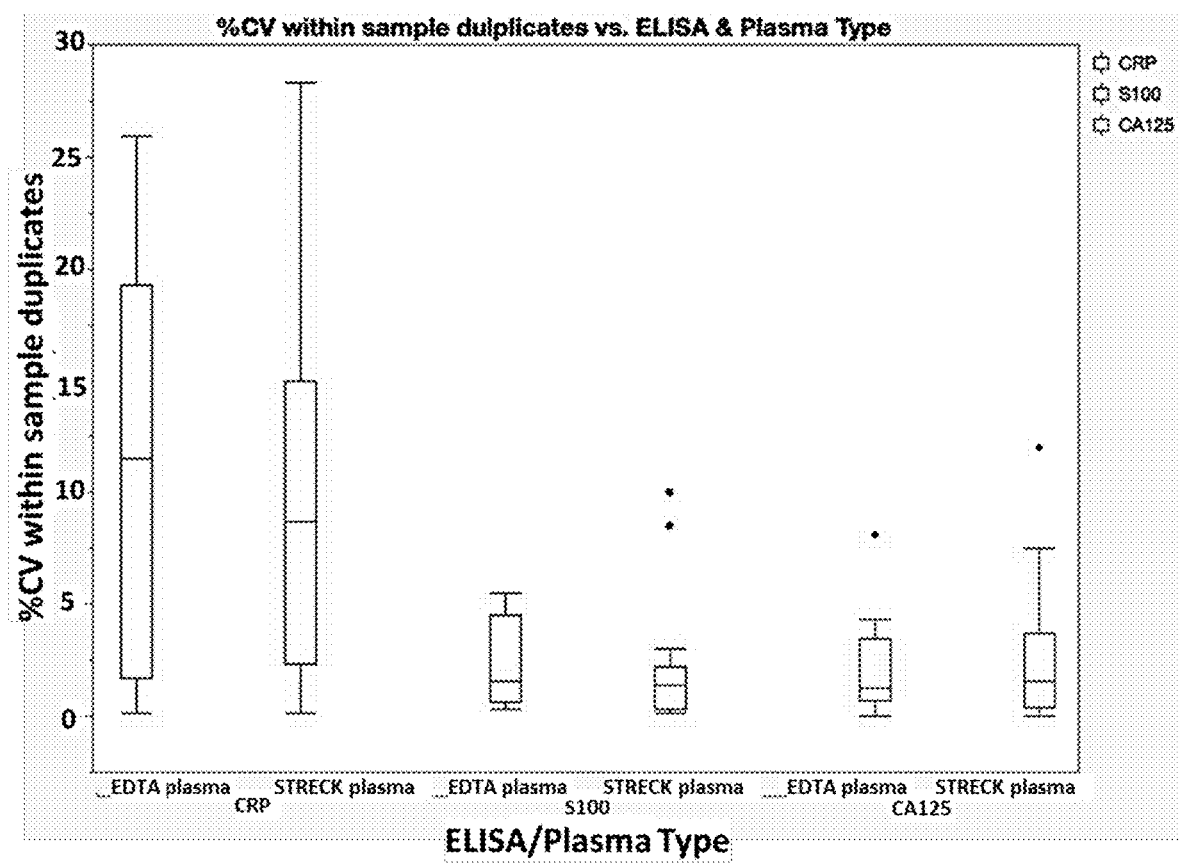
FIG. 31 shows the percent coefficient of variation (% CV) of CRP (left two box and whiskers), S100 (middle two box and whiskers), and CA125 (right two box and whiskers) of protein concentrations detected by ELISA in plasma samples collected in either EDTA blood collection tubes or Streck blood collection tubes.
Figure 32:
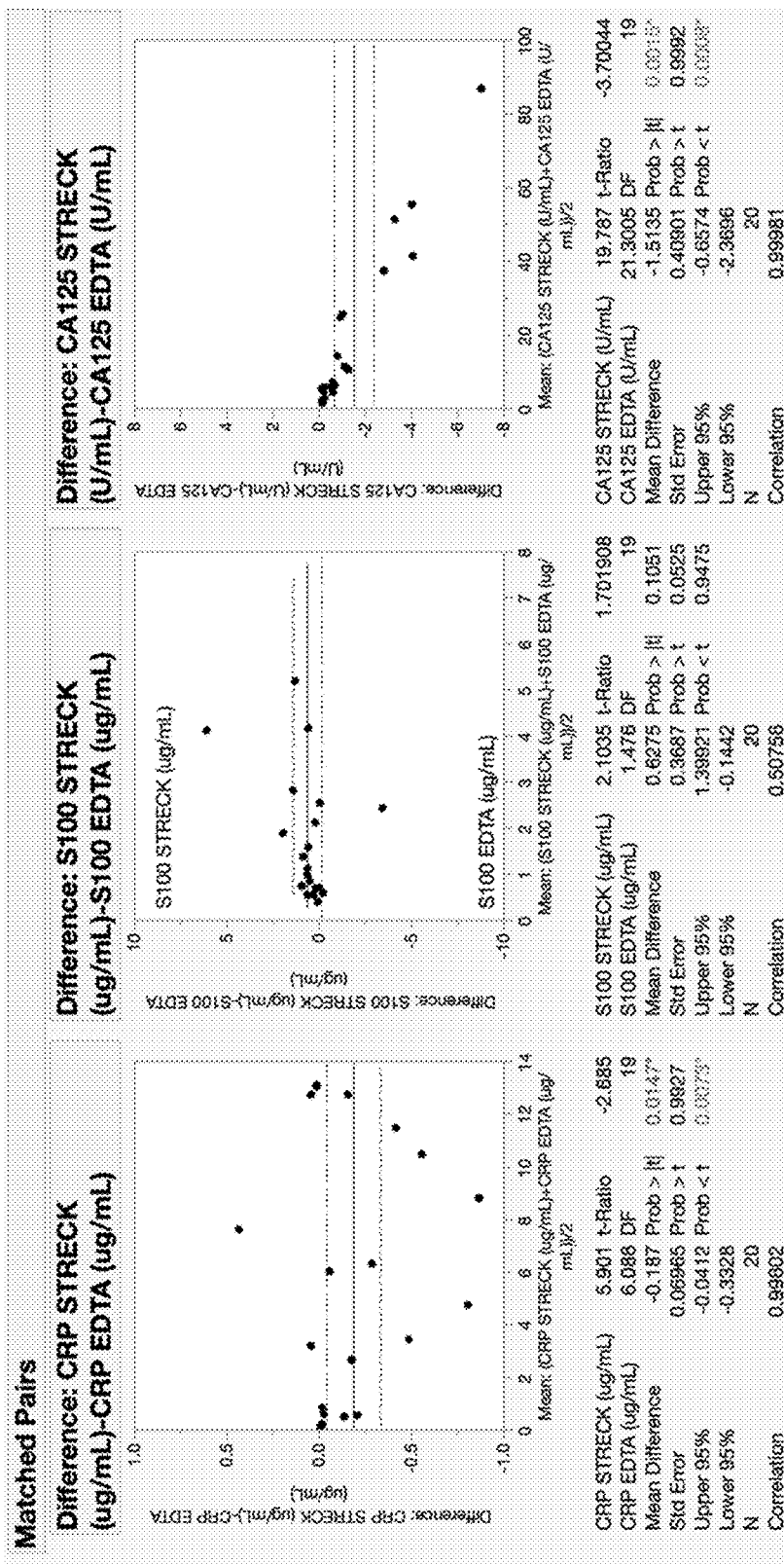
FIG. 32 shows the matched pair difference in protein concentration detected by ELISA in samples collected in either EDTA blood collection tubes or Streck blood collection tubes for CRP (left plot), S100 (middle plot), and CA125 (right plot).

Protein concentrations were measured using commercially available kits specific for each protein. CRP was detected using the Human C-Reactive Protein/CRP Kit (R&D Systems, Inc.), S100 was detected using the Human S100A8/S100A9 Heterodimer Kit (R&D Systems, Inc.), and CA125 was detected using the Human CA125/MUC16 Kit (R&D Systems, Inc.). FIG. 30A-FIG. 30C show correlation of three protein concentrations as measured by enzyme-linked immunosorbent assay (ELISA) between plasma samples collected in EDTA blood collection tubes (x-axis) and plasma samples collected in Streck sample collection tubes (y-axis). FIG. 30A shows the correlation of C-reactive protein (CRP). FIG. 30B shows the correlation of a Calgranulin A and B heterodimer ("S100"). FIG. 30C shows the correlation of MUC16/CA125 ("CA125"). Protein concentrations in each sample were measured in duplicate and averaged between the two repeats. Concentrations of CRP, S100, and CA125 were well correlated between samples collected in EDTA blood collection tubes and samples collected in Streck blood collection tubes. FIG. 31 shows the percent coefficient of variation (% CV) of CRP (left two box and whiskers), S100 (middle two box and whiskers), and CA125 (right two box and whiskers) of protein concentrations detected by ELISA in plasma samples collected in either EDTA blood collection tubes or Streck blood collection tubes. The percent coefficient of variation of protein concentration was consistent between samples collected in EDTA blood collection tubes and samples collected in Streck blood collection tubes. FIG. 32 shows the matched pair difference in protein concentration detected by ELISA in samples collected in either EDTA blood collection tubes or Streck blood collection tubes for CRP (left plot), S100 (middle plot), and CA125 (right plot). The difference in protein concentration in samples collected in EDTA blood collection tubes and samples collected in Streck blood collection tubes was low.

Example 20

Dynamic Range Compression of Plasma Using Protein Corona Analysis

This example describes dynamic range compression of plasma using protein corona analysis.

In order to evaluate the ability of particles to compress the measured dynamic range, measured and identified protein feature intensities were compared to the published values for the concentration of the same protein. First, the resulting peptide features for each protein was selected with the maximum MS-determined intensity of all possible features for a protein (using the OpenMS MS data processing tools to extract monoisotopic peak values), and then the intensities were modeled against the published abundance levels for those same proteins. FIG. 34 shows correlation of the maximum intensities of particle corona proteins and plasma proteins to the published concentration of the same proteins. The blue plotted lines are linear regression models to the data and the shaded regions represent the standard error of the model fit. The dynamic range of the samples assayed with particles ("S-003," "S-007," and "S-011") exhibited a compressed dynamic range as compared to the plasma sample not assayed with particles ("Plasma"), as shown by the decrease in slopes of the linear fits. The slopes of each plot are 0.47, 0.19, 0.22, and 0.18 for, plasma without particles, plasma with S-003 particles, plasma with S-007 particles, and plasma with S-011 particles, respectively. FIG. 35 shows the dynamic range compression of a protein corona analysis assay with mass spectrometry as compared to mass spectrometry without particle corona formation. Protein intensities of common proteins identified in particle corona in the plasma samples assayed in FIG. 34 ("Nanoparticle MS ln Intensity") are plotted against the protein intensity identified by mass spectrometry of plasma without particles ("Plasma MS ln Intensity"). The lightest dotted line shows a slope of 1, indicating the dynamic range of mass spectrometry without particles. The slopes of the linear fits to the protein intensity was 0.12, 0.36, and 0.093 for S-003, S-007, and S-011 particles, respectively. The grayed area indicates the standard error region of the regression fit.

By comparing the regression model slopes and the intensity span of the measured data, the particle coronas contain more proteins at lower abundances (measured or reported) than does plasma. The dynamic range of those measured values was compressed (the slope of the regression model is reduced) for particle measurements as compared to plasma measurements. This was consistent with previous observations that particle can effectively compress the measured dynamic range for abundances in the resulting corona as compared to the original dynamic range in plasma, which could be attributable to the combination of absolute concentration of a protein, its binding affinity to particles, and its interactions with neighboring proteins. The results indicated that the protein corona strategy facilitated the identification of a broad spectrum of plasma proteins, particularly those in the low abundance that are challenging for rapid detection by conventional proteomic techniques.

Example 21

Serial Interrogation as Compared to Parallel Interrogation of a Sample

This example describes serial interrogation of a sample with particles as compared to parallel interrogation of a sample with particles.

A first sample having a low sample volume of 10 µL is serially interrogated with two or more particle types. A first particle type is contacted to the first sample, the first sample and the first particle type are incubated to allow formation of a first biomolecule corona on the first particle type, and the first particle type is separated from the first sample. The remainder of the first sample is contacted to a second particle type, the remainder of the first sample and the second particle type are incubated to allow formation of a second biomolecule corona on the first particle type, and the second particle type is separated from the remainder of the first sample. The contacting, incubating, and separating are optionally repeated with additional particle types. The biomolecule corona on the first particle type, the second particle type, and any additional particle types are analyzed by assaying for proteins in the corona, for example, by mass spectrometry.

A second sample, from the same source as the first sample, is split into 10 µL multiple aliquots for parallel interrogation with two or more particle types. The sample is split into a number of aliquots greater than or equal to the number of particle types to be used in the method of assaying for proteins. A first particle type is contacted to a first aliquot, the first aliquot and the first particle type are incubated to allow formation of a first biomolecule corona on the first particle type, and the first particle type is separated from the first aliquot. In parallel, a second particle type is contacted to a second aliquot, the second aliquot and the second particle type are incubated to allow formation of a second biomolecule corona on the second particle type, and the second particle type is separated from the second aliquot. The contacting, incubating, and separating are performed with additional particle types in additional aliquots. The biomolecule corona on the first particle type, the second particle type, and any additional particle types are analyzed by assaying for proteins in the corona, for example, by mass spectrometry.

Serial interrogation with two or more particle types of the first sample uses a smaller sample volume (10 µL total) for protein corona analysis than parallel interrogation of the second sample, which uses 10 µL of sample per particle type to be assayed. Even while using less total sample, serial interrogation of the first sample enables detection of a range of proteins that is comparable to or broader than the range detected by parallel interrogation. As shown in FIG. 9, a biomolecule corona formed on a particle (e.g., HX-42) may contain a different population of proteins when contacted to a sample first ("HX-42 corona 1") than when contacted to a sample following 3 rounds of serial interrogation with another particle type ("P39 & HX-42 Corona 4"). Serial interrogation of the first sample enables detection of a range of low abundance proteins that comparable to or broader than the range detected by parallel interrogation. For example, serial interrogation of the first sample may result in depletion of low abundance, high affinity proteins in early rounds of interrogation, allowing for adsorption of low abundance, low affinity proteins into the biomolecule corona of particle types used in later rounds of interrogation.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A method of serially interrogating a sample, the method comprising:
   a) contacting the sample to a first particle type and incubating the first particle type with the sample to form a first biomolecule corona, wherein the first biomolecule corona forms upon incubation of the first particle type with the sample and wherein the first biomolecule corona comprises a protein;
   b) separating the first particle type comprising the first biomolecule corona as a pellet from a supernatant of the sample;
   c) contacting the supernatant of the sample to a second particle type and incubating the second particle type with the supernatant of the sample to form a second biomolecule corona, wherein the second biomolecule corona forms upon incubation of the second particle type with the supernatant of the sample, wherein the second biomolecule corona comprises a protein, and further wherein (i) the first particle type and the second particle type are a same particle type or (ii) the first particle type and the second particle type are different;
   d) separating the second particle type comprising the second biomolecule corona from the supernatant of the sample; and
   e) assaying the first biomolecule corona and the second biomolecule corona to determine a composition and concentration of a plurality of proteins in the sample based on the assayed first biomolecule corona and the assayed second biomolecule corona,
   wherein the sample is serially interrogated with the first particle type before the second particle type.

2. The method of claim 1, wherein upon the incubating the first particle type with the sample to form the first biomolecule corona, the dynamic range of the plurality of proteins in the first biomolecule corona is compressed relative to a dynamic range of a plurality of proteins in the sample, as measured by a total protein analysis method.

3. The method of claim 2, wherein the dynamic range of the plurality of proteins in the first biomolecule corona is a first ratio of:
   a) a signal produced by a higher abundance protein of the plurality of proteins in the first biomolecule corona; and
   b) a signal produced by a lower abundance protein of the plurality of proteins in the first biomolecule corona.

4. The method of claim 2, wherein the dynamic range of the plurality of proteins in the first biomolecule corona comprises:
   a) a first ratio of a concentration of the highest abundance protein to a concentration of the lowest abundance protein in the plurality of proteins in the first biomolecule corona;

b) a first ratio of a top decile of proteins to a bottom decile of proteins in the plurality of proteins in the first biomolecule corona;

c) a first ratio comprising a span of the interquartile range of proteins in the plurality of proteins in the first biomolecule corona; or d) a first ratio comprising a slope of fitted data in a plot of all concentrations of proteins in the plurality of proteins in the first biomolecule corona versus known concentrations of the same proteins in the sample, wherein the known concentrations of the same proteins in the sample are obtained from a database.

5. The method of claim 1, wherein the dynamic range of a plurality of proteins in the sample is a second ratio of:

a) a signal produced by a higher abundance protein of the plurality of proteins in the sample, as measured by a total protein analysis method; and b) a signal produced by a lower abundance protein of the plurality of proteins in the sample, as measured by a total protein analysis method.

6. The method of claim 1, wherein the dynamic range of the plurality of proteins in the sample, as measured by a total protein analysis method, comprises:

a) a second ratio of a concentration of the highest abundance protein to a concentration of the lowest abundance protein in the plurality of proteins in the sample;

b) a second ratio of a top decile of proteins to a bottom decile of proteins in the plurality of proteins in the sample;

c) a second ratio comprising a span of the interquartile range of proteins in the plurality of proteins in the sample; or d) a second ratio comprising a slope of fitted data in a plot of all concentrations of proteins in the plurality of proteins in the sample versus known concentrations of the same proteins in the sample, wherein the known concentrations of the same proteins in the sample are obtained from a database;

wherein the compressing the dynamic range comprises a decreased first ratio relative to the second ratio, and wherein the decreased first ratio is at least 1.1-fold, at least 1.2-fold, at least 1.3-fold, at least 1.4-fold, at least 1.5-fold, at least 2-fold, at least 2.5-fold, at least 3-fold, at least 3.5-fold, at least 4-fold, at least 5-fold, or at least 10-fold less than the second ratio.

7. The method of claim 1, wherein the method further comprises: determining the composition and concentration of a plurality of proteins in the biomolecule corona by performing mass spectrometry.

8. The method of claim 1, the method further comprising repeating step a), b), and e) with one or more additional particle types to form one or more additional biomolecule coronas, wherein the one or more additional biomolecule coronas comprise proteins from the supernatant of the sample.

9. The method of claim 1, the one or more additional particle types are the same as the first particle type or the second particle type.

10. The method of claim 1, the one or more additional particle types are different from the first particle type, the second particle type, or a combination thereof.

11. The method of claim 1, wherein the first biomolecule corona, the second biomolecule corona, the one or more additional biomolecule coronas, or any combination thereof comprises at least 100 distinct proteins.

12. The method of claim 1, wherein the first biomolecule corona, the second biomolecule corona, the one or more additional biomolecule coronas, or any combination thereof comprises a different composition of proteins, a different concentration of a subset of proteins, or a combination thereof.

13. The method of claim 8, wherein upon incubating the one or more additional particle types with the supernatant of the sample to form one or more additional biomolecule coronas, wherein the one or more additional biomolecule coronas comprises a plurality of proteins, wherein a dynamic range of the plurality of proteins in the one or more additional biomolecule coronas is compressed relative to a dynamic range of a plurality of proteins in the sample, as measured by a total protein analysis method.

14. The method of claim 13, wherein the dynamic range of the plurality of proteins in the one or more additional biomolecule coronas is an additional ratio of:

a) a signal produced by a higher abundance protein of the plurality of proteins in the one or more additional biomolecule coronas; and b) a signal produced by a lower abundance protein of the plurality of proteins in the one or more additional biomolecule coronas.

15. The method of claim 9, the dynamic range of the plurality of proteins in the one or more additional biomolecule coronas comprises:

a) an additional ratio of a concentration of the highest abundance protein to a concentration of the lowest abundance protein in the plurality of proteins in the one or more biomolecule coronas;

b) an additional ratio of a top decile of proteins to a bottom decile of proteins in the plurality of proteins in the one or more biomolecule coronas;

c) an additional ratio comprising a span of the interquartile range of proteins in the plurality of proteins in the one or more biomolecule coronas; or d) an additional ratio comprising a slope of fitted data in a plot of all concentrations of proteins in the plurality of proteins in the one or more biomolecule coronas versus known concentrations of the same proteins in the sample, wherein the known concentrations of the same proteins in the sample are obtained from a database;

wherein the compressing the dynamic range comprises a decreased additional ratio relative to the second ratio, and wherein the decreased first ratio is at least 1.1-fold, at least 1.2-fold, at least 1.3-fold, at least 1.4-fold, at least 1.5-fold, at least 2-fold, at least 2.5-fold, at least 3-fold, at least 3.5-fold, at least 4-fold, at least 5-fold, or at least 10-fold less than the second ratio.

16. The method of claim 1, wherein the first particle type, the second particle type, the one or more additional particle types, or any combination thereof are selected from a group consisting of carboxylate (citrate) superparamagnetic iron oxide nanoparticles (SPION), phenol-formaldehyde coated SPION, silica-coated superparamagnetic iron oxide nanoparticles (SPION), polystyrene coated SPION, (carboxylated poly(styrene-co-methacrylic acid), P(St-co-MAA)) coated SPION, N-(3-trimethoxysilylpropyl) diethylenetriamine coated SPION, poly(N-(3-(dimethylamino) propyl) methacrylamide) (PDMAPMA)-coated SPION, 1,2,4,5-benzenetetracarboxylic acid coated SPION, poly(vinylbenzyltrimethylammonium chloride) (PVBTMAC) coated SPION, carboxylate/PAA coated SPION, poly(oligo (ethylene glycol) methyl ether methacrylate) (POEGMA)-coated SPION, carboxylate microparticle (surfactant free), carboxyl functionalized polystyrene, carboxylic acid functionalized particles, silica particles, carboxylic acid functionalized particles (150 nm), amino surface microparticle (0.4-0.6 μm), silica amino functionalized microparticle (0.1-0.39 μm), Jeffamine surface particle (0.1-0.39 μm), polystyrene microparticle (2.0-2.9 μm), particles with carboxylated original coating (50 nm), particles with dextran based coating (0.13 μm), and particles with silica silanol coated with lower acidity.

17. The method of claim 1, comprising removing high abundance proteins from the sample by depleting or fractioning the sample prior to step a).

18. The method of claim 1, wherein the first biomolecule corona, the second biomolecule corona, the one or more additional biomolecule coronas, or any combination thereof comprises a lipid, a nucleic acid, a polysaccharide, or any combination thereof.

19. The method of claim 1, wherein the first particle type, the second particle type, or the one or more additional particle types differ by at least one physicochemical properties, wherein the first particle type, the second particle type, the one or more additional particle types, or any combination thereof is selected from the group consisting of a nanoparticle, a microparticle, a micelle, a liposome, an iron oxide particle, a graphene particle, a silica particle, a protein-based particle, a polystyrene particle, a silver particle, a gold particle, a metal particle, a quantum dot, a superparamagnetic particle, or any combination thereof.

20. A device for serially interrogating a sample, the device comprising:
 a particle panel comprising a first magnetic particle type and a second magnetic particle type, wherein (i) the first magnetic particle type and the second magnetic particle type are a same particle type or (ii) the first magnetic particle type and the second magnetic particle type are different;
 a plurality of wells comprising the particle panel, wherein a first well in the plurality of wells comprises the first magnetic particle type and a second well in the plurality of wells comprises the second magnetic particle type;
 one or more pipettes, one or more shakers, one or more magnets in operable communication with the plurality of wells; and
 at least one processor comprising:
  a computer program including instructions that, upon execution by the at least one processor, cause the at least one processor to perform at least:
   i. pipetting, using the one or more pipettes, the sample to a first well in the plurality of wells comprising the first particle type to contact the sample to the first particle type;
   ii. incubating, using the one or more shakers, the first particle type with the sample to form a first biomolecule corona, wherein the first biomolecule corona forms upon incubation of the first particle type with the sample and wherein the first biomolecule corona comprises a protein;
   iii. separating, using the one or more magnets, the first particle type comprising the first biomolecule corona from the sample to form a supernatant of the sample;
   iv. pipetting, using the one or more pipettes, the supernatant of the sample to a second well in the plurality of wells comprising the second particle type to contact the supernatant of the sample to the second particle type;
   v. incubating, using the one or more shakers, the second particle type with the supernatant of the sample to form a second biomolecule corona, wherein the second biomolecule corona forms upon incubation of the second particle type with the supernatant of the sample, wherein the second biomolecule corona comprises a protein;
   vi. separating, using the one or more magnets, the second particle type comprising the second biomolecule corona from the supernatant of the sample; and
   vii. assaying the first biomolecule corona and the second biomolecule corona to determine a composition and concentration of a plurality of proteins in the sample based on the assayed first biomolecule corona and the assayed second biomolecule corona,
  wherein the sample is serially interrogated with the first particle type before the second particle type.

21. The method of claim 1, wherein the sample is plasma or serum.

22. The method of claim 21, wherein the assaying comprises mass spectrometry.

23. The method of claim 22, wherein the assaying comprises determining the composition and the concentration of at least 2000 distinct proteins.

24. The method of claim 23, wherein the first biomolecule corona, the second biomolecule corona, or both comprises lipids.

25. The method of claim 24, wherein the first particle, the second particle, or both comprise magnetic microparticles.

* * * * *